(12) United States Patent
Villa-Real

(10) Patent No.: US 10,207,684 B2
(45) Date of Patent: Feb. 19, 2019

(54) BLADELESS MULTI-JET SURFACE CLEANING SYSTEM PROVIDING CLEAR-VIEW NON-DISTRACTING VISIBILITY FOR AUTOMOBILE WINDSHIELDS, SIDE-VIEW MIRRORS, AND TRANSPARENT VIEWING SHIELDINGS OF AMPHIBIAN, AQUATIC AND AERIAL VEHICLES, INCLUDING BUILDING VIEWING PANELS

(71) Applicant: Antony-Euclid C. Villa-Real, Las Vegas, NV (US)

(72) Inventor: Antony-Euclid C. Villa-Real, Las Vegas, NV (US)

( * ) Notice: Subject to any disclaimer, the term of this patent is extended or adjusted under 35 U.S.C. 154(b) by 0 days.

(21) Appl. No.: 15/065,457

(22) Filed: Mar. 9, 2016

(65) Prior Publication Data

US 2017/0259788 A1 Sep. 14, 2017

(51) Int. Cl.
| | |
|---|---|
| *A47L 11/40* | (2006.01) |
| *B60S 1/48* | (2006.01) |
| *B60S 1/52* | (2006.01) |
| *B60R 1/06* | (2006.01) |
| *B60S 1/58* | (2006.01) |
| *B08B 3/02* | (2006.01) |
| *B08B 5/02* | (2006.01) |
| *B08B 3/10* | (2006.01) |
| *B08B 7/00* | (2006.01) |
| *B08B 3/12* | (2006.01) |

(52) U.S. Cl.
CPC .......... *B60S 1/488* (2013.01); *B08B 3/02* (2013.01); *B08B 3/10* (2013.01); *B08B 3/102* (2013.01); *B08B 3/12* (2013.01); *B08B 5/02* (2013.01); *B08B 7/0071* (2013.01); *B60R 1/0602* (2013.01); *B60S 1/52* (2013.01); *B60S 1/58* (2013.01)

(58) Field of Classification Search
None
See application file for complete search history.

(56) References Cited

U.S. PATENT DOCUMENTS

2011/0155192 A1\* 6/2011 Ahmad .................. B60S 1/481
134/56 R
2013/0193231 A1\* 8/2013 Mologousis ............ B05B 15/06
239/172

\* cited by examiner

*Primary Examiner* — Eric W Golightly

(57) ABSTRACT

An apparatus and system for bladeless transparent wiping, cleaning and clearing operations applicable for automobile windshields and side-view mirrors, and those of other vehicles, including transparent viewing shielding of buildings, by removing and bouncing off rain, snow, ice and dirt away from the visual fields of drivers and passengers and other viewers, using forceful regulated sustained or intermittent cyclic ejection of multi-streams of angular-oriented fluid jets ejected from angled linear-slit or wavy-slit jet nozzles built-in from longitudinal pressurized fluid delivery pipes structurally placed away from the visual fields of the drivers and passengers and other viewers, wherein the degree of pressurization, fluid volume, intensity, velocity, and timing of cyclic release of the pressurized suctioned fluid jets are manually and automatically controlled by commands, regulators, temperature sensing and fluid suctioning mechanisms supplied by electrical power supply.

13 Claims, 57 Drawing Sheets

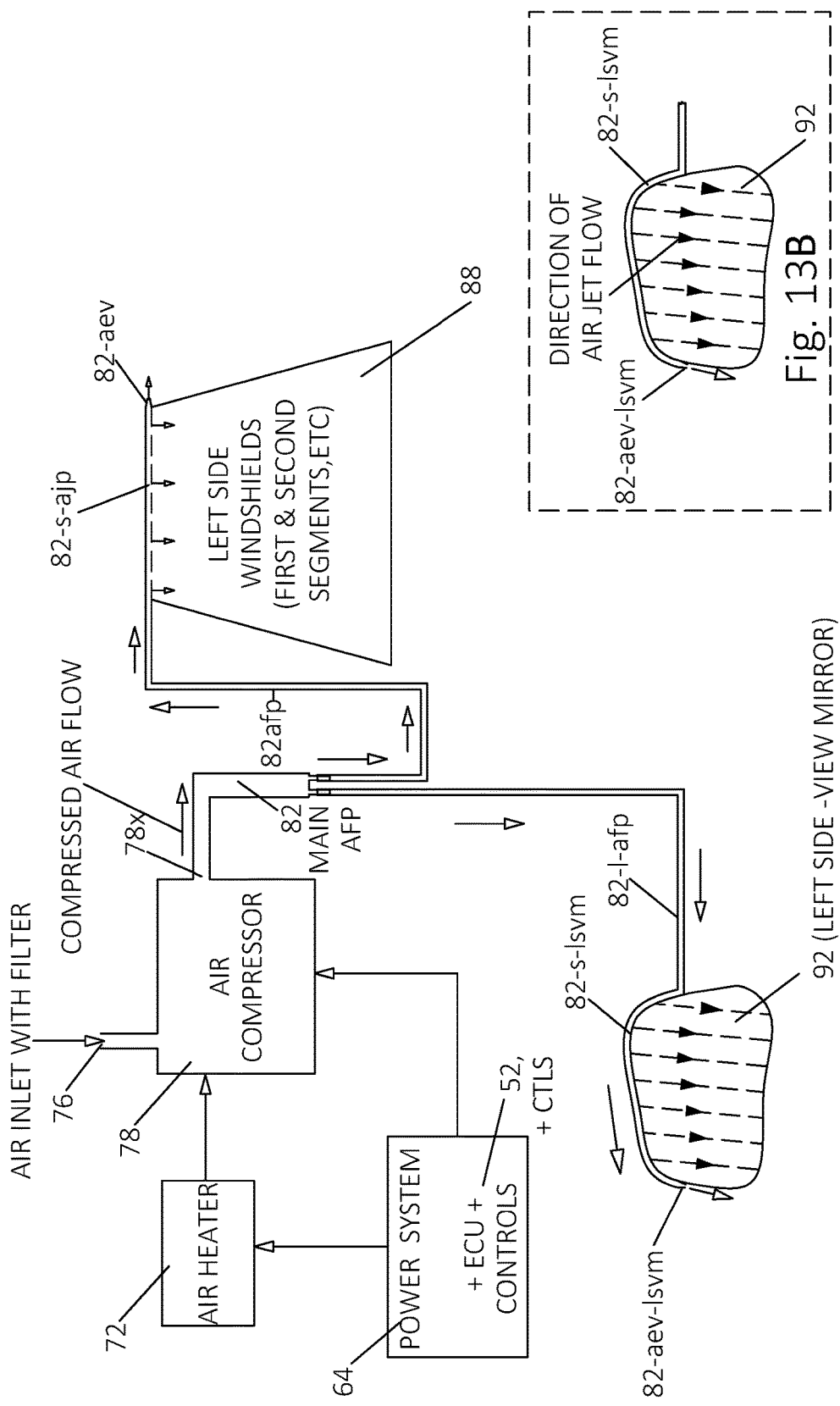

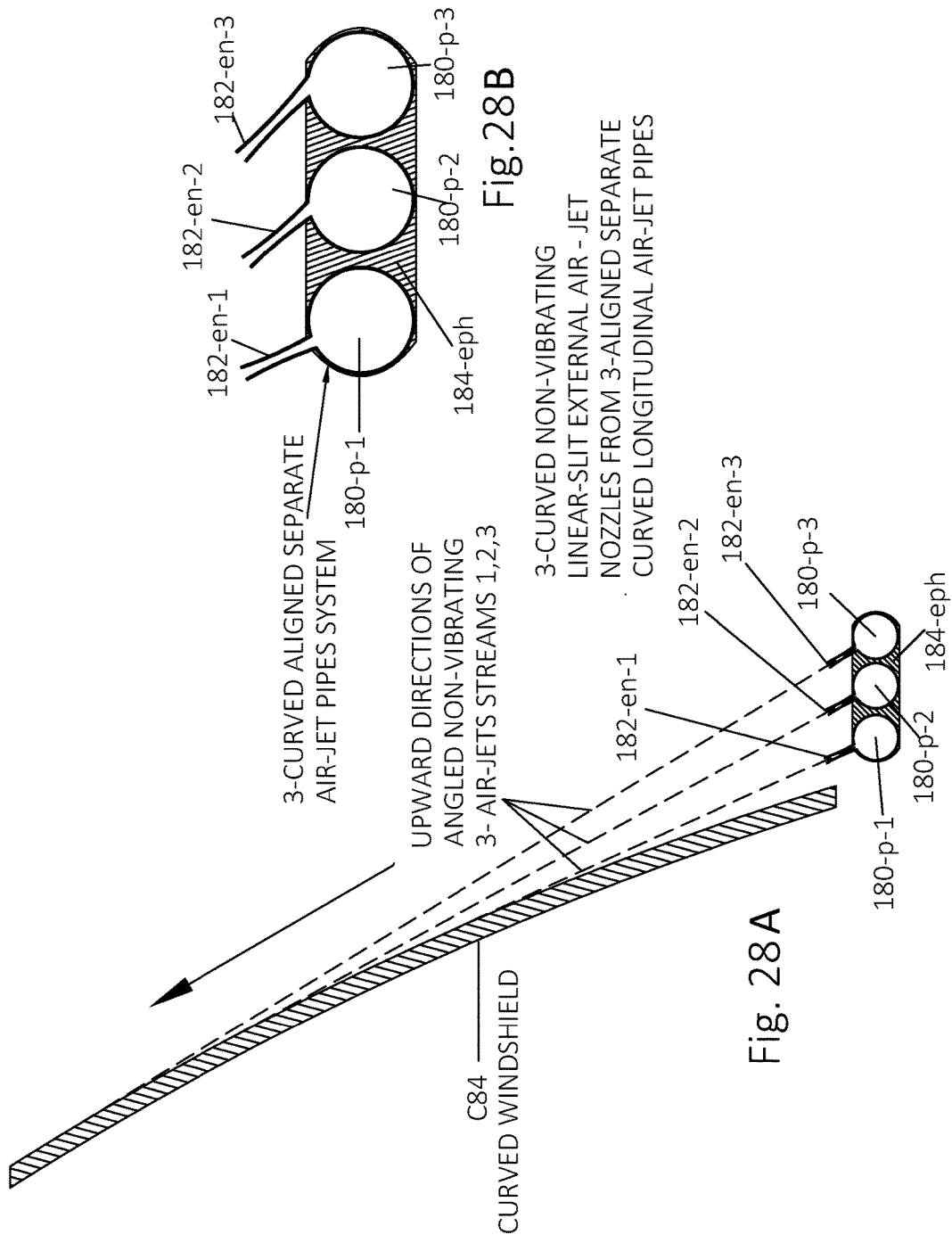

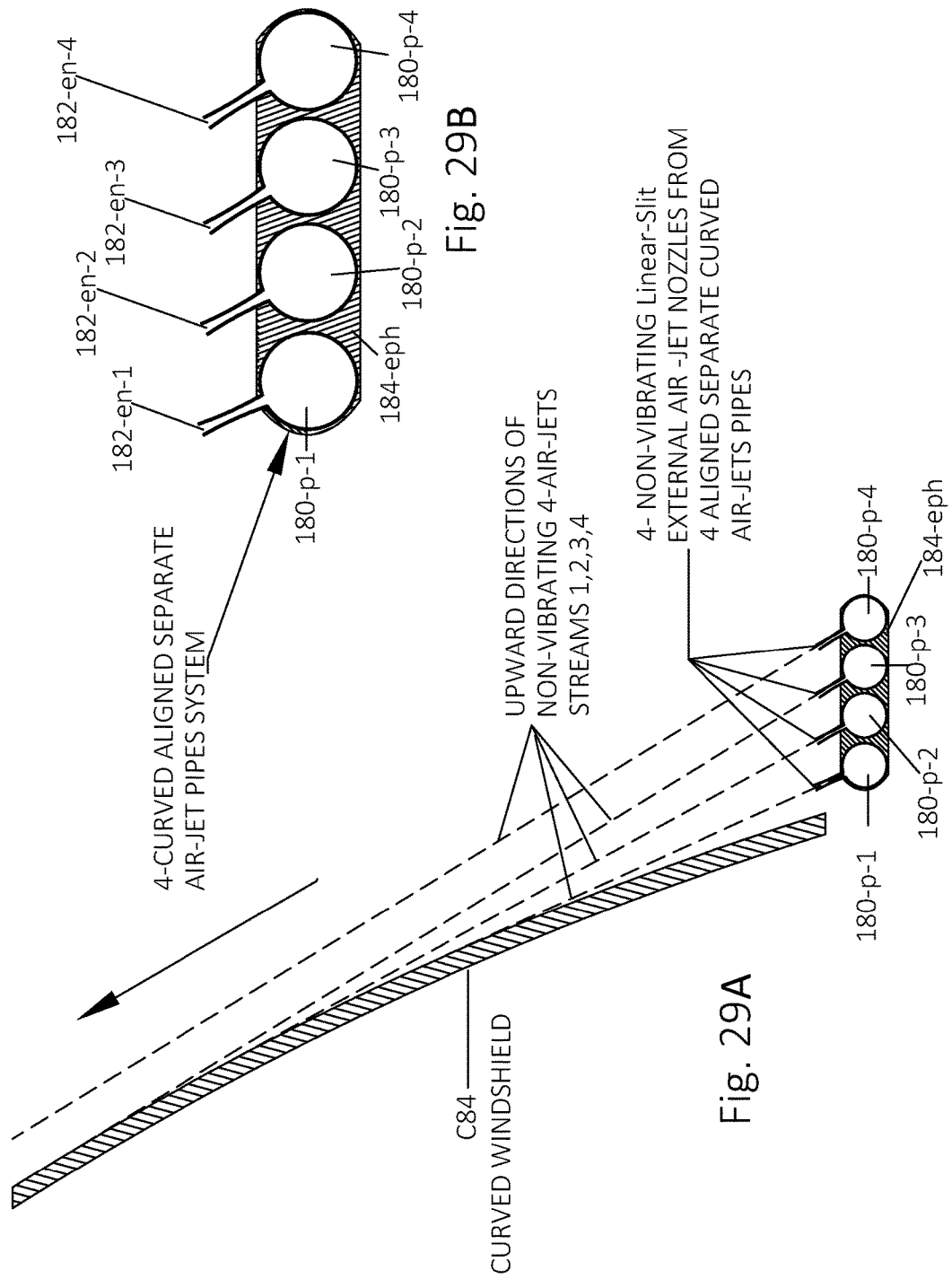

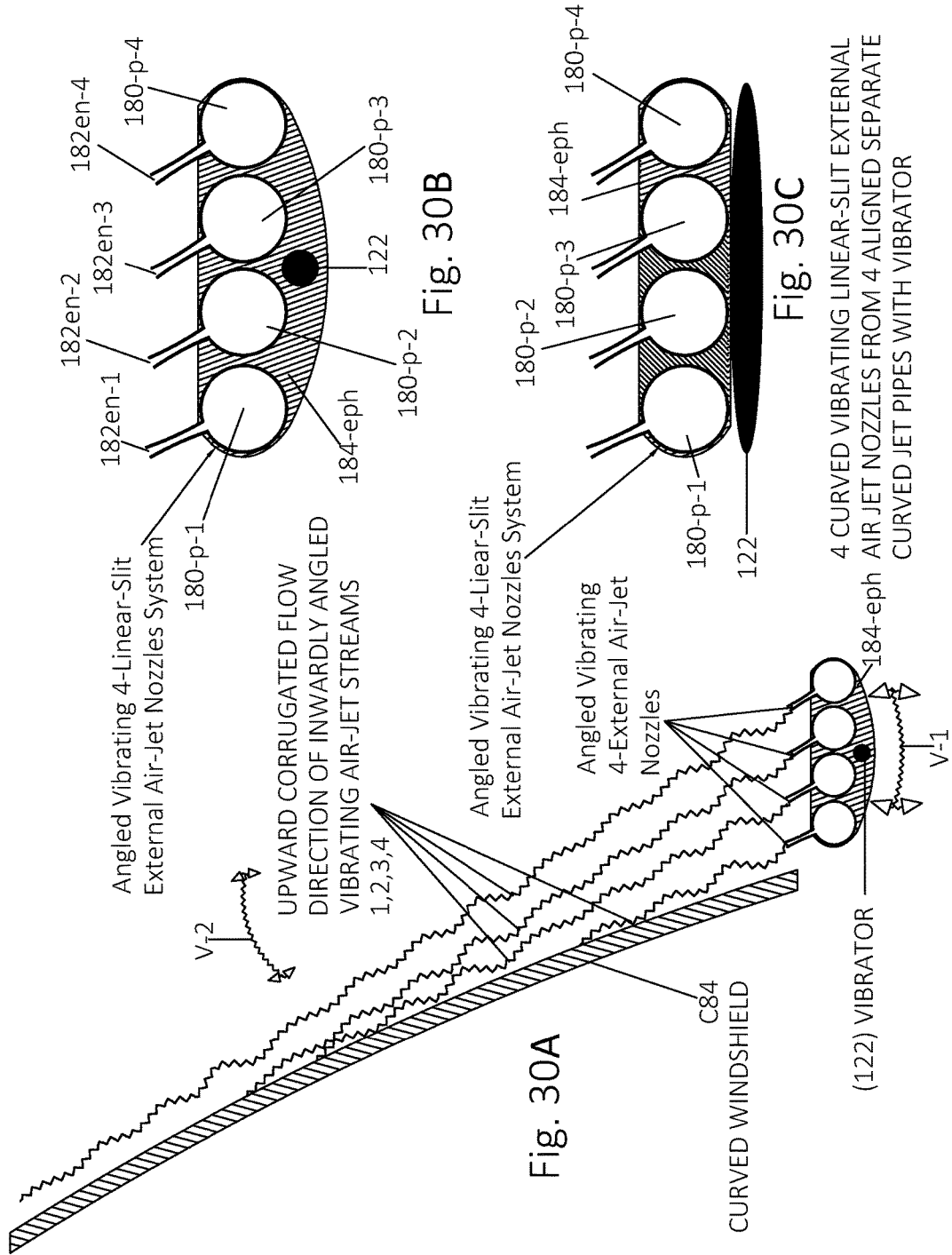

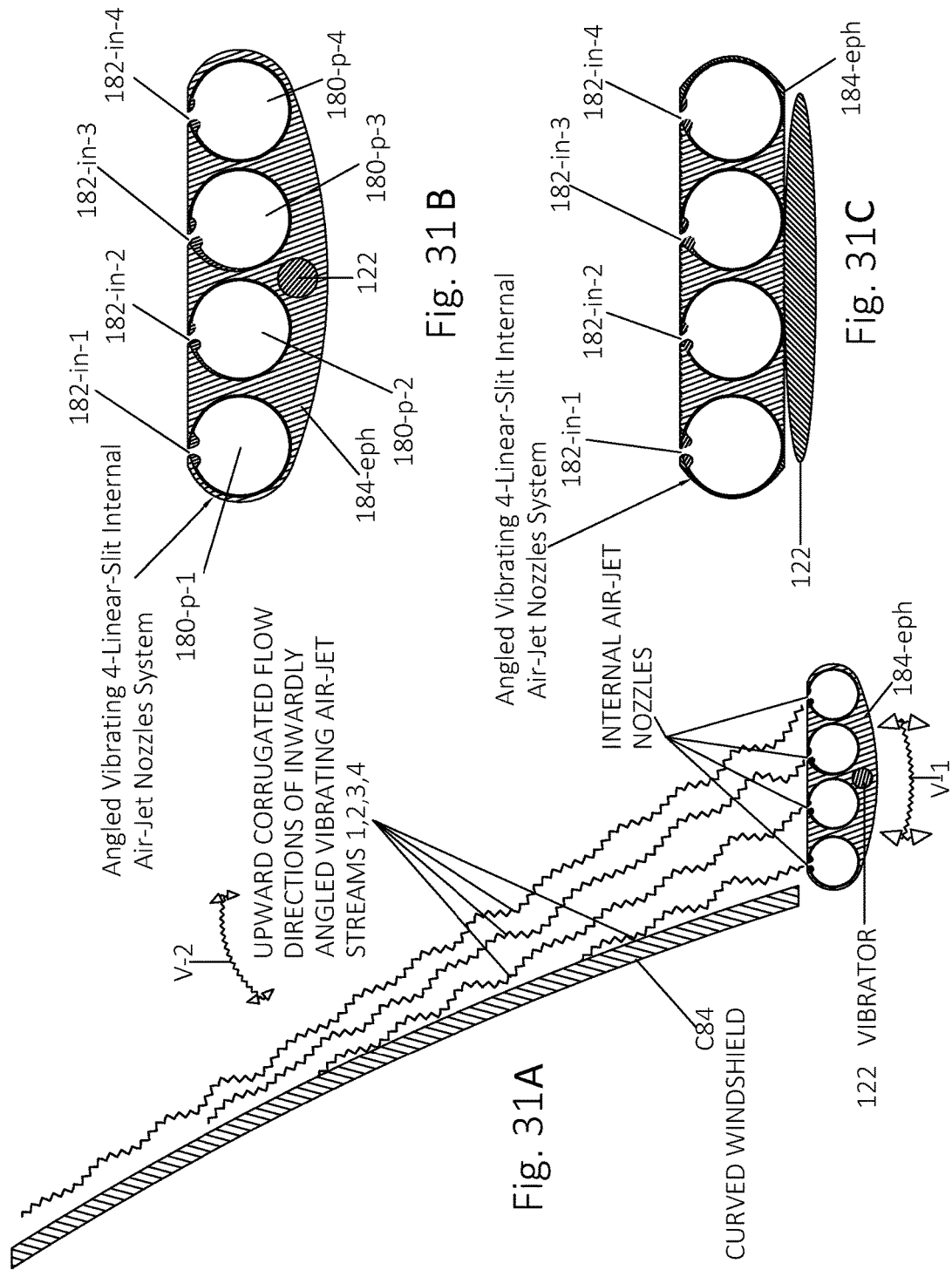

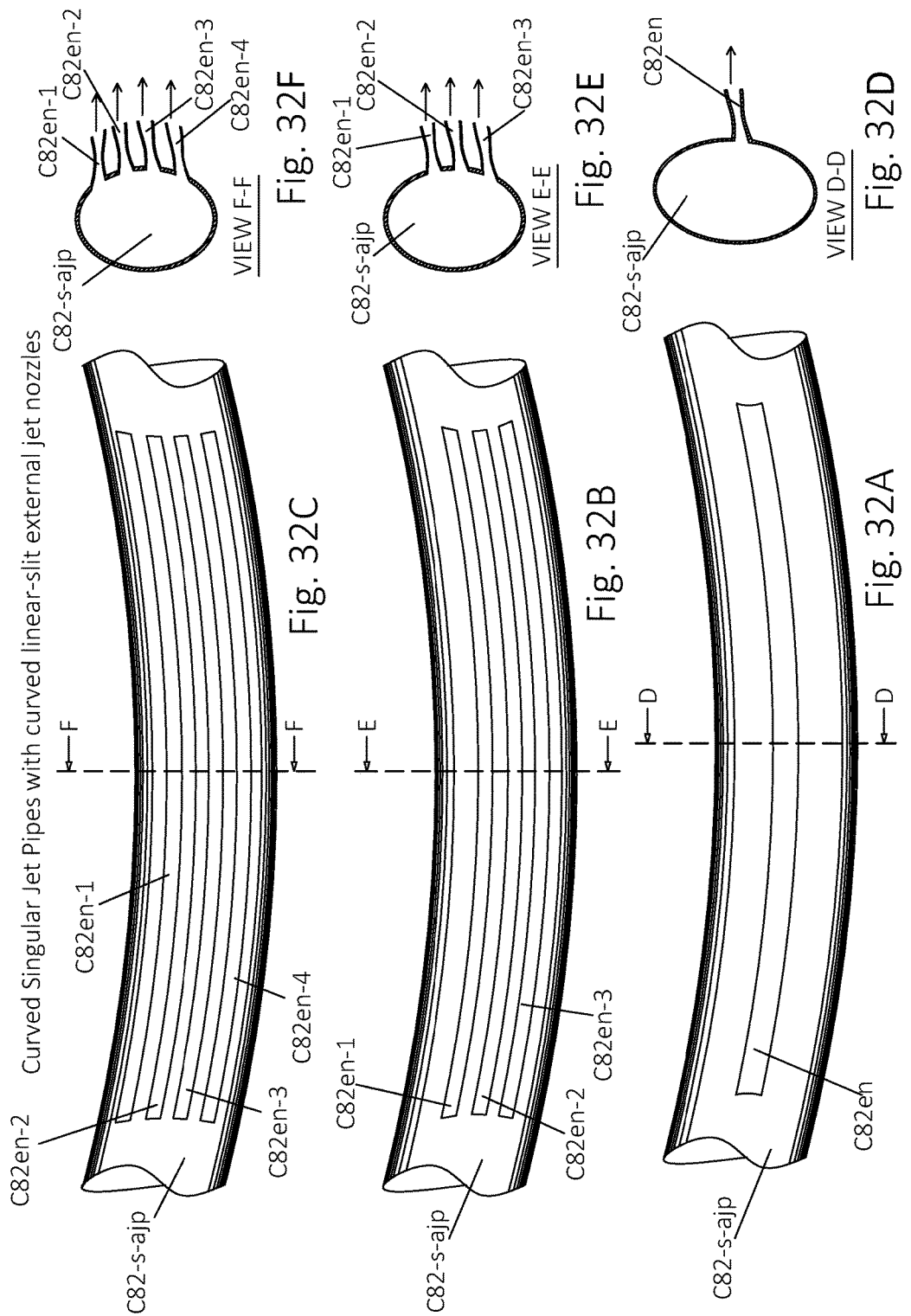

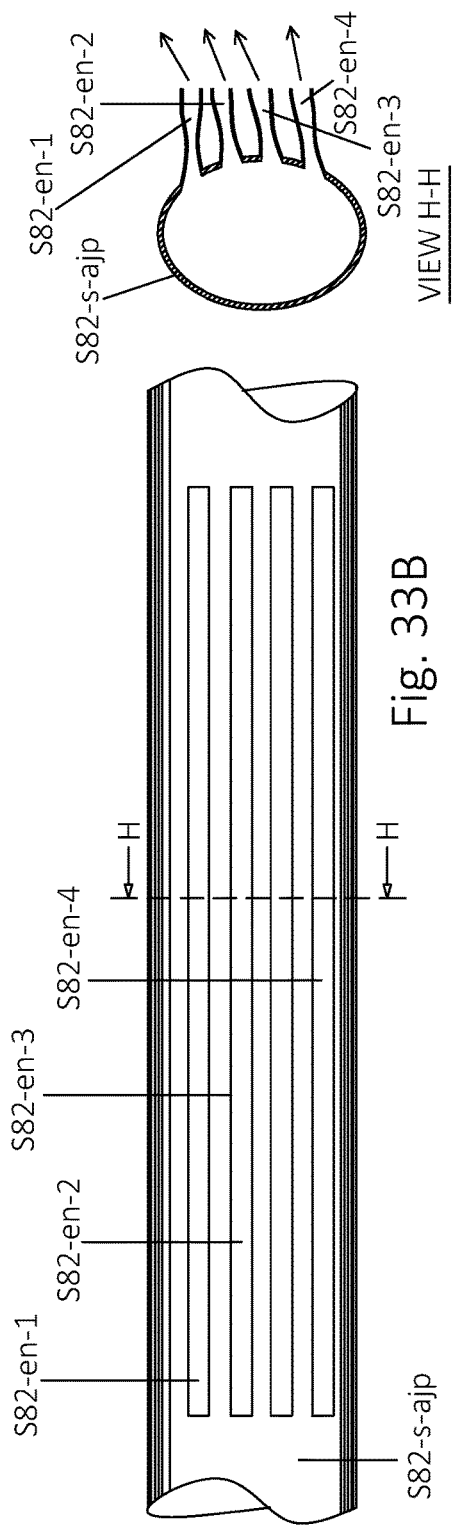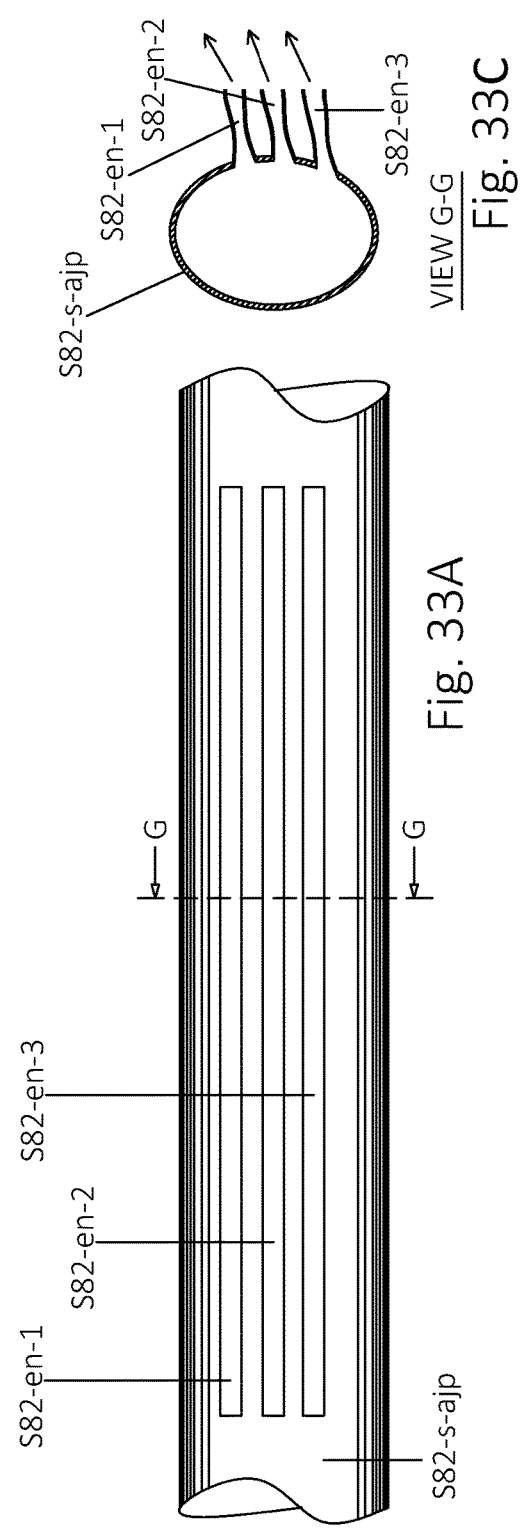
Straight Singular Jet Pipes with Straight linear-slit External Jet Nozzles

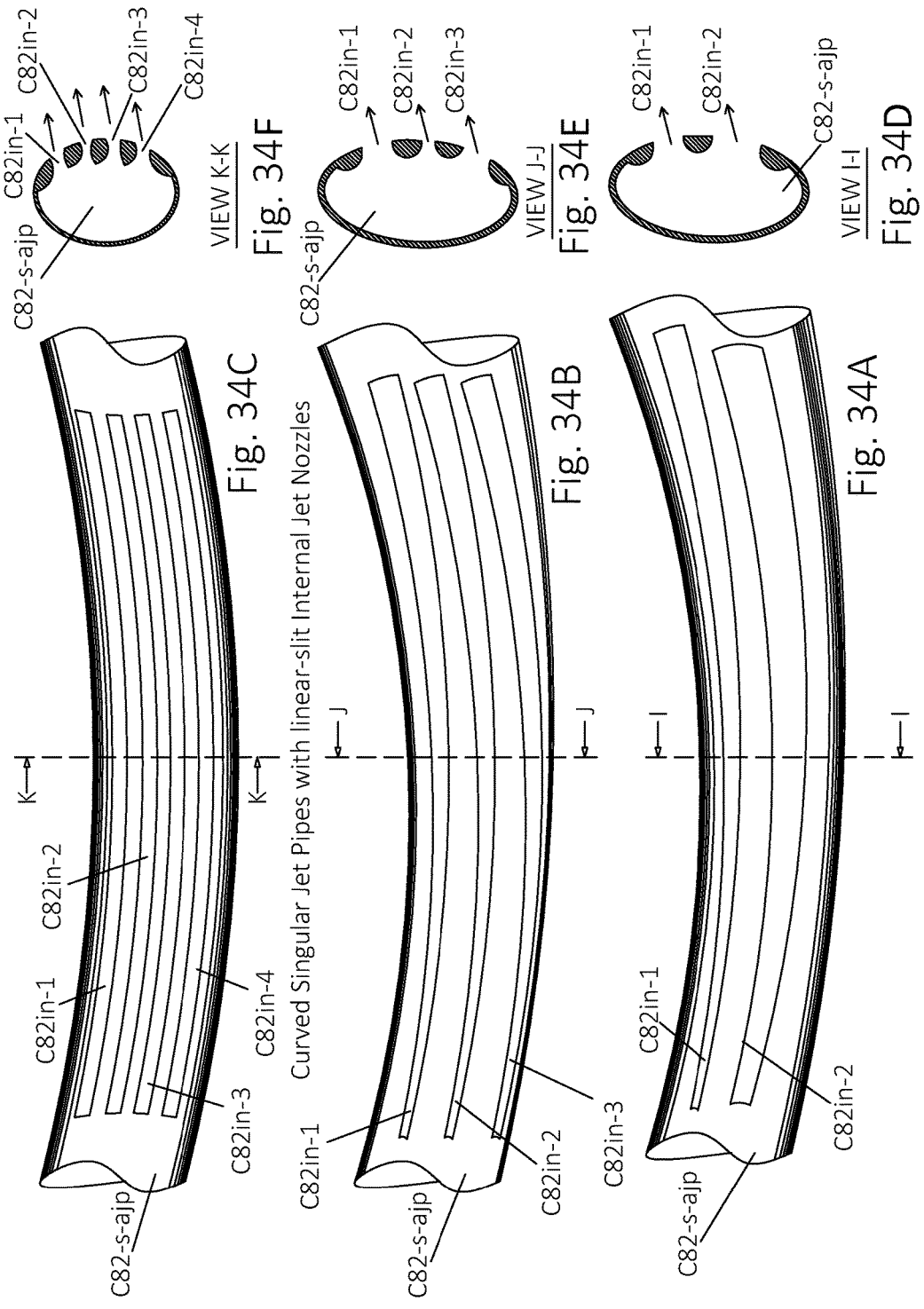

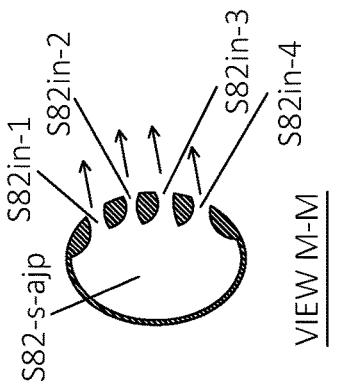
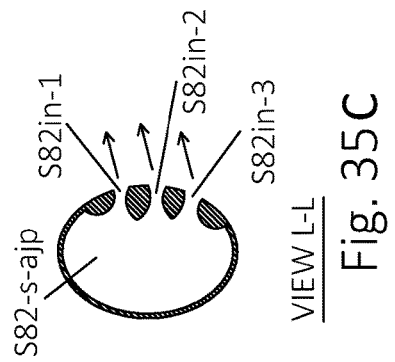
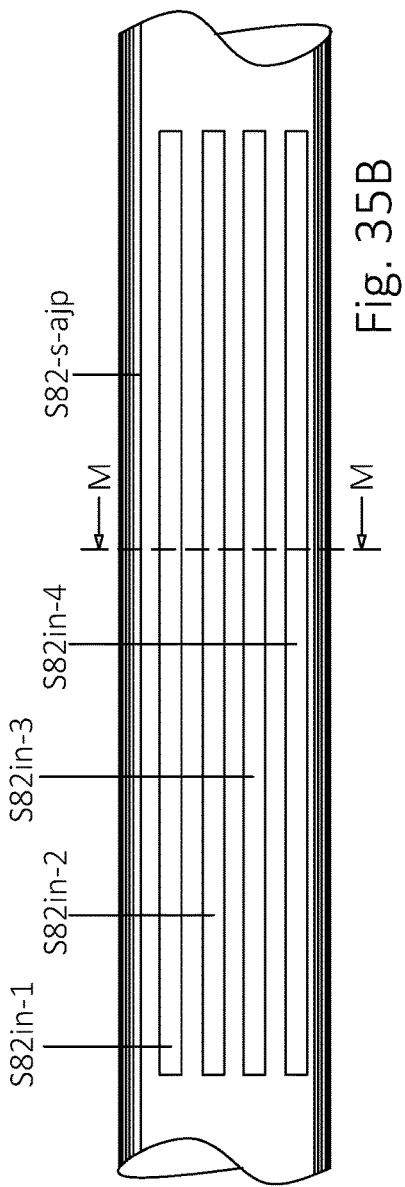
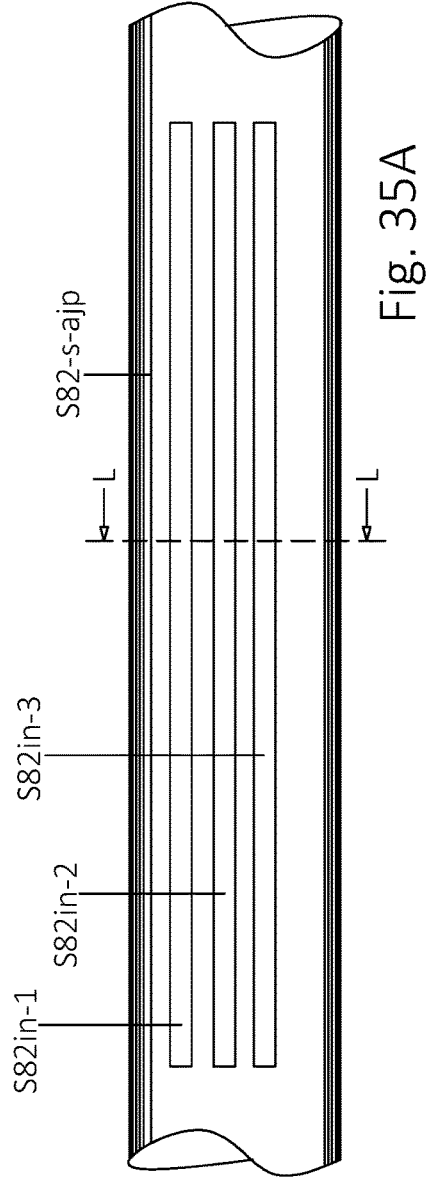
Straight Singular Jet Pipes with linear-slit Internal Jet Nozzles

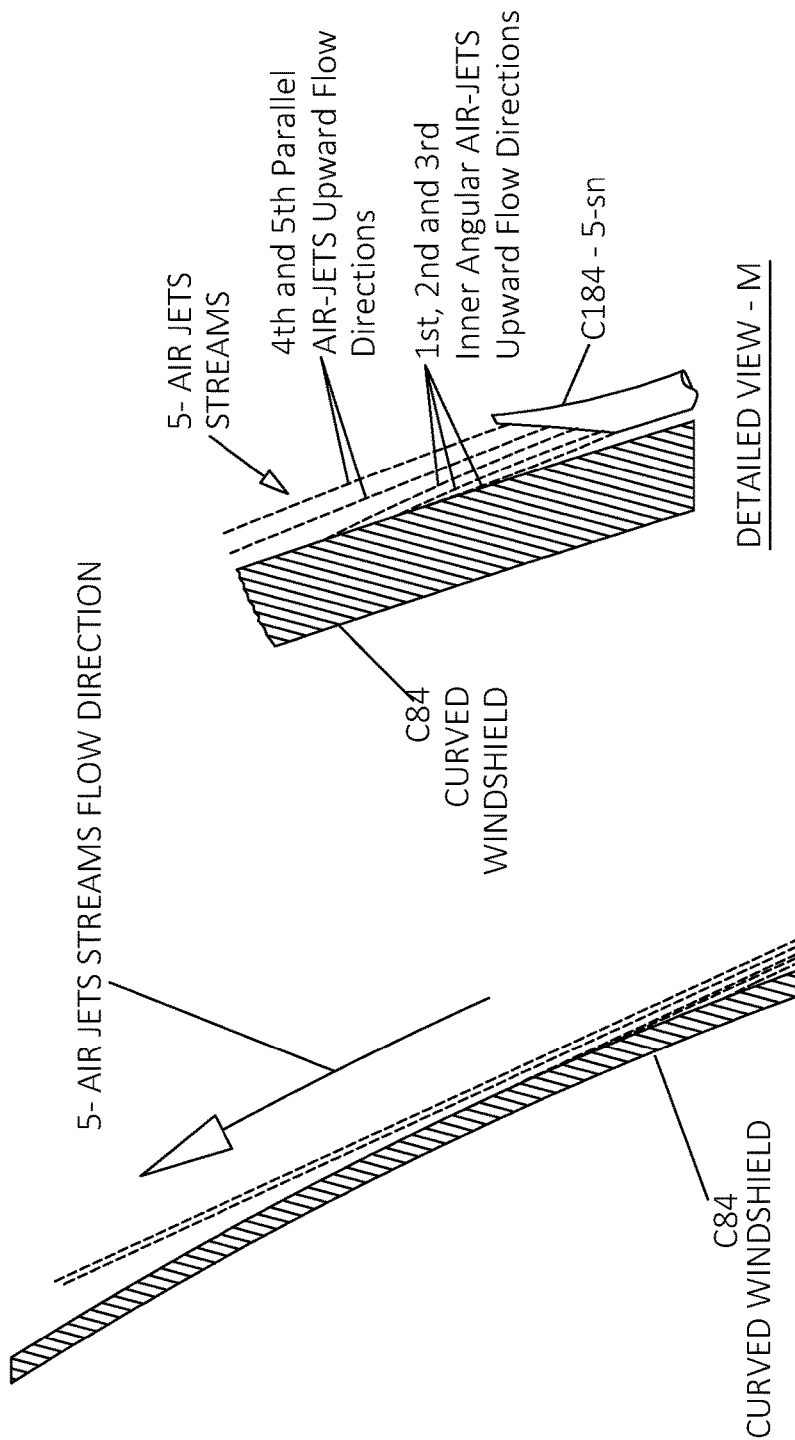
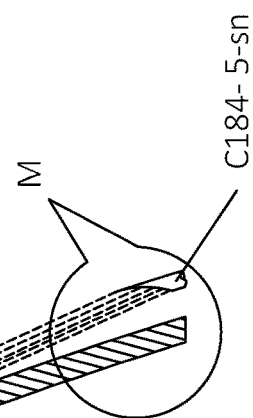
Fig. 46 A
Fig. 46 B

— AIR JET - 1
— — AIR JET - 2
— — — AIR JET - 3

— 1 —

BLADELESS MULTI-JET SURFACE CLEANING SYSTEM PROVIDING CLEAR-VIEW NON-DISTRACTING VISIBILITY FOR AUTOMOBILE WINDSHIELDS, SIDE-VIEW MIRRORS, AND TRANSPARENT VIEWING SHIELDINGS OF AMPHIBIAN, AQUATIC AND AERIAL VEHICLES, INCLUDING BUILDING VIEWING PANELS

1. FIELD OF THE INVENTION

The present invention generally relates to wipers and cleaners. More particularly, it pertains to important major revolutionary innovations in the field of regulated and automated wiper and cleaner devices, methods, systems, assemblies and programs applicable for modern state-of-the-art automobile windshields and side-view mirrors, for achieving safer and all-around superior non-distracting field of vision for drivers and passengers of modern state-of-the-art cars, SUVs, Vans and trucks, including driverless vehicles of different models and designs. It also includes the arena of effectively and clearly wiping and cleaning the viewing transparent shielding of most amphibian and aquatic vehicles, and, including also the effective clear wiping and cleaning the viewing transparent shielding of various high-rise, medium-rise and low-rise buildings. The new programmable embodiments, features and functionalities of the present invention are achieved by providing forceful graded sustained or intermittent ejections of non-vibrating or vibrating angularly aimed multi-layers of powerful moving streams of air-jets and/or water-jets aimed to adequately wipe, clean and clear rain, snow, ice, frost, dirt and other particulate matters away from the external surfaces of the various respective viewing transparent shielding of the above.

2. BACKGROUND OF THE INVENTION

Currently and in the past 20$^{th}$ Century, millions of automobiles around the world have been installed with mechanical long-bladed windshield wipers for cleaning and clearing rain, snow, ice and dirt. However, through the years, drivers and passengers traveling aboard these vehicles have always encountered the annoying oscillating back-and-forth operations of these wipers that distract their field of vision and concentration, pre-disposing them to harm.

Moreover, as the long blades of these wipers streak across the windshields, they easily get loose, worn out and torn through repeated use, thus needing frequent adjustments, repairs or replacements. These problems add to the cost of automobile maintenance and delays in travel plans during hazardous weather conditions, and therefore are not conducive to safeguarding them from the perils of potential collisions, wrecks, bodily injury and increase in insurance costs.

Based on current patent searches and publications on windshield wipers, the issued patents, publications and adapted inventions on the subject matter reveal complicated designs and operations, requiring numerous mechanical parts and linkages to support the long wiper blades. The prior and current mechanical long-bladed windshield wipers lack maximum frontal and rearward visibilities for the automobile drivers and passengers during mild, moderate and intense rainy, icy, snowy, foggy and dusty conditions. Prior-art and current externally exposed vision-distracting long-bladed automobile windshield wipers are not practical for installation to the right-side and the left-side automobile windshields and side-view mirrors.

Hundreds of millions of prior-art windshield wipers installed and currently used in most automobiles also lack provisions for automatic wiping and cleaning of the left and right side-view mirrors, which, in reality, is a very much needed requirement for attaining safer automobile driving. Whenever, the driver maneuvers his or her automobile forward or rearward or swerving or turning to the left or to the right, or changing lanes during rainy or snowy days or nights, the driver has to manually wipe the left-side and right-side windshields and side-view mirrors, in order to achieve better and clearer visibility so as to avoid the dangers of collision with other automobiles on the road, and prevent hitting other obstacles along the way. While driving through sudden heavy rain, snow, ice and dusty situations, drivers may have to slow down or stop driving, thereby he or she, including the inboard passengers are delayed.

Since the original U.S. Pat. No. 743,801 was granted to Mary Anderson in 1903, the main principles behind the long-bladed mechanical windshield wipers still remain basically unchanged, except for some additional upgraded innovations patented in 1917 issued to Charlotte Bridgewood, and issued to Robert Kearns who invented the intermittent windshield wiper in 1967 with U.S. Pat. No. 3,351,836.

Other inferior prior-art examples are: U.S. Pat. No. 8,555,456 issued to Ehde; U.S. Pat. No. 8,535,462B2 granted to Castro, et al; WO200347928A2 to Anise Lohokare; and U.S. Pat. No. 7,150,795 B2 to Russell J. Javaruthi, etc. There was an attempt to reduce the problems of oscillating long-bladed windshield wipers to improve better visibility for the automobile drivers, which was the subject of an ultrasonic wiper described in U.S. Pat. No. 4,768,556 granted in 1988 to Kenro Motoda which comprises of an ultrasonic wiper for conveying fluid off of the windshield glass of a vehicle by means of ultrasonic oscillators that excite progressive waves in the glass in a predetermined directional movement. The ultrasonic vibrations cause the progressive waves to move from one side of the windshield to the other side, so that rain and snow that adhere to the windshield external glass surfaces are subjected to the thrust forces leading to the downward fall of the adhering rain and snow on the windshield glass. However, this particular innovation was not successfully implemented because of functional limitations.

U.S. Pat. No. 3,171,683 (1963) granted to Arthur Ludwig involving an array of ultrasonic means, and US 2013/0298419 A1 published on Nov. 14, 2013 invented by David Robert Murray Trevett and Patrick Naven Trevett, which involve vaporizing precipitation from a surface of a window-shield were not successful for global implementation on modern automobiles. These ultrasonic inventions, once activated have been shown to take longer periods of time to be effective. The innovations presently being developed by McLaren are costly to replace and maintain and may cause gradual erosion of the molecular constituents of the external surfaces of windshields. Due to the disadvantages of the prior art, the present invention has been invented to provide various important innovative non-vision distracting and safer wiping and cleaning devices, methods systems, assemblies and programs that are much better in automobile operational features solving the many shortcomings of the above prior art.

Amphibian and aquatic vehicles still rely on the prior-art long bladed windshield wipers that are distracting to the field of vision of the operators and inboard passengers. Also, the prior-art devices and currently used practices for the wiping and cleaning the external surfaces of the viewing transparent shielding of high-rise. medium-rise and low-rise buildings, still largely depend on the time-consuming and costly methods and devices as accomplished by the climbing and clinging and dangling manual operators who are predisposed to the dangers of falling and the visually-induced fear of heights.

The present invention, being automatically programmable in effectively cleaning and clearing the various windshields, can also be used for the driverless automobiles currently being developed by Larry Page, one of the founders of Google, thus providing clearer-view for the passengers aboard the driverless automated vehicles, during rain, snow and icy weather, thereby eliminating the installation and use of the prior-art visual field annoying long-bladed oscillating windshield wipers.

SUMMARY AND OBJECTS OF THE PRESENT INVENTION

The general and specific objects of the present invention's preferred designs, embodiments, assemblies, systems, methods and programs are defined and explained in the various illustrative drawings and descriptions in the written specifications as enumerated below:

(1) To provide innovative high-tech bladeless devices, systems, methods, assemblies and programs for maximally wiping, cleaning and clearing most new automobile windshields and side-view mirrors, including the front, rear, right-side and left-side windshields and right side-view mirror and left side-view mirror, by means of ejecting forceful invisible moving multi-streams or layers of air-jets (and water-jets if needed) to conveniently attain optimum non-distracting visibility for the automobile drivers and passengers while driving, stopping and parking during hazardous weather conditions, such as during rainy, snowy, icy, dusty, and muddy situations.

(2) To provide effective regulation and control of the forceful ejections of multi-air-jet streams and/or water-jet streams of varying layers, velocities and power, in such an optimally angled fashion to maximally wipe, clean and clear either or both the curved as well as the flat configurations or shapes and contours of the various automobile windshields and side-view mirrors according to the different designs of modern-state-of-the-art automobiles.

(3) To provide various effective sizes and configurations of external and internal linear-slit or wavy-slit air-jet nozzles and water-jet nozzles that are built-in and incorporated in the present inventive devices and systems in accordance with the pressurized at least one or a plurality of varying types of longitudinal pressurized air-jet pipes and/or water-jet pipes and their branches that follow the respective contours and shapes of the various portions of automobile windshields and side-view mirrors.

4) To provide sturdy adaptable angular attachments and placements for linear-slit or wavy-slit internal or external air-jet nozzles and water-jet nozzles incorporated with or without an optional bladeless oscillating type of automobile windshield wipers, cleaners and obstacle-clearers.

(5) To provide sturdy linear-slit or wavy-slit nozzles incorporated with at least one singular or aggregated plurality of pressurized longitudinal air-jet and water-jet pipes, in combination with the built-in linear-slit or wavy-slit internal or external nozzles with the coordinating but optional oscillating type of bladeless windshield wipers.

(6) To provide either and/or both combinations of the vibrating type and/or the non-vibrating type of air-jet nozzles and water-jet nozzles with the addition of imbedded vibrator rods or vibrator rings to effect wider coverage of wiping and cleaning capabilities exerted on the external surfaces of the various windshields and side-view mirrors, whenever practical and applicable.

(7) To provide various applicable effective intensities of vibration waves and features and beneficial capabilities, (including other applicable vibration frequencies of acoustic and/or ultrasonic vibrations that may and can be incorporated with the air-jet pipes and/or water-jet pipes of the non-oscillating types and the optional oscillating system) of linear-slit nozzles or wavy-slit nozzles, and when applicable, can also possibly be installed adjacent to the external surfaces of the subjected windshields and side-view mirrors.

(8) To provide various bladeless air-jet and water-jet all-around automobile windshields wipers and cleaners by placing the bladeless windshield wipers below and/or above and possibly, if needed, placed at the sides of the particular design of windshields, that are not distracting to the field of vision of the drivers and passengers of modern state-of-the-art automobiles, especially useful for providing the automobile drivers and passengers with much clearer non-distracting visual field while traveling through rainy, icy, snowy, foggy, misty and insect-infested conditions.

(9) To provide effective voice-activated inboard and remote interactive command-and-response methods and systems for attaining selective manual and automatic controls in operating various functions, features and capabilities of the present invention, while regulating the sustained or intermittent flow, volume and frequency of forceful ejections of moving multi-streams or layers of air-jets (with water-jets if needed) as released in close proximity and adjacently alongside the external contours and shapes of the selected windshields and side-view mirrors of modern automotive vehicles.

10) To conveniently and effectively remove and prevent the adherence of rain, snow, ice, dust, dirt, mud and other particulate debris on the external surfaces of various windshields and side-view mirrors of automobiles, providing better all-around clear-view visibility through the various windshields and side-view mirrors, conducive for much safer automobile driving, stopping and parking during rainy, snowy, icy, misty, foggy, dusty, muddy and flying insect-infested situations.

(11) To provide important state-of-the art revolutionary invisible bladeless automobile wipers, cleaners and debris-clearing designs, embodiments, systems, assemblies and programs, favoring easier installations for various types of selected windshields and side-view mirrors that perfectly fit into newer breeds of automobiles, including automated driverless vehicles, thereby eliminating the need of the visually distracting mechanical long-bladed windshield wipers currently in use worldwide, which consist of flimsy mechanical parts that are costly and time-consuming to maintain.

(12) To provide safer operational good observance of traffic rules for millions drivers of modern automobiles equipped with automatically regulated programmable bladeless multi-air-jet and water-jet wipers/cleaners and debris-clearers applicable for various selective windshields and side-view mirrors, achieving constant clear-view non-distracting maximum and optimum visibility and safety while driving, parking and stopping, during rainy, icy, snowy and dusty situations.

(13) To provide effective technologically advanced methods, systems, assemblies, and devices for safer and more efficient bladeless cost-effective air-jets and water-jets wiping, cleaning and debris-clearing of the front, rear, left-side and right-side windshields and left-side and right-side-view mirrors of automobiles, and applicable also to the transparent windshields of various amphibian, aquatic and aerial vehicles, with much less problematic to operate involving lesser moving parts, and, geared towards better green environment-friendly vehicles.

(14) To provide various adaptable operationally selective and combined devices, embodiments, systems, assemblies, methods and programs applicable for either and both non-vibrating and vibrating longitudinal linear-slit non-oscillating types (and optional oscillating linear-slit nozzle designs) to effectively eject powerful sustained or intermittent invisible forceful multi-jet streams and layers of bladeless moving sheets of air-jets to effectuate maximum wiping, cleaning, and clearing coverage of selective and combined applications for the front, rear, right-side and left-side windshields and right-side-view mirror and left-side-view mirror of modern state-of-the-art automobiles.

(15) To provide certain selective security and safety features with authenticating input and output means for PINS or passwords and/or personal biometrics, including iris, voice, and true-personal facial identity recognition of the authorized drivers/users/owners as linked with legitimate databases, thus allowing only the registered drivers/users/owners to operate the various functions of the present invention, while disallowing fraudulent unauthorized drivers the use of the system during the activated mode; however, in the deactivated mode, temporarily allowing others like valet drivers for parking and drive back recall operations of the specific modern automobiles equipped with the present invention.

(16) To provide effective biometric-sensitive and pin/password-sensitive touch- and voice-command and response inboard and remote-control wireless devices, systems, methods and programs using radio waves, allowing only the registered drivers/users/owners of the specific modern automobiles to properly activate and deactivate the effective operations of the present invention, so that during freezing weather, before entry of the driver and passengers inside the automobile, will allow activation of the incorporated heater system to properly clear, wipe and clean the adhering ice, snow, dust, mud, or small insects that have gathered on the external surfaces of various selected windshields and side-view mirrors; and, during hot weather conditions, will enable the authorized user to activate the cooling system of the automobile before entry inside the otherwise hot vehicle.

(17) To provide state-of-the-art bladeless air-jet and/or water-jet wipers and cleaners for various automobile windshields and side-view mirrors to effectively and accurately respond specifically to the voice commands of the authorized drivers and to delineate them from among millions of other multi-national automobile drivers with differing intonations, accents, languages and dialects using adaptive sensitive pluralistic voice-delineation-recognition databases with multi-language/dialects and speech intonations and accents detectors and voice comparators for trans-global applications.

18) To provide a cost-saving and time-saving automated regulated effective multi-jet angularly aimed air-jet and water-jet singular or aggregated multiple longitudinal air-jet pipes and water-jet pipe and their branches thereof, having built-in angularly aimed linear-slit and/or wavy-slit air-jet nozzles and water-jet nozzles for effectively wiping and cleaning of the external surfaces of the viewing transparent shielding of high-rise, medium-rise and low-rise buildings to prevent pre-disposing the operators from the dangers of falling and vision-impairing fear of heights.

In a capsule, for application to the automobile windshields and side view mirrors, the present revolutionary invention is aimed to offer broad-spectrum panoramic maximum visibility through the various automobile windshields and side-view mirrors favorable for installation to modern state-of-the-art automobiles, by enabling the effective utilization of invisible non-vision distracting medium of optimally angled forceful ejection of multi-air-jet streams or multi-layers of moving air-jet sheets (with water-jets, if needed and included) in order to effectively clean, wipe, clear and bounce off the onrushing rain, snow, ice, dust and mud, and other particulate matters, and prevent their adherence on the external surfaces of the all-around windshields and side-view mirrors, operated and controlled to automatically function selectively or altogether, providing greater safety for drivers and passengers aboard modern cars, vans, SUVs or trucks or amphibian or aquatic or aerial vehicles while traveling through hazardous weather conditions, with better broad-spectrum effective control without additional inconvenient struggles or movements of the drivers or operators from his/her driving or operating positions. The present invention is also applicable for providing effective cost-saving and time-saving wiping, cleaning and clearing the transparent viewing shielding of the glass surfaces of high-rise, medium-rise and low-rise buildings.

Pertaining to automobiles, reducing the drag coefficient has always been challenging to researchers in the past and current decades. It is well known that air drag depends on the frictional area of the moving vehicle. With the present bladeless wipers, in particular as applied to the front windshield, the higher frictional area exerted upon the front windshield of a forwardly moving automobile can be reduced during forward driving, because the frictional resistance of the resisting ambient frontal air is reduced as the frontal resisting ambient air smoothly flows over the upwardly ejecting pressurized frontal moving multi-air-jet streams or layers or moving air-jet sheets, thus contributing as one major function with achievable advantages of the present invention. Whereas, with millions of current automobiles equipped with the mechanical long-bladed windshield wipers, there is greater frontal frictional area exerted upon the front windshield due to the absence of the upwardly and inwardly moving forceful ejections of multi-layers of air-jet streams along which the resisting frontal ambient air can glide around.

Hence, the present invention helps reduce the aerodynamic drag forces exerted upon the frontal section of the automotive vehicles, and, thereby definitely aids in improving the efficiency and performance of the automobile engine in the long run.

Other further objects and advantages of the present invention, (inclusive of the present inventive devices, methods, systems, assemblies and application programs) which is otherwise named as "BLADELESS MULTI-JET CLEAR-VIEW SAFE-DRIVE WINDSHIELD AND SIDE-VIEW MIRROR WIPERS" will be vastly clarified and will become apparent in the detailed descriptions and explanations, allied with the various illustrative figure drawings, and also allied with the correspondingly labeled numeric, alphabetic and alpha-numeric parts and functions, wherein identical parts and functions are basically or generally represented by identical numeric, alphabetic and/or alpha-numeric labels, included in the specifications (yet not limiting in scope, designs, modifications and applications of the present invention's illustrated embodiments, components, systems, assemblies, methods and programmable features).

(A) BRIEF DESCRIPTIONS AND EXPLANATIONS OF SOME PREFERRED EMBODIMENTS, DESIGNS AND ASSEMBLIES OF THE PRESENT INVENTION ARE ILLUSTRATED IN THE FOLLOWING FIGURE DRAWINGS AND REPRESENTATIONS

FIG. 1 illustrates a general block diagram of one preferred inter-linked elements and embodiments involved in the bladeless multi-air-jet wiper and cleaner device, method, system and assembly (without vibrator and oscillating type), but equipped with touch/voice remote controller and air heater systems, among other required components, providing bladeless non-vibrating air-jets for wiping, cleaning and clearing the various windshields and side-view mirrors applicable for modern state-of-the-art automotive vehicles.

FIG. 2 illustrates a general block diagram of another preferred inter-linked elements and embodiments involved in the bladeless multi-air-jet wiper and cleaner device, method, systems and assembly, showing that it is specifically equipped with vibrator. The optional motor with oscillating system), touch/voice remote controller, and air heater are among the other components, providing effective vibrating air-jets for wiping, cleaning and clearing the various windshields and side-view mirrors, especially applicable for modern state-of-the-art automotive vehicles.

FIG. 3 illustrates a general block diagram of the inter-linked elements and components of the bladeless water-jet wiper and cleaner device, system, method and assembly (without vibrator), but specifically equipped with liquid cleaner solution, water reservoir, touch/voice remote controller, water pump and water-heater, among other components for providing effective non-vibrating water-jets for wiping, cleaning and clearing the various windshields and side-view mirrors, specially applicable for modern state-of-the-art automobiles.

FIG. 4 illustrates a general block diagram of another inter-linked elements and components of the bladeless water-jet wiper and cleaner device, method, system and assembly (with liquid cleaner solution and water reservoir, water pump, water heater), and particularly equipped with a vibrator, touch/voice remote controller, and oscillating system, among other required components, for providing effective vibrating water-jets for wiping, cleaning and clearing the various wind-shields and side-view mirrors specially applicable for modern state-of-the-art automotive vehicles.

FIG. 5 illustrates a general block diagram of a combination of both the bladeless multi-air-jet and water-jet devices, methods, systems, and assemblies, showing the multi-air-jet control system, water-jet control system, multi-air-jet system, water jet system, and also showing that both are equipped with vibrators and touch/voice remote controller means, among other required components, for selectively providing both vibrating air-jets and water-jets for wiping, cleaning and clearing various selected windshields and side-view mirrors applicable for modern state-of-the-art automotive vehicles.

FIG. 6 illustrates a general block diagram and schematics of the combined elements and components of the bladeless multi-air-jet devices, methods, systems and assembly, utilizing a longitudinal air-pipe or air-tube with linear-slit nozzles system, and also using a water-jet system, assembly, method and device (with 3 water-jet spraying system), which together and/or selectively are applicable for the effective wiping, cleaning and clearing the front windshield of modern state-of-the-art automotive vehicles.

FIG. 7 illustrates a sectional view taken from broken line G-G of FIG. 6, and showing a sectional view of a curved front windshield and also showing the sectional view of a portion of a non-vibrating singular longitudinal air-pipe or air tube with 3 linear-slit air-jet external nozzles originating from said singular longitudinal air-pipe or air-tube (without a vibrator means); both of said sectional views shown to be placed at the bottom of the front windshield of a modern state-of-the-art automotive vehicle, and also illustrating the general upward directional flow of the optimally angled pressurized non-vibrating 3 multi-air-jet streams or layers or moving air-jet sheets for wiping, cleaning and clearing the curved front windshield.

FIG. 8 illustrates a sectional view taken from broken line G-G as shown in FIG. 6, illustrating the 3 vibrating multi-air-jet device, method, system and assembly, with the sectional view of the curved front windshield, and also illustrating the sectional view of a vibrating singular longitudinal air-pipe or air-tube in which the sectional views of the 3 linear-slit air-jet external nozzles are built-in and extending from said singular air-pipe (illustrated also in sectional view is a vibrator located or placed at the bottom of the sectional view of said curved front windshield of a modern state-of-the-art automotive vehicle, and, also shows the general upward direction of the converging vibrating flow of pressurized 3 layers or streams of multi-air-jets for effectively wiping, cleaning and clearing the curved front windshield of said modern state-of-the-art automotive vehicle.

FIG. 9A illustrates a sectional view of a flat windshield using the bladeless multi-air-jet system, assembly, method and device, and showing a sectional view of a singular longitudinal air-pipe or air-tube, with the sectional views of the 3 linear-slit air-jet external nozzles, placed at the bottom of said flat windshield of a modern state-of-the-art automotive vehicle, and, also showing the parallel upward directions of each of the pressurized non-vibrating 3 multi-air-jet moving streams ejecting or jetting upwards from the proximal bottom of the flat windshield, for effectively wiping, cleaning and shielding the external exposed sectional view of said flat windshield of a modern state-of-the-art automotive vehicle.

FIG. 9B illustrates a sectional view of a flat windshield, in proximal placement with the angled bladeless 4 multi-air-jet system, assembly, method and device, and showing a sectional view of the inner-angularly-tilted positioning of the aggregated multiple longitudinal air-pipes or air-tubes, with the sectional views of the 4 linear-slit air-jet external nozzles, placed at the bottom of flat windshield of an automotive vehicle, and, illustrating also the inwardly angled generally upward directions of each of the different inwardly angled pressurized non-vibrating 4 multi-air-jet moving streams ejecting or jetting angularly upwards from the close proximal bottom of the flat windshield, for achieving more effective wiping, cleaning and shielding of the external surface of said flat windshield of a state-of-the-art automotive vehicle.

FIG. 10 illustrates a general block diagram and schematics of the combined bladeless multi-air jet-system, assembly, method and device, including the water-jet method, system, assembly and device, which are placed on the top of the rear windshield for effective wiping, cleaning or obstacle clearing of the rear windshield of a modern state-of-the-art automobile, using longitudinal pipes with built-in linear-slit air-jet system, and water-jet spraying system.

FIG. 11 illustrates a sectional view partly taken from broken line A-A shown in FIG. 10, (excepting the water pipe which is not shown in this FIG. 11); and that FIG. 11 shows only the sectional view of the singular non-vibrating longitudinal air-pipe or air-tube of the bladeless multi-air-jet method, system, assembly and device; also showing the sectional view of the 4 linear-slit air-jet external nozzles extending from said singular non-vibrating air-pipe or air-tube that can be placed at the top of a curved rear windshield of a modern state-of-the-art automobile. also illustrating the first 3 inner-angled and the fourth straight non-vibrating downwards direction of flow of pressurized multi-air-jets emanating from the non-vibrating 4 linear-slit air-jet external nozzles to effectively wipe, clean and shield the curved rear windshield of a modern automobile. This FIG. 11 does not illustrate the water-spraying system of FIG. 10.

FIG. 12A illustrates a general block diagram and schematic representation of the bladeless multi-air-jet system, assembly, method and device for wiping, cleaning and clearing off the right-side windshields (first and second segments of the right-side windshields), and, also showing the frontal view of the right side-view mirror of a modern state-of-the-art automobile, and illustrating the downward flow direction of air-jets represented by the downward arrows, as being ejected from the linear-slit air-jet nozzle system, placed at the respective relevant top portions.

FIG. 12B illustrates a frontal face view of the right side-view mirror of a modern state-of-the-art automobile, and, illustrating the downward flow direction of the pressurized air-jets streams for wiping, cleaning and clearing the right side-view mirror, using a linear-slit multi-air-jet nozzle system, method and device.

FIG. 13A illustrates a general block diagram and schematics of the bladeless multi-air-jet system, assembly, method and device for wiping, cleaning and clearing the left-side windshields (first and second segments or portions), and, also showing the frontal face view of the left side-view mirror of a modern state-of-the-art automobile, and also illustrating the downward flow direction of air-jets streams represented by downward arrows, and shown as being ejected from the linear-slit multi-air-jet nozzle system, placed on top of the respective relevant portions.

FIG. 13B illustrates a frontal face view of the left side-view mirror of a modern automobile, and showing the downward flow of pressurized multi-air-jets streams being represented by the direction of the downward arrows; said air-jets streams being ejected from the top portions of the left side-view mirror assembly, and utilized for wiping, cleaning and clearing the frontal face of the left side-view mirror, using a linear-slit multi-air-jet nozzle system.

FIG. 14 illustrates a general block diagram and schematic representation of a combined air-jet and water-jet systems, assemblies, methods and devices for wiping, cleaning or clearing the left-side windshields (first and second segments or portions), and showing also the frontal face view of the left side-view mirror, and illustrating the downward flow of both air-jets and water-jets on both the left-side windshields and the left side-view mirror to achieve effective wiping, cleaning or clearing purposes.

FIG. 15 illustrates a general block diagram and schematics of a combined air-jet and water-jet systems, assemblies, methods and devices for wiping, cleaning or clearing the right-side windshields (first and second segments or portions), and showing also the frontal face view of the right side-view mirror, and illustrating the downward flow of both air-jets and water-jets on both the right-side windshields and the right side-view mirror to achieve effective wiping, cleaning or clearing purposes.

FIG. 16 illustrates an optional alternative embodiment of the type of a triple oscillating but non-vibrating air-jet nozzle method, system, assembly and device showing the principal working mechanism involving various mechanical linkages, motor, gears, cam and mechanical transmission means, etc. for the optional bladeless oscillating non-vibrating multi-jet windshield wiper, cleaner, and obstacle-clearer (without vibrator ring) applicable for modern state-of-the-art automobiles.

FIG. 17 illustrates an optional triple oscillating and vibrating air-jet nozzle system, assembly, method and device, and illustrating the principal working mechanism with required mechanical linkages, motor, gears, cam and mechanical transmission means, etc., for wiping, cleaning and clearing off of the front and/or rear windshields (each of the three air-jet oscillating nozzles being equipped with a corresponding vibrator ring) applicable for state-of-the-art automobiles.

FIG. 18 illustrates a general block diagram and schematics of the combined elements and components and portions of the bladeless multi-air-jet and water-jet systems, assemblies, methods and devices, for wiping, cleaning and clearing off of the external frontal face of the front automobile windshield, using an optional triple oscillating, non-vibrating air-jet nozzle system (without vibrator rings), placed at the bottom of the front windshield below the field of vision of the driver and passengers of a modern state-of-the-art automobile. The water-jet spraying system is of the non-oscillating type and using a 3-water-jet spraying system, also placed below the field of vision of the driver and passengers of a modern automobile.

FIG. 19 illustrates a general block diagram and schematics of the combined elements and components and portions of the bladeless multi-air-jet and water-jet systems, assemblies, methods and devices, for wiping, cleaning and clearing off of the external frontal face of the front automobile windshield, using an optional triple oscillating and vibrating air-jet nozzle system (equipped with triple vibrator rings), and placed at the bottom of the front windshield below the field of vision of the driver and passengers of a modern state-of-the-art auto-mobile. The water-jet spraying system is non-oscillating and using a 3-water-jet spraying system also placed at the bottom of the front windshield below the field of vision of the driver and passengers of a modern state-of-the-art automobile.

FIG. 20 illustrates a general block diagram and schematics of a combined elements and components and portions of the optional triple oscillating, non-vibrating multi-air-jet system (without vibrator ring), and also showing a linear-slit non-oscillating water-jet system; both oscillating multi-air-jet and non-oscillating water-jet systems, assemblies and devices generally positioned at the top of the rear windshield, above the field of vision of the driver and passengers of a modern state-of-the-art automobile, and for the purpose of ejecting forceful pressurized streams or moving layers or sheets of air-jets and water-jets from both the pressurized oscillating non-vibrating multi-air jets system and the linear-slit water-jets nozzle system, to achieve non-vision distracting wiping, cleaning and clearing off of obstructing materials from the rear windshield of a modern state-of-the-art automobile.

FIG. 21 is a general block diagram and schematics of the combined portions of the bladeless multi-air jet system, method and device using the optional triple oscillating and vibrating air-jet nozzles system (each nozzle equipped with a vibrator ring). The longitudinal linear-slit water-jet system is shown. Both multi-air-jet and water jet devices, systems and assemblies are positioned at the top of the rear windshield above the field of vision of the driver and passengers of a modern state-of-the-art automobile, and for the purpose of ejecting powerful moving streams of air-jets and water-jets from both pressurized oscillating vibrating multi-air jets and non-vibrating longitudinal linear-slit water-jets nozzle systems, providing non-vision distracting wiping, cleaning and clearing of the rear windshield of a modern state-of-the-art automobile.

FIG. 22 is a simple illustration of an alternative but optional dual oscillating and vibrating air-jet nozzle system, assembly, method and device, with the principal working mechanism involving the required mechanical linkages, motor, gears, cam and mechanical transmission means of the bladeless multi-jet windshield wiper, cleaner, and clearer of the dual oscillating and vibrating type. Each of the two air-jet oscillating nozzles are equipped with a vibrator ring.

FIG. 23 illustrates a general block diagram and schematic representation of the combined portions of the bladeless multi-air-jet system, method and device, and the water-jet system, method and device for wiping, cleaning and clearing the external frontal face of the front automobile windshield, using a dual oscillating and vibrating air-jet nozzle system (each oscillating nozzle with a vibrator ring), and placed at the bottom of the front windshield below the field of vision of the driver and passengers of a modern state-of-the-art automobile. The water-jet spraying system is non-oscillating and using a 3-water-jet spraying system, also placed below the field of vision of the driver and passengers of a modern automobile.

FIG. 24 illustrates a general block diagram and schematic representation of the combined portions of the bladeless multi-air jet system, method and device using the dual oscillating and vibrating air-jet nozzle system (each nozzle with a vibrator). The longitudinal linear-slit water-jet system and the multi-air-jet system are positioned at the top of the rear windshield, above the field of vision of the driver and passengers of a modern automobile, and for the purpose of ejecting forceful streams of air-jets and water-jets from both the pressurized oscillating and vibrating multi-air-jets nozzles and non-vibrating longitudinal linear-slit water-jets nozzle systems, to achieve non-vision distracting wiping, cleaning and clearing of the rear windshield of a state-of-the-art automobile.

FIG. 25A illustrates the corresponding sectional views of the oscillating but non-vibrating bladeless multi-air-jet system, method and device, with linear-slit internal nozzles, positioned at the close proximal bottom of the sectional view of a curved windshield; said sectional illustration of the multi-air jet system also illustrates the upwardly inner-directed angular ejecting pressurized multi-air jets from the respective linear-slit internal air-jet nozzles positioned at the bottom of a sectional view of a curved windshield; said respective pressurized air-jets being optimally and angularly ejected for effective wiping, cleaning and clearing the curved windshield of a modern state-of-the-art automobile, using a multi-air jet system with oscillating non-vibrating internal nozzles that are placed hidden below the field of vision of the driver and passengers so that, in effect becomes non-distracting to the view of the driver and passengers of a modern state-of-the-art automobile.

FIG. 25B illustrates the two side-sectional views of the oscillating 3 linear-slit multi-jet internal nozzle system, each respectively showing viewpoint P and viewpoint Q.

FIG. 25C illustrates the cross-sectional views of two kinds of arrangements of the oscillating 3 linear-slit multi-jet internal nozzle system. One arrangement is staggered in placement as seen from viewpoint P of FIG. 25B. The other arranged in stack as seen from viewpoint Q of FIG. 25B.

FIG. 26 illustrates a general block diagram and schematics of a multi-air-jet system, method and device and water-jet system, method and device for wiping or cleaning and clearing the front windshield of a modern state-of-the-art automobile, using combinations of longitudinal linear-slit nozzle system and non-vibrating dual oscillating nozzle design of the multi-air jet system, method and device (without a vibrator ring), and also showing the non-oscillating water-jet system, method and device, all correspondingly optimally located at the close proximal bottom portion of the front windshield of a modern state-of-the-art automobile, below the frontal field of vision of the driver and passengers of a state-of-the-art automobile.

FIG. 27 illustrates a general block diagram and schematics of a combination of the multi-air-jet system, method and device, and also the water-jet system, method and device for wiping or cleaning and clearing the front windshield of state-of-the-art automobile, using combination of both the longitudinal linear-slit air-jet nozzle system and the dual oscillating and vibrating nozzle system of the multi-air-jet system (each with a vibrator ring), and the non-oscillating water-jet system, all of which are optimally and correspondingly located at the bottom portion of the front windshield below the frontal field of vision of the driver and passengers of modern automobile.

FIG. 28A illustrates a sectional view of a curved windshield of a state-of-the-art automobile, and showing the sectional views of the three non-vibrating linear-slit external air-jet nozzles, each one extending from three separate sectional views of longitudinal delivery air-pipes or air-tubes that are placed at the bottom or adjacently close to the bottom of the curved windshield; and positioned as inwardly angled and ejecting non-vibrating air-jets upwards, for effective wiping, cleaning and clearing of curved windshield.

FIG. 28B is a magnified sectional view of part of the 3 linear-slit external nozzles of FIG. 28A, showing the sectional view of the multi-angular arrangement of the linear-slit air-jet external nozzles extending from each of the respective sectional views of the aggregated but separate multiple longitudinal air-pipes or air-tubes, shown also in FIG. 28A.

FIG. 29A illustrates a sectional view of a curved windshield, and representing the first 3 inner angled upwards direction, and the straight upward direction of the fourth moving streams of air-jets shown as being ejected from each of the four sectional views of the longitudinal linear-slit external nozzles, interspaced in equal gaps, each nozzle shown as built-in from the sectional views of firmly placed and aligned separate longitudinal air-jet pipes.

FIG. 29B illustrates a magnified sectional view of part of FIG. 29A, and showing the optimally angled four sectional views of the longitudinal linear-slit external nozzles; each one of said linear-slit external nozzles shown as built-in separately from the corresponding sectional views of the adjacent firmly placed aligned aggregated separate longitudinal multiple air-pipes or air-tubes.

FIG. 30A illustrates a sectional view of a curved windshield, and showing its positional adjacency to the angled generally upwards direction of four vibrating air-jets streams flowing with inter-spaced gaps as being ejected from a the sectional views of four vibrating longitudinal linear-slit external nozzles, and showing the sectional view of an aggregated or compositely adjacent separate pressurized multiple air-pipes or air-jet tubes; also showing the embedded vibrator below the sectional view of the aggregated or compositely adjacent separate multiple air-pipes or air-tubes, below and together held firmly by an external pipe holder.

FIG. 30B is a magnified sectional view of part of FIG. 30A, showing the sectional view of the angled 4 longitudinal linear-slit external nozzles, each originating separately from the corresponding sectional views of the adjacent composite aggregated separate multiple air-pipes or air-tubes; additionally this FIG. 30B also shows the sectional view of the roundish rod vibrator embedded within the bottom of the aggregated or composite adjacent separate aligned longitudinal air-pipes or air-tubes.

FIG. 30C illustrates a sectional view of the optimally angled four longitudinal linear-slit external nozzles, each originating separately from the corresponding sectional view of adjacent composite aggregated aligned separate longitudinal multiple air-pipes or air-tubes; additionally, FIG. 30C also shows the sectional view of the flattened vibrator, located at the bottom of the aggregated adjacently aligned separate longitudinal multiple air-pipes or air-tubes.

FIG. 31A illustrates a sectional view of a curved windshield, including the optimally angled upwards corrugated direction of vibrating moving streams of air-jets flowing with interspaced gaps and being ejected from the sectional views of four longitudinal linear-slit internal nozzles, and, showing the sectional view of the aggregated adjacently separate longitudinal multiple air-pipes or air-tubes; also showing the sectional view of the roundish vibrator embedded at the bottom of the aggregated adjacently aligned separate longitudinal multiple air-pipes or air-tubes.

FIG. 31B is a magnified sectional view of the four longitudinal linear-slit internal nozzles and showing the sectional view of the aggregated adjacently separate longitudinal multiple air-pipes or air-tubes; also showing the sectional view of the roundish rod vibrator embedded within the bottom of the aggregated adjacently separate longitudinal multiple air-pipes or air-tubes.

FIG. 31C illustrates a sectional view of the four longitudinal linear-slit internal nozzles and showing the sectional view of an aggregated adjacently separate longitudinal multiple air-pipes or air-tubes; also showing the sectional view of a flattened vibrator at the bottom of the aggregated or compositely adjacent separate longitudinal multiple air-jet pipes or air-tubes.

FIG. 32A illustrates a generally top view of the curved singular longitudinal air-pipe or air-tube with the curved orientation of the longitudinal centrally located mono-linear-slit air-jet external nozzle following equidistantly the curvature of the curved longitudinal singular air-pipe or air-tube, and optimally can be positioned along the curved length of a curved windshield.

FIG. 32B illustrates a generally top view of the curved longitudinal singular air-pipe and the curved orientation of the three longitudinal linear-slit external nozzles, following equidistantly along the curvature of the curved singular longitudinal air-pipe or air-tube, and can be optimally positioned along the curved length a curved windshield.

FIG. 32C illustrates a general top view of the curved longitudinal singular air-jet pipe or air-jet tube that can be placed either on top or at the bottom and along the curved length of a curved windshield, and, also illustrating the equidistant longitudinally running four air-jet linear-slit external nozzles situated along the longitudinal singular air-pipe or air-tube.

FIG. 32D illustrates the sectional view taken from broken line D-D of FIG. 32A showing the sectional view of a singular air-jet mono-linear-slit external nozzle extending from and internally communicating with the sectional view of the longitudinal singular air-pipe.

FIG. 32E is the sectional view taken from broken line E-E of FIG. 32B, and showing the sectional views of three linear-slit external nozzles extending from and internally communicating with the sectional view of the longitudinal singular air-pipe or air-tube.

FIG. 32F is the sectional view taken from broken line F-F of FIG. 32C, showing the sectional view of 4 linear-slit external nozzles built-in from and internally communicating with the sectional view of the longitudinal singular air-pipe or air-tube.

FIG. 33A illustrates a generally top view of a straight longitudinal singular air-pipe or air-tube with longitudinally running straight three air-jet linear-slit external nozzles situated equidistantly along the straight longitudinal singular air-pipe or air-tube.

FIG. 33B illustrates a generally top view of a straight longitudinal singular air-pipe or air-tube with four linear-slit external nozzles longitudinally running equidistantly along the straight longitudinal singular air-pipe or air-tube.

FIG. 33C is the sectional view taken from broken line G-G of FIG. 33A, showing the sectional view of the straight longitudinal singular air-pipe or air-tube with three linear-slit external nozzles extending from and internally communicating with the sectional view of the straight longitudinal singular air-jet pipe or air-jet tube.

FIG. 33D illustrates the sectional view taken from broken line H-H of FIG. 33B, showing the sectional view of the four linear-slit external nozzles extending from and communicating with the sectional view of the straight longitudinal singular air-pipe.

Figure 1:
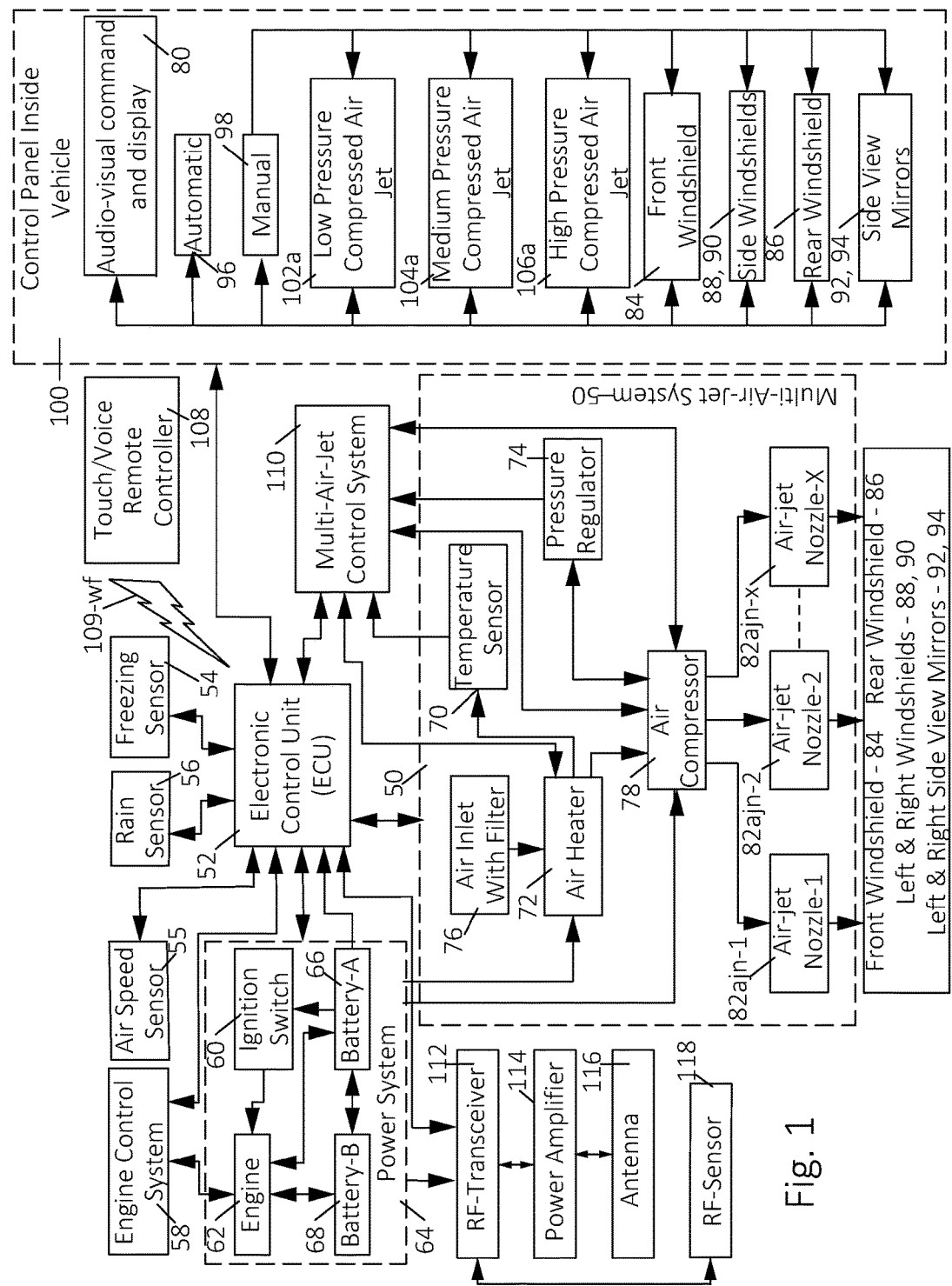

FIG. 34A illustrates a general top view of the curved longitudinal singular air-pipe that can be positioned either on top or at the bottom and along the curved length of the curved windshield, and, also illustrating the curved longitudinally running 2 linear-slit internal nozzles situated centrally along the curved longitudinal singular air-pipe or air-tube; also showing that the two built-in linear-slit internal nozzles are of widening dimension or flared from the left side to the right side.

FIG. 34B is generally a top view of the curved longitudinal singular air-pipe or air-tube that can be placed either on top or at the bottom and along the curved length of the curved windshield, and, also showing the equidistant longitudinally running three linear-slit internal nozzles situated centrally along the longitudinal singular air-jet pipe or air-jet tube; each of said three linear-slit internal nozzles are of widening dimension and flared from the left side to the right side of said air-pipe.

FIG. 34C shows a generally top view of the curved longitudinal singular air-pipe that can be placed along either on top or at the bottom of a curved length of a curved windshield, and, also illustrating the equidistant longitudinally running four linear-slit internal nozzles situated centrally along the curved longitudinal singular air-pipe or air-tube; also showing that said four linear-slit internal nozzles are of the same even dimension from left side to right side.

FIG. 34D illustrates the sectional view taken from broken line I-I of FIG. 34A, showing the sectional view of the curved 2 linear-slit internal nozzles that are internally situated in the sectional view of the curved longitudinal singular air-pipe or air-tube.

FIG. 34E is the sectional view taken from broken line J-J of FIG. 34B, and showing the sectional views of 3 linear-slit internal nozzles that are built-in and internally communicating with the sectional view of the curved longitudinal singular air-pipe or air-tube.

FIG. 34F is the sectional view taken from broken line K-K of FIG. 34C, showing the sectional view of the 4 linear-slit internal nozzles that are built-in and internally communicating with the sectional view of the curved longitudinal singular air-pipe.

FIG. 35A illustrates a general top view of a longitudinal singular straight air-jet pipe or air-jet tube with longitudinally running straight 3 air-jet linear-slit internal nozzles situated along the top view of the straight longitudinal singular air-pipe or air-tube.

FIG. 35B shows a general top view of a straight longitudinal singular air-pipe or air-tube with 4 linear-slit internal nozzles longitudinally running along the top of the straight longitudinal singular air-pipe or air-tube.

FIG. 35C illustrates the sectional view taken from broken line L-L of FIG. 35A, showing the sectional view of the straight longitudinal singular air-pipe or air-with 3 linear-slit internal nozzles that are built-in and communicating with the sectional view of the straight longitudinal singular air-pipe or air-tube.

FIG. 35D illustrates the sectional view taken from broken line M-M of FIG. 35B, showing the 4 linear-slit internal nozzles that are built-in and communicating with the sectional view of the straight longitudinal singular air-pipe or air-tube.

Figure 36:
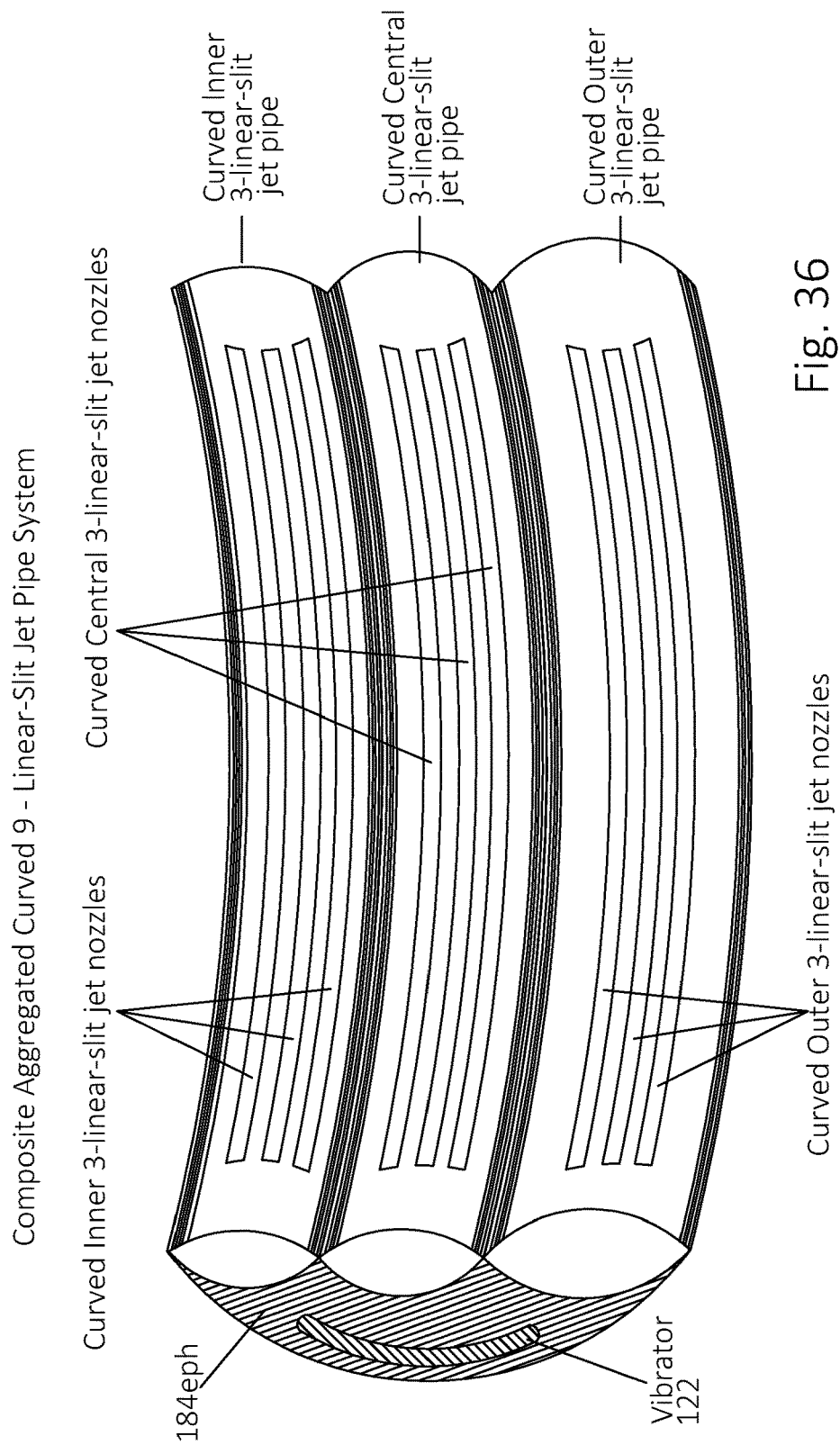

FIG. 36 is a general top view and partial side view of a composite aggregated multiple curved 9-Linear-Slit Jet Pipe System equipped with embedded vibrator.

Figure 37:
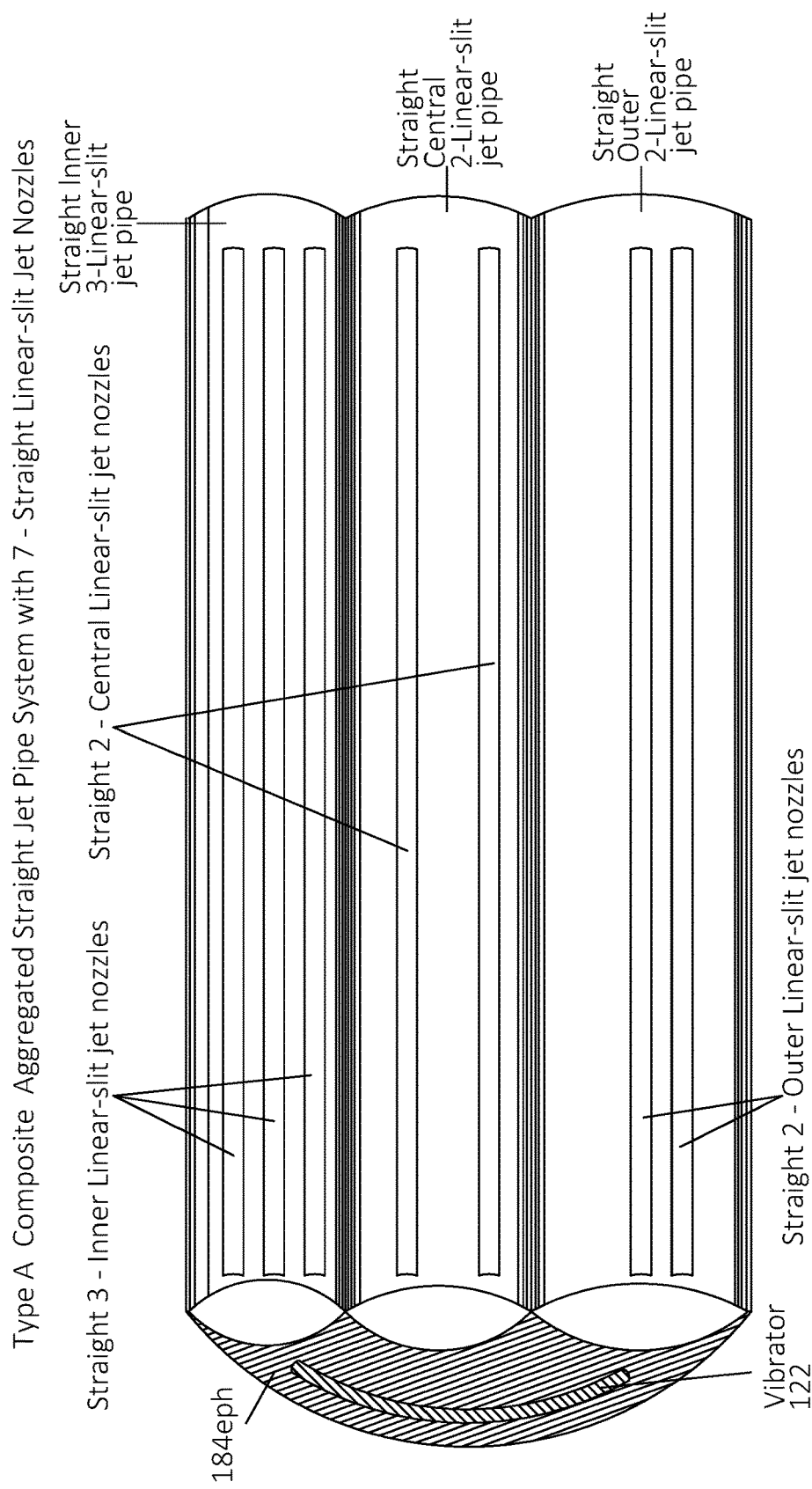

FIG. 37 illustrates a generally top-view and partial side-view of an embodiment of Type A of a composite aggregated straight jet pipe system (with vibrator) showing 7 straight linear-slit internal nozzles system, and, illustrating the 3 equidistant straight linear-slit internal nozzles being located in the inner segment, the 2 equidistant straight linear-slit internal nozzles being set farther apart and located in the middle segment, and the 2 equidistant straight linear-slit internal nozzles being set near each other at the outer periphery and located in the outer segment, and also partially showing the aggregated composite but separate corresponding multiple longitudinal jet pipes embedded with the sectional view of the curved vibrator, which are together held firmly by a sturdy external pipe holder.

Figure 38:
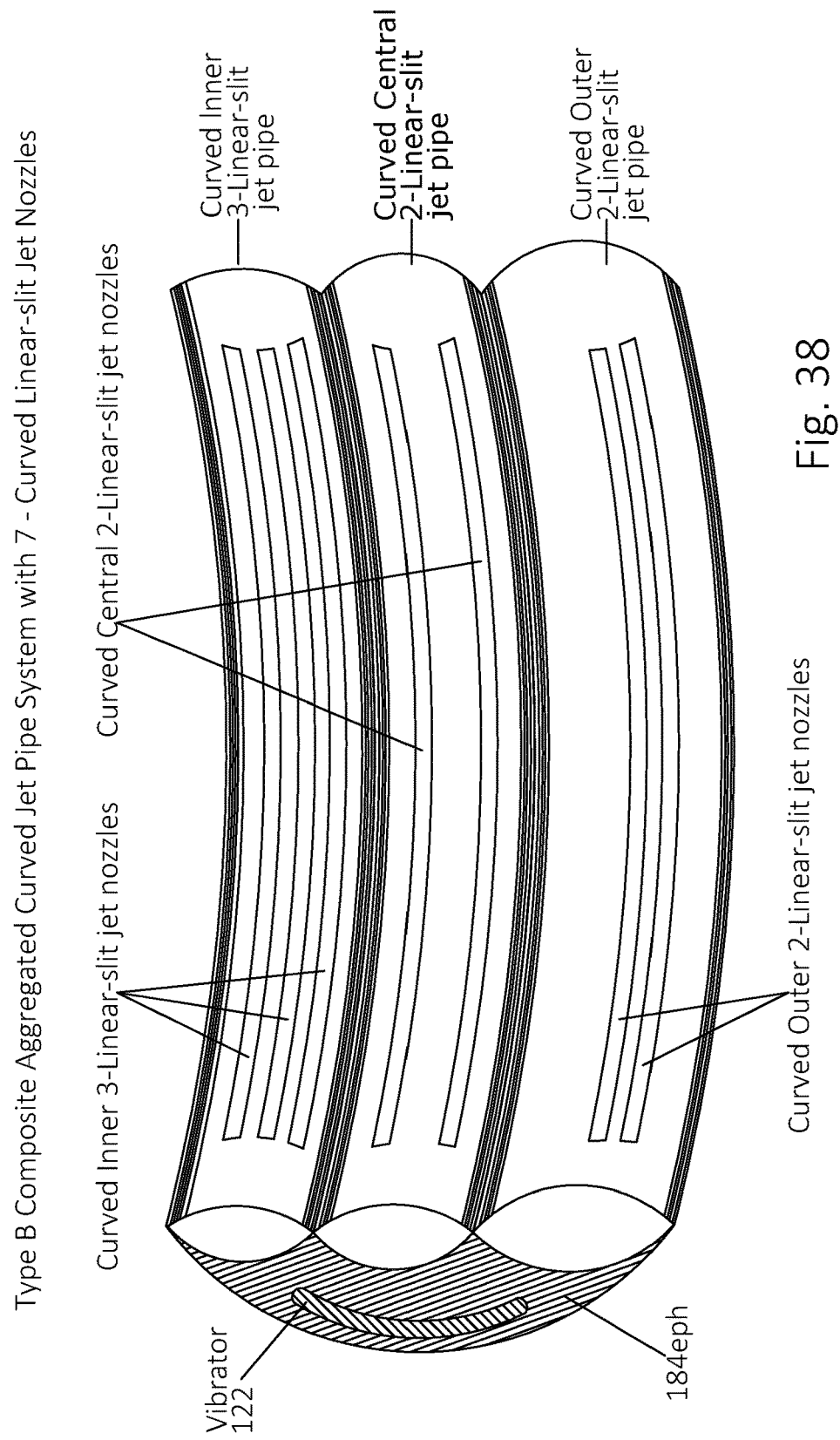

FIG. 38 illustrates a general top-view and partial side-view of the Type B composite aggregated curved jet pipe system (with vibrator) and illustrating the 7-composite curved linear-slit nozzles system, wherein 3-equidistant curved linear-slit internal nozzles being located in the inner segment, 2-equidistant curved linear-slit internal nozzles being set farther apart and located in the central segment, and 2-equidistantly located curved linear-slit nozzles being set near each other at the outer periphery and located in the outer segment, and also partially showing the aggregated but separate corresponding water-pipe and air-pipes embedded firmly with the sectional view of the curved vibrator.

Figure 39:
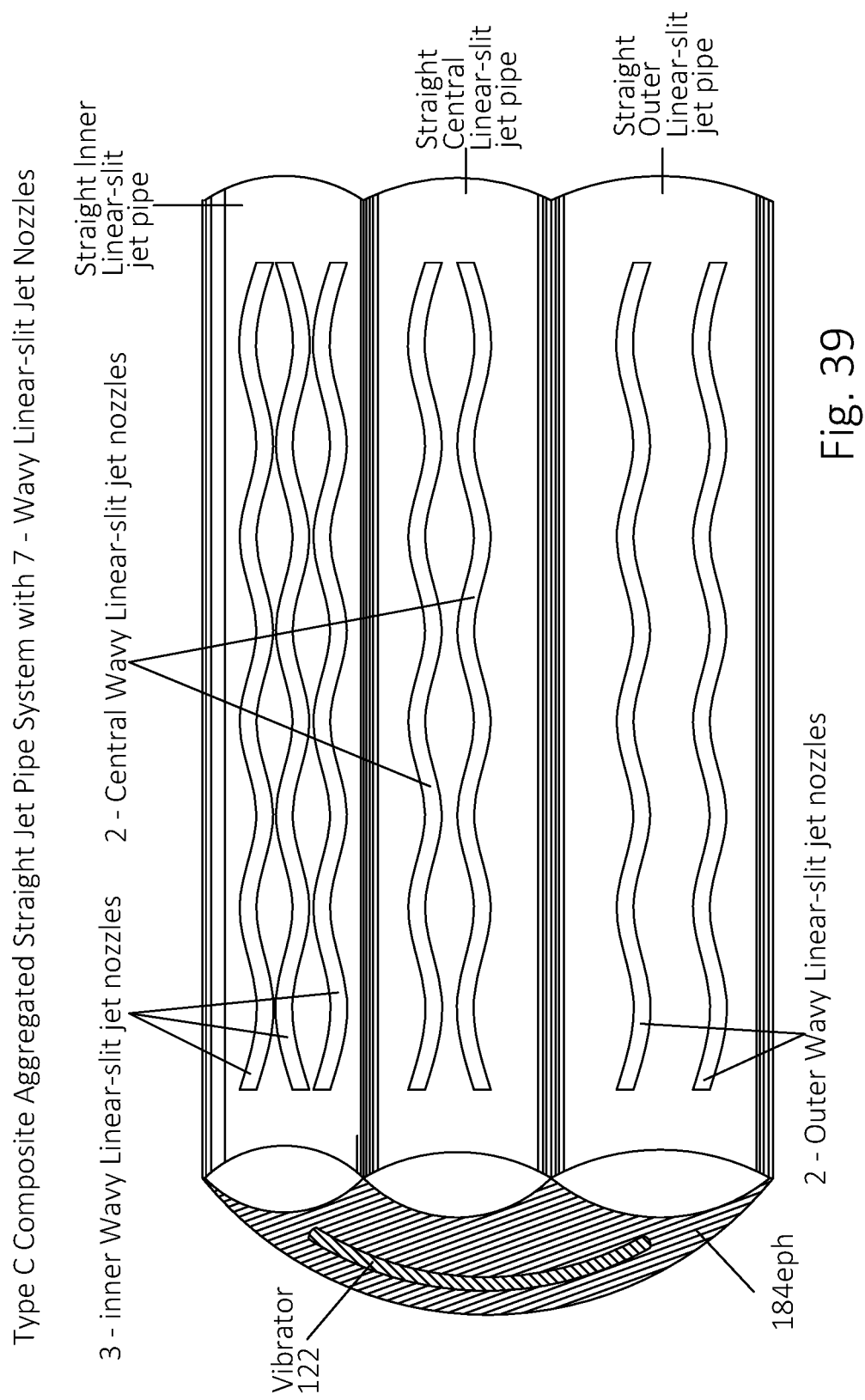

FIG. 39 shows a general top-view and partial side-view of an embodiment of the Type C composite aggregated straight pipes system (with vibrator) having 7-wavy-slit internal nozzles. It features 3-wavy-slit internal nozzles being oppositely positioned against each other and located in the inner segment, and 2-wavy-slit internal nozzles being set oppositely positioned against each other and located in the middle segment, and 2-wavy-slit internal nozzles being set evenly and uniformly positioned along with each other and located at the outer periphery of the outer segment. It also partially shows the aggregated composite separate corresponding water-pipe and air-pipes embedded firmly with the sectional view of the curved vibrator.

Figure 40:
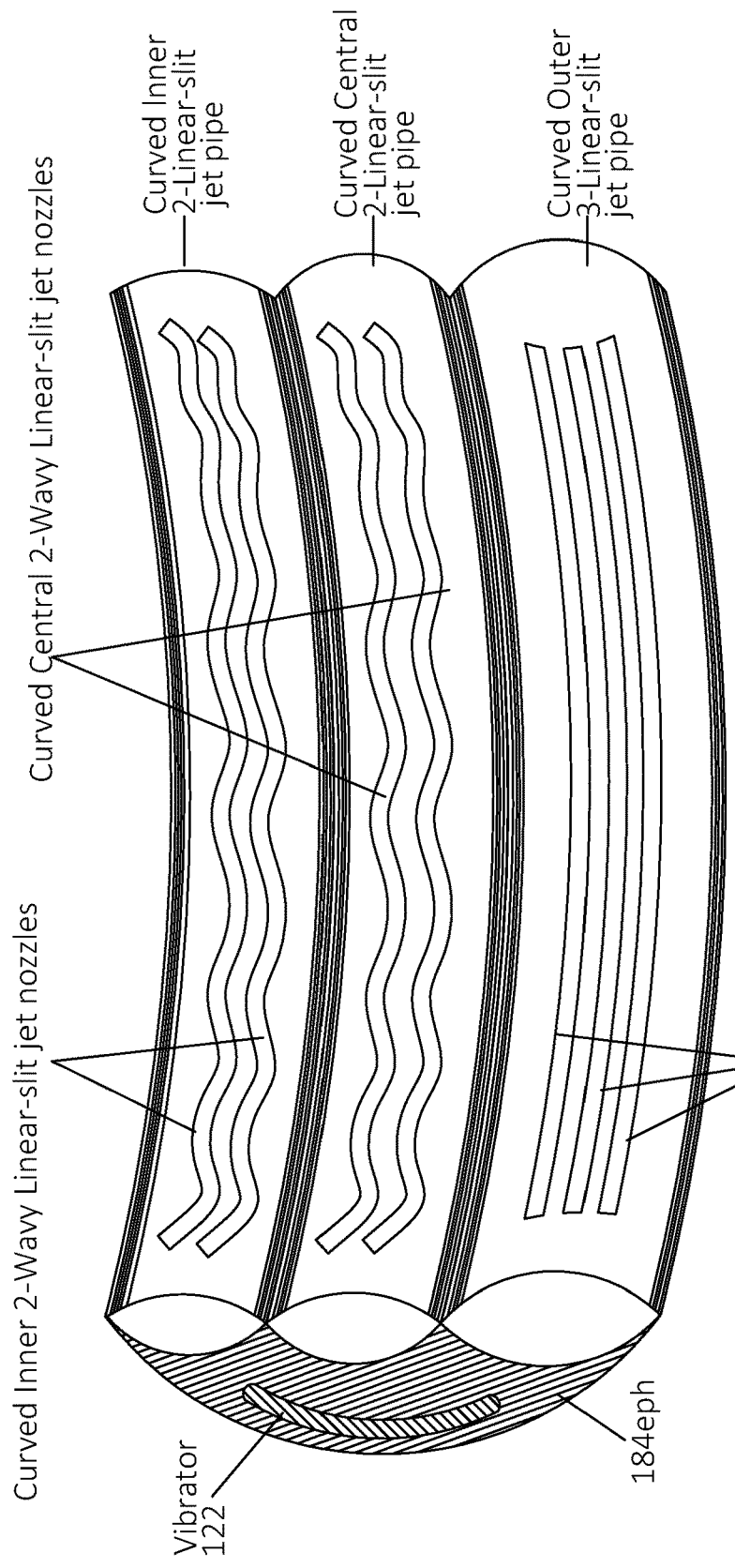

FIG. 40 illustrates a generally top-view and partial side-view of an embodiment of Type D composite aggregated curved pipes system (with vibrator) having 7-wavy-slit and non-wavy-slit internal nozzles. It features a set of curved 2-wavy-slit internal nozzles following equidistant paths along each other and located in the inner segment, a set of curved central 2-wavy-slit internal nozzles following equidistant paths running along each other and located in the middle or central segment, and a set of curved 3-non-wavy linear-slit internal nozzles along equidistant paths and located in the outer segment. The aggregated composite but separate pipes embedded firmly with the sectional view of the curved vibrator is also shown.

Figure 41:
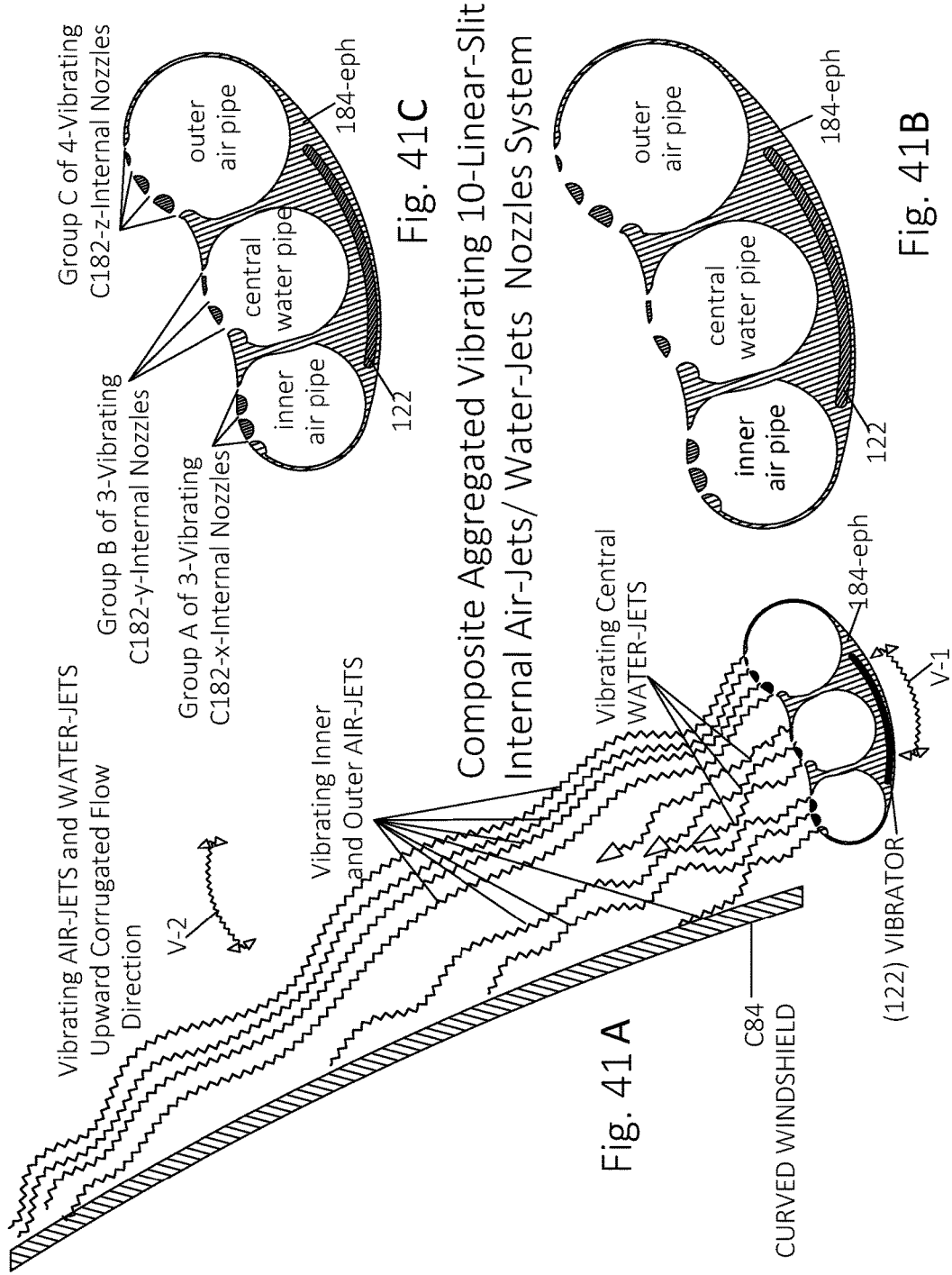

FIG. 41A illustrates a bottom-mounted sectional view of a composite aggregated curved 10-vibrating internal air-jets and water-jet nozzle system, showing a sectional view of the aggregated but separate vibrating inner and outer air-pipes with central vibrating water-pipe, the built-in 3-groups of linear-slit vibrating internal nozzles formed within each respective air-jet pipes and water-jet pipe, from which the corresponding vibrating streams or layers of air-jets and water-jets are ejected generally upwards and angled inwards to effectively clean, wipe or clear an adjacent curved windshield shown in sectional view. Each of the inner air-jet pipe and the central water-jet pipe each with three linear-slit internal vibrating nozzles, while the outer air-jet pipe has four linear-slit vibrating internal nozzles. Imbedded is a sectional view of a curved vibrator placed at the bottom of the composite 10-vibrating linear-slit internal air-jets and water-jet nozzle system.

FIG. 41B is a magnified sectional view of part of the composite aggregated vibrating 10-linear-slit internal air-jets and water-jets nozzles system having aggregated but separate inner and outer air-jet pipes and central water-jet pipe shown in FIG. 41A, and showing also the sectional view of the curved vibrator embedded below the inner and outer air-jet pipes and central water-jet pipe held firmly in place by an enclosing external pipe holder.

FIG. 41C is a sectional view of the same sectional view of FIG. 41B, with labels: Group A of 3-vibrating linear-slit internal nozzles, Group B of 3-vibrating central linear-slit internal nozzles, and group C of 4-vibrating linear-slit internal nozzles that are built-in with the corresponding group of vibrating linear-slit air-jet pipes and a water-jet pipe. The sectional view of the curved vibrator is also shown embedded below the air-jet and water-jet pipes.

Figure 42:
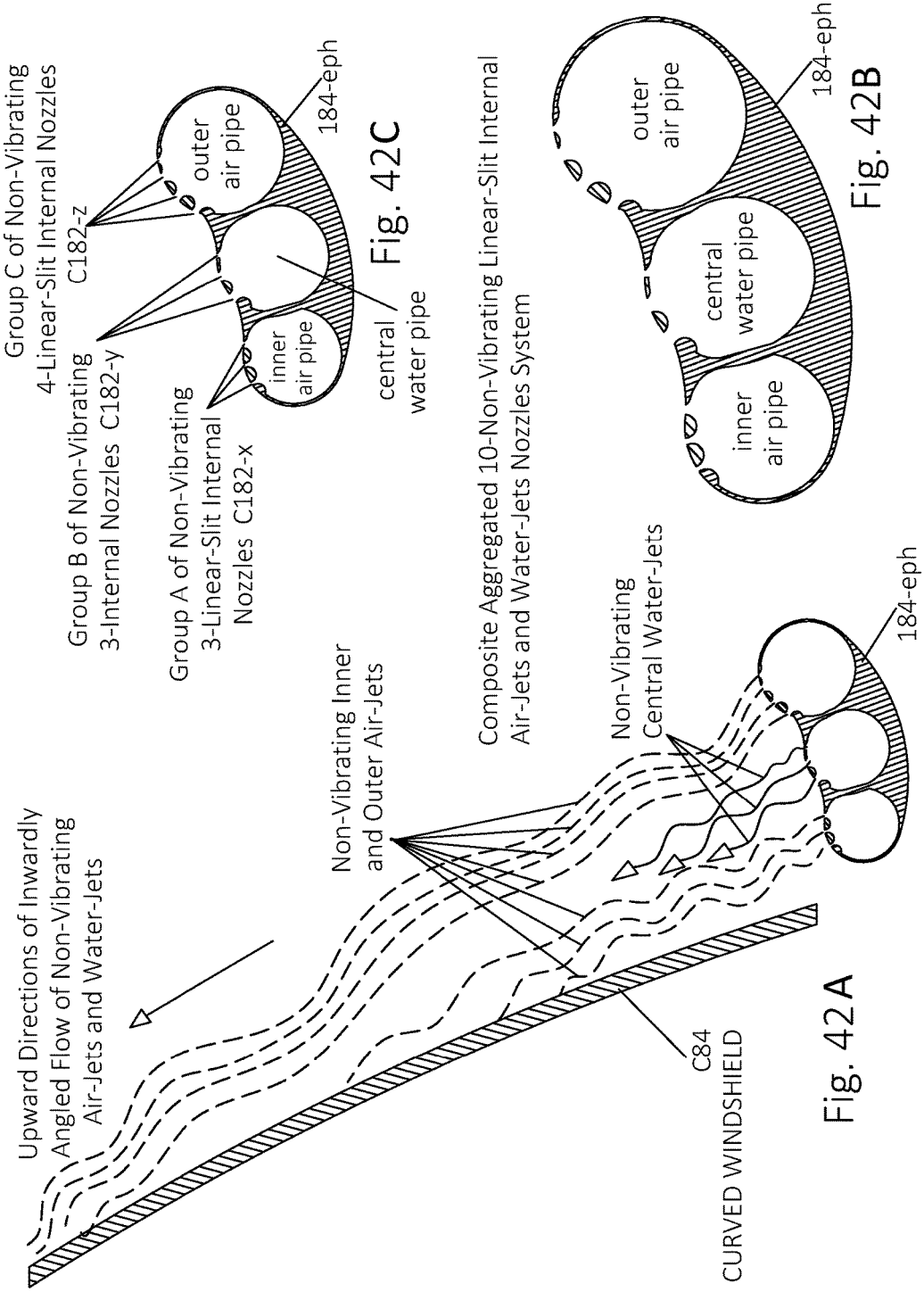

FIG. 42A is a bottom-mounted sectional view of the 10-non-vibrating inner and outer air-jets with central non-vibrating water-jets system, and showing the upward direction of the non-vibrating forceful moving layers or streams of air-jets and water-jets as being ejected from a sectional view of a composite curved 10-non-vibrating air-jets and water-jets internal nozzles system, and, also showing the adjacently placed sectional view of a curved windshield.

FIG. 42B is a magnified sectional view of a portion of the drawing shown in FIG. 42A showing the composite aggregated curved arrangement of the 10-non-vibrating air-jets and water-jet linear-slit internal nozzles system formed from the aggregated curved arrangement of the adjacent delivery pipes such as the inner air-jet pipe, the central water-jet pipe and the outer air-jet pipe being held firmly as embedded together with a curved vibrator held within the external pipe holder. 42C is a sectional view of the same sectional view of FIG. 42B, with labels: Group A of 3-non-vibrating linear-slit internal nozzles, Group B of 3-non-vibrating central linear-slit internal nozzles, and group C of 4-non-vibrating linear-slit internal nozzles that are built-in with the corresponding group of non-vibrating linear-slit air-jet pipes and a water-jet pipe.

Figure 43:
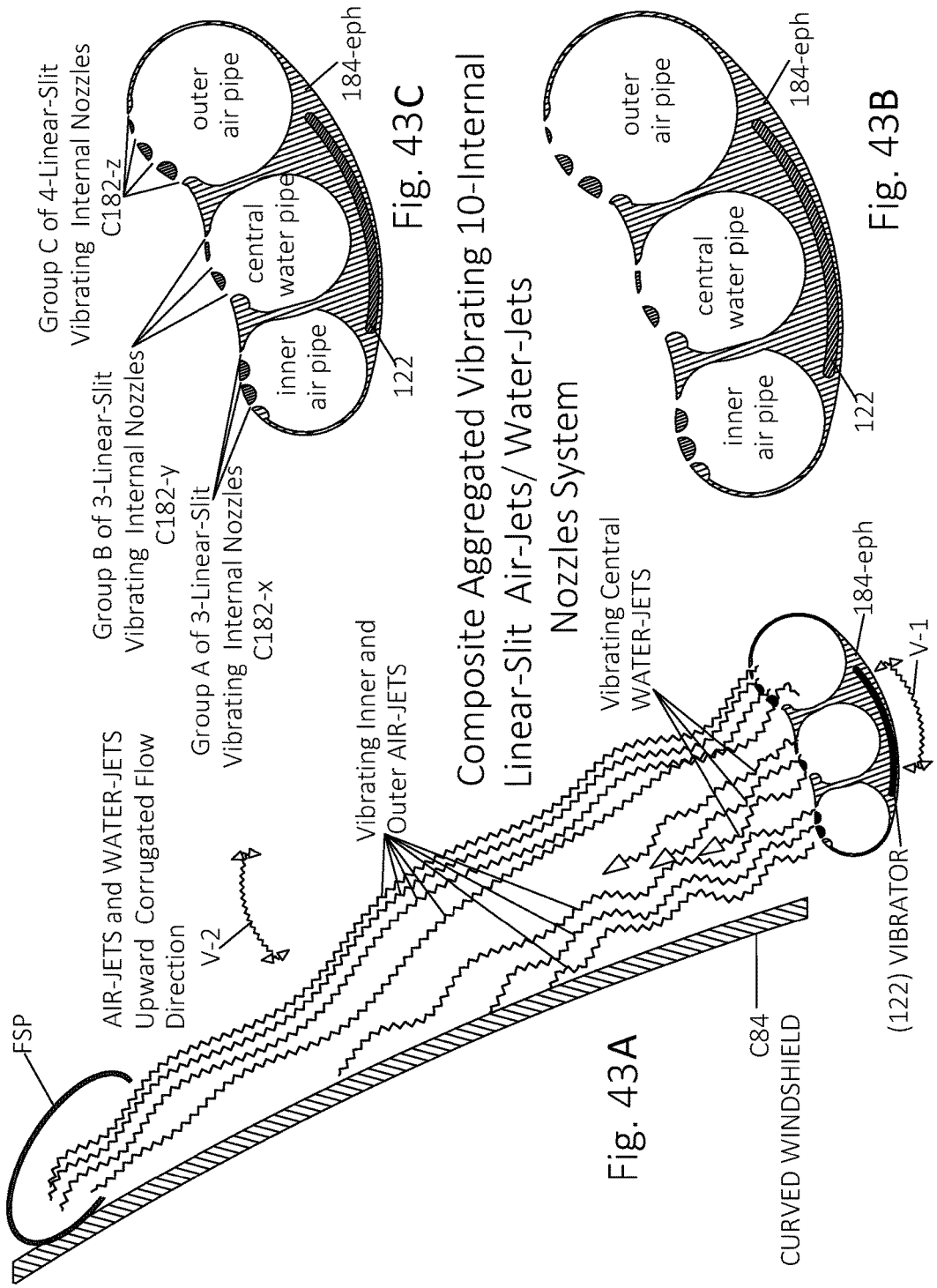

FIG. 43A shows a bottom-mounted sectional view of the vibrating inner and outer air-jets with central water-jets system, and, also showing the adjacent sectional view of a curved windshield, and, illustrating the upward corrugated directions of the vibrating inner and outer moving layers or streams of air-jets and vibrating central water jets being forcefully ejected from the various composite groups of vibrating 10-internal air-jet nozzles and water-jet nozzles; a sectional view of a longitudinal fluid suctioning pipe is shown placed at the top portion.

FIG. 43B is a magnified sectional view of a portion of the drawing shown in FIG. 43A showing the composite aggregated curved arrangement of the 10-non-vibrating air-jets and water-jet linear-slit internal nozzles system formed from the aggregated curved arrangement of the adjacent delivery pipes such as the inner air-jet pipe, the central water-jet pipe and the outer air-jet pipe being held firmly as embedded together with a curved vibrator held within the external pipe holder.

FIG. 43C is a sectional view of the same sectional view of FIG. 43B, with labels: Group A of 3-vibrating linear-slit internal nozzles, Group B of 3-vibrating central linear-slit internal nozzles, and group C of 4-vibrating linear-slit internal nozzles that are built-in with the corresponding group of vibrating linear-slit air-jet pipes and a water-jet pipe. The sectional view of the curved vibrator is also shown embedded below the air-jet and water-jet pipes.

Figure 44:
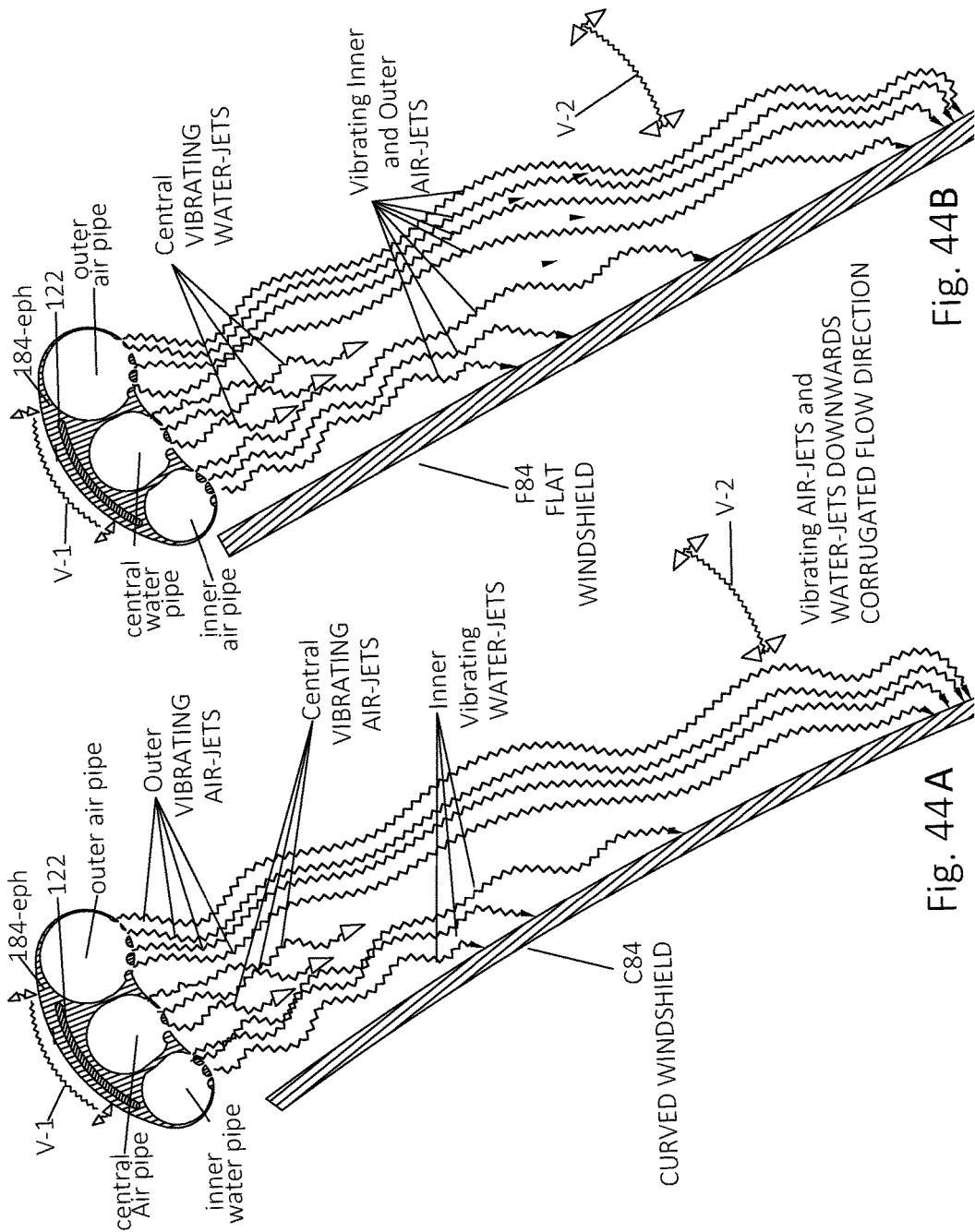

FIG. 44A illustrates a sectional view of a top-mounted composite aggregated curved 10-vibrating linear-slit internal air-jets and water jets nozzles system, and showing the sectional view of the inner vibrating water-jet linear-slit internal nozzles built-in from the inner water-pipe, and showing the central vibrating air-jet linear-slit internal nozzles formed from the central air-pipe, and also showing the outer 4-vibrating linear-slit internal air-jet nozzles formed from the outer air-pipe. The generally downward flowing directions of the corresponding vibrating water-jets and vibrating air-jets streams or layers are shown, represented by the corrugated V2 up and down and front and back set of double arrows. The drawing also shows the adjacent sectional view of a curved windshield, and the aggregated but separate corresponding water-pipe and air-pipes embedded firmly together with the sectional view of the flattened vibrator enclosed within a sturdy external pipe holder.

FIG. 44B illustrates the top-mounted vibrating inner and outer air-jets and vibrating central water-jet system, showing the sectional view of a flat windshield glass in positional relationship with the sectional view of the 3-curved composite inner and outer air-pipes and a central water-pipe, together with an imbedded vibrator causing the vibrating up and down and front and back corrugated directional downward flow of the vibrating air-jets and water-jets that provide comprehensive wiping and cleaning of the external surface of the flat windshield.

Figure 45:
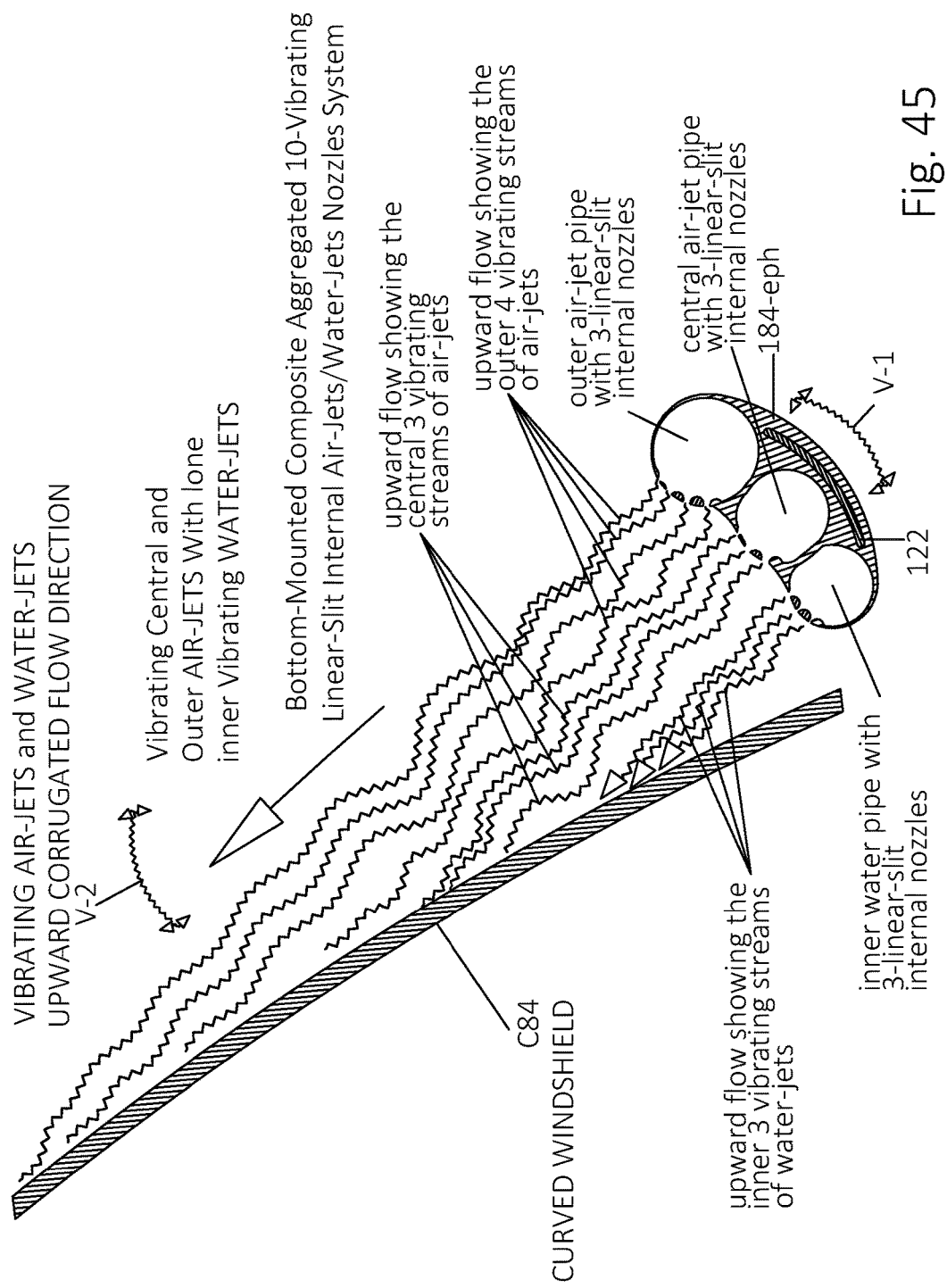

FIG. 45 is a sectional view of a bottom-mounted composite aggregated 10-vibrating linear-slit air-jets and water-jets internal nozzles system, and showing the sectional view of the inner vibrating water-jet linear-slit internal nozzles and inner water pipe, the central vibrating air-jet 3-linear-slit internal nozzles and central air-pipe, and the outer vibrating 4-linear-slit internal air-jet nozzles built-in from the outer air-pipe; also showing the upward flow directions of the corresponding vibrating inner water-jets and vibrating central air-jets streams and vibrating outer air-jets streams, respectively represented by the upward flowing vibrating streams of water-jets and vibrating streams of air-jets represented by corrugated arc V-2, and also showing the adjacent sectional view of a curved windshield, and showing the aggregated composite but separate corresponding water-pipe and air-pipes embedded firmly with the sectional view of the curved vibrator, held firmly by the sectional view of a sturdy external pipe holder.

FIG. 46A illustrates a sectional view of a curved windshield with sectional view of a five internal air-jet nozzles of the optional oscillating type of air-jet system for possibly attaining angled optimal flows of the inner three air-jet streams or layers reinforcing each other to optimally and effectively and maximally clean or wipe the various areas of the curved wind-shield, while the two outer fourth and fifth parallel-flowing air-jets ejecting from below and acting as effective continuous or intermittent flowing air-jet streams or sheets or layers for the purpose of shielding and bouncing off the onrushing rain or snow or dust particles in order to prevent their further penetration onto the windshield of a forwardly moving automotive vehicle.

FIG. 46B is a magnified portion showing detailed View-M of FIG. 46A, and illustrating the various corresponding directions of the five streams of non-vibrating air-jets flowing in upwards direction as ejected from the respective built-in 5 hidden internal nozzles of the oscillating type of multi-air-jet system with five separately angled internal air-jet nozzles operating with oscillating motion.

Figure 47:
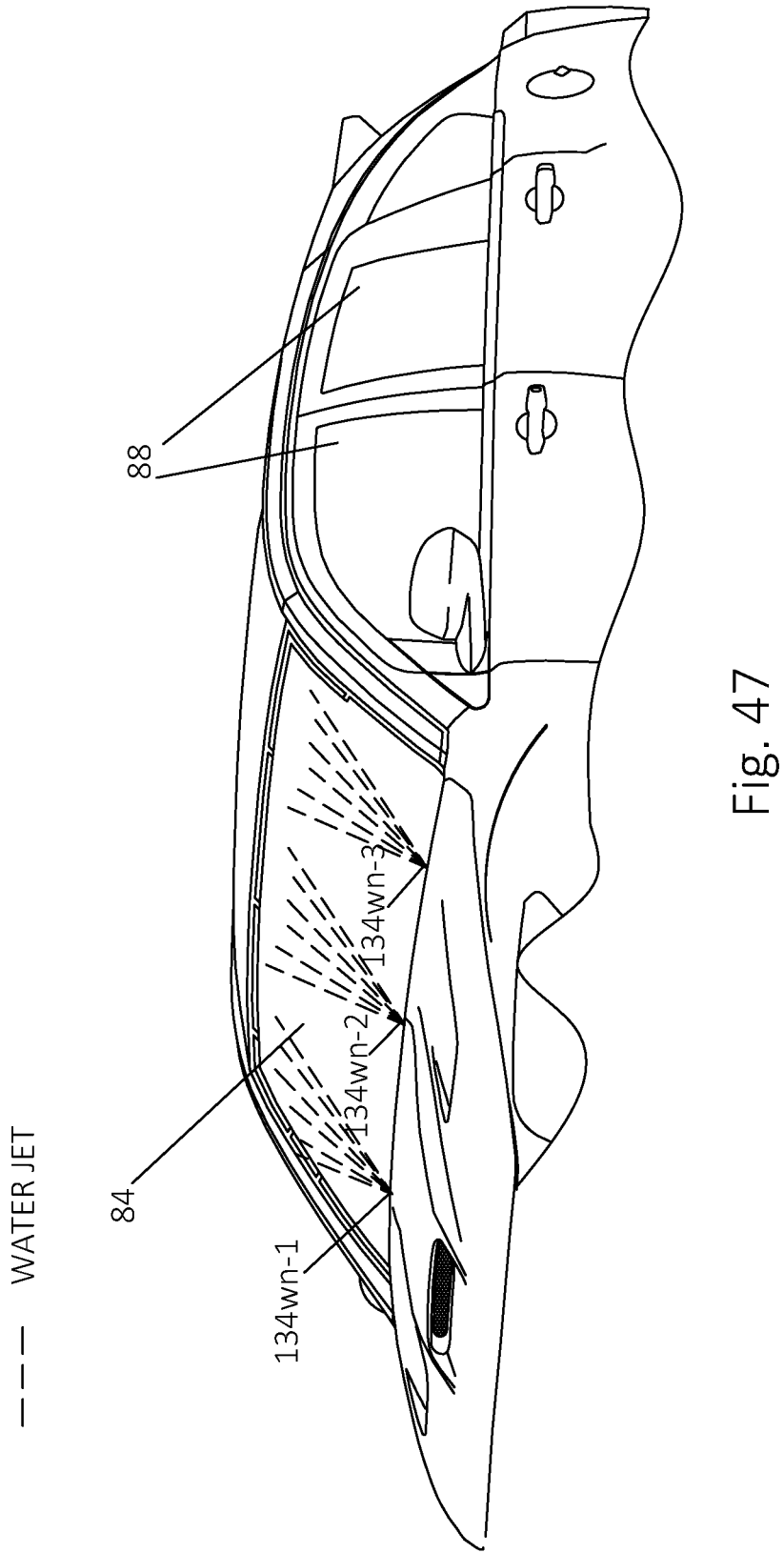

FIG. 47 is a simple illustration representing the spraying of water-jets emanating from below the front windshield 84 of a car; said water-jets sprayed on the external surface of said front windshield.

Figure 48:
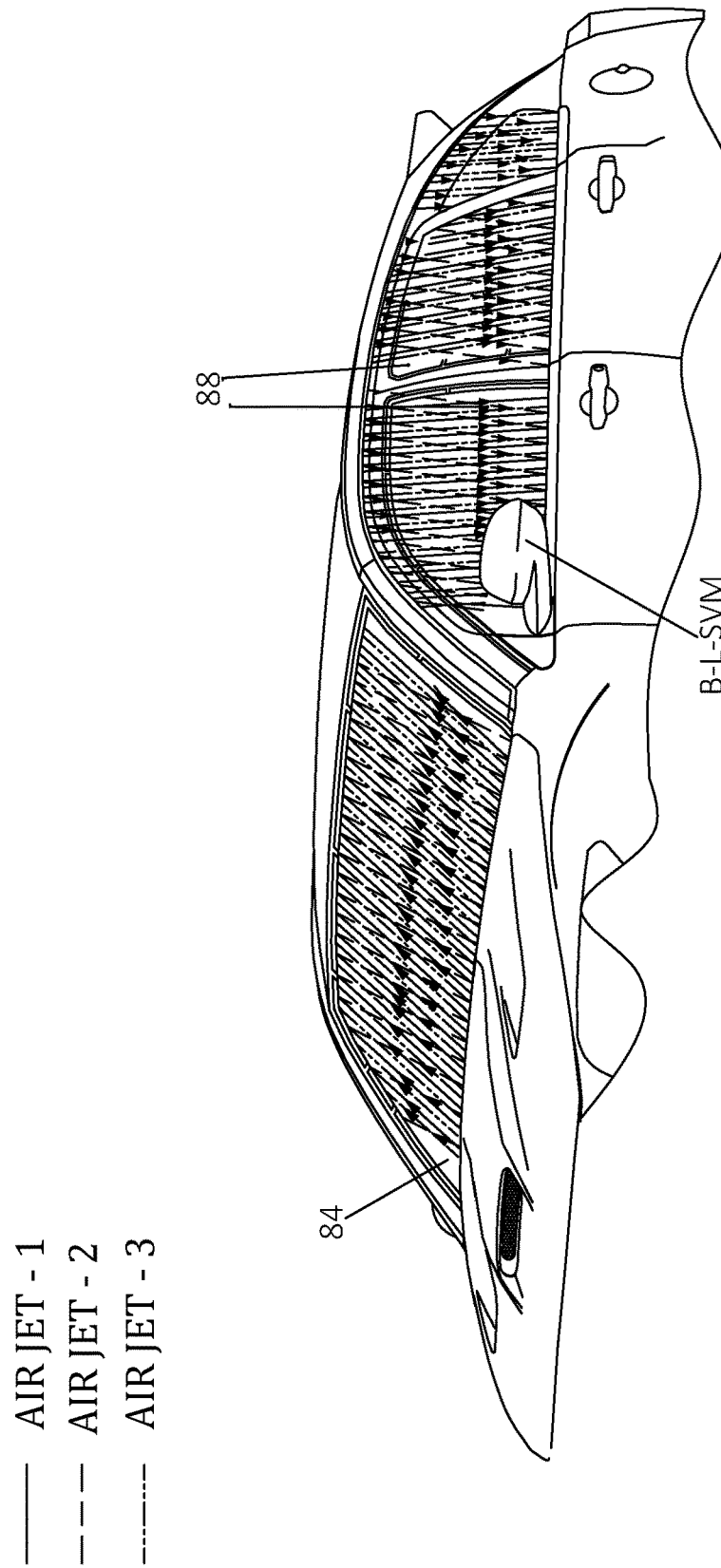

FIG. 48 is an illustration of an example of the upward directional multi-angular air-jets streams flowing and impinging on the external front windshield 84, and also showing various downward directional multi-angular air-jets streams flowing and impinging on portions of the left-side windshields 88 of a modern automobile.

Figure 49:
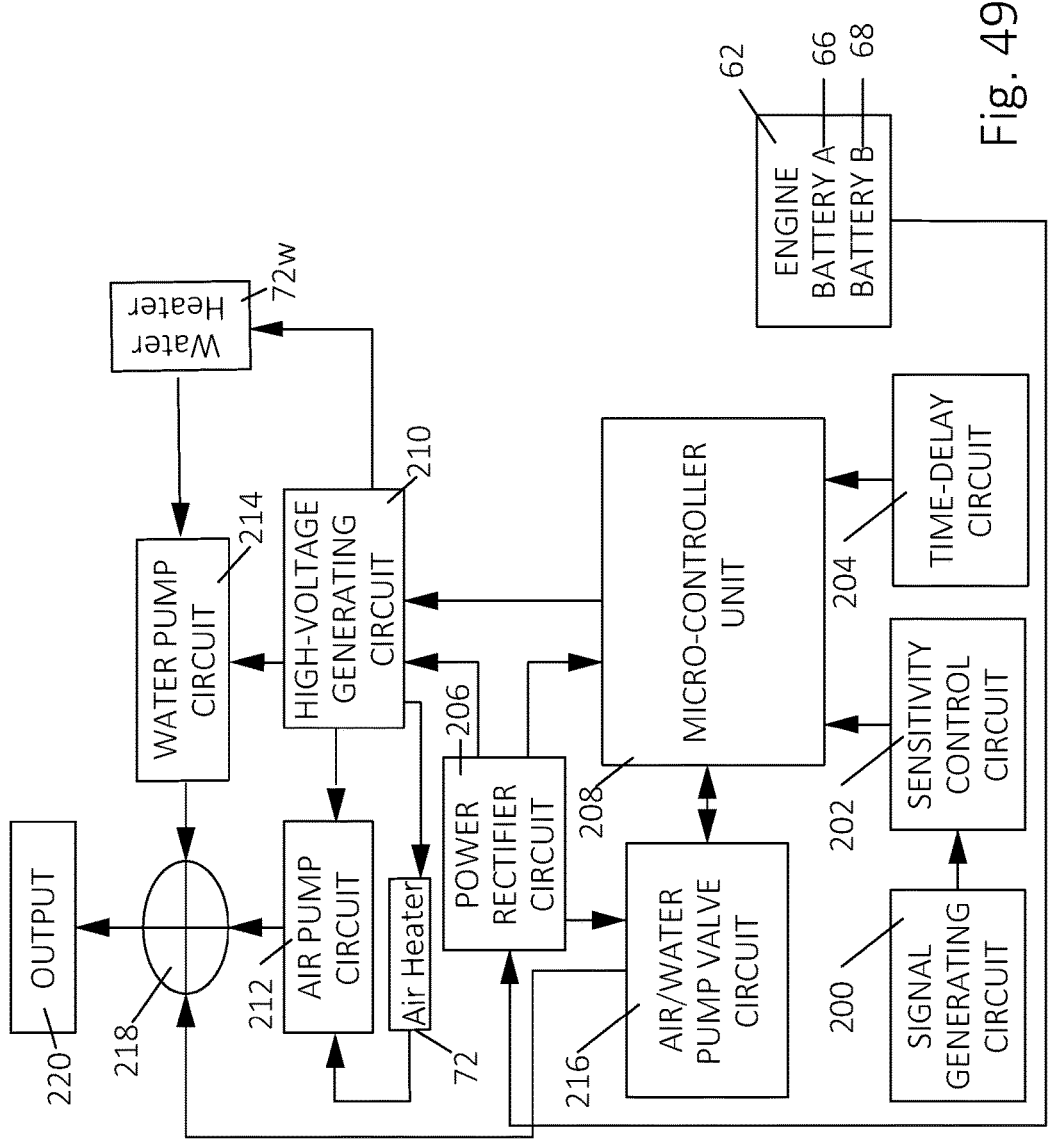

FIG. 49 is an electronic block diagram involving the signal generating circuit, which calculates how much rain is falling on the external surface of the glass windshield based on that sensitivity control circuit calculating the parameters providing data to the micro-controller to give the respective valve sizes to open for the respective valve circuits, in order to provide how much controlled water and/or air quantity to be spilled and ejected on to the selected windshields. Time delay circuit controls the frequency of the pumping (i.e. time period to spill and eject the water-jets and/or air-jets through the respective pumps). Power rectifier circuit generates the required power to operate the micro-controller, air pump and water pump circuits.

Figure 50:
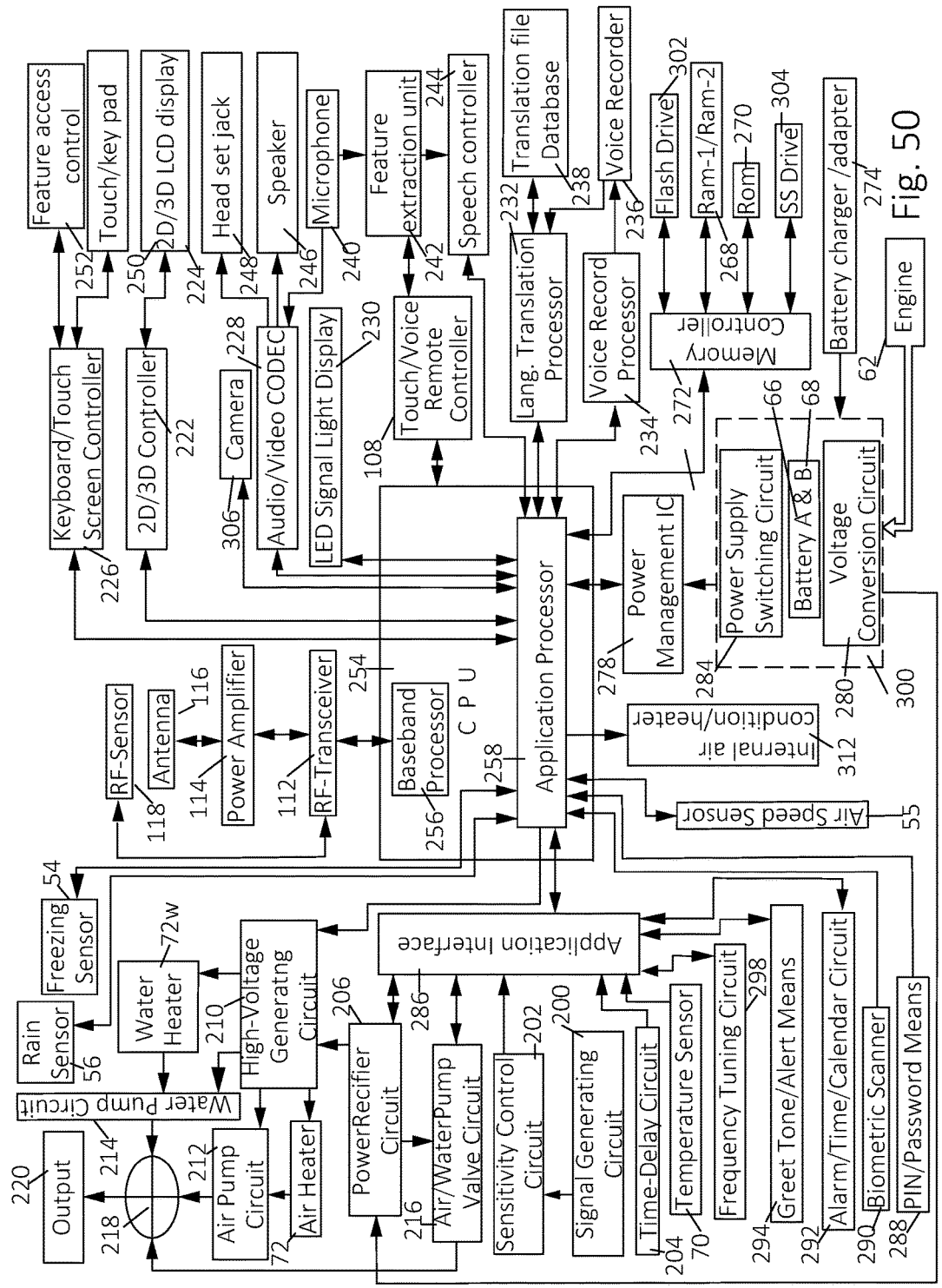

FIG. 50 illustrates the electronic block diagram essentially containing the various respective components in FIG. 49, except that the micro-controller in FIG. 49 is not shown because the micro-controller in FIG. 50 is now part of the CPU as the components in FIG. 50 are already connected to the application processor of the CPU and linked through the application interface. The diagram also shows that there is no vibrator, no oscillator, no GPS components, and yet the other important electronic and electrical components and connections, linkages, controls and power systems and rectifiers, etc. are included so as to operate together and optimally and selectively manage and properly effectuate the required optimal tasks for the combined multi-air-jet and water-jet method, system, assembly and device for wiping, cleaning and clearing various selected windshields and side-view mirrors, equipped with touch/voice remote controller with frequency tuning circuit, temperature sensor, rain sensor, freezing sensor, greet tones and alert processor means, alarm/time/calendar circuit, biometric scanner, pin/password means, air heater, water heater, camera, internal air-conditioner/heater and others in the diagram, for applications to new modern high-tech automobiles.

Figure 51:
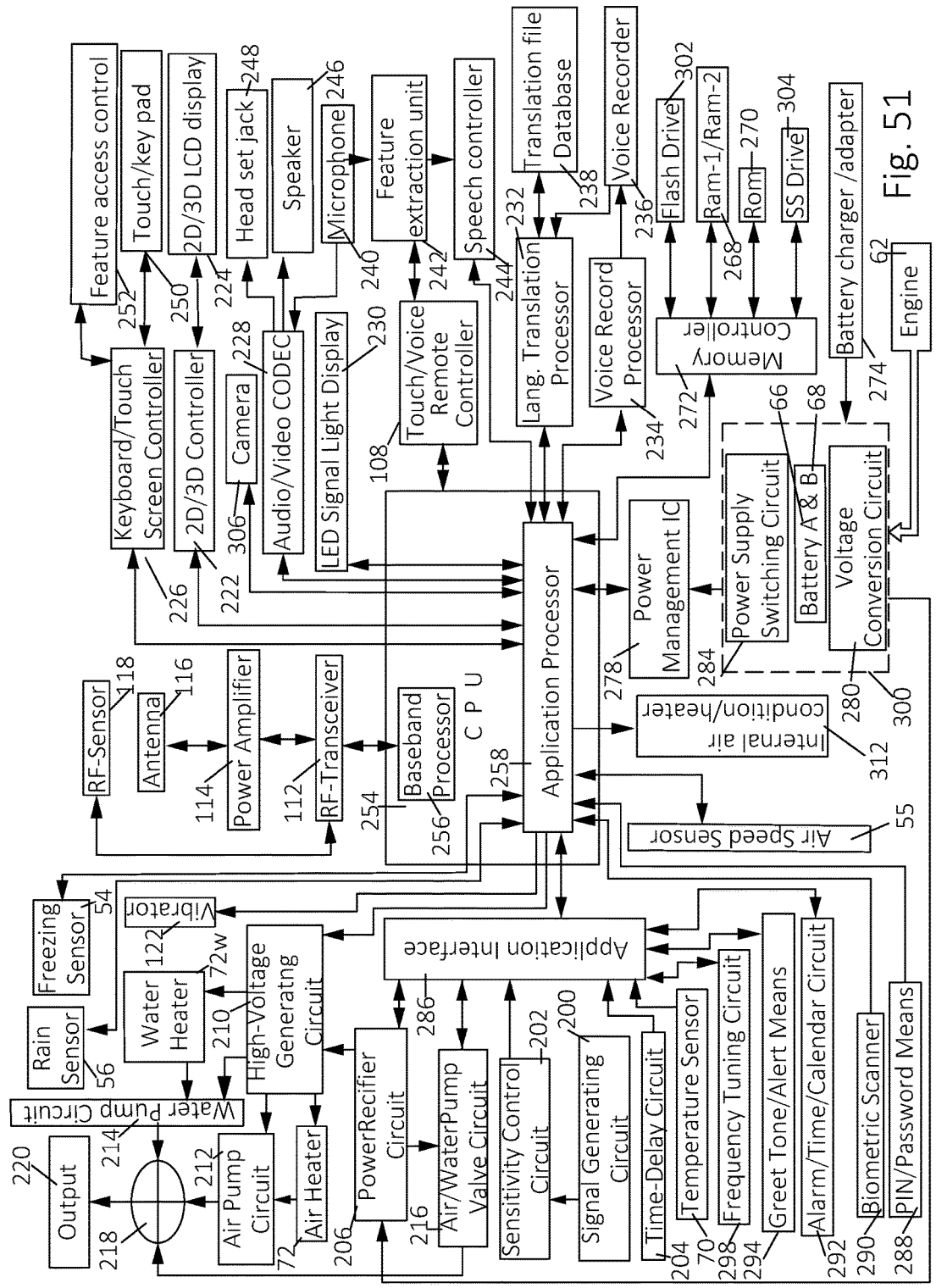

FIG. 51 illustrates the electronic block diagram essentially containing the various respective components in FIGS. 49 and 50, except that the micro-controller in FIG. 49 is not shown because the micro-controller in FIG. 49 is now part of the CPU as the components in FIG. 51 are already connected to the application processor of the CPU and linked through the application interface. The diagram also shows the other important electronic and electrical components and connection, linkages, controls and power systems and rectifiers, so as to operate together and optimally and selectively manage and properly effectuate the required optimal tasks for the combined multi-air-jet and water-jet method, systems, assembly and devices for wiping, cleaning and clearing various windshields and side-view mirrors, (but this diagram shows the additional inclusion of vibrator means, among others included in FIG. 50, for applications to new modern high-tech automobiles.

Figure 52:
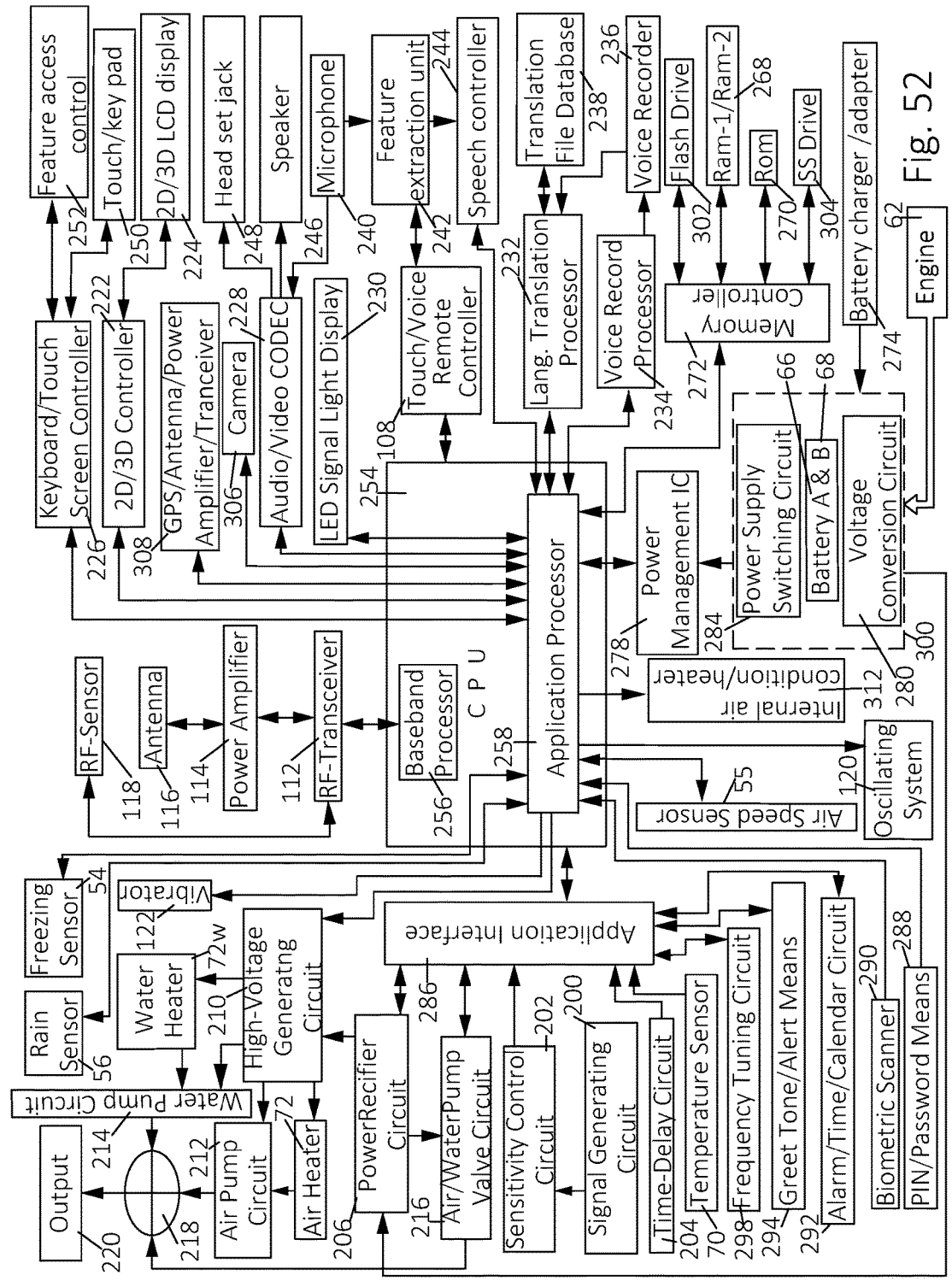
Figure 55:
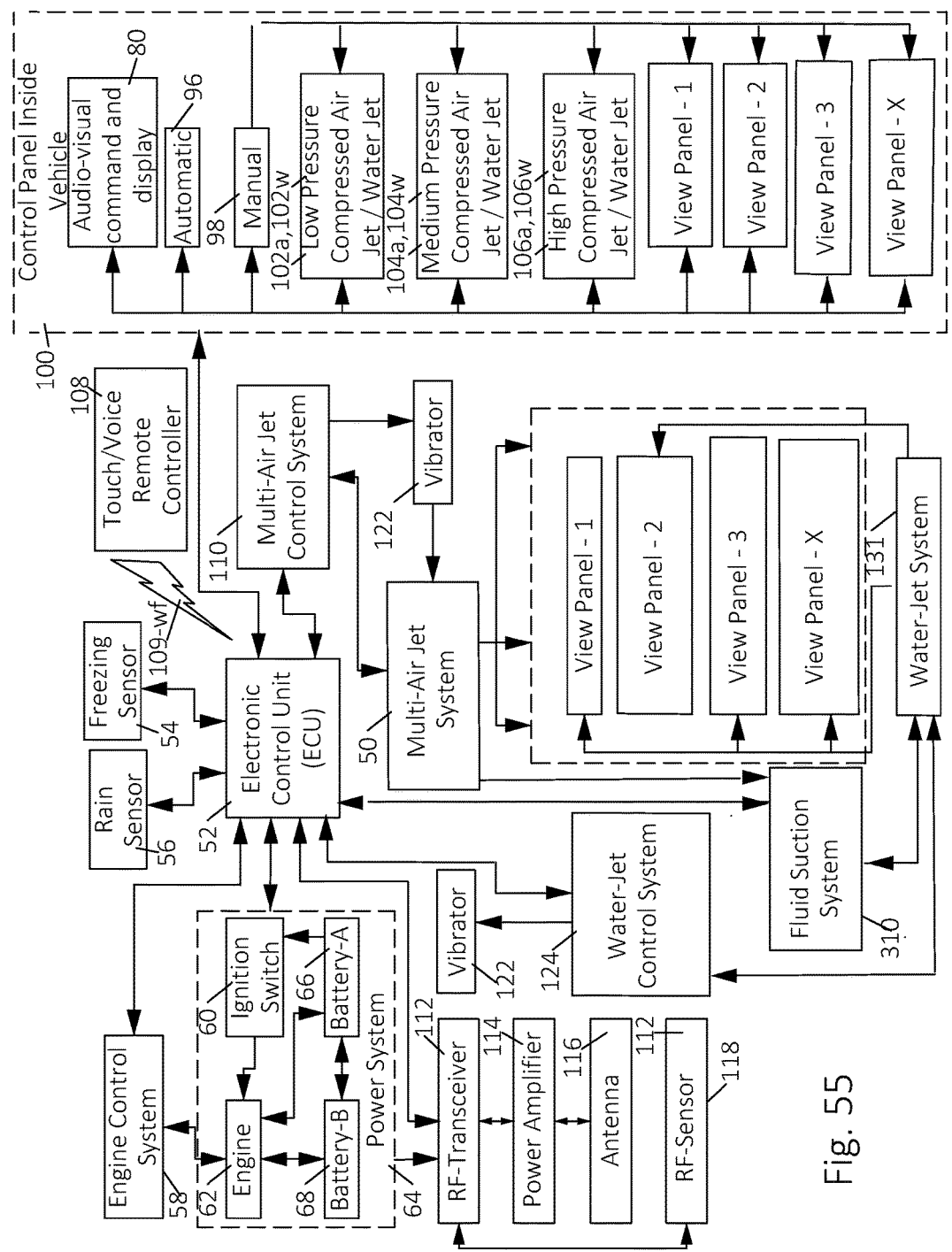
Figure 56:
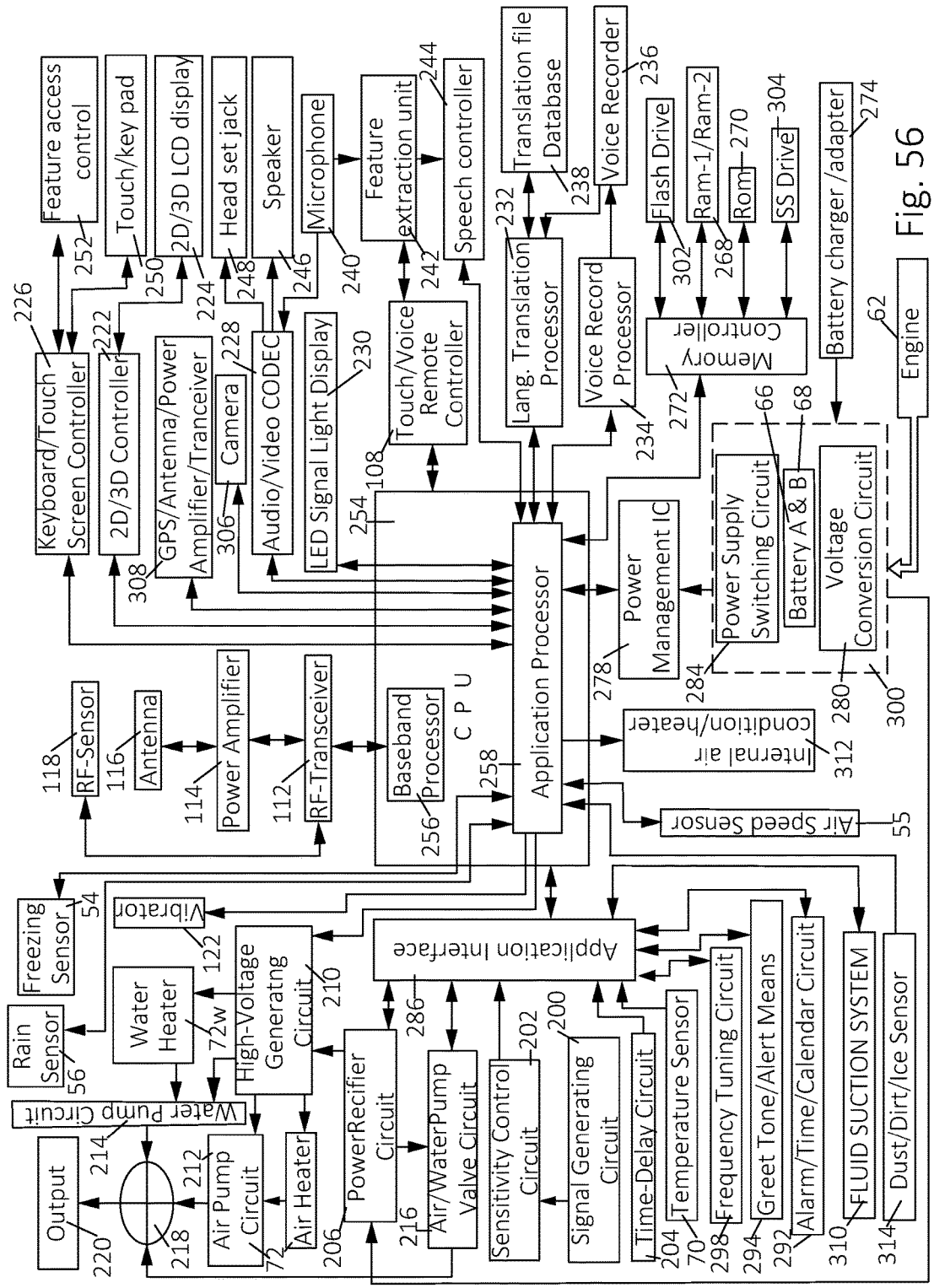
Figure 57:
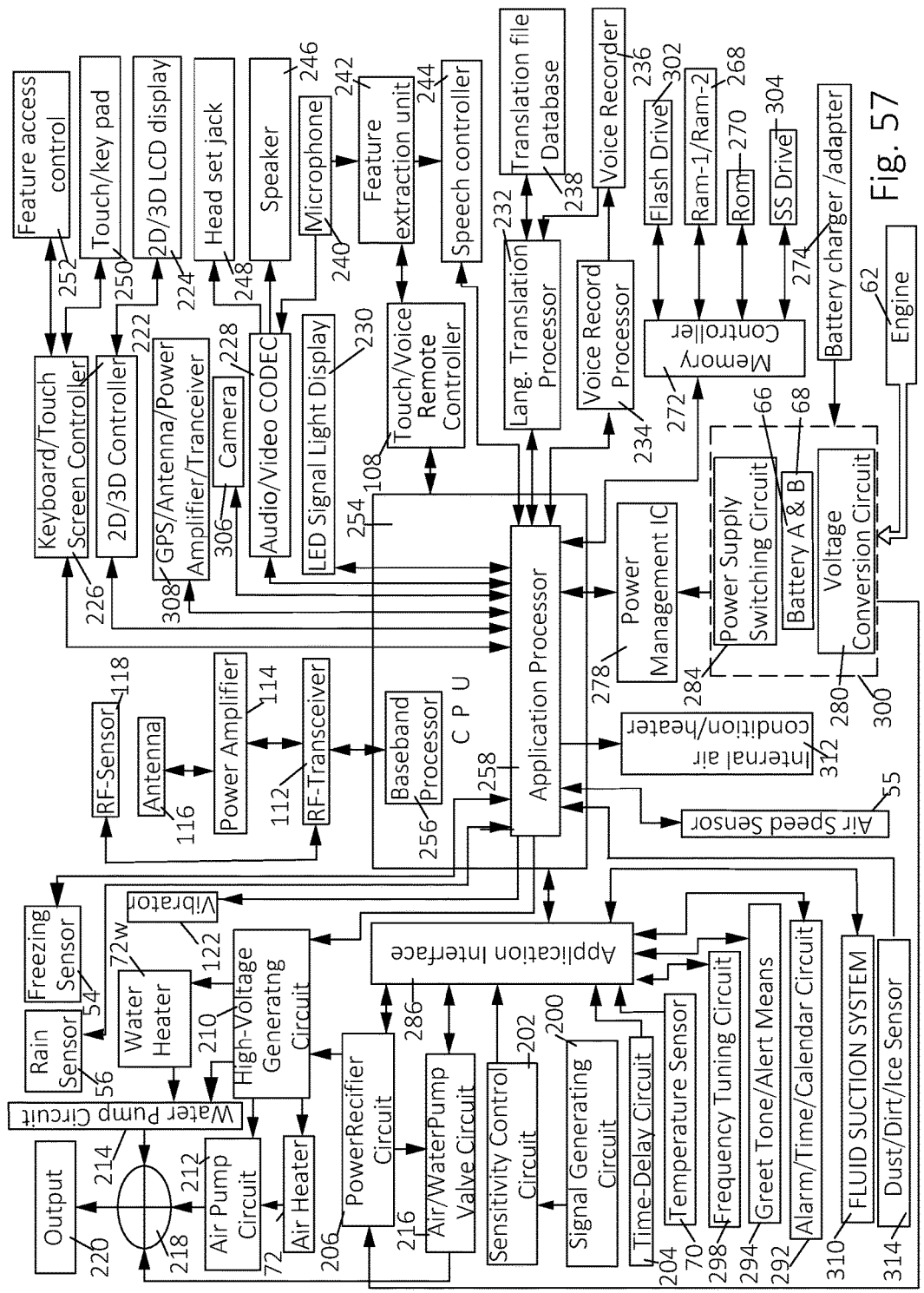

FIG. 52 illustrates the electronics, electrical hardware and software components, controls, commands, inter-connections and linkages as in FIGS. 55, 56 and 57, (except in this FIG. 52 there is additional inclusion of an optional oscillating system) for application to new modern high-tech automobiles.

Figure 53:
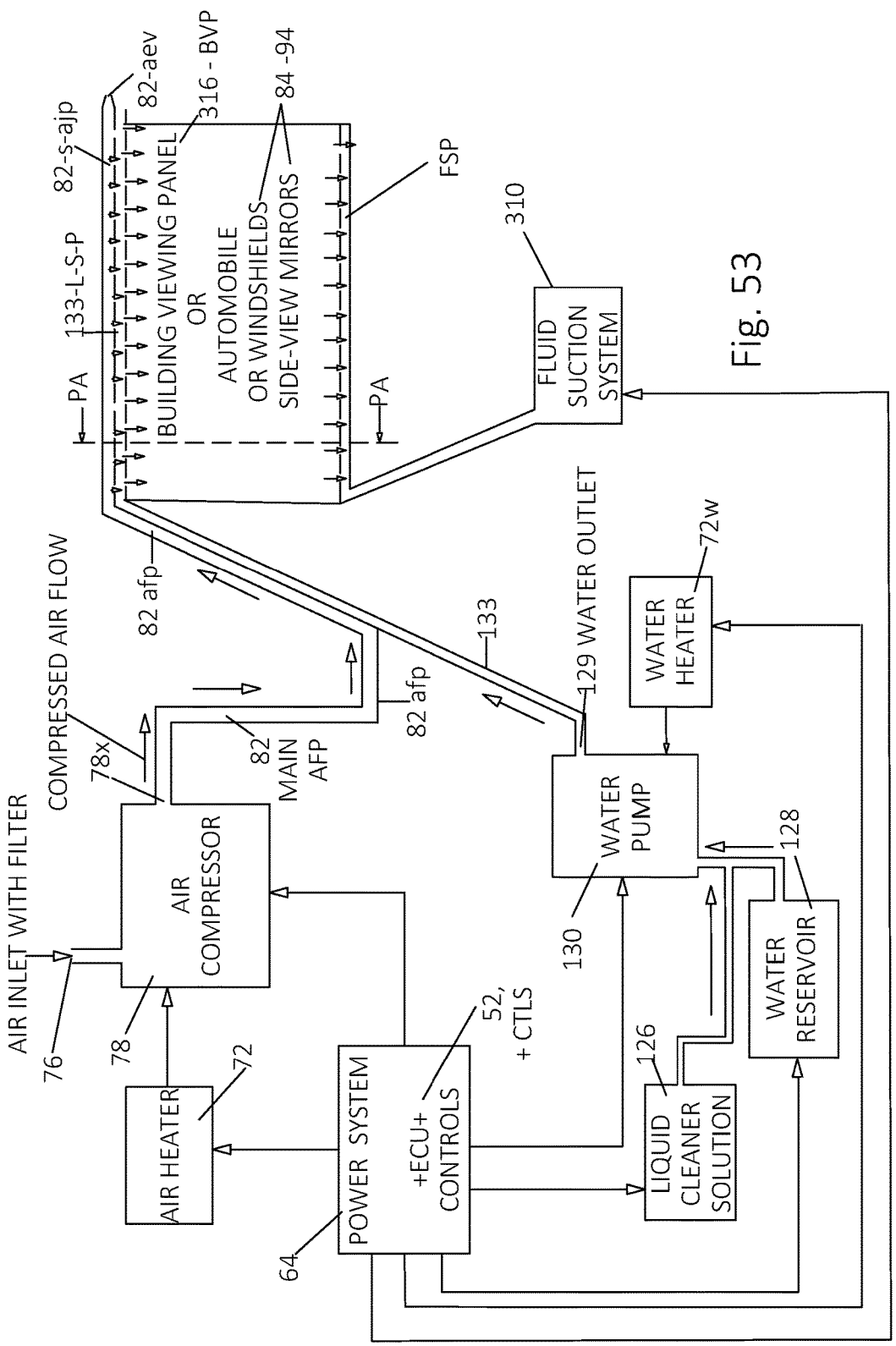

FIG. 53 illustrates a general block diagram and schematic representation of a combined air-jet and water-jet systems, assemblies, methods and devices for wiping, cleaning or clearing the transparent viewing panel of high rise or medium rise and low-rise buildings, and also applicable for automobile windshields, and illustrating the downward flow of both air-jets and water-jets from longitudinal air-jet and water-jet linear-slit nozzles that are built-in from the corresponding longitudinal air-jet and water-jet pipes, and also showing a corresponding longitudinal fluid suctioning pipe system ideally located at the bottom section of said transparent viewing panels or windshields.

Figure 54:
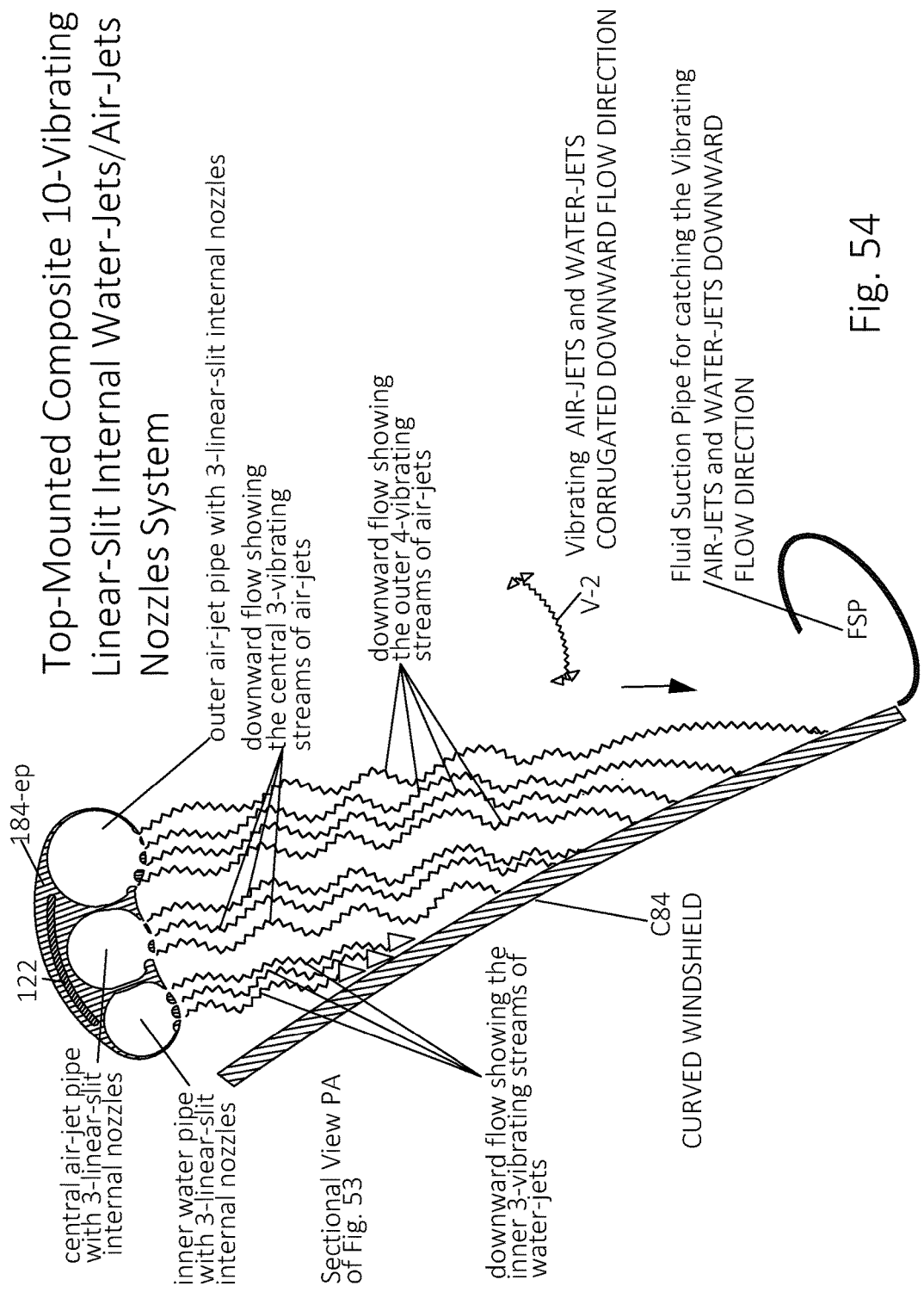

FIG. 54 illustrates a sectional view of a top-mounted composite curved 10-vibrating linear-slit internal air-jets and water jets nozzles system, and showing the sectional view of the inner vibrating water-jet linear-slit internal nozzles built-in from the inner water-pipe, and showing the central vibrating air-jet linear-slit internal nozzles formed from the central air-pipe, and also showing the outer 4-vibrating linear-slit air-jet internal nozzles formed from the outer air-pipe; also showing the generally downward flowing directions of the corresponding vibrating water-jets and vibrating air-jets streams or layers, represented by the corrugated V2 up and down and front and back set of double arrows, and also showing the adjacent sectional view of a curved windshield, and also showing the aggregated but separate corresponding water-pipe and air-pipes embedded firmly together with the sectional view of the flattened vibrator enclosed within a sturdy external pipe holder. Also illustrated at the bottom is a sectional view of a longitudinal fluid suctioning longitudinal pipe for catching and suctioning the ejected pressurized vibrating water-jets and air-jets to prevent undesired fluid spillage or leakage.

FIG. 55 illustrates a general block diagram of the combination of both the bladeless multi-air-jet and water-jet devices, methods, systems, and assemblies, showing the multi-air-jet control system means, water-jet control system means, multi-air-jet system, water jet system, and also showing that both are equipped with vibrators and touch/voice remote controller means, among other required components, for selectively providing both air-jet and water-jet wiping, cleaning and clearing of the various selected building transparent viewing panels of high-rise or medium-rise or low-rise buildings, and including a fluid suctioning system for catching and suctioning the ejected pressurized vibrating water-jets and air-jets to prevent undesired fluid spillage or leakage.

FIG. 56 illustrates the electronic block diagram essentially containing the various respective components in FIGS. 49 and 50, except that the micro-controller in FIG. 56 is not shown because the micro-controller in FIG. 56 is now part of the CPU as the components are already connected to the application processor of the CPU and linked through the application interface. The diagram also shows the other important electronic and electrical components and connection, linkages, controls and power systems and rectifiers, in order to operate together and optimally and selectively manage and properly effectuate the required optimal tasks of the combined multi-air-jet and water-jet method, systems, assembly and devices for wiping, cleaning and clearing various windshields and side-view mirrors, (but this diagram shows the additional inclusion of vibrator, and GPS among others included in FIG. 51, except that there is a coordinated fluid suction system as well as a dirt and dust sensor system for cleaning applications of transparent viewing panels of high-rise or medium-rise or low-rise buildings, and to prevent undesired fluid spillage and leakage.

FIG. 57 illustrates basically the electronics, electrical hardware and software components, controls, commands, storage, inter-connections and linkages, moreover, there is also the additional GPS with its antenna and vibrator, among other relevant components (but without an oscillating system) for application to new modern high-tech automobiles.

REFERENCE NUMERALS, ALPHABETIC AND ALPHA-NUMERIC LABELS IN THE DRAWINGS

To clearly describe the details in the specifications of the present invention, the following parts and functions are respectively labeled with the corresponding numerals, alphabetic and alpha-numeric representations, where like parts and functions are respectively labeled as closely as possible with corresponding like numeric and/or like alpha-numeric and like alphabetic labels.

50—multi-air-jet system shown in FIGS. 1, 2 and 5
52—electronic control unit (ECU) shown in FIGS. 1, 2, 3, 4, 5 and 55
54—freezing sensor shown in FIGS. 1, 2, 3, 4, 5, 50, 51, 52, 55, 56 and 57
55—airspeed sensor shown in FIGS. 1-5, 50, 51, 52, 55-57
56—rain sensor shown in FIGS. 1, 2, 3, 4, 5, 50, 51, 52, 55, 56 and 57
58—engine control system shown in FIGS. 1, 2, 3, 4, 5 and 55
60—ignition switch shown in FIGS. 1, 2, 3, 4, 5 and 55
62—engine shown in FIGS. 1, 2, 3, 4, 5 and 55-57
64—power system shown in FIGS. 1, 2, 3, 4, 5, 6, 10, 12A, 12B, 13A, 13B, 14, 15, 18-21, 23, 24, 26 and 27
66—Battery-A shown in FIGS. 1, 2, 3, 4, 5, 50, 51, 52, 55, 56 and 57
68—Battery-B shown in FIGS. 1, 2, 3, 4, 5, 50, 51, 52, 55, 56 and 57

Figure 2:
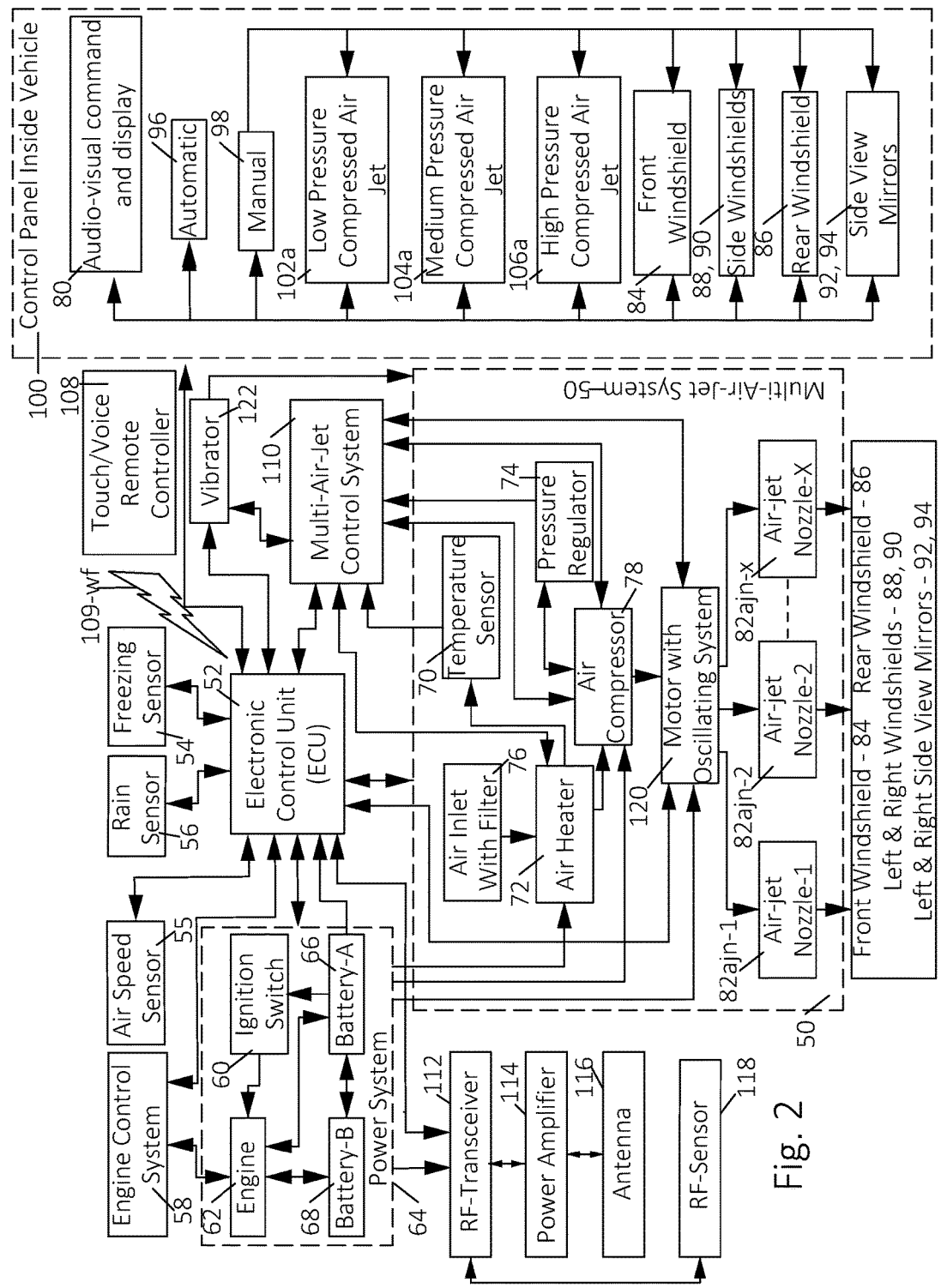
Figure 10:
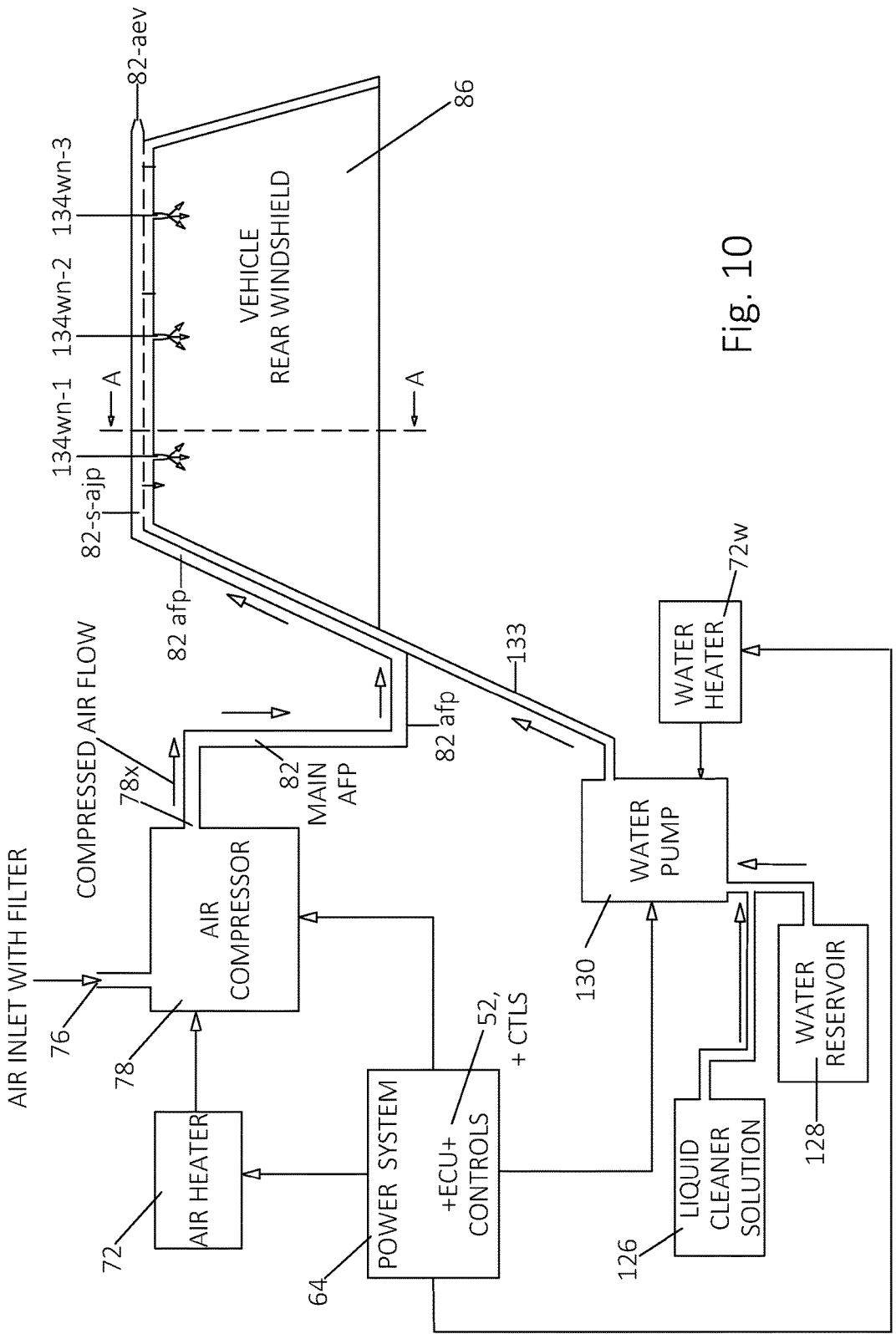
Figure 11:
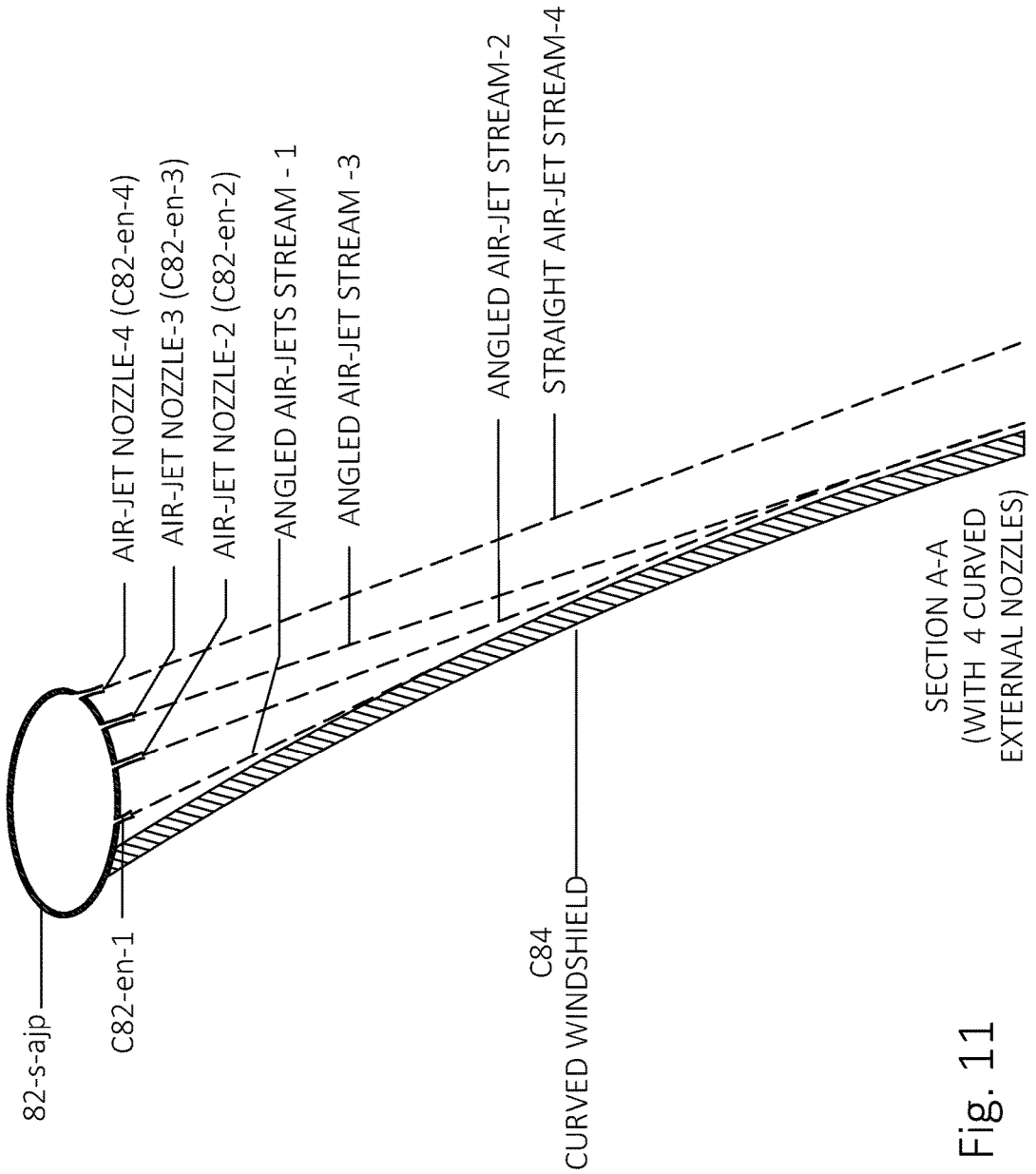
Figures 12A, 12B:
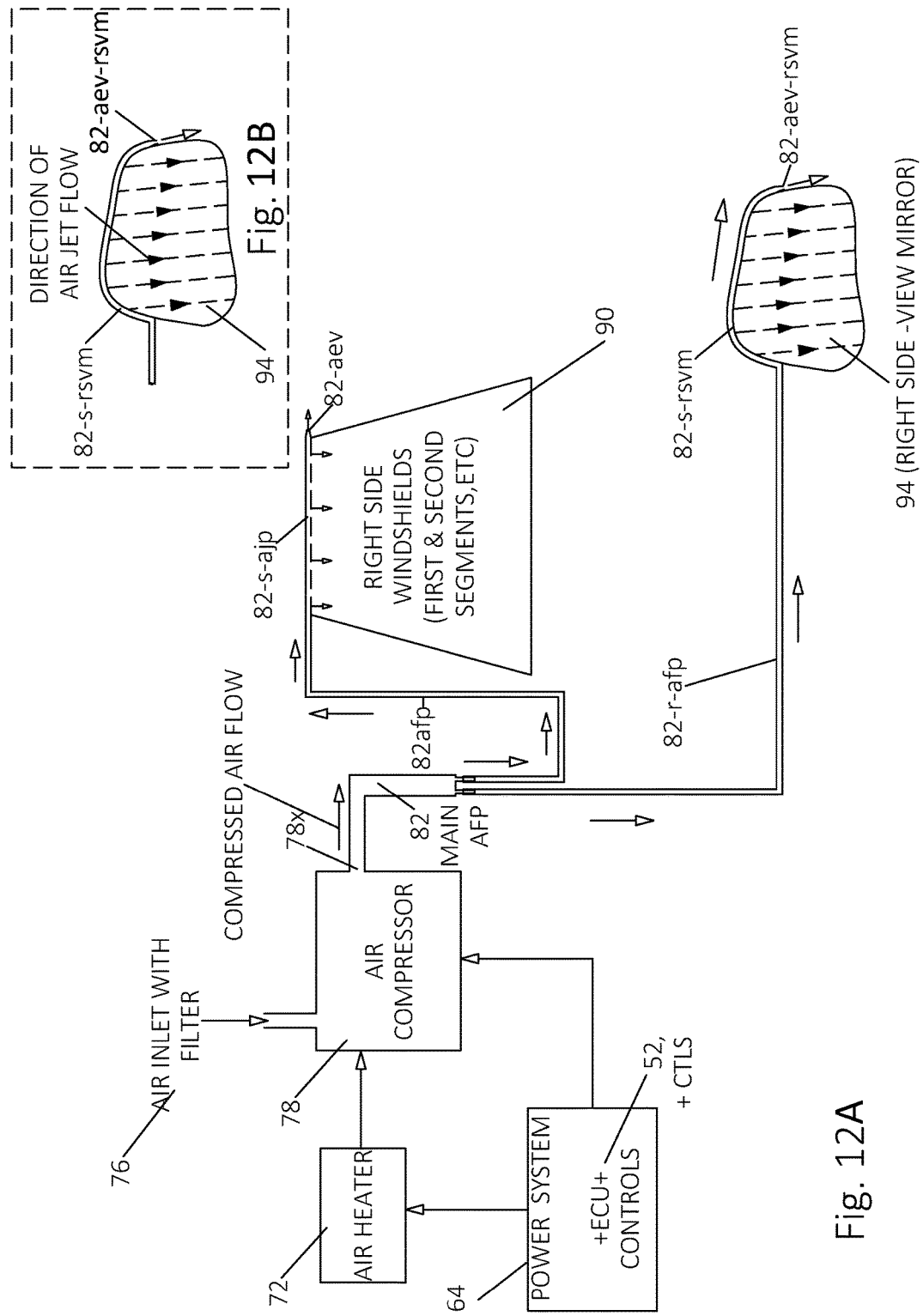
Figure 14:
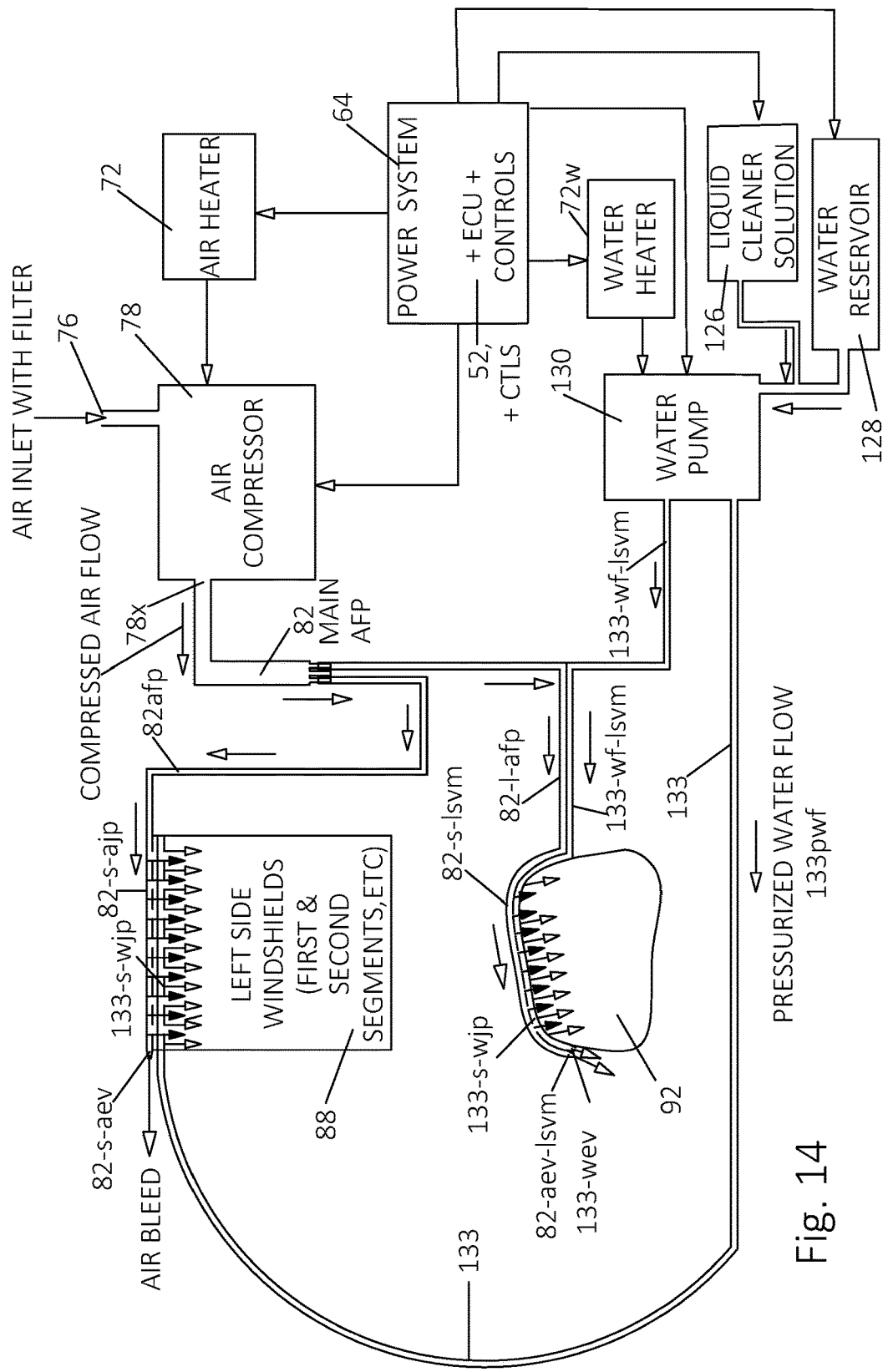
Figure 15:
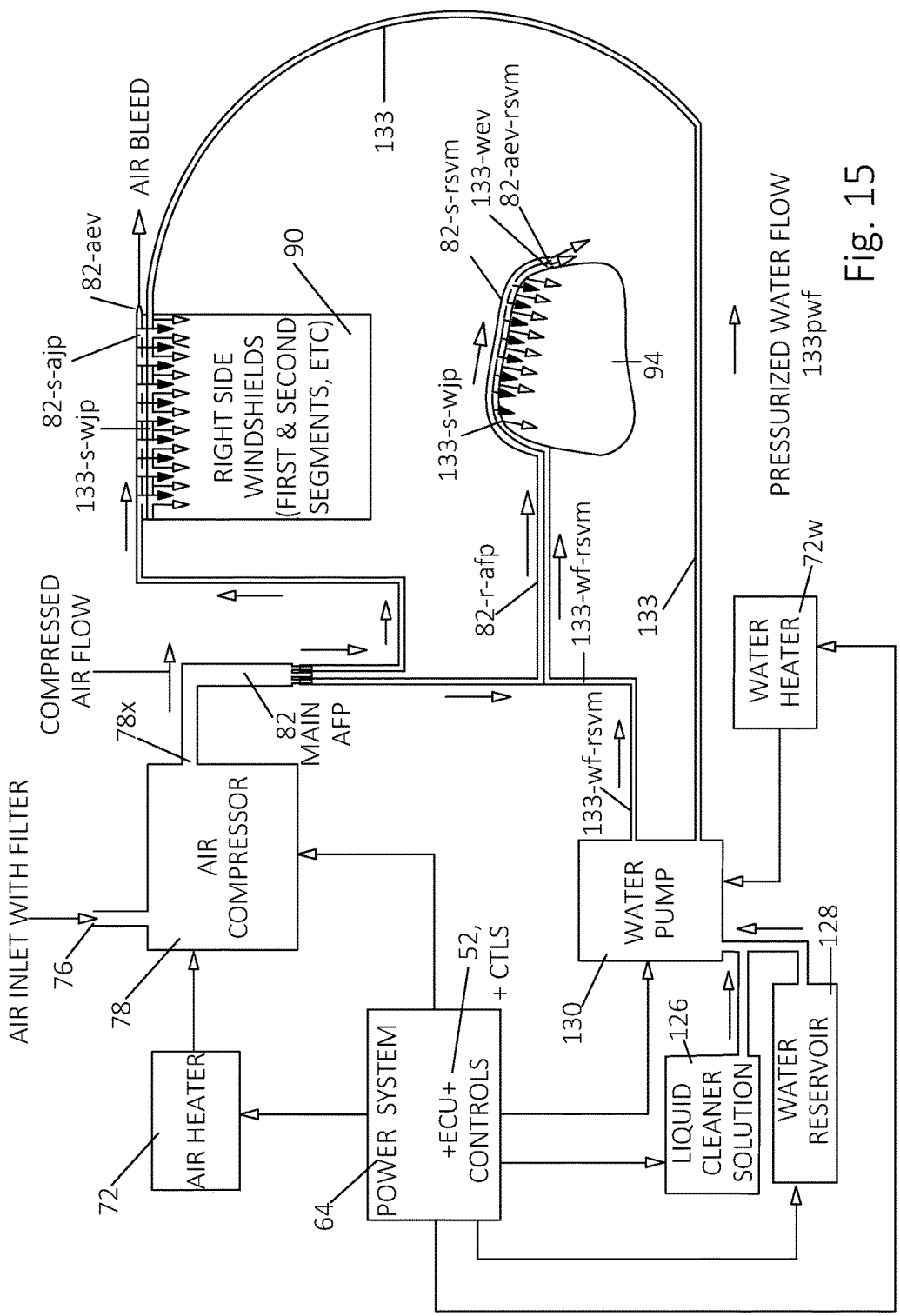

70—temperature sensor shown in FIGS. 1, 2, 3, 4, 5, 50, 51, 52, 56 and 57
72—air heater shown in FIGS. 1, 2, 5, 6, 10, 12A, 13A, 14, 15, 18-21, 23, 24, 26, 27, 49, 50, 51,52, 53, 56 and 57,
72w—water heater shown in FIGS. 3, 4, 5, 6, 10, 14, 15, 18, 19, 20, 21, 23, 24, 26, 27, 49, 50, 51, 52, 53, 56 and 57
74—air-pressure regulator shown in FIGS. 1 and 2
76—air inlet with filter shown in FIGS. 1, 2, 6, 10, 12-15, 18-21, 23, 24, 26, 27, 53
78—air compressor shown in FIGS. 1, 2, 6, 10, 12A, 13A, 13B, 14, 15, 18-21, 24, 24, 26, 27 and
78x—compressed air outlet from air compressor in FIGS. 6, 10, 12A, 13A, 13B, 14, 15, 18-21, 24, 26, 27, 53
80—audio-visual command and display shown in FIGS. 1, 2, 3, 4, 5 and 55
82-s-ajp—longitudinal singular linear-slit air-jet pipe in FIGS. 6, 7, 8, 9, 10, 11, 12A, 13B, 14, 26, 27, 53
S82-s-ajp—is the straight longitudinal singular linear-slit air-jet pipe shown in FIGS. 33A, 33B, 33C, 33D 35A, 35B, 35C and 35D
S82-en-1—straight longitudinal singular jet pipe with linear-slit external nozzle-1 shown in FIGS. 33A, 33B, 33C and 33D
S82-en-2—straight longitudinal singular jet pipe with linear-slit external nozzle-2 shown in FIGS. 33A, 33B, 33C and 33D
S82-en-3—straight longitudinal singular jet pipe with linear-slit external nozzle-3 shown in FIGS. 33A, 33B, 33C and 33D
S82-en-4—straight longitudinal singular jet pipe with linear-slit external linear-slit nozzle 4 in FIGS. 33B and 33D
C82-s-ajp—curved longitudinal singular air-jet pipe with linear-slit air-jet nozzle shown in FIGS. 32A, 32B, 32C, 32D, 32E, 32F, 34A, 34B, 34C, 34D, 34E and 34F
82ajn-1—air-jet nozzle 1 shown in FIGS. 1 and 2
82ajn-2—air-jet nozzle 2 shown in FIGS. 1 and 2
82ajn-x—air-jet nozzle-x means a third or more air-jet nozzles in FIGS. 1 and 2
82-aev—air-escape valve of the longitudinal linear-slit air-jet pipe shown in FIGS. 6, 10, 12A, 13A, 14,15, 26 and 27
82 MAIN AFP—main air-flow pipe in FIGS. 6, 10, 12A, 13A, 14, 15, 18, 19, 26 and 27
82afp—air-flow pipe to the rear windshield, right side windshield and left side windshield shown in FIGS. 10, 12A, 13A and 14
82-l-afp—the left air-flow pipe to the left side-view mirror shown in FIGS. 13A and 14
82-r-afp—the right air-flow pipe to the right side-view mirror shown in FIG. 15
82-a—is the first air-flow pipe shown in FIGS. 18, 19, 20, 21, 23, 24, 26 and 27
82-b—second air-flow pipe shown in FIGS. 18, 19, 20, 21, 23, 24, 26 and 27
82-c-third air-flow pipe shown in FIGS. 18, 19, 20, 21, 23, 24, 26 and 27
82-ojn-1—oscillating air-jet nozzle-1 in FIGS. 16, 17, 18, 19, 20, 21, 22, 23, 24, 26 and 27
82-ojn-2—oscillating air-jet nozzle-2 shown in FIGS. 16, 17, 18, 19, 20, 22, 23, 26 and 27
82-ojn-3—oscillating air-jet nozzle-3 shown in FIGS. 16, 17, 18, 19, 20 and 21
82-s-rsvm—linear-slit nozzle of the right side-view mirror shown in FIGS. 12A, 12B and 15
82-aev-rsvm—air-escape valve of the right side-view mirror shown in FIGS. 12A, 12B, 15

Figure 19:
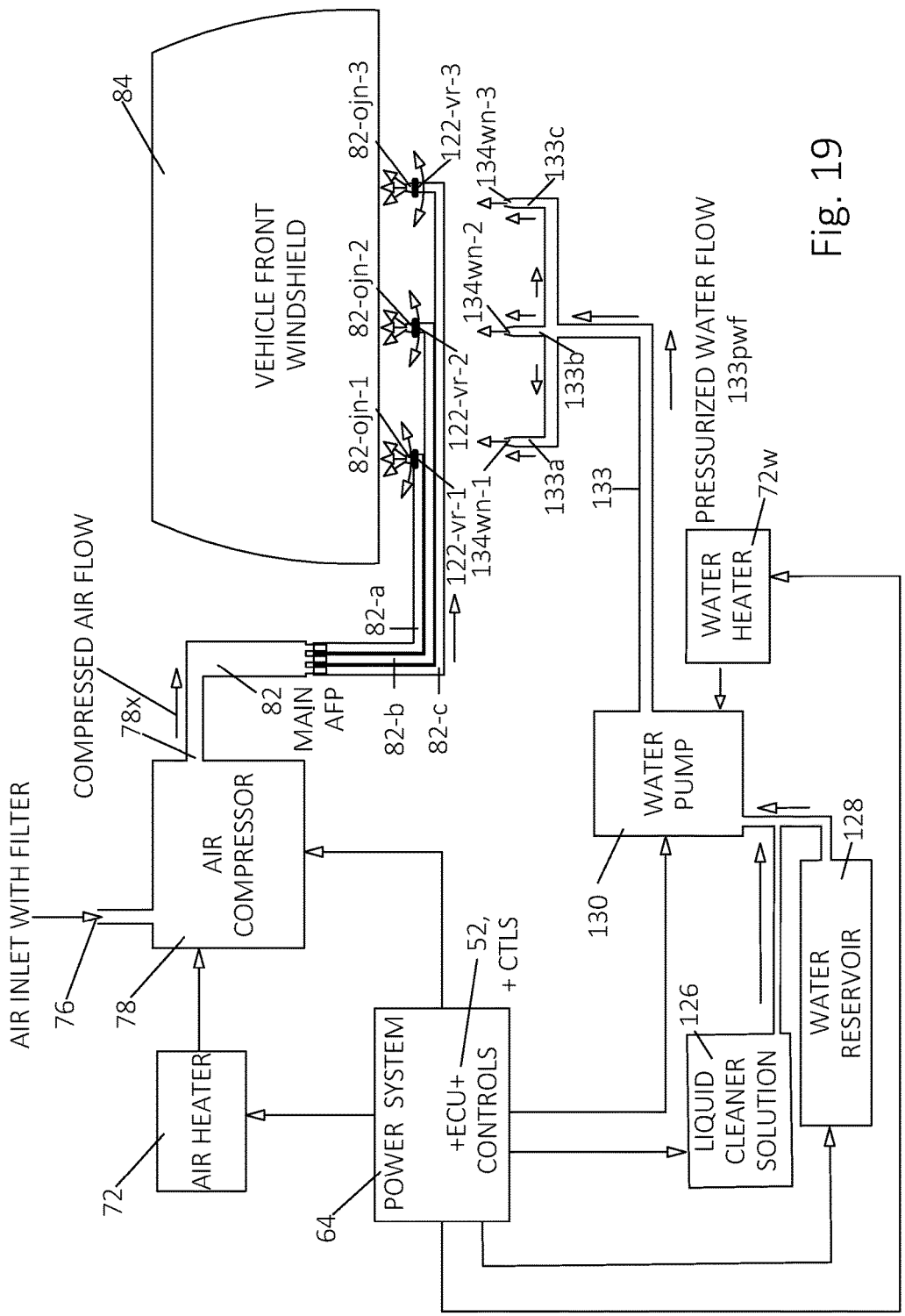
Figure 20:
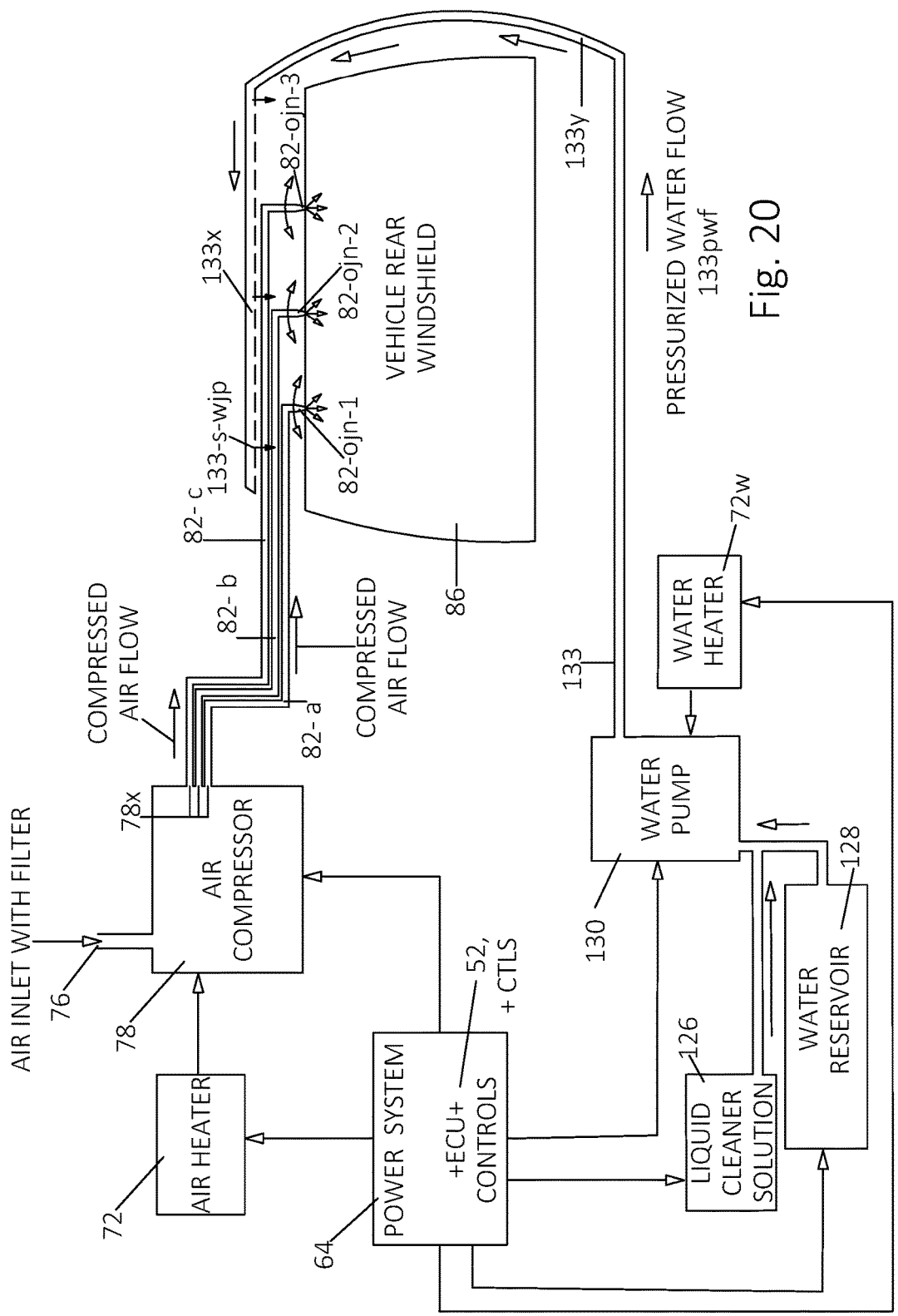
Figure 21:
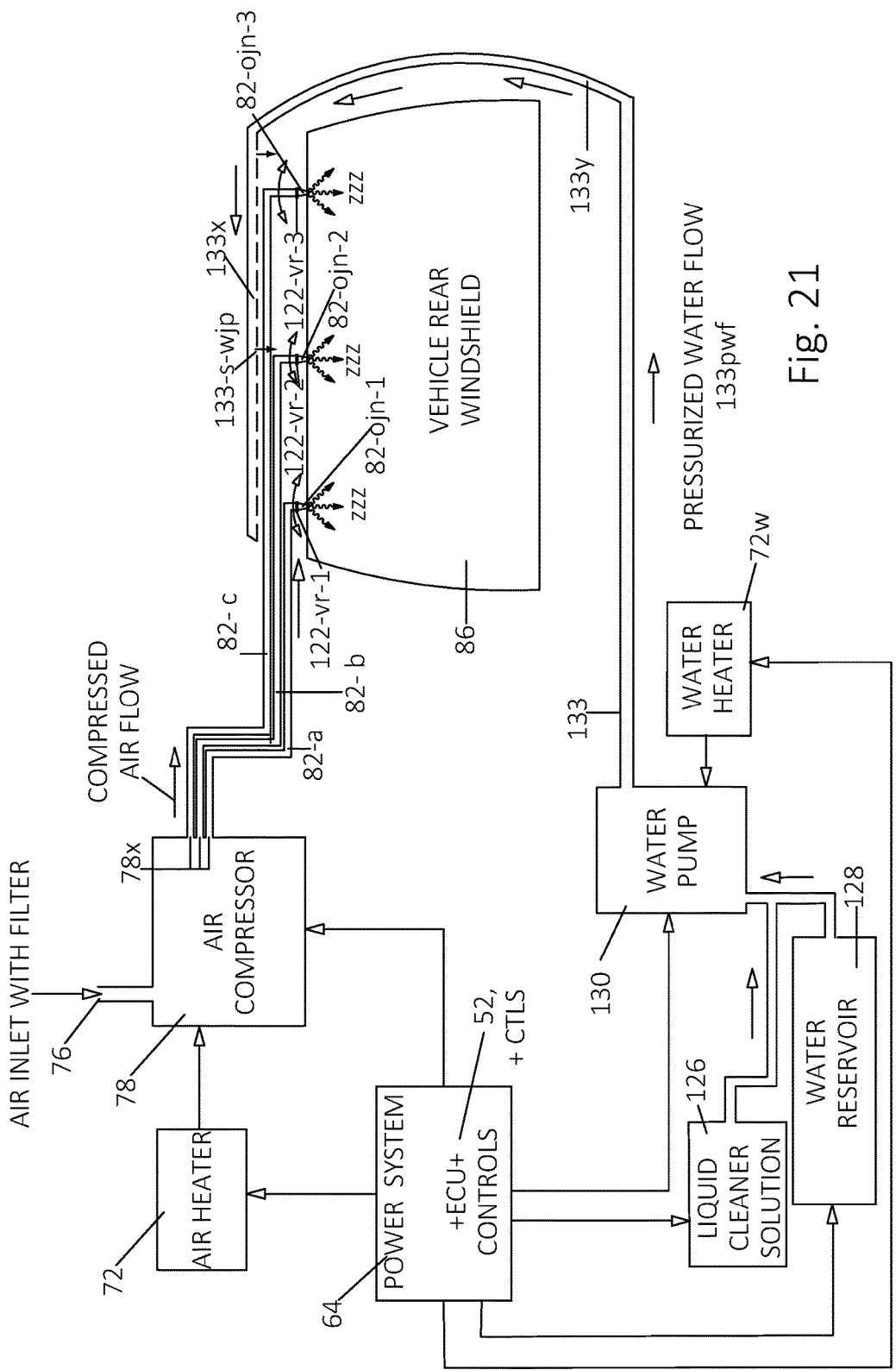

82-s-lsvm—linear-slit-nozzle for left side-view mirror shown in FIGS. 13A, 13B and 14
82-aev-lsvm—air-escape valve of left side-view mirror in FIGS. 13A, 13B and 14
ZZZ—vibrating air-jets representation coming from oscillating air-jet nozzles on the rear windshield shown in FIG. 21
F84—sectional view of a flat windshield shown in FIGS. 9A, 9B and 44B
C82-en—is the curved mono-linear-slit air-jet external nozzle shown in FIGS. 32A and 32D
C82-en-1—curved linear-slit external nozzle 1 from curved longitudinal singular pipe in FIG. 7, 8, 11, 32A-32F
C82-en-2—curved linear-slit external nozzle 2 from curved longitudinal singular pipe in FIG. 7, 8, 32B, 32C, 32E, 32F
C82-en-3—curved linear-slit external nozzle 3 from curved longitudinal singular pipe in FIG. 7, 8, 32B, 32C, 32E, 32F
C82-en-4—curved linear-slit external nozzle 4 from curved longitudinal singular pipe in FIGS. 32C and 32F
C84—sectional view of a curved windshield in FIGS. 7, 8, 11, 25, 28A, 29A, 30A, 31A, 41A, 42A, 43A, 44A, 45, 46A and 54
84—front windshield in FIGS. 1-6, 18,19, 23, 26, 27, 47 and 48
86—rear windshield shown in FIGS. 1, 2, 3, 4, 5, 10, 20, 21 and 24
88—left side windshields shown in FIGS. 1, 2, 3, 4, 5, 13A, 14, 47 and 48
90—right first and second portions of the right windshields in FIGS. 1, 2, 3, 4, 5, 12A, 12B and 15
92—left side-view mirror shown in FIGS. 1, 2, 3, 4, 5, 13A, 13B and 14
94—right side-view mirror shown in FIGS. 1, 2, 3, 4, 5, 12A, 12B and 15
96—automatic control shown in FIGS. 1, 2, 3, 4, 5 and 55
98—manual control shown in FIGS. 1, 2, 3, 4, 5 and 55
100—control panel inside the vehicle within box in broken lines in FIGS. 1, 2, 3, 4, 5 and 55
102a—low pressure compressed air-jet control shown in FIGS. 1, 2, 5 and 55
102w—low water pressure control means shown in FIGS. 3, 4, 5 and 55
104a—medium pressure compressed air-jet control in FIGS. 1, 2, 5 and 55
104w—medium water pressure control shown in FIGS. 3, 4, 5 and 55
106a—high pressure compressed air-jet control in FIGS. 1, 2, 5 and 55
106w—high water pressure control shown in FIGS. 3, 4, 5 and 55
108—touch/voice remote controller in FIGS. 1, 2, 3, 4, 5, 50, 51, 52, 56 and 57
109wf—wireless flash communication shown in FIGS. 1, 2, 3, 4, 5 and 55
110—multi-air-jet control system shown in FIGS. 1, 2, 5 and 55
112—RF-Transceiver shown in FIGS. 50, 51, 52, 55, 56 and 57
114—power amplifier shown in FIGS. 50, 51, 52, 56 and 57
116—antenna shown in FIGS. 50, 51, 52, 56 and 57
118—RF Sensor shown in FIGS. 50, 51, 52, 56 and 57
120—oscillating system with motor shown in FIGS. 2 and 52
122—vibrator for the bladeless multi-jet windshield wiper cleaner applicable for modern automobiles, shown in FIGS. 2, 4, 5, 36, 37, 38, 39, 40, 41A, 41B, 41C, 43A, 43B, 43C, 44A, 44B, 45, 51, 52, 54-57

Figure 17:
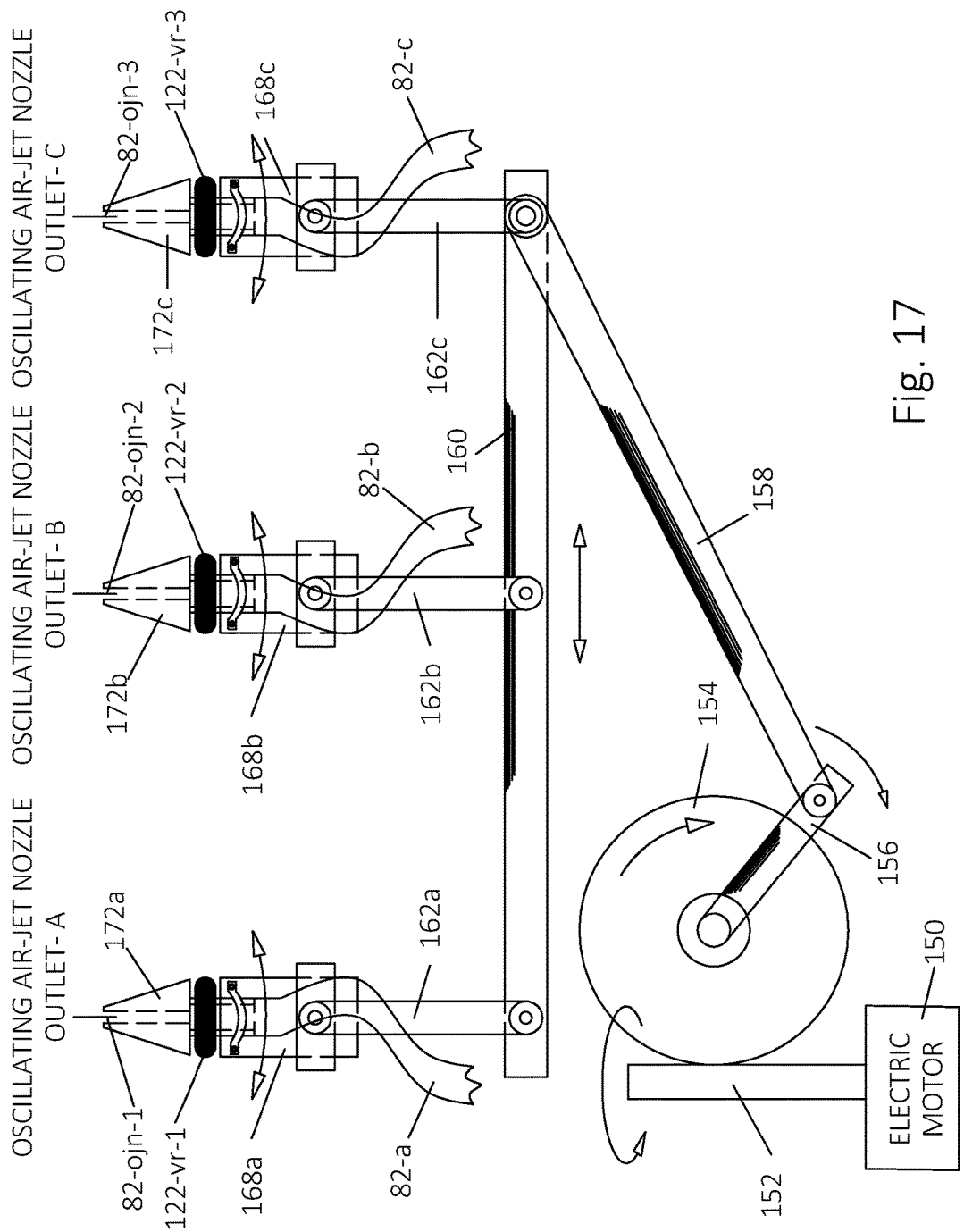

122-*vr*-1, 122-*vr*-2 and 122-*vr*-3—three vibrator rings in FIGS. 17, 19 and 21

122-*vr*-1, 122-*vr*-2—two vibrator rings shown in FIGS. 22, 23, 24 and 27

124—water-jet control system shown in FIGS. 3, 4, 5 and 55

126—liquid cleaner solution of the water-jet system shown in FIGS. 3, 4, 6, 10, 14, 15, 18-21, 23, 24, 26, 27 and 53

128—water reservoir in FIGS. 3, 4, 6, 10, 14, 15, 18-21, 23, 24, 26, 27 and 53

130—water pump shown in FIGS. 3, 4, 6, 10, 14, 15, 18, 19, 20, 21, 24, 26, 27 and 53

131—water-jet system shown in FIGS. 3, 4, 5 and 55

Figure 3:
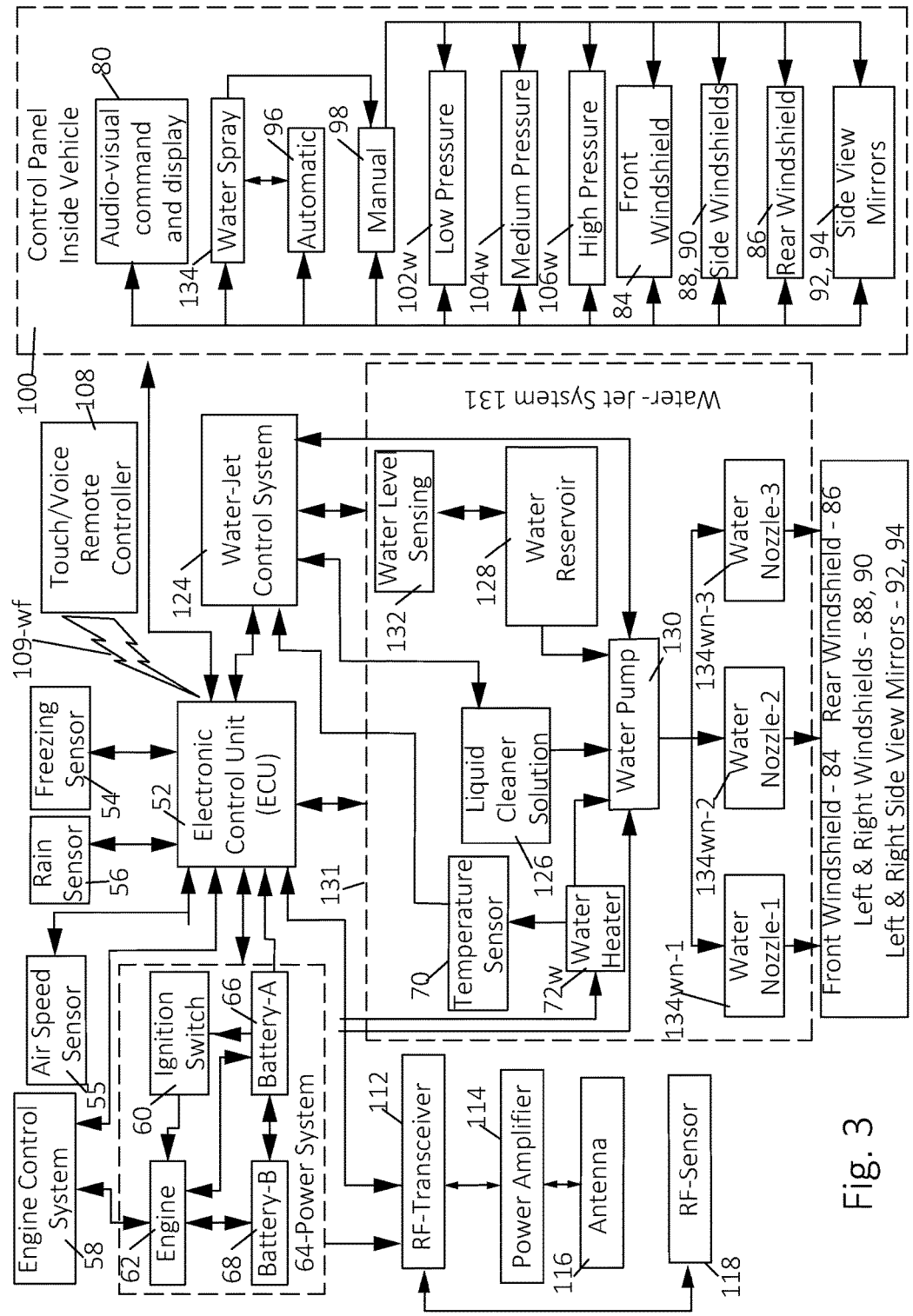
Figure 4:
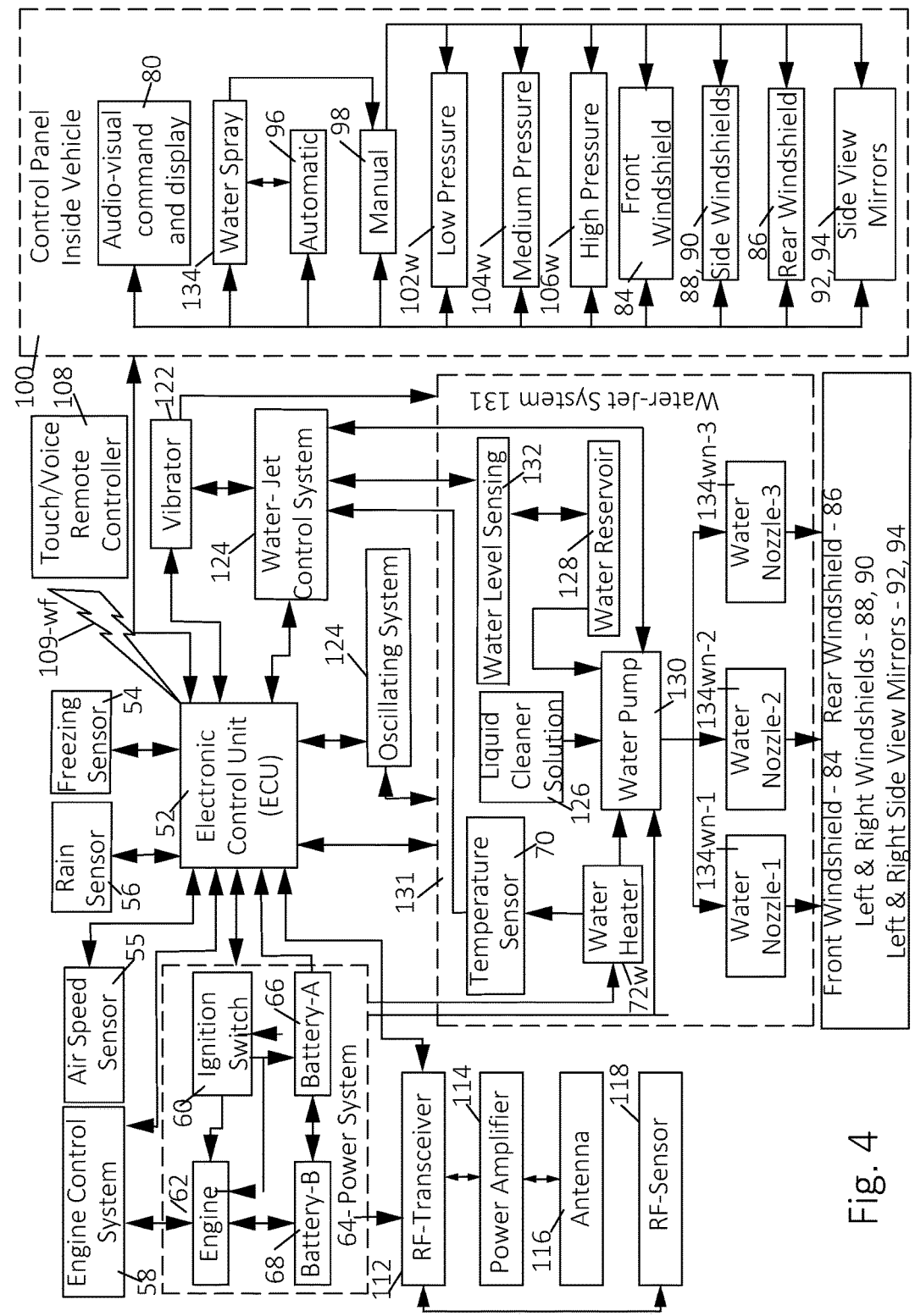

132—water level sensing means shown in FIGS. 3 and 4

133*a*, 133*b* and 133*c*—are branches of water pipe 133 in FIGS. 6, 18, 19 and 23

133—water-jet pipe in FIGS. 6, 10, 14, 15, 18, 19, 20, 21, 23, 24, 26, 27 and 53

133-*pwf*—pressurized water flow in FIGS. 6, 14, 15, 18, 19, 20, 21, 23, 24, 26 and 27

133-*wev*—water-escape valve shown in FIGS. 14 and 15

133-*wf-lsvm*—water flow to left side-view mirror shown in FIG. 14

133-*wf-rsvm*—water flow to right side-view mirror shown in FIG. 15

133-*s-wjp*—singular linear-slit water-jet pipe shown in FIGS. 14, 15, 20, 21 and 24

Figure 24:
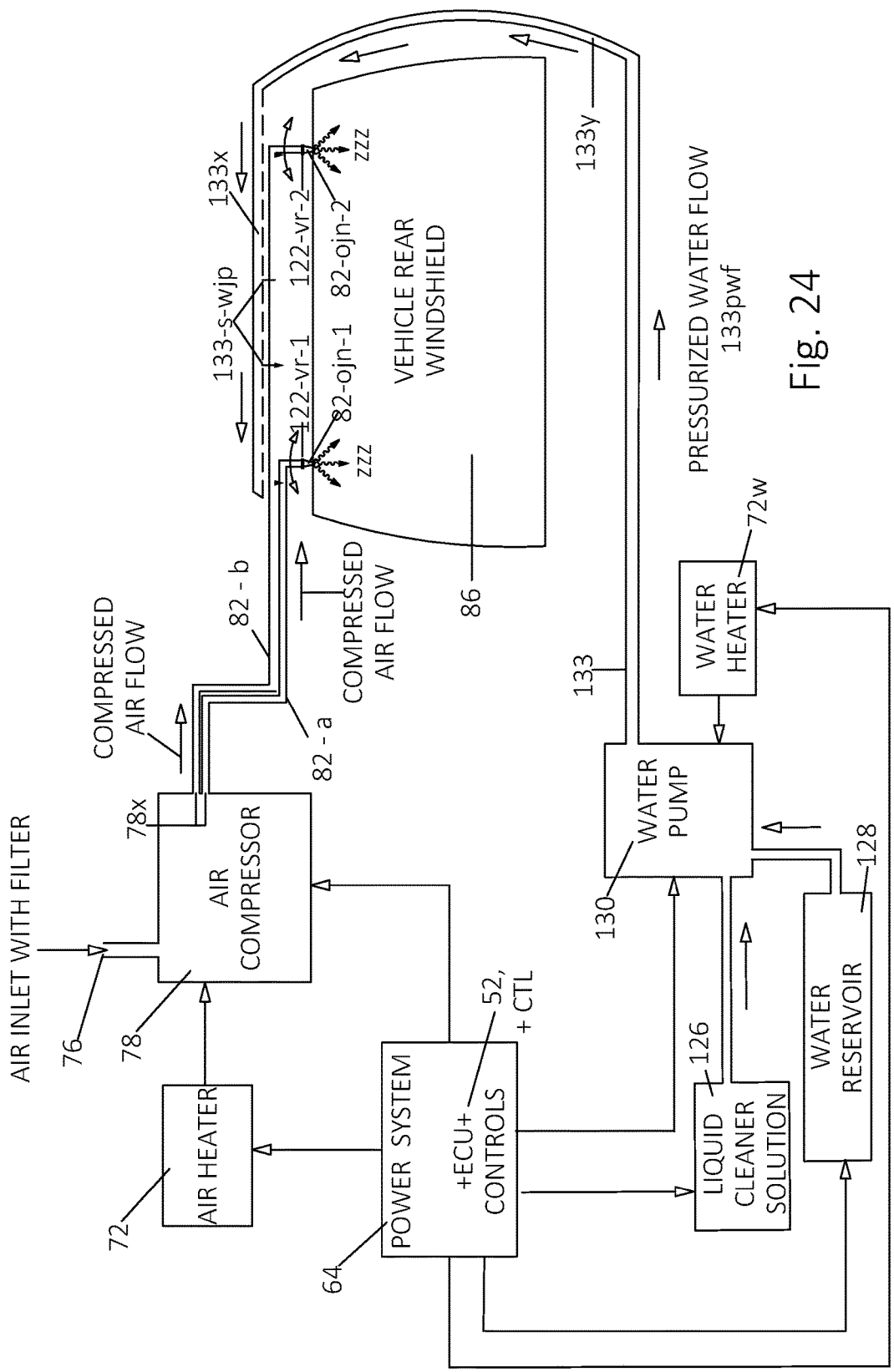
Figure 25:
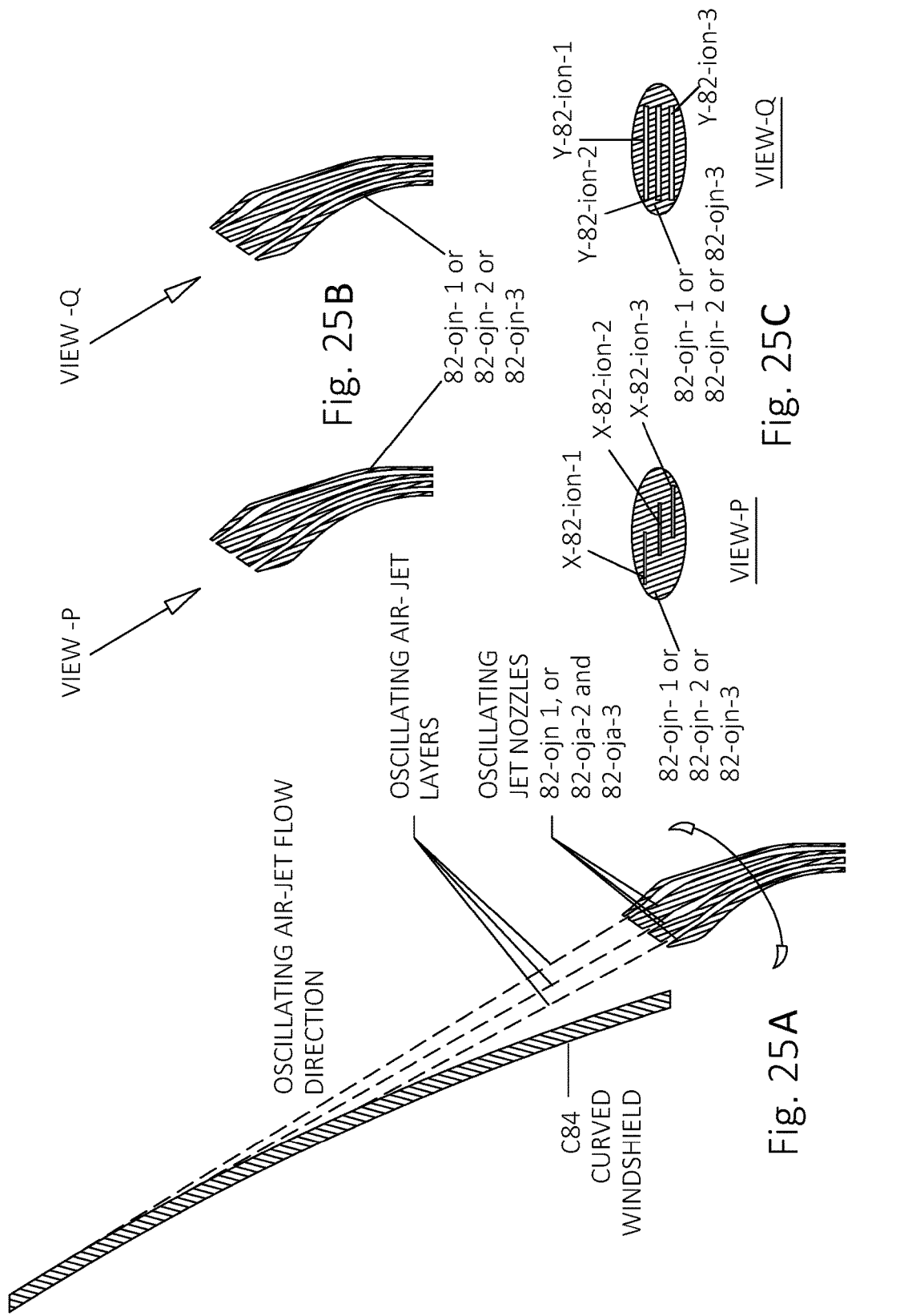

133 and 133*x* and 133*y*—water-delivery pipe and branches in FIGS. 20, 21 and 24

134*wn*-1—water-jet nozzle-1, in FIGS. 3, 4, 6, 10, 18, 19 and 23

134*wn*-2—water-jet nozzle-2 in FIGS. 3, 4, 6, 10, 18, 19 and 23

134*wn*-3—water-jet nozzle-3, in FIGS. 3, 4, 6, 10, 18, 19 and 23

Figure 16:
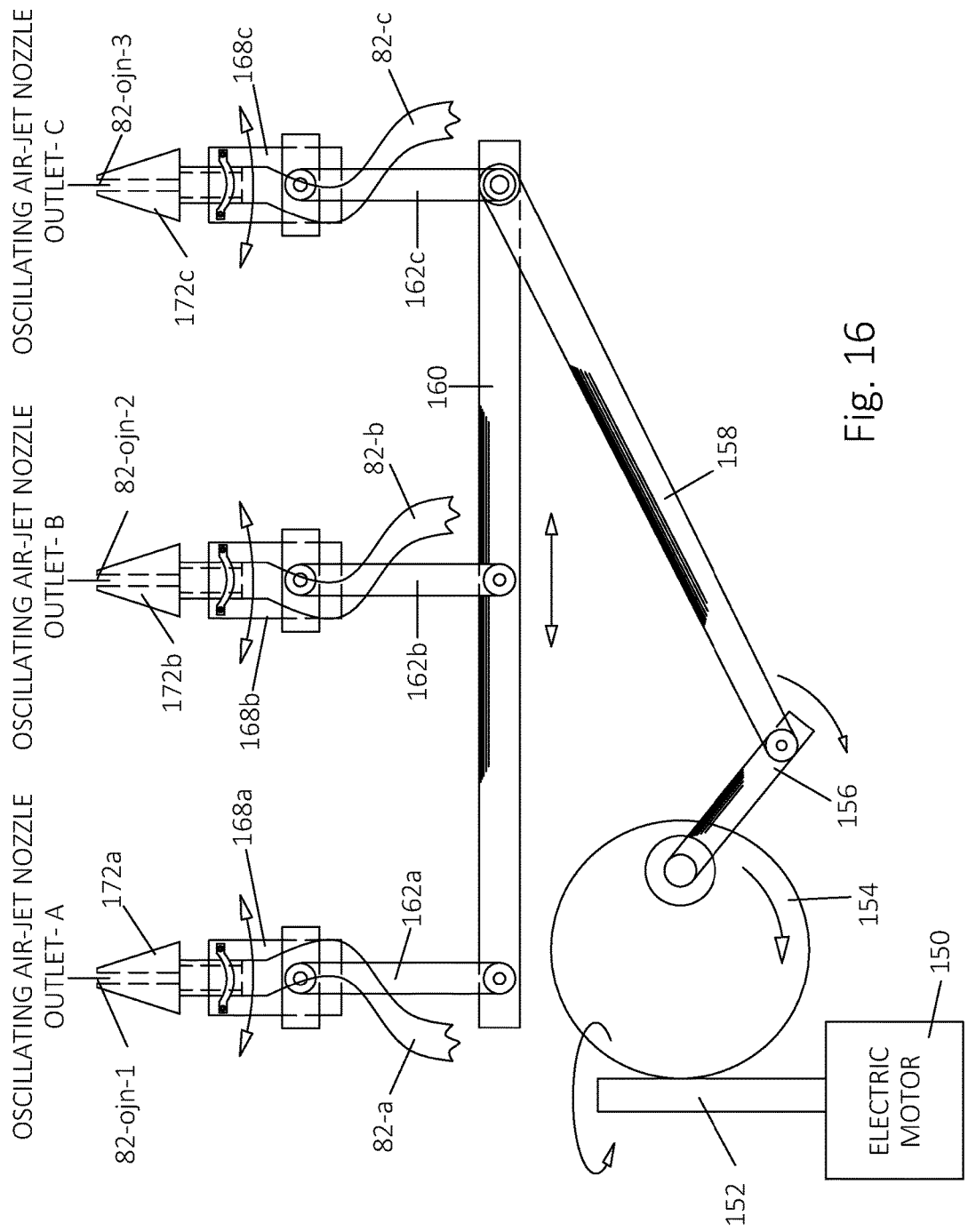
Figure 22:
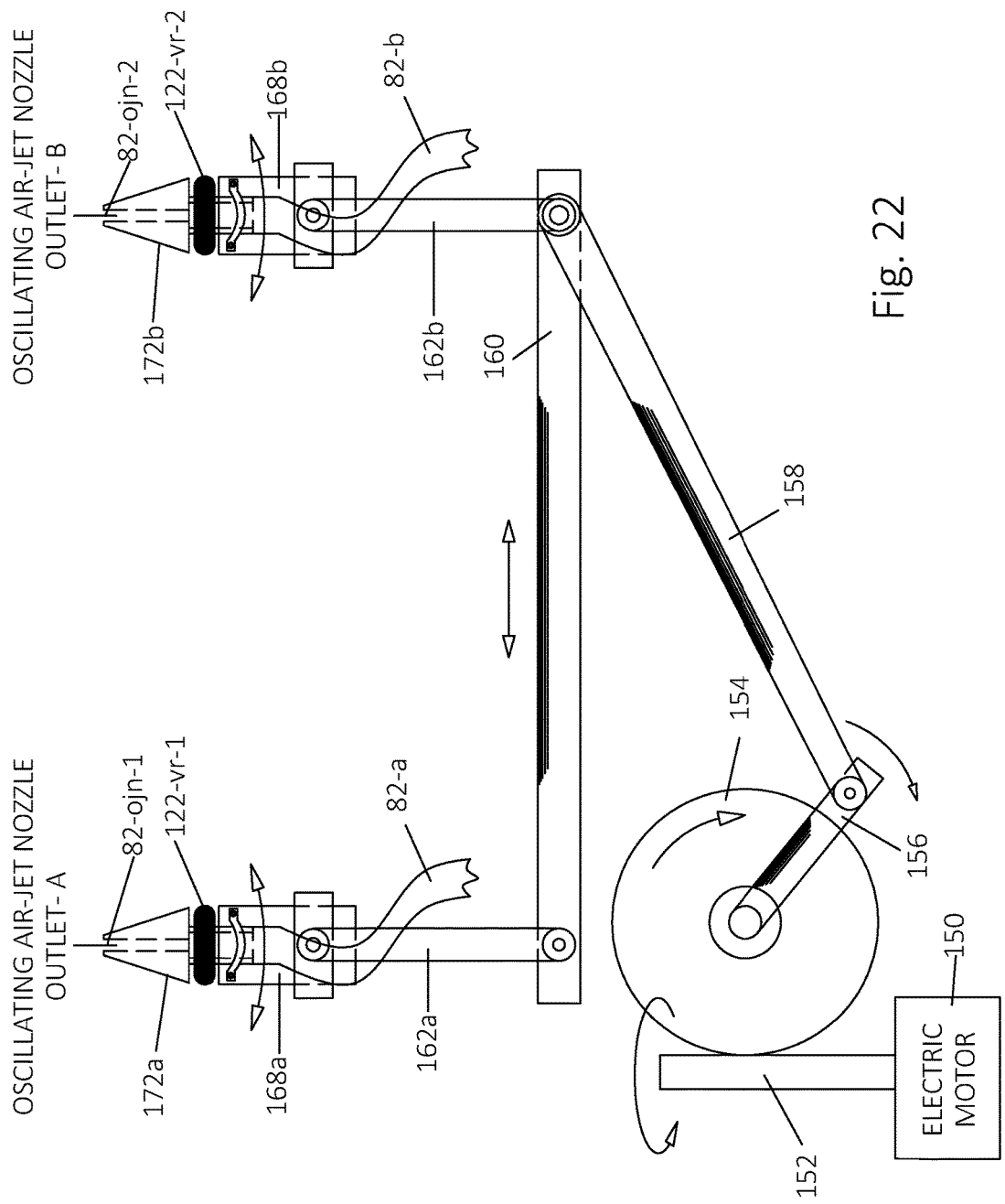

150—electric motor shown in FIGS. 16, 17 and 22

152—worm gear shown in FIGS. 16, 17 and 22

154—geared rotating worm wheel shown in FIGS. 16, 17 and 22

156-160—are mechanical linkages shown in FIGS. 16, 17 and 22

162*a* and 162*b*—are mechanical arms of the dual oscillating nozzles shown in FIG. 22

162*a*, 162*b* and 162*c* are mechanical arms of the triple oscillating nozzles in FIGS. 16 and 17

168*a*,168*b* and 168*c*—are nozzle holders shown in FIGS. 16 and 17

172*a*—and 172*b* and 172*c*—nozzle cones of triple oscillating nozzles in FIGS. 16 and 17

172*a*-172*b*—nozzle cones for the dual oscillating nozzles in FIG. 22

180-*p*-1—air-jet pipe-1 shown in FIGS. 28A, 28B, 29A, 29B, 30B, 30C, 31B and 31C 180-*p*-2—air-jet pipe-2 shown in FIGS. 28A, 28B, 29A, 29B, 30B, 30C, 31B and 31C 180-*p*-3—air-jet pipe-3 shown in FIGS. 28A, 28B, 29A, 29B, 30B, 30C, and 31B 180-*p*-4—air-jet pipe-4 shown in FIGS. 29A, 29B, 30B, 30C, and 31B 182-*en*-1, 182-*en*-2 and 182-*en*-3—are external nozzles-1, 2 and 3 from multiple separate pipes shown in FIGS. 28A, 28B, 29A, 29B, 30A, 30B 182-*en*-4—additional external nozzle from multiple separate pipes in FIGS. 29A, 29B, 30A, 30B 182-*in*-1, 182-*in*-2, 182-*in*-3 and 182-*in*-4—are internal nozzles shown in FIGS. 31A, 31B, 31C, 34A-34F 184-*eph*—external pipe holder shown in FIGS. 28A, 28B, 29A, 29B, 30A, 30B, 30C, 31A, 31B, 31C, 36-40, 41A, 41B, 41C, 42A, 42B, 42C, 43A, 43B, 43C, 44A, 44B and 45

C184—5-*sn*—sectional view of a curved singular pipe of oscillating 5-linear-slit internal nozzles shown in FIGS. 46A and 46B 200—signal generating circuit shown in FIGS. 49, 50, 51, 52, 56 and 57

202—sensitivity control circuit shown in FIGS. 49, 50, 51, 52, 56 and 57

204—time delay circuit shown in FIGS. 49, 50, 51, 52, 56 and 57

206—power rectifier shown in FIGS. 49, 50, 51, 52, 56 and 57

208—is the micro-controller unit shown in FIG. 49

210—high voltage generating circuit shown in FIGS. 49, 50, 51, 52, 56 and 57

212—air-pump circuit shown in FIGS. 49, 50, 51, 52, 56 and 57

214—water pump circuit shown in FIGS. 49, 50, 51, 52, 56 and 57

216—air/water pump valve circuit shown in FIGS. 49, 50, 51, 52, 56 and 57

218—selective valve junction for either/or both the water-jets and/or the air-jets to be outputted, shown in FIGS. 49, 50, 51, 52, 56 and 57

220—represents the output for either or both air-jets and/or water-jets, shown in FIGS. 49, 50, 51, 52, 56 and 57

222—2D/3D controller shown in FIGS. 50, 51, 52, 56 and 57

224—2D/3D display shown in FIGS. 50, 51, 52, 56 and 57

226—keyboard/touch-screen controller shown in FIGS. 50, 51, 52, 56 and 57

228—audio/video codec shown in FIGS. 50, 51, 52, 56 and 57

230—LED signal light display shown in FIGS. 50, 51, 52, 56 and 57

232—language translation processor shown in FIGS. 50, 51, 52, 56 and 57

234—voice record processor shown in FIGS. 50, 51, 52, 56 and 57

236—voice recorder shown in FIGS. 50, 51, 52, 56 and 57

238—translation database shown in FIGS. 50, 51, 52, 56 and 57

240—microphone shown in FIGS. 50, 51, 52, 56 and 57

242—feature extraction unit shown in FIGS. 50, 51, 52, 56 and 57

244—speech controller shown in FIGS. 50, 51, 52, 56 and 57

246—speaker shown in FIGS. 50, 51, 52, 56 and 57

248—head set jack shown in FIGS. 50, 51, 52, 56 and 57

250—touch/keypad shown in FIGS. 50, 51, 52, 56 and 57

252—feature access control shown in FIGS. 50, 51, 52, 56 and 57

254—CPU (central processing unit) shown in FIGS. 50, 51, 52, 56 and 57

256—baseband processor shown in FIGS. 50, 51, 52, 56 and 57

258—application processor shown in FIGS. 50, 51, 52, 56 and 57

268—are the Ram-1/Ram-2 shown in FIGS. 50, 51, 52, 56 and 57

270—ROM shown in FIGS. 50, 51, 52, 56 and 57

272—memory controller shown in FIGS. 50, 51, 52, 56 and 57

274—battery charger/adapter shown in FIGS. 50, 51, 52, 56 and 57
278—power management IC shown in FIGS. 50, 51, 52, 56 and 57
280—voltage conversion circuit shown in FIGS. 50, 51, 52, 56 and 57
284—power supply switching circuit shown in FIGS. 50, 51, 52, 56 and 57
286—application interface shown in FIGS. 50, 51, 52, 56 and 57
288—PIN/Password means shown in FIGS. 50, 51 and 52
290—biometric scanner shown in FIGS. 50, 51 and 52
292—alarm/time/calendar circuit shown in FIGS. 50, 51, 52, 56 and 57
294—greet tones/alert/calendar means shown in FIGS. 50, 51, 52, 56 and 57
298—frequency tuning circuit shown in FIGS. 50, 51, 52, 56 and 57
300—power unit shown in FIGS. 50, 51, 52, 56 and 57
302—flash drive shown in FIGS. 50, 51, 52, 56 and 57
304—SS drive (solid state drive) shown in FIGS. 50, 51, 52, 56 and 57
306—camera shown in FIGS. 50, 51, 52, 56 and 57
308—GPS/antenna/power amplifier/transceiver, shown in FIGS. 52, 56 and 57
310—fluid suction system in FIGS. 53, 55, 56 and 57
312—internal air-conditioning/heater system shown in FIGS. 50, 51, 52, 56 and 57
314—dust, dirt and ice sensor shown in FIGS. 56 and 57
FSP—is the fluid suction pipe of the fluid suction system in FIGS. 43A and 54
316—BVP—is the building transparent viewing panel in FIG. 53
x-82-*ion*-1, x-82-*ion*-2, x-82-*ion*-3—are staggered internal oscillating nozzles in FIG. 25C
y-82-*ion*-1, y-82-*ion*-2, y-82-*ion*-3—are stacked internal oscillating nozzles in FIG. 25C

(B) DETAILED DESCRIPTIONS OF ILLUSTRATIVE DRAWINGS OF THE PRESENT INVENTIVE DEVICES, ASSEMBLIES, SYSTEMS, METHODS AND PROGRAMS

In order to clarify and simplify understanding the various beneficial structures, features capabilities and functions of the present invention (inclusive of some preferred and alternate optional embodiments, designs, systems and assemblies that can be inter-linked selectively together with effective operational application programs) as described in the specifications and drawings, the following relevant distinguishing types of the present invention are concisely named and classified as follows:

1) Non-Oscillating, Non-Vibrating embodiments, systems and assemblies;
2) Non-Oscillating Vibrating embodiments, systems and assemblies;
3) Singular air-jet pipe and water-jet pipe embodiments, systems and assemblies;
4) Aggregated or Composite Multi-Pipe and multi-air-jet and/or water-jet Non-Vibrating nozzles embodiments, systems and assemblies;
5) Clustered Vibrating Multi-Pipes and nozzles embodiments, systems, assemblies;
6) Angulated linear-slit or wavy-slit air-jet and water-jet external or internal nozzles, systems and assemblies; Other shapes of air-jet nozzles or water-jet nozzles possible;
7) Longitudinal linear-slit curved and branching multi-pipe embodiments, systems and assemblies having even width or flared width of internal or external nozzles;
8) Longitudinal Wavy-slit with non-wavy linear-slit internal or external nozzles built-in from multi-pipes embodiments, systems and assemblies;
9) Optional oscillating Non-Vibrating or Vibrating embodiments, systems and assemblies;
10) Aggregated Clustered Multi-Pipe Vibrating embodiments, systems, assemblies coordinated with fluid suctioning system.
11) Any combinations of the above 1-10 embodiments, designs, systems that are placed, either or both below or above or at the sides of the visual field of the driver and passengers (if applicable with conforming branches)

Figure 7:
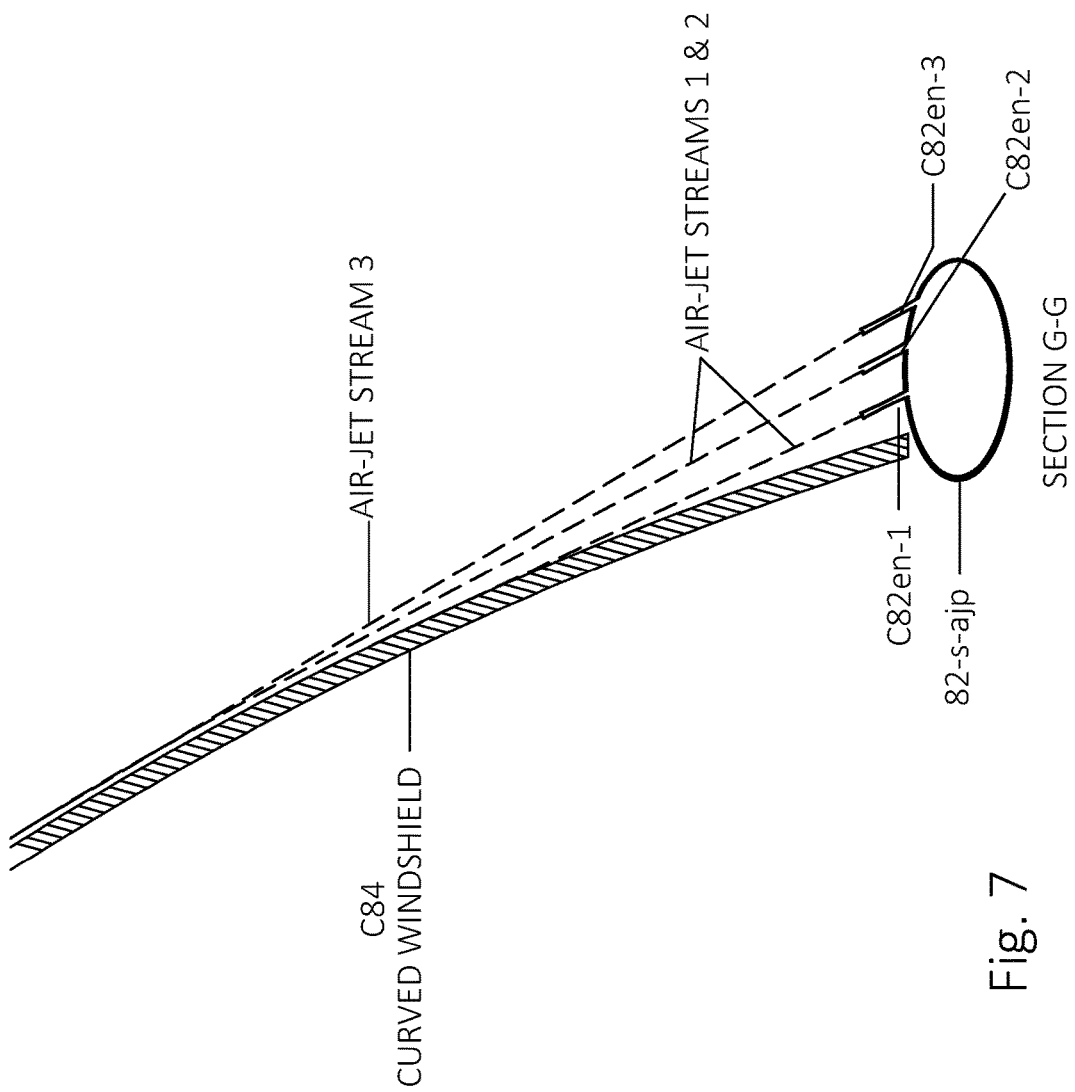

For simple clarification, the general dynamics involved in the present invention is the selective combination of various optimally angled ejections of forceful continuous and/or intermittent moving invisible multi-air-jet streams or multi-layers of moving air-jet sheets ejected from along and in optimal proximity to the contours or shapes of the external surfaces of the curved automobile windshield. Respectively shown in FIGS. 7 and 31A, are bottom-mounted longitudinal singular and multiple pressurized delivery pipes or tubes with built-in linear-slit non-oscillating and non-vibrating type of air-jet nozzles, which are applicable for curved windshields, wherein the first most proximal continuous or intermittent forceful air-jet streams or multi-layers of moving air-jets sheets being projected toward and almost hugging the lower portion of the curved windshield C84, and the second adjacent continuous or intermittent air-jet streams or layers of moving air-jet sheets being projected almost hugging the second next upper or middle portion of the curved windshield C84, and reinforcing the gliding trajectory and velocity of the first most proximal continuous or intermittent air-jet streams or layers of moving air-jet sheets, and, the third continuous or intermittent air-jet streams or layers of moving air-jet sheets being projected toward the third upper portion of the curved windshield C84. This simple presentation shows that even though the windshield is curved, with the proper gradual angular inner-orientation design of the air-jet nozzles that are built-in from the conforming longitudinal singular and multi-pipe pressurized delivery system, it is possible to effectively wipe and clean and prevent the adherence of the onrushing and incoming particles of raindrops, snows, ice, mud, dusts or other particulate matters, including small insect debris as the automotive vehicle is driven forward.

Basically, the addition of vibrator 122 in FIGS. 8, 30A, 31A, 41A, 43A, 44A, 44B, 45 and 54, will even accentuate the wiping and cleaning and debris-clearing efficiency and coverage on the external surfaces of various all-around windshields. These beneficial effects of adding vibrator(s) will effectuate the vibrations of the forceful multi-streams or multi-layers of vibrating moving sheets of the multi-air jets with water-jets, respectively. With the inclusion of the independent water pipe as part of the aggregated and subdividing branching delivery pipe system, water-jets can be mixed with a liquid cleaner solution that can also be released with adequate force from the respective water-jet nozzles ejecting powerful water-jets with the required selected pressures of air-jets from air-jet nozzles, thus jointly or alternatively will be very effective in the wiping and cleaning and debris-clearing operations of the combined system in removing any undesired adhering rain, snow and icy build-up away, from the external surfaces of various windshields, and when possible directed also to wiping and cleaning side-view mirrors.

Although the alternative optional oscillating type of linear-slit nozzle system shown in FIGS. 16, 17, 18, 19, 20, 21, 22, 23, 24, 26, 27 and 46A may be included in this present invention, it can also be used merely as an optional substitute and back-up system, if necessary. However, in order to avoid extra cost and maintenance, the optional oscillating system can be eliminated, if the installed non-oscillating type of bladeless conforming longitudinal linear-slit wiper/cleaner and debris-clearer system is adequate enough for the desired necessary tasks.

Important Note:

Not all are applicably illustrated in the various figure drawings, due to the many possible variations in the designs and configurations of the evolving modern automobiles. There are several among many applicable factors, components, arrangements and positional placements of the different parts comprising the present invention, including (but not limited in scope and modifications) a plurality of combinations enumerated as follows:

1) The additional use of the imbedded vibrators cause the release of the pressurized air-jets streams or moving layers and forceful water-jet streams to vibrate in order to accentuate the resultant wiping, cleaning and clearing of the selected windshields and side-view mirrors.

2) There can be many required optimum numbers and variations of angles and shapes of the needed applicable delivery air-pipes or air-tubes and their branches from which the linear-slit or wavy-slit nozzles are built-in.

3) There are no limitations as to the required applicable designs, positional arrangements and configurations of the linear-slit nozzles, whether they may be internally or externally built-in from the air-jet delivery pipes or water-jet delivery pipes and their branches.

4) There are no limitations as to the required applicable optimum width and variations of width and length of each of the air-jet delivery pipes and/or water-jet delivery pipes and their branches.

5) There are no limitations as to the required applicable optimum differentials in the applied degrees of compressions exerted upon the fluidic medium of air and/or water volume to effect the needed pressurized air and/or water in the air-jet and/or water-jet delivery pipes and branches.

6) There are no limitations as to the required applicable optimum placements and aggregations and arrangements of the plurality of air-jet delivery pipes and/or water-jet delivery pipes and their branches.

7) There are no limitations as to the required applicable optimum branching of the various air-jet delivery pipes and/or water-jet delivery pipes.

8) There are no limitations as to the required applicable optimum volume, frequency and intermittence or sustained ejection of air-jets and/or water-jets from either or both the vibrating and non-vibrating and/or either or both non-oscillating and the optional oscillating nozzle system.

9) There are no limitations as to the required applicable optimum strength and power of the multi-streams or multi-layers of moving air-jets and/or water-jets with or without the additional application of acoustic and/or ultrasonic frequency waves that may be required to effect the optimum and maximum wiping, cleaning and clearing capabilities of the bladeless present invention.

10) There are no limitations as to the required applicable optimum manual and/or automated controls to effectively manage the best functional and operational effectiveness of the present inventive bladeless wipers, cleaners and debris clearers for the various portions and applicable locations and installations of windshields and side-view mirrors.

11) There are no limitations as to the required proper optimum angular arrangements and positional placements of the various internal or external air-jet nozzles and water-jets in relation to each other and in relation to the various selected windshields and side-view mirrors onto which the various relevant parts and functions of the present invention can be applied.

12) The coordinated fluid suctioning system associated with the air-jet and water-jet system, when optimally placed in correct angular orientation and correct range of distance relative to each other, can add in the adequate efficient wiping and cleaning and clearing operations of the various transparent shielding viewing panels of buildings and also the various applicable automobile windshields and side-view mirrors, and resulting in preventing or minimizing undesirable fluid spillage and leakage.

Note:

(1) Although in the drawings and most of the descriptions in the specifications are centered on the placements of the longitudinal linear-slit or wavy-slit air-pipes and water-pipes, with their respective built-in linear-slit or wavy-slit nozzles that eject multi-streams of forceful air-jets and water-jets coming from either the top portion or the bottom portions of the windshields, it must be clarified and understood that, if the particular designs of the vehicles and their respective windshields will allow, then the placements of the multiple aggregated longitudinal linear-slit pr wavy-slit air-pipes and water-pipes with their corresponding linear-slit or wavy-slit external or internal nozzles can also be placed in close proximity at the left and/or at the right sides of the perimeter of the corresponding external surfaces of the windshields to be cleaned, in combination with the top-mounted and bottom-mounted placements as explained, depending upon the designs and shapes and contours of the specific windshields. Therefore, in those situations, their structural arrangements and placements in relation to each other to accomplish the desired cleaning operations, will require that the ejections of the multi-streams of air-jets and/or water-jets must be properly angled, and the timing of the sustained and intermittent release of the ejecting multi-streams of air-jets and water-jets in relation to each other, possibly including the use of vibration components, must be automatically set to accomplish the desired maximum cleaning and clearing coverage of the various particular windshields.

2) The operational combinational activities of the positive forceful ejections of the multi-streams of air-jets and water-jets can possibly be aided by the additional negative forces of the coordinated fluid suction tubes and suctioning system placed at the opposite side of the releasing multi-streams of air-jets and water-jets.

3) The longitudinal linear-slit delivery pipes with the linear-slit jet nozzles are possibly the best designs especially when applied to the smooth contoured surfaces of the particular windshields. Alternatively, the wavy-slit jet nozzles can be mixed with the linear-slit jet nozzles especially in case of steeper curved portions of the windshields. The combinational arrangements and placements of the sets of linear-slit jet nozzles and the wavy-slit jet nozzles must be properly built, adjusted and angled to accomplish the best ways of the cleaning and clearing each particular curved portions of the contoured windshields.

4) Although the system of oscillating jet nozzles are shown in the drawings and explained in the specifications, it can be made as an optional back-up sub-system in combinations with the longitudinal linear-slit and/or wavy-slit nozzles system. Or, it can be eliminated in order to reduce the use of more moving parts and reduce operational manufacturing and operational maintenance costs. It can also be used solely by itself, if desired or needed, if it can be shown to be adequate enough to accomplish the needed cleaning and clearing operations of the particular windshields and according to the choice of the buyers or manufacturers.

Major Importance of the Longitudinal Branching Pressurized Delivery Air-Pipes with Longitudinal Linear-Slit or Wavy-Slit Air-Jet Nozzles:

To efficiently cover the maximum area for wiping, cleaning and clearing the external surfaces of the all-around front and rear windshields, left-side and right-side windshields and the right and left side-view mirrors, the proper installations of the shape-conforming longitudinal delivery air-pipes and their branches with built-in longitudinal linear-slit inwardly angulated nozzles capable of ejecting forceful multi-layers or multi-streams of moving invisible sheets of air-jets are optimally needed. The delivery air-pipes with the built-in longitudinal linear-slit inwardly angulated nozzles can be installed ideally below the field of vision for the front windshield, and ideally above the field of vision for the left-side and right-side windshields and rear windshield. If desired to extend wiping and cleaning the surfaces of the right and left side-view mirrors, small tributaries of the delivery air-pipes can be designed and installed to branch on the top portions of the right and left side-view mirrors. Depending on the designs and configurations of modern automobiles, the placements of the delivery air-pipes and their branches may vary, whichever adaptable arrangements or placements that will provide the most effective bladeless air-jet wiping, cleaning and debris-clearing of the different selected windshields and side-view mirrors that will be non-distracting to the field of vision of the drivers and passengers. To better control the varying pressures and velocities of the multi-air-jet streams of multi-layers or moving sheets of air-jets, it can be more efficient to include other adaptable varying sizes and shapes of longitudinal linear-slit nozzles that are built-in from separate aggregated multiple delivery air-pipes such as respectively shown for clarity in FIGS. 9B, 28A, 29A, 30A, 31A, 36, 37, 38, 40, 41A, 42A, 43A, 44A, 44B and 45. The variations in the pressure differentials exerted upon the ejecting fluid medium regarding the forcefully ejecting multi air-jet streams or layers are better accomplished by the independent multi-pipe system with built-in linear-slit internal or external nozzles system, rather than with the singular longitudinal pipe system as shown in FIGS. 7, 8, 9A and 11. The required sufficient number of air-pumps or compressors can be adapted to attain the effective wiping and cleaning and clearing operations using the longitudinal linear-slit air-jet nozzle and/or wavy-slit nozzle systems.

As shown also in greater details in FIGS. 1-5, control panel 100 located inside the vehicle has means for controlling water pressures (in FIGS. 3, 4 and 5) in the automatic mode 96, and the manual mode 98, depend on the requirements for cleaning and clearing accumulated snow and icy build-up on the various windshields and side-view mirrors. In the automatic mode 96, ECU 52 controls the various pressures of compression of water depending on the signals sent by the freezing sensor 54 to the ECU 52 and CPU 254 (in FIGS. 49-52 and 55-57).

The main purpose of the touch/voice remote controller 108 is to enable the authorized user to remotely operate the melting, clearing, wiping and cleaning system especially in case of snow and ice, to pre-melt and pre-clear the accumulated ice and snow and blow them off from the various selected windshields and/or side-view mirrors, before the driver and the passenger(s) will enter the automobile. It offers great convenience and comfort to the driver and passengers and prevent them from unnecessarily waiting in a cold environment inside the automobile while snow or ice are being melted down and cleared away, and to avoid the nuisance of manually scraping and removing the adhering snow or ice from the affected windshields and/or side-view mirrors. The driver can remotely operate the heating system before he/she gets into the vehicle by using the touch/voice remote controller 108, as wirelessly activated from a distance via wireless frequency flash 109$wf$ and touch and/or voice commands, providing the capability to blow heated air-jets and water-jets on to the selected front, rear windshields, left and right windshields and side-view mirrors so as to melt and remove the snow or accumulated icy build-up, without the driver going to the vehicle to manually remove and scrape the snow or ice stuck or accumulated on the external glass surface of the various windshields and side-view mirrors. In the present day scenario, it is really time-consuming and annoying for the driver to clean the snow and ice from the windshields before he or she gets into the automobile.

Illustrated in FIGS. 1, 2, 3, 4, 5 and 55, respectively, the bladeless windshield wiping, cleaning and clearing system mainly consists of a Central Electronic Control Unit (ECU) 52, ignition switch 60, power system 64, engine control system 58, engine 62 with alternator, rain sensor 56, freezing sensor 54, air-speed sensor 55 (not shown in FIG. 55), multi-air jet system 50 (FIGS. 1, 2, 5 and 55), multi-air jet control system 110 (FIGS. 1, 2, 5 and 55), water-jet system 131 (shown in FIGS. 3, 4 and 55), water-jet control system 124 (FIGS. 3, 4, 5 and 55), and (in FIGS. 1-5 and 55) showing the control panel 100 located inside the vehicle and touch/voice remote controller 108, and other auxiliaries). The ECU 52 is the heart of the bladeless clear-view safe-drive windshield wiping, cleaning and clearing systems. It gets feedback from the multi-air jet control system 110, control panel section inside the vehicle 100, engine control system 58, rain sensor 56, and freezing sensor 54, and sends the output signals to the proper relevant components to perform the required and desired operations.

Power generating system 64 consists of battery-A 66, battery-B 68, ignition switch 60, engine 62 with alternator, and allied as connected with the engine control system 58. When the ignition switch 60 is activated with electrical power supply from the battery-A 66 or battery-B, whichever is electrically sufficient, engine 62 starts operating. While engine 62 is running, it also charges the battery-A 66 and battery-B 68. The two batteries are coupled together in order to meet the sufficient power requirements of the main systems and other auxiliary systems. Both battery-B 68 or battery-A 66 are preferred to be on board for better and broader performance, and for back-up purposes, but if only one powerful battery is needed, one of the two batteries can be eliminated, especially when advanced regenerative batteries are available as battery technologies improve. However, if there are more than the two batteries A and B are required, a third battery or more batteries as back up can also be installed in the system. The battery charge is measured electronically in the vehicle and automatically always displayed and heard in the audio/visual command and display 80 in the control panel 100 for the benefit and convenience of the drivers during driving and/or parking/braking and standby operations.

Figure 5:
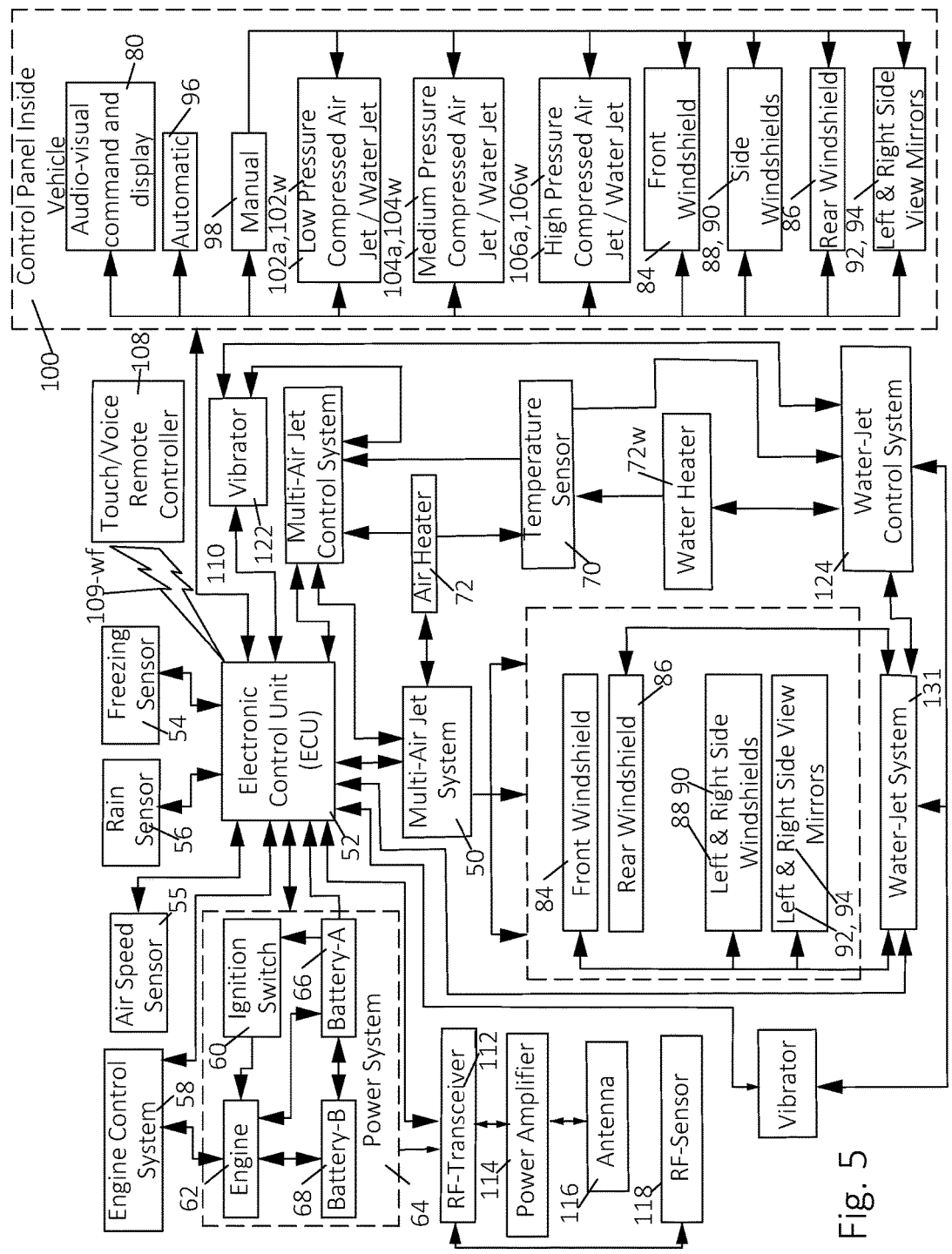

Means are provided to terminate the power supply from the battery or batteries as the measured power level in the battery or batteries reach optimum capacity, which can be about 85-90% (for example only), of electrical capacity, and, depending upon the required optimal settings. To conserve the use of remaining electrical power, the driver has to turn on the engine 62. In this way, when needed, the wiping and clearing operations can be jump started which can conserve battery life, especially useful during instances of low or lagging battery power. The battery or batteries is/are the prime source of the electrical power, and sustained by the automobile's engine and alternators during continued or prolonged operations. Maintenance of adequate electrical energy supply is needed for optimal operations of air compressor 78 (FIGS. 1 and 2), air heater 72, water pump 130 and water heater 72*w* (shown in FIGS. 3 and 4), and other electronics and components of the system like the ECU 52 and multi-air-jet control system 110, multi-air jet system 50 (in FIGS. 1, 2 and 5), and water-jet control system 124 (FIGS. 3, 4 and 5). The engine control system 58 controls the operations of engine 62 as directed by the central electronic control unit (ECU) 52.

The air-compressor 78 (in FIGS. 1 and 2) generates the required powerful pressurized air-jets delivered onto the external surface glass of the selected windshields through the air-jet nozzles 82*ajn*-1, 82*ajn*-2 and 82*ajn*-*x*. As soon as the required powerful pressurized air is distributed through the respective delivery air-pipes, and reaches the respective air-jet nozzles, the air-jets are ejected out from air-jet nozzle-1 (82*ajn*-1), air-jet nozzle-2 (82*ajn*-2), and air-jet nozzle-x (82*ajn*-*x* which means 3 or more air-jet nozzles).

In case of other automobiles and marine vehicles that are equipped with flat shaped windshield F84 as particularly shown in the sectional views of FIGS. 9A and 9B, the design of the respective singular longitudinal and multiple longitudinal delivery pipes that are linearly arranged with the respective linear-slit air-jet external nozzles do not have to be of differing angles, but, can be projecting straightly (in FIG. 9A) or in optimal inner-directed angular fashion (in FIG. 9B), inter-spaced proximal to the external portions of the straight non-curved flat windshield 84F. However, in FIG. 9B, the inwardly tilted 4 separate pressurized multiple delivery air-pipes with the corresponding angularly tilted air-jet nozzles eject air-jets at different angles to forcefully release various strengths of invisible streams of multi-air-jets at graded inwardly projected angles are aimed to hit the flat windshield F84 shown also in sectional view.

In FIGS. 1, 2,3, 4 and 5, the electronic and computerized controls at the automotive control panel 100 located inside the automotive vehicle can be manually or automatically controlled, and also can be wirelessly activated and controlled by remote touch/voice controller 108, as regulated and maintained by the authorized registered driver and/or passenger(s) of the respective automotive vehicle.

The Electronic Control Unit 52 accepts inputs from the Temperature Sensor 70, Rain Sensor 56, Freezing Sensor 54, Air Speed Sensor 55, Engine Control System 58, Touch/Voice Remote Control 108, In-vehicle Control Panel 100, Multi-Air-jet Control System 110 and Multi-Air Jet System 50.

The Air Speed Sensor 55 senses air speed, not necessarily car speed, so the system can make allowances for air flow over the windshield from the environment. This also allows for consideration of wind chill factor in calculations. The Air Speed Sensor 55 is basically a rotating vane. This is the reverse of a fan. The faster the wind blows the faster the blades turn and the higher the output voltage. Much the same as is used in weather forecasts. The Air Speed Sensor 55 is physically located in an air scoop up towards the front grill of the vehicle. Other sensors may be housed in the same assembly.

As shown in FIGS. 1, 2 and 5, there are three controls in the control panel 100, for controlling and monitoring the various required optimal air-jet pressures needed. They are for: low pressure compressed air-jet 102*a*, medium pressure compressed air-jet 104*a*, and high air pressure compressed air-jet 106*a*. In the automatic mode 96, the rain sensor 56 detects the intensity of rain, snow, ice or moisture on the windshield and sends the necessary signals to the ECU 52 in order to help regulate the effective needed air-jet pressures to be ejected onto the selected windshields and side-view mirrors, accordingly. However, in the MANUAL mode 98, the driver can adjust the desired needed air-jet pressures according to his/her required convenient maximum visibility factors. The reference compression air-jet pressures for low, medium and high pressure operations for the front windshield 84, rear windshield 86, and the left side and right side windshields 88 and 90, respectively, can be set initially controlled in the electronic control unit (ECU) 52, so that the pressure regulator 74 (FIGS. 1 and 2) can adjust the required needed air-jet pressures, accordingly, depending on the application. The automated controls are made through the control panel 100 located inside the vehicle especially during driving. The required forceful pressures of the air-jet streams or moving air-jet sheets or layers ejected from the various air-jet nozzles can vary differently depending on the required needed optimal applications. For example, the air pressure exerted into the delivery pipe connected to front windshield can be adjusted equal or more than the air pressures exerted within the delivery pipes connected to the rear windshield, and the right and left side windshields. On the dash board there are monitoring controls for releasing the optimally needed adequate forceful pressures of the air-jets streams or air-jets sheets or layers that are to be ejected out of the various respective air-jet nozzles.

The electronic and computerized activators and controls are accessible at the control panel 100 of the vehicle, where the authentic user can manually or wirelessly execute the needed operational activation, regulation and control of the device. The registered user can also command the various operations of the device by using the touch/voice remote control 108. The present invention is specially applicable to the front and rear windshields, as well as to the right and/or left side windshields of the respective automotive vehicles, depending upon the structural distributions of the delivery air-pipes and the corresponding placements of the longitudinal linear-slit air-jet nozzles or wavy-slit air-jet nozzles (vibrating or non-vibrating). The optional hidden oscillating vibrating or non-vibrating embodiments may be installed, (if necessary as back or in combination to the non-oscillating vibrating or non-vibrating longitudinal singular or aggregated multiple air-jet pipes with built-in linear-slit nozzles), according to the manufacturers and preference of the respective registered automotive drivers and allowed passengers/users.

Water cleaning means are also provided to wipe, clean and clear the dirty debris stuck onto the external surfaces of the windshield(s) and/or side-view mirrors.

Particularly in FIGS. 3, 4 and 5, illustrating the purpose of the water-jet system 131, which is to pump the pressurized jets of water onto the respective windshields and side-view mirrors so as to clean the various external surfaces of the selected windshields and side-view mirrors and attain better, wider and clearer visibility for the driver and passengers of automotive vehicles. This water-jet system 131 (shown in FIGS. 3 and 4) consists of a water reservoir 128, and water nozzles 134wn-1, 134wn-2 and 134wn-3; the water reservoir 128 which stores and supplies enough water to be channeled to the water pump 130, and, if needed, a liquid cleaner solution 126 is mixed with the water, which, together, can be pumped as mixed water and liquid cleaner solution to be ejected onto whatever chosen selected windshields, such as front windshield 84, rear windshield 86, left-side windshield 88, right-side windshield 90, and, (when installed and needed), ejected also onto the surface of either/or both the left side-view mirrors and/or the right side-view mirrors. The water level sensor 132 automatically senses the level of water continuously and sends the signals to the water-jet control system 124, and, accordingly, the water-jet control system 124 activates the water pump 130, in the water-jet system 131, and pumping the required volume and pressures and frequency of release of pressurized water-jets through respective water-jet pipes, and through the various water-nozzle 1 labeled 134wn-1, water nozzle 2 labeled 134wn-2 and water nozzle 3 labeled 134wn-3, and then ejected onto the selected windshield(s), and when needed, ejected also onto the side-view mirrors. Water-jet control system 124 is controlled by the ECU 52 as commanded from the control panel 100 inside the vehicle or as commanded wirelessly through the touch/voice remote controller 108 via wireless frequency signals 109wf, in order to control the water pump to supply the desired amount of pressurized water to the various water nozzles for adequate ejection onto the various selected respective windshields, and when needed, ejected also onto the side-view mirrors.

In FIGS. 3, 4 and 5, in case of mud, dust or ice adhering on the various external windshield glass surface, it may be required to spray water first on the external specific surfaces of the respective windshields before operating the air compressor 78. The water spray nozzles 134-wn-1, 134-wn-2 and 134-wn-3 (FIGS. 3 and 4) are to be positioned to spray water-jets onto the maximum surface areas on the various selected respective windshields, such as front windshield 84, rear windshield 86, left and right windshields 88 and 90, respectively, and the respective left and right side-view mirrors 92 and 94.

The water pump 130, particularly shown in FIGS. 3, 4, 6, 10, 14, 15, 18, 19, 20, 21, 23, 24, 26 and 27, pumps adequate water volume as sourced from the water reservoir 128 to function in coordination with the various water spray nozzles for the front windshield 84, rear windshield 86 and left and right side windshields 88 and 90, respectively, and/or the respective left and right side-view mirrors 92 and 94, depending on the configurations of designs applicable to various automobiles.

In case of the left side windshields 88, the right windshield 90, the left and right side-view mirrors 92 and 94, respectively, the water-jets are ejected from the respective longitudinal linear-slit water pipes and jet nozzles.

Rain Sensor and Freezing Sensor

The rain sensor 56 (as shown in FIGS. 1-5, 50, 51, 52 and 55-57), in the present invention is a fully automatic moisture-activated system that determines the intensity of rain and snow falling on the respective windshield. The rain sensor 56 is placed at the external portions of the vehicle, and open to the ambient atmosphere in order to sense rain impinging on the windshield(s). Rain sensor 56 sends the electrical signals to ECU 52 as a function of determining the amount of water or moisture present at the time on the external surface of the specific windshield(s) of the vehicle. ECU 52 triggers the system's respective air-jets to be ejected towards the respective windshields and respective side-view mirrors to perform the needed and desired volume, intensity and frequency of wiping, cleaning and clearing operations. Engine control system 58 (also shown in FIGS. 1, 2, 3, 4 and 5) which communicates with ECU 52 is provided with the necessary adequate power for the intermittent and/or sustained continuous automatic wiping (especially when set in the automatic mode 96 in the control panel 100).

A freezing sensor 54 (shown in FIGS. 1-5 and 55-57) can be used to detect the presence of external icing conditions.

At freezing temperatures, the freezing sensor 54 (also shown in FIGS. 1-5 and 55-57) sends the proper electrical active signals of the presence of snow or ice on the windshield(s), to the ECU 52 or CPU 254 then directs the air heater to be activated (in FIGS. 1, 2 and 5 and 55-57) so that the required adjusted heated air-jets are blown onto the respective windshields and, when needed, ejected also onto the side-view mirrors. However, in the manual mode 98, the driver can also manually control and adjust the needed air-jets being released, after selecting whichever he or she determines would be the needed properly required pressures of air-jets flow, either via the manual or automatic adjustments to be made to allow either low pressure compressed air-jets 102a, medium pressure compressed air-jets 104a, or high pressure compressed air-jets 106a (in FIGS. 1, 2 and 5) delivered through the sturdy delivery air-pipes and ejected from the selected air-jet nozzles to solve the rainy or icy or snowy environmental predicament. Controlling the effective wiping, cleaning and clearing operations for the front windshield 84, rear windshield 86, left side-view mirror 92 and right side-view mirror 94, left side windshield 88 and right side windshield 90, including controlling the water spray 134wn-1, 134wn-2 and 134wn-3 (FIGS. 3 and 4), individually or in combination can be managed at Control panel 100 (FIGS. 1-5) where the driver can adjust to achieve his or her required optimum visibility and convenience as well the passenger(s).

Multi-air jet system 50 (in FIGS. 1, 2, 5) when selectively activated, supplies sucked-in ambient air from the surrounding environment. The icy temperature signals detected by freezing sensor 54 are used by the ECU 52 or CPU 254 to automate the functioning of the air heater 72 (FIGS. 1, 2, 6, 10, 12A, 13A, 14, 15, 18,19, 20, 21, 23, 24, 26 and 27) to be activated accordingly, for the proper air-heating so that heated air is compressed by the air compressor 78, then ejected respectively as heated air-jets through air-jet nozzle 82ajn-1, 82ajn-2 and 82ajn-x (FIGS. 1 and 2), and through the respective longitudinal linear-slit nozzles, onto the selected windshields and the side-view mirrors nozzles during snowy and icy weather. However, during regular weather, the air heater can be deactivated before the air is compressed by the air-compressor 78 so as to eject non-heated air-jets through the respective air-jet nozzles onto the various selected respective windshields and side-view mirrors. Adequately heated air-jets can melt the snow and ice and blow them away from the respective windshields and side-view mirrors. Ambient air is not heated during regular applications to invisibly wipe, clear and shield the respective windshields and side-view mirrors from the incoming rain or snow or dust, or other small particulate matters or tiny insect debris in order to remove them and/or prevent adherence of the vision distracting matters on the windshields and side-view mirrors. Multi-air jet system 50 operates to achieve compression of unheated regular air, or cold air or hot air, depending on the necessities required for the front, rear and left and right windshields, and the right and left side-view mirrors, to attain effective wiping and cleaning and clearing of selected windshields and side-view mirror from rain, snow, ice, mist, dust, etc. Multi-air jet system 50 includes a powerful air compressor 78 (shown also in FIGS. 1, 2, 6, 10, 12A, 13A, 14, 15, 18, 19, 20, 21, 24, 26, 27 and 53) to forcefully compress air volume with required commanded pressures for the wiping and clearing system. Pressure regulator 74 (shown in FIGS. 1 and 2) regulates the forceful air-jet pressures of the ejecting air-jet layers or air-jet streams or moving air-jet sheets ejecting and aimed onto the respective windshields and side-view mirrors, accordingly. Temperature sensor 70 (in FIGS. 1, 2, 3, 4 and 5) senses the temperature of the heated air and sends the feedback to the multi-air-jet control system means 110 and then to the ECU 52 which controls the air heater 72 (in FIGS. 1, 2 and 5) also an integral part of the bladeless multi-air jet system 50. Temperature sensor 70 (in FIGS. 3, 4 and 5) also senses the temperature of the heated water from water-heater and sends the signals to the water-jet control system 124. Communications between various elements of the multi-air jet system 50 and water-jet system 131, and the ECU 52 are made possible by the correctly linked electrical connections.

Particularly in FIGS. 6, 10, 12A, 13A, 14, 15,18, 19, 20, 21, 23, 24, 26 and 27, the air inlet (with filter) 76 supplies the continuous flow of air from the immediate surrounding ambient environment to supply enough air for the air compressor 78 of multi-air-jet system 50. Pressurized flow of air-jets are either heated or non-heated air, according to the activation or deactivation of air heater 72, which can be either turned on or off depending on the existing environmental weather conditions, and then after passing through sturdy air flow delivery pipes, the air-jets are ejected through the various nozzles onto the respective windshields and side-view mirrors.

In FIG. 7, as illustrated in sectional view, the bottom-mounted singular pressurized air-jet pipe with 3 built-in linear-slit external nozzles arranged next to each other are designed in inwardly angular fashion, in order to maximize coverage for effective cleaning, wiping and clearing of the curved windshield C84, to attain beneficial clearer visibility for the driver and passengers. This is simply illustrated as to properly adapt specifically to curved designs of windshields. In this illustration, the linear-slit singular longitudinal air-jet pipe design having the 3 built-in I non-vibrating linear-slit external nozzles, shows that the first and inmost linear-slit air-jet external nozzle C82en-1 being positioned as releasing air-jet streams or moving air-jet layer 1a aimed tangential to the immediate lower external surfaces of the curved windshield C84, and that the second linear-slit air-jet external nozzle C82en-2 being positioned and optimally angled as releasing forceful moving air-jets streams 2a aimed and hitting tangential to the middle external portions of the curved windshield C84, and the third linear-slit air-jet external nozzle C82-en-3 being angularly positioned as releasing air-jet streams 3a aimed towards the upper third portion of the curved windshield C84 in an inward direction and pressing on the ejecting first and second forceful streams of air-jets from the ones emanating from the first and second linear-slit external air-jet nozzles.

The gradual inward angular positioning of the three linear-slit external air-jet nozzles in relation to each other will result in the first air-jet streams 1a being aimed to hit the near bottom of external surface of the curved windshield C84, and the second air-jet streams 2a being aimed to hit the middle portion of the curved external surface of the front windshield, and the third air-jet streams 3a being aimed toward the higher portion of the curved windshield, which will in effect reinforce each other with the required needed effective pressure forces toward attaining an inwardly curved angular direction to further press onto the curved external surface of the front windshield. To clarify further, the three optimally angled forceful invisible multi-air-jet streams being ejected from the inwardly angled linear-slit external nozzles will then result into the effective clearing or wiping or bouncing off of rain, snow, ice and other undesired particulate matters so as to effectuate additional pressurizing reinforcing actions on each other in order to cover maximum external areas of the curvature of the front windshield C84, and thereby preventing them from adhering to the front windshield C84.

Thus, the forceful moving streams of invisible air-jets will clear the frontal field of vision of the drivers and passengers without the need of the century-old long bladed windshield wipers of the prior art. For clarification, the third forceful streams of air-jet 3a which is aimed at the higher upper portion of the front windshield will pave its way to reinforce the escaping air-jets coming from the first two bottom and middle air-jet streams or moving air-jet sheets, and thereby, the three air-jet streams or moving air-jets sheets will be forced to potentially follow the contoured shape of the sectional view of the curved front windshield C84, as they are being ejected from the respective linear-slit nozzles located there-around and following the contour of the front windshield (beginning from the bottom left end to the right bottom end not shown in FIG. 7).

However, although FIG. 7 simply only shows the covered 3 regions of the curved windshield using 3 inner-directed angles of the linear-slit external nozzles, it must be clearly understood that there can be more than 3 regions of the curved windshield that can be targeted by more than 3 corresponding built-in linear-slit external or internal nozzles, depending on the degree and extent of the curved configuration or shape and contour of the selected windshield according to the design of the automobile.

Figure 6:
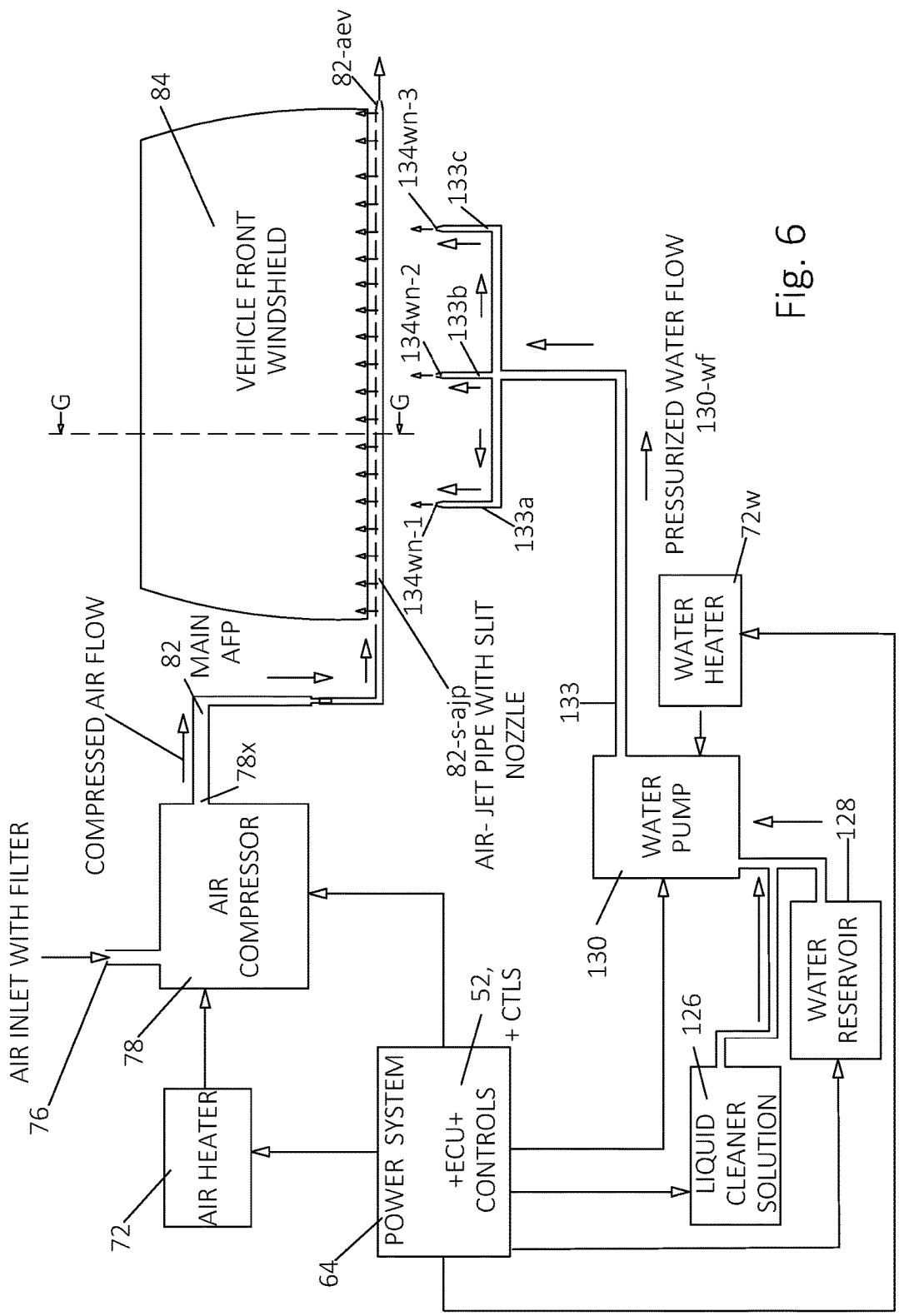

FIGS. 6, 10, 14 and 15 represent the block diagram and schematic representation involving the multi-air-jet and water-jet systems as coordinated for the needed use. In FIG. 6, the air compressor 78 compresses the suctioned ambient air through air-inlet with filter 76, and which may be pre-heated by air-heater 72 when activated, and then compressed by air-compressor 78, then the compressed air exits through 78x and directed to flow through the main air-flow pipe Main 82 AFP which delivers compressed air through longitudinal linear-slit air-jet pipe 82-s-ajp and through the linear-slit nozzles ejecting forceful linear air-jets shown by upward arrows emanating from below the front windshield 84. Excess compressed air can escape through air escape valve 82-aev. Water volume from water reservoir 128 is mixed with liquid cleaner solution 126 when needed, and then led through pressurized water delivery pipe 133, and then, the pressurized water is led to the branching pressurized water pipes 133a, 133b and 133c and forcefully sprayed through the respective water-jet nozzles 134-wn-1, 134-wn-2 and 134 wn-3, and being ejected from below (shown in FIG. 6) the front windshield 84. Water heater 72w, when activated pre-heats the water before ejection through the respective water-jet nozzles. The front windshield 84 (in FIG. 6) and the rear windshield 86 (in FIG. 10) are equipped with water-jet spraying to clean the external surfaces of the respective windshields thus providing better visibility for the driver and passenger(s) aboard the vehicle.

It must be understood, however that in the distribution of the needed delivery air-pipes and water-pipes that one delivery pipe can be connected to the front windshield 84; another delivery pipe can be connected to the rear windshield 86; and the other pipes can be connected to the left side windshield 88 and right side windshields 90, respectively. The fabrication, distribution, location and branching connections of different air-pipes for the various portions of windshields can be achieved, for example, one singular or aggregated multiple air-pipes can be optimally positioned ideally at the bottom of the front windshield 84 (FIG. 6), and a branching singular or aggregated multiple air-pipes can be optimally positioned on top of the right side portions of right side windshields 90 (FIG. 12A) and left side portions of the left side windshields 88 in FIG. 13A; and another singular or aggregated multiple air-pipes can be optimally positioned ideally on the top portion of the rear windshield 86 (FIG. 10). It must be clearly understood that controlling each major and branching singular or aggregated multiple delivery air-pipes depending on the application can be adjusted in various optimal different singular or aggregated multiple longitudinal pipe-designs and branching with built-in linear-slit air-jet nozzles.

The major deficiency in most of the old and current automobiles is that their designs are not conducive or adaptable to having installations of automatic water-spraying applicable to the left and right side windshields, because when the prior-art left and right side windshields are opened and closed, sprayed water-jets could cause water to leak into the interior areas of the automobile that can cause damage and inconvenience to the driver and/or passenger(s). But, with improvements in adaptable designs, shapes, configurations and installations in modern state-of-the art automobiles, the right side windshields 90 (in FIG. 12A) and the left side-windshields 88 (in FIG. 13A) can still have provisions for the automatic water-jet spraying so as to enable effective wiping and cleaning of both right side and left side windshields while in the closed position, and then immediately dried with forceful multi-layers of inner-directed air-jets ejected from inner-directed angular designed linear-slit air-jets of the present invention. In FIGS. 6, 10, 12A, 13A, 14, 15,19, 20, 21, 23, 24, 26 and 27, Power system 64 controlled by ECU 52 allied with relevant controls, supply regulated electrical energy to properly activate and deactivate air compressor 78, air-heater 72, water pump 130, water-heater 72w, air and water delivery pipe systems, and the air and water nozzles' ejection rate, volume per unit time, frequency and time delay operations to achieve optimum and maximum effectiveness of both air-jet and water-jet wiping and cleaning and clearing capabilities.

As illustrated also in FIGS. 6, 10, 14, 15, 18, 19, 20, 21, 23, 24, 26, and 27, respectively, the water-jet system includes a water reservoir 128, liquid cleaning solution 126, water-heater 72w, water pump 130, and, also the pressurized water flow pipe 133 and its branches. Water pump 130 gets the power from the battery A 66 and battery B 68 (also in FIGS. 3 and 4) which are part of the power system 64 as managed by ECU 52 and relevant controls CTL. The purpose of the water-jet system is to pump the pressurized water onto the various respective windshields and side-view mirrors so as to clean their surfaces for better visibility of the automobile driver and passengers. The water reservoir 128 stores and supplies the water into the water pump 130 and then led into the pressurized water pipe 133.

Figure 26:
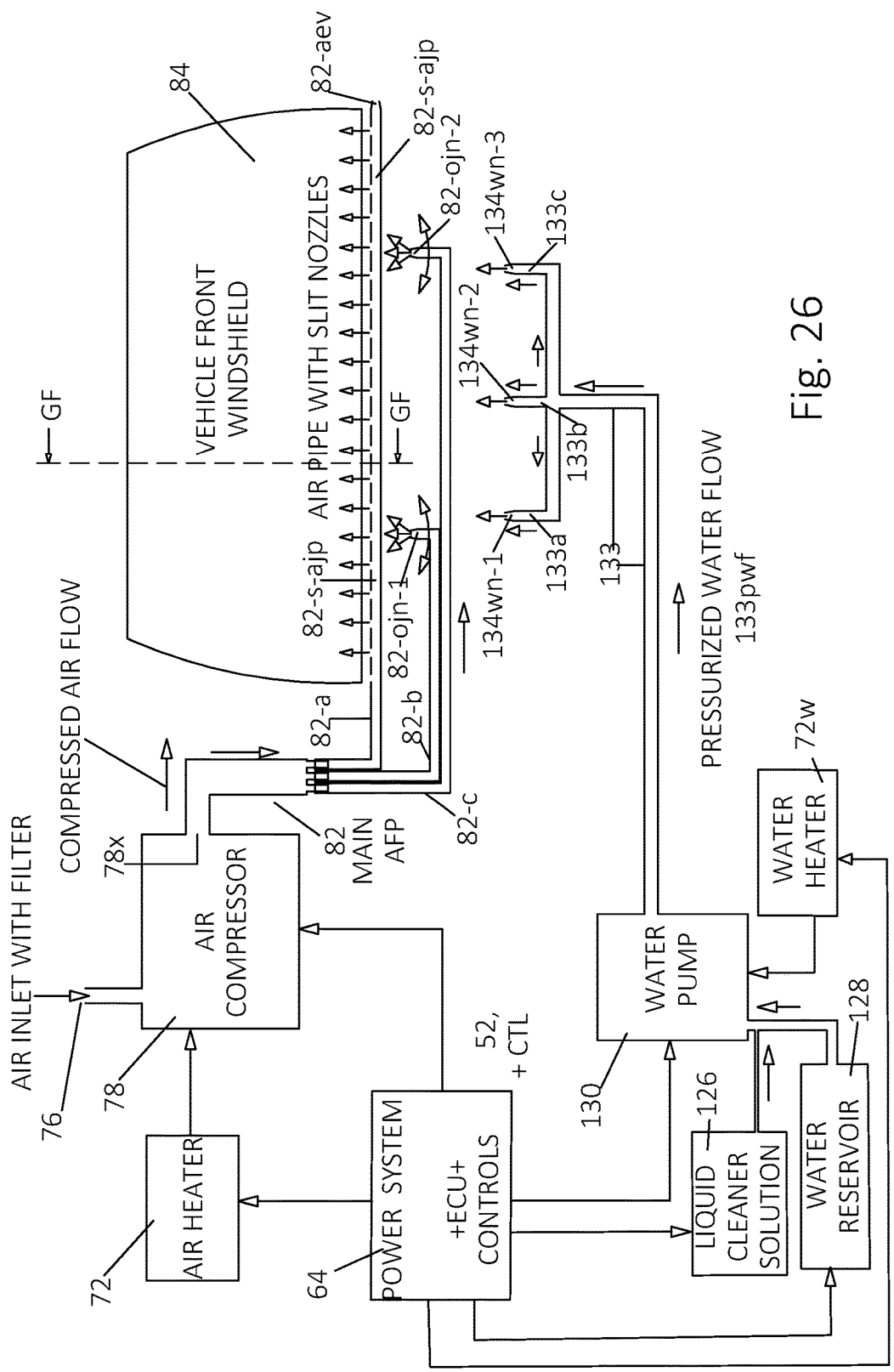
Figure 27:
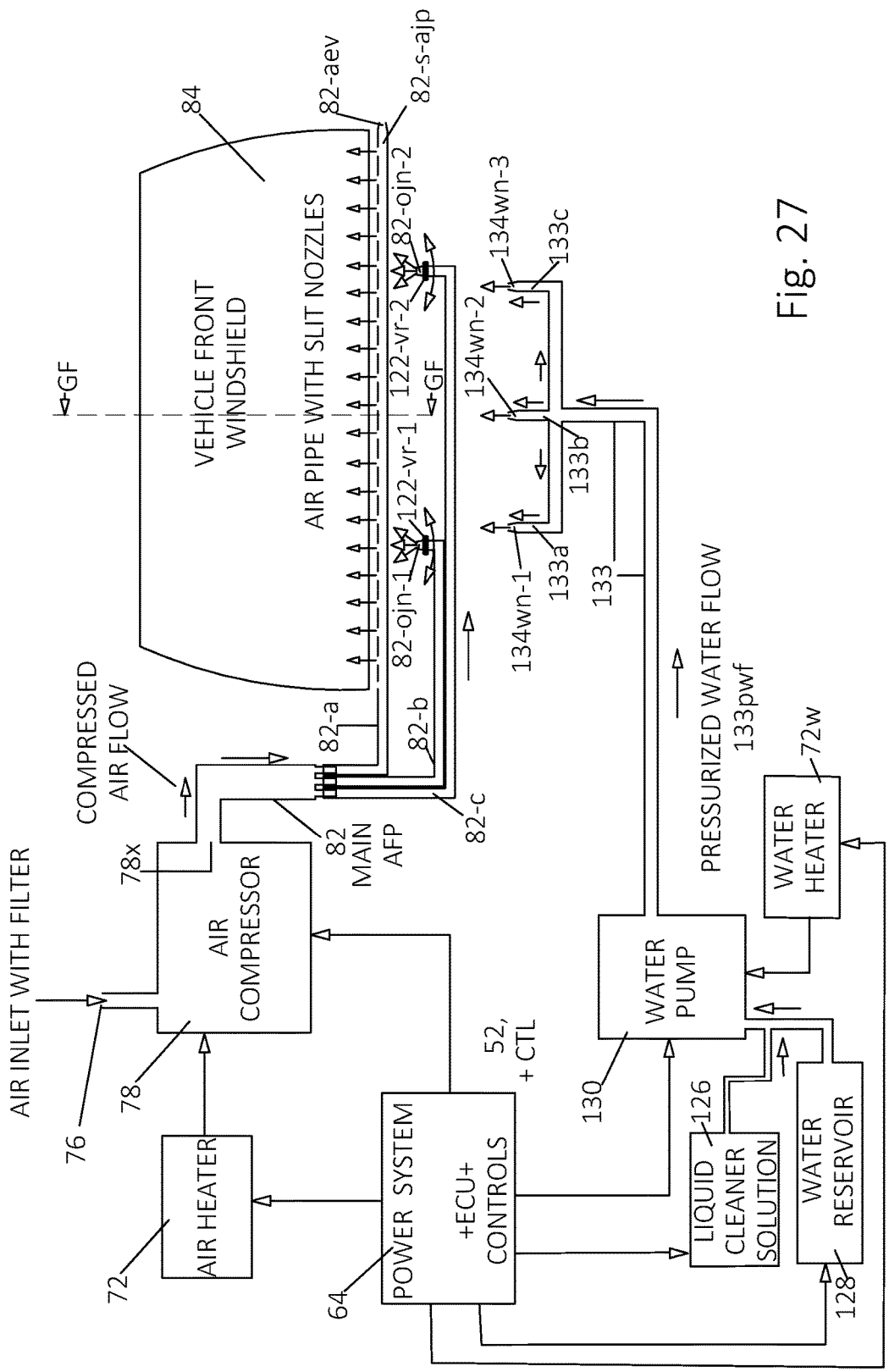

In FIGS. 6, 10, 18, 19, 23, 26 and 27, water pump 130 in the water-jet system pumps pressurized water to be sprayed as water-jets through water-jet nozzles 134-*wn*-1, 134-*wn*-2 and 134-*wn*-3 onto the various windshields, such as front windshield 84 (also shown FIGS. 6, 18 19, 23, 26 and 27) and rear windshield 86 (also shown in FIGS. 10, 26 and 27).

In FIGS. 14, 15, 20, 21 and 24, water pump 130 pumps pressurized water into water delivery pipe 133 branching into 133*y* and 133*x* to convey the effective pressurized water to be sprayed as water-jets using longitudinal linear-slit water-jet nozzles 133-*s-wjp*, onto the respective windshields.

It is of utmost engineering importance to note that the best ideally suited applicable placements and required mechanism for installations of the relevant longitudinal delivery air-pipes or air-tubes and corresponding linearly arranged vibrating and/or non-vibrating linear-slit and/or wavy-slit air-jet external or internal nozzle designs of the present invention applied to the front and rear windshields, as well as to the right-side and left side windshields and side-view mirrors are of foremost consideration to ideally conform with the contours of various respective designs of future modern automobiles.

Figure 8:
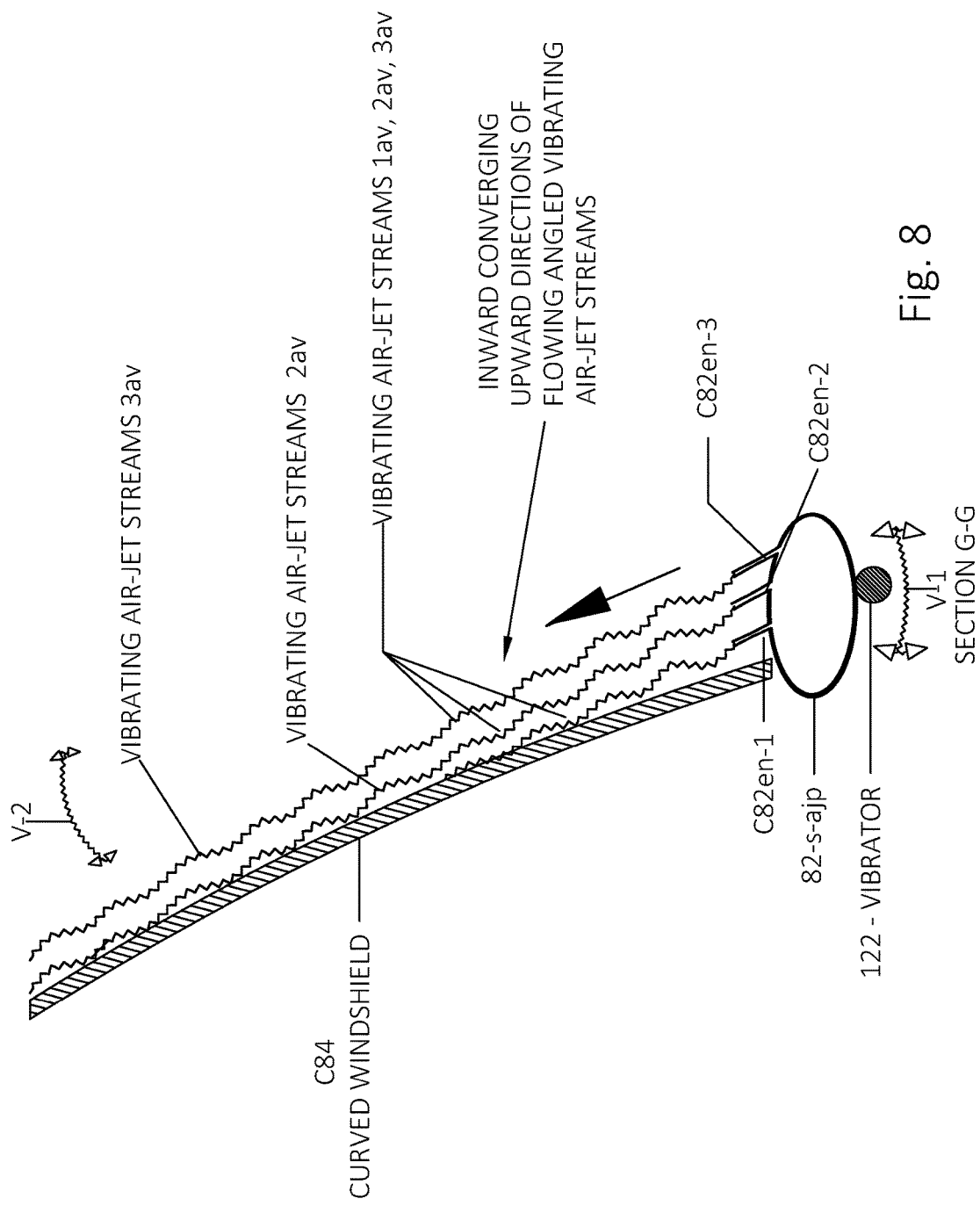
Figure 9:
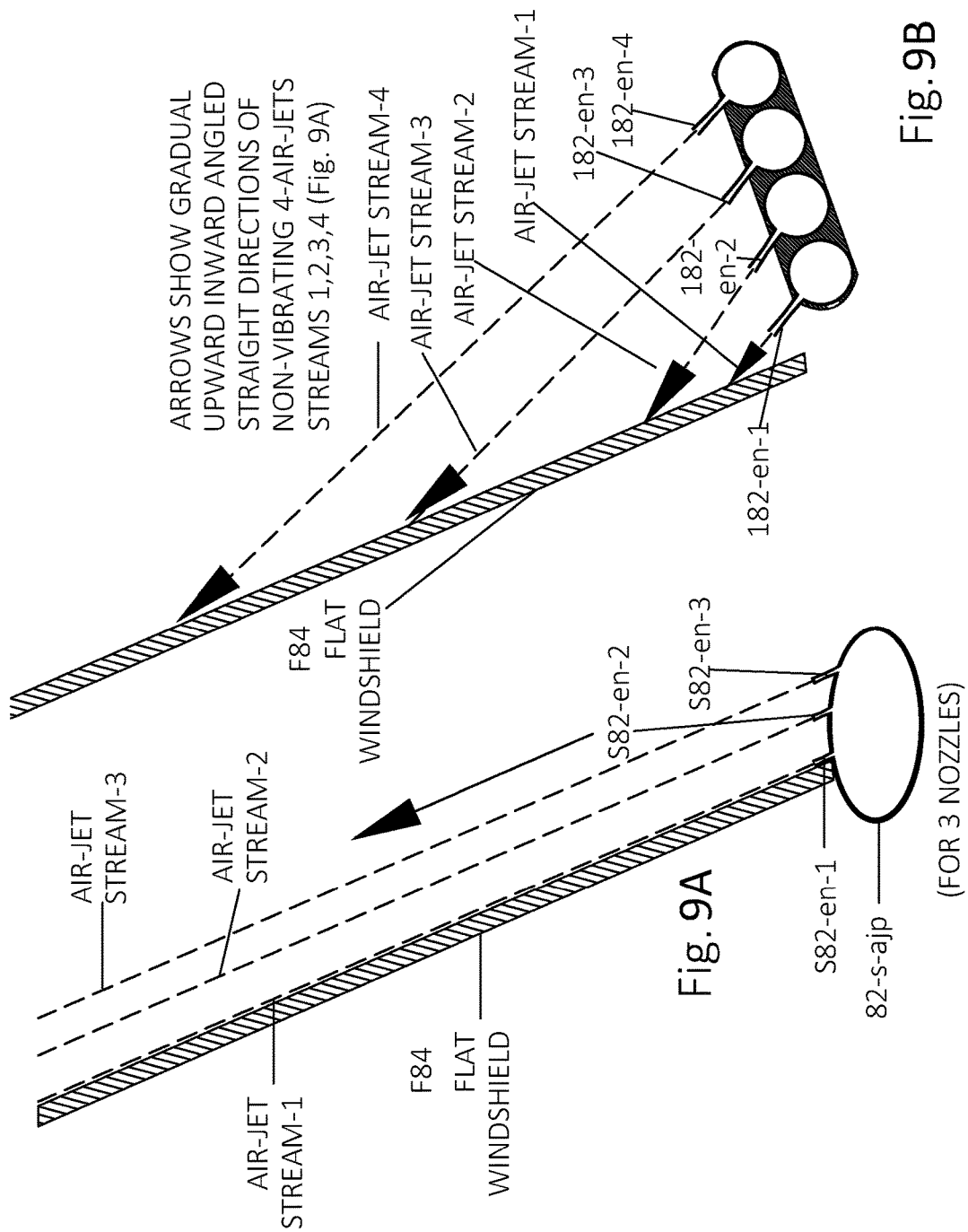

As illustrated in FIG. 8, another non-oscillating singular pipe embodiment of the present invention (with vibrator 122) is shown to be placed at the bottom of the singular air-jet pipe 82-*s-ajp*, so that when activated to vibrate, the vibrator 122 causes the three curved linear-slit external nozzle C82*en*-1, C82*en*-2 and C82*en*-3 to vibrate, thus resulting in the vibration of the 3 inner-angular directed air-jets streams or layers or moving air-jet sheets as they are being ejected from respective vibrating linear-slit external air-jets nozzles; the vibrating action as mentioned previously, favorably helps to effectively accentuate the wiping, clearing and bouncing off rain, snow and/or ice and other undesired tiny particulate matters, and better removing unwanted materials stuck on the curved windshield C84.

As shown in FIG. 9A, the sectional view of a plane flat windshield F84 of some other automobiles and marine vehicles, the design of the combination of linearly arranged external air-jet nozzles S82-*en*-1, S82-*en*-2 and S82-*en*-3 can be assembled to eject straightly projecting powerful high velocity air-jet streams or moving air-jets streams 1, 2 and 3 ejecting from the bottom and aimed upwards at optimal angular fashion, but parallel relative to each other and inter-spaced immediately proximal to the external portions of the straight non-curved flat windshield 84F. The 3 parallel-projected air-jets streams or moving air-jets sheets or layers being ejected from the respective straight linear-slit external air-jet nozzles being projected parallel to each other as well as parallel to the flat shape or configuration of the flat windshield F84; and, the distance between the flat windshield and the ejecting parallel-aligned air-jet streams are optimally set and determined by manufacturers. The force and velocities of the powerful upwardly ejecting air-jet streams can vary depending upon the optimal electronically determined needed proper calculations of the ECU which depends also on the desired conditions and requirements of the driver and the varying intensities of the rain or snow or ice or other undesired extraneous materials or particles. In this case, the 3 layers of multi-jet streams are for the purpose of just blocking the incoming rain, snow, ice and other particulate debris and preventing the adherence of the incoming rain, snow, ice particles. etc. onto the external surface of the flat windshield F84.

In FIG. 9B, however, the projections of the 4 multi-air-jet streams 1, 2, 3 and 4 as being ejected from 4 built-in linear-slit external nozzles 182-*en*-1, 182-*en*-2, 182-*en*-3 and 182-*en*-4 that are correspondingly built-in from the aggregated multiple aligned air-jet pipes, and are all differently positioned with gradual angled fashion in relation to each other and in relation to the sectional view of the flat windshield F84 for purposes of achieving better cleaning and wiping and clearing the flat windshield F84.

In FIG. 10 the air compressor 78 compresses the ambient air from the immediate surrounding environment after being suctioned through air inlet with filter 76, and then exiting through outlet 78x, and which may be pre-heated by air-heater 72 when activated, and then the compressed air is directed to flow through the main air-flow pipe 82 MAIN AFP and directly to the air-flow pipe 82-*afp* and routed across the top of the rear windshield 86 to be forcefully ejected as powerful air-jets from the built-in longitudinal linear-slit air-jet nozzles 82-*s-afp*, and showing the downward flow of the air-jets being represented by the downward arrow coming from above the rear windshield 86 to effectively wipe, clean and clear the external surfaces of the rear windshield 86. Any excess pressurized compressed air can escape through air escape valve 82-*aev*. In FIG. 10, from the water reservoir 128, a required amount of water is led to the water pump 130, and if needed, mixed with liquid cleaner solution 126 to be conveyed, after adequate pumping by water pump 130, into the pressurized water pipe 133 that routes across the top of the rear windshield and be sprayed as forceful water-jets from 3 water-jet nozzles, 134*wn*-1, 134*wn*-2 and 134*wn*-3 from the top of the rear windshield 86 downwards to effectively wipe, clean and clear the external surface of the rear windshield 86. Water heater 72*w*, when activated pre-heats the water before ejection through the respective water-jet nozzles.

Note: Emphasizing that the major function of the various embodiments of the bladeless wipers, cleaners and clearers for the selected windshields and side view-mirrors are to wipe off and clean and clear the external surfaces of the various windshields and side-view mirrors in order to get the possible maximum advantages for a much better driving visibility of the driver and passenger(s) of every modern automobiles. Many of the front windshields of automotive vehicles are curved and not designed with plane flat surfaces. Rather, generally, most curved windshields have 3-dimensional surfaces. These require and necessitate the correct design of the properly angled linear-slit nozzle shapes that are built-in from the longitudinal pressurized delivery pipes (either and/or both combinations of singular and/or aggregated multiple air-jet pipes and water-jet pipes that are installed along the main contour of the various windshields and side-view mirrors.

Basically, in FIG. 11, which shows the top-mounted non-oscillating non-vibrating sectional view of a 4-linear-slit external nozzles extending from a singular longitudinal air-pipe or air-tube 82-*s-ajp*, the preferred embodiment is favorably applicable for the curved rear windshields. The first air-jet nozzle C82-*en*-1 being inwardly aimed to cover the top external surface of the rear windshield C84, the second air-jet nozzle C82-*en*-2 being inwardly aimed to cover the middle external surface of the rear windshield, and the third air-jet nozzle C82-*en*-3 being inwardly aimed closely to cover the lower external surface of the curved windshield, as clearly shown in this sectional view of FIG. 11. The most proximal continuous or intermittent forceful angled air-jet stream 1 being aimed to clean or clear the top external surface of the curved rear wind-shield C84, the second angled air-jet stream 2 being aimed to wipe, clean or clear the middle external surface of the curved rear windshield, and the third angled air-jet streams 3 being aimed to wipe, clean or clear the bottom external surface of the curved rear windshield, and the fourth air-jet stream 4 being aimed straightly acting as shield to the curved windshield C84 from the incoming rain, snow, ice and other particulate debris. This FIG. 11 clearly represents the orientations of the built-in sectional views of the linear-slit external nozzles, C82-*en*-1, C82-*en*-2, C82-*en*-3 and C82-*en*-4, in relation to the sectional view of the singular linear-slit air-pipe 82-*s-ajp*. Moreover, aside from the preferred applicability for the rear windshield, the same top-mounted and preferred embodiment can also be favorably applicable to the curved left-side and curved right-side windshields' external surfaces, based on the design of the 4 linear-slit air-jet nozzles.

In the above-written design embodiment, the compressed air-jets that being ejected from the respective linear-slit external nozzles are regulated and automatically adjusted according to assigned pressurized compression forces and air velocities and strengths as regulated by the ECU 52, but dependent on the compression pressures exerted internally upon the singular air-jet pipe 82-*s-ajp* as regulated and automatically calibrated with pre-adjusted compressed air pressures to be released as per assigned air compression forces and air-jet velocities and strengths to effectively carry on with the desired pressurized air-jet pressures coming from the respective linear-slit air-jet nozzles as regulated by the ECU 52 and the specific controls made by the driver.

In FIG. 12A, the ambient air sucked in through air inlet with filter 76 gets pumped by air compressor 78 and through exit 78x then led to main air-flow pipe 82 MAIN AFP, then routed across the top portion of the right side windshields 90 and through the longitudinal linear-slit air pipe 82-*s-ajp* placed on top of the right side windshields, effectively ejects powerful air-jets downwards from the built-in linear-slit nozzles to wipe, clean and clear the right-side windshields 90 of whatever already stuck or to be stuck rain or snow or other debris, thus preventing their adherence on the external surface of the right-side windshields. The other branching air pipe 82-*r-afp* routes the pressurized air across the top of the right side-view mirror 94, and through the built-in linear-slit air-jet nozzles 82-*s-rsvm* ejects forceful air jets downwards from top to bottom to wipe, clean and clear rain, or snow or other debris preventing their adherence at the viewing surface of the right side-view mirror. The air compressor 78 is powered by power system 64 allied with ECU 52 plus relevant controls. In case heated pressurized air-jets are needed to melt snow and ice, air heater 72 is activated by 64 and 52.

FIG. 13A illustrates that the left side windshields 88, and the left side-view mirror 92, respectively, are using the longitudinal linear-slit nozzles 82-*s-ajp* as means of ejecting powerful graded pressurized air-jets as the effective means of wiping, cleaning and clearing whatever snow, rain, ice, mist and dirt from the respective left side-windshields 88 and left side-view mirror 92.

In FIG. 14, there are illustrated that the conforming longitudinal air-jet pipe 82-*s-ajp* and the water-jet pipe 133-*s-wjp*, both eject air-jets and water-jets from the conforming linear-slit nozzles for wiping and cleaning the left side windshields 88 and the left side-view mirror 92, respectively.

In FIG. 15, illustrates that the conforming multi-air-jet and water-jet systems, assemblies, methods and devices, provide air-jet and water-jet wiping, cleaning and clearing of the right-side windshields 90, and right side-view mirror 94. The right side windshields 90 are provided with forceful air-jets ejected from longitudinal linear-slit nozzle system built-in from longitudinal linear-slit air pipe 82-*s-ajp*. It also shows that water-jets are sprayed from longitudinal linear-slit water-jet nozzles built-in from linear-slit water-jet pipe 133-*s-wjp* as branching from pressurized water delivery pipe 133*y* and 133*x* from pressurized main water delivery pipe 133, after being pumped by water pump 130, supplying adequate water volume being sourced from water reservoir 128, and if needed, being mixed with liquid cleaner solution 126. Also in FIG. 15, it illustrates that the right side-view mirror 94 is provided with right linear-slit water-jet pipe 133-*s-wjp*, and the right linear-slit air-jet nozzles 82-*s-rsvm*, both of which spray water-jets and air-jets to clean unwanted stuck materials from the right side-view mirror 94. Again, these operations are electrically powered by power system 64 allied with regulations from ECU 52, plus relevant controls.

In the illustrative diagrams shown in FIGS. 6, 10, 12A, 12B, 13A, 13B, 14 and 15, involving the multi-air jet system, the air compressor 78 generates the forceful pressurized air that delivers powerful air-jets to the front windshield 84, and rear windshield 86 through the pressurized air pipes 82 MAIN AFP and directly from its subdivisions or branches. Forceful pressurized air-jets emerging from longitudinal linear-slit nozzles built-in from linear-slit longitudinal air-jet delivery pipe 82-*s-ajp*, effectively wipe and clean and clear whatever rain, snow, ice, dirt and mist from the surface of the front windshield 84 and rear windshield 86. The air compressor 78 is connected with air inlet with filter 76 that gets air supply from the ambient environment. Since the ambient air is not clean all the time, there is required a filter to clean the impurities from the air inlet 76.

It is important to note that the desirable chosen shapes, contours, spacing, numbers and relative angulations or angular orientations or set-up of the various longitudinal linear-slit and/or wavy-slit air-jet nozzles are made to be as adequately effective in producing substantially forceful flow of moving multi-streams or sheets or layers of air-jets that can be optimally ejected onto the selected respective windshields. Since the main objective of the forceful air-jets is to wipe, clean and clear the maximum possible surfaces of the respective windshields, in order to remove and prevent accumulation of unwanted materials like snow, rain, etc., the various designs and embodiments of the desired chosen air-jet nozzles are structured and arranged in such a way that the powerful multi-streams of air-jets must effectively cover the maximum external surface area of the curved windshield glass. The ideal flow of air-jets are made to cover most of the entire length and width of the curved windshield C84. So, it is aimed to design the various configurations of the respective longitudinal linear-slit nozzles in such a way as to accomplish the needed adaptable objective. Therefore, there are also several ways of designing the adaptable longitudinal linear-slit air-jet nozzle shapes (whether with evenly built-in or flared built-in linear-slit nozzles) which physically communicate with either or both singular or aggregated multiple air-jet delivery pipes. It is also important to clarify that, though the 3 and 4 air-jet longitudinal linear-slit nozzle designs have been previously illustrated as aimed to maximally impinge onto just three regions of the external windshield surfaces, there is no imposed limit as to the number of targeted regions of the respective windshields onto which the various angularly projected ejection of multi-air-jet streams are being aimed, and which depend upon the required adequate number of longitudinal multi-linear-slit nozzles that are designed and installed with various optimum angular orientations of the air-jet nozzle system. The angular orientations are set to accomplish the above mentioned objective. The visible area of interest for the driver through the respective windshields has to be divided into at least about three regions, but more targeted regions are possibly better, depending upon the increased degrees of curvature in design and shape of the installed windshields at various respective locations.

As illustrated before, among the three longitudinal linear-slit nozzles, one powerful air-jet streams or sheets or layers are oriented to eject towards the lower region of the front windshield 84, the second towards the middle region and the third towards the upper region of the front windshield 84 in the bottom-mounted nozzle system and assembly.

Again, there is no imposed limit as to the number and forceful strength of the multi-streams or layers of air-jets that can target the required multi-portions or multi-regions of the respective installed windshields.

As for the side-view mirrors, the branching linear-slit air-jets are emitted there-around from the top of the left side-view mirror and right side-view mirrors (shown respectively in FIGS. 12A,13A, 14 and 15) The delivery air-pipes and water-pipes are designed as being distributed with branches to the various windshields and side-view mirrors, depending on the designs and manufacturing needs and types and configurations of different automobiles in order to achieve various optimal and maximum wiping and cleaning and obstacle clearing capabilities.

The air compressor 78 sends the forceful pressurized air that, if needed, gets heated by the air heater 72, as automatically controlled by cold environmental conditions through the power system 64 allied with the ECU 52 plus relevant controls, or regulated by manual or automatic means triggered or activated by the driver. The air heater 72 as activated, conveys the heated air to the air compressor 78 which has an air outlet 78*x* that is connected to the main high pressure air delivery pipe 82 MAIN AFP and its subdivisions or branches. There are no limitations as to the number of aggregated multiple pressurized air delivery pipes connected from the air-outlet 78*x*. Rather, it depends on the requirements of the surface areas to be wiped or cleaned. However, it is also possible that instead of using multiple pipes, the same application would be achieved by branching out from the same 82 MAIN AFP into various branching air-pipes into different locations. There can also be a combination of both singular and aggregated multiple longitudinal linear-slit and/or wavy-slit air-and-water delivery pipes with linear-slit and/or wavy-slit air-jet and water-jet nozzles. The aggregated delivery pipes can also be switchable in delivering either or both pressurized air-jet volume or water-jet volume. The air compressor 78 gets power from the battery 66 and/or 68 which are parts of power system 64 and managed by the ECU 52 and relevant controls CTL.

The present invention also includes, but is not limited to several different types of longitudinal linear-slit or wavy-slit nozzles. One kind has a set of linear-slit nozzles that are built-in to cause the jetting of powerful pressurized air-jets coming from a singular delivery air-pipe as shown in FIGS. 7 and 11, which are of the non-vibrating type of linear-slit or wavy-slit nozzles respectively, and also depending upon the proper adequate and maximal applicability for the front or rear or side windshields. The other type nozzles have built-in set of linear-slit or wavy-slit nozzles or a combination of both that can cause the jetting of powerful pressurized air-jets coming from individual separate aggregated multiple longitudinally aligned linear-slit or wavy-slit pipes which are effectively connected and arranged coordinating together as shown in the sectional views in FIGS. 9B. 28A, 29A, 30A, 30B, 30C, 31A, 31B and 31C, in order to accomplish the required effective wiping and cleaning objectives. The shapes and dimensions of the nozzles are specifically designed conducive to the curvature of the respective targeted portions of the respective windshields, and, the number of jet nozzles of the longitudinal linear-slit or wavy-slit air-pipes may vary in number, depending on the required effectiveness upon the external surfaces of the respective windshield area to be wiped, cleaned or cleared. For the applications where the surface area to be wiped, cleaned or cleared is more, then, the number of longitudinal linear-slit nozzles or wavy-slit nozzles or a combination of both can be increased to four or to five as shown in the FIGS. 36-40, 41A-45 and 54.

Note: There can be one or two or three or four or five or more of composite multiple linear-slit or wavy-slit nozzles or a combination of both, depending upon the designs and needs that are applicable to the various different kinds or styles or types of automotive vehicles, in order to attain the maximum external surface area wiping and cleaning and clearing functions of the specific automotive vehicle's windshields and/or side-view mirrors. Also, there can be various linked branches of air-pipes and/or water-pipes and nozzles for both the right and left side windshields as well as for the right and left side-view mirrors which will all have the specific kinds of nozzles situated at various applicable optimal locations. The pressurized ejected water-jet flow and air-jet flow will work in the appropriate directions that are applicable and favorable to the various windshields and/or side-view mirror components, depending on the design and constructions of the specific automotive vehicle. There can be multiple inner air-inlets and water-inlets that can be constructed which will effectively work according to the different sizes and designs of linear-slit or wavy-slit air-jet and water-jet nozzles which can effectively output the required air-jets and water-jets depending upon the various specific vehicle systems to achieve the most effective wiping, cleaning and clearing functionalities.

Basic Principle on how the Bladeless Windshield Wipers and Cleaners Generally Work for a Curved Windshield.

Again as illustrated in FIG. 7 of a typical curved singular pipe with 3-linear-slit non-oscillating type of curved external nozzles C82-*en*-1, C82-*en*-2 and C82-*en*-3, illustrate that the respective 3 forceful air-jets streams 1, 2 and 3 are ejected from the corresponding linear-slit external air-jet nozzles. These 3 forceful air-jets streams 1, 2 and 3 are delivered respectively from the curved external nozzles of the pressurized single delivery pipe 82-*s*-*ajp* in FIG. 7. They are being ejected from the respective non-oscillating non-vibrating linear-slit external air-jet nozzles, showing the first, second and third layers of powerful air-jets directed from said respective first, second and third external linear-slit air-jet nozzles. The first air-jet stream 1 is aimed in an upward direction toward the lower portion of the curved windshield. The second air-jet stream 2 is inwardly aimed upwards to target the middle portion of the curved windshield. The third air-jet stream 3 is inwardly aimed to target the upper portion of the windshield. The linear-slit external nozzles are placed running along just below the curvature of the front windshield. Each respective external air-jet nozzles releases a sustained or intermittent moving streams or sheets or layers of air-jets that are linearly angled and equidistantly released upwards. The 3 layers of non-vibrating air-jets inwardly press upon each other, so that in effect, reinforcing each other to conform and help in wiping and cleaning the curved windshield C84.

In FIG. 7, although the above are simply illustrated with just 3 ejecting air-jet layer released from the 3 non-vibrating external linear-slit nozzles that are place equidistant from each other, there can be installed more than 3 linear-slit air-jet nozzles that are of the non-vibrating or vibrating types which are inwardly angulated to eject more forceful vibrating air-jet layers so as to cover greater regional areas or portions of the front windshield to achieve better effective wiping and cleaning capabilities.

As shown in FIGS. 30A and 31A, respectively of a curved typical multi-pipe 4-linear-slit non-oscillating but vibrating type of linear-slit external nozzles 182-*en*-1, 182-*en*-2 and 182-*en*-3 and 182-*en*-4 (in FIG. 30A), and from the corresponding linear-slit internal nozzles 182-*in*-1, 182-*in*-2 and 182-*in*-3 and 182-*in*-4 of the respective separate aligned multiple delivery pipes 180-*p*-1, 180-*p*-2, 180-*p*-3 and 180-*p*-4 (shown in 31A), the pressurized streams of forceful 4 layers of vibrating air-jets are delivered by compression forces through the said respective delivery air-pipes and built-in jet nozzles that are hidden along the bottom external portions of the front windshield glass C84. In this case of a curved windshield C84, the effective wiping, cleaning and clearing of the curvature of the windshield, is accomplished by the inwardly angulated upward direction of the ejecting vibrating 4 streams of non-oscillating air-jets—air-jet stream 1, air-jet stream 2, air-jet stream 3 and air-jet streams 4 as being released inwardly and upwardly in relation to the proximal sectional view of the curved windshield C84. Altogether, the 4 inwardly angulated ejection of forceful vibrating moving air-jet streams 1, 2, 3 and 4, reinforce each other by pressing upon each other inwardly to conform with the curvature of the curved windshield, thus assisting in basically wiping and cleaning the curved windshield C84. These clearly show that the optimally angled ejection of 4 powerful vibrating multi-air-jet moving streams or layers are capable of better wiping and cleaning coverage of the external multi-region surfaces of curved front windshield C84 from the bottom to the middle and upper regions.

The conforming shapes of longitudinal multi-linear-slits of air-jet nozzles arranged with gradual inwardly projecting angles as built-in from the pressurized delivery pipes that follow the main shape of the windshields are the best chosen designs that can produce forceful multi-streams of inwardly projecting air-jets aimed to effectively wipe, clean and clear the external surfaces of the selected windshields. The conforming placement of the longitudinal multi-linear-slits of air jet nozzles that are built-in from the conforming pressurized delivery pipes that follow in close proximity along the shapes of the windshields and side-view mirrors are very effective designs as applied in FIG. 6 for the front windshield 84, and in FIG. 10 for the rear windshield 86, and in FIG. 12A for the right side windshields 90, and the right side-view mirror 4, and in FIG. 13A for the left side windshields 88 and the left side-view mirror 92.

Water cleaning means are also provided to externally wipe, clean or clear dirty debris stuck onto the external surfaces of the various windshields and side-view mirrors, as shown in the diagrams of FIGS. 3, 4, 5, 6, 10, 14, 15, 18, 19, 20, 21, 23, 24, 26, 27, 41A, 42A, 43A, 44A, 45, 47, 50, 51, 52, 53, 54, 55 and 57.

Note: For clarification, there are also a variety of design embodiments of delivery air-pipes and water pipes. One embodiment is designed to be of singular pipe structure; another embodiment is designed to be of composite adjacently aggregated multiple air-pipes with associated water-pipes. From each air-pipe or water-pipe there are air-jet nozzles that are of the vibrating or non-vibrating external type or internal types, each communicating and built-in from each specific air-pipe and water pipe. Each of the longitudinal linear-slit nozzles are built-in to be angled optimally in relation to each other so as to effect proper and maximal reinforcement to each other to provide cumulative forceful streams or layers of air-jets and/or water-jets to attain optimal maximum wiping and clearing and clearing of various shapes and contours of the specific windshields and side-view mirrors. As for the designs and embodiments, there are designed branching air-pipes; with some having built-in external nozzles or internal nozzles which are either or both straight longitudinal linear-slit nozzles or wavy-slit curved linear-slit nozzles as properly angulated, and, some with pipes having longitudinal branching delivery pipes with linear-slits for the uniform sustained and/or intermittent delivery of powerful multi-air-jets and water-jets streams or moving layers or sheets.

Optionally, possibly as a back-up system or sub-system, there are also some other additional alternative embodiments of the present invention that include the bladeless oscillating vibrating and/or non-vibrating structural designs, especially as shown in FIGS. 16, 17, 18, 19, 20, 21, 22, 23, 24, 25A, 26 and 27, according to the preference of the respective automotive drivers and/or passengers, and also depending on the applications so desired by the respective driver and/or passengers of the respective automotive vehicle as well as the design configuration engineering adapted by the automobile manufacturers based on the configuration of the particular automotive vehicle.

In FIGS. 16, 17, 18, 19, 20, 21, 22, 23, 24, 25A, 26 and 27, the respective optional three and two oscillating nozzles systems, assemblies and methods work by enabling the oscillating jet nozzles 82-*ojn*-1, 82-*ojn*-2 and 82-*ojn*-3, to move in an oscillating fashion, respectively, but without the prior-art annoying long-bladed wipers that stick out and distract the frontal and rearward field of vision of the driver and passengers. The main difference is that the present invention's oscillating mechanism enables the ejection of the pressurized invisible optimally angulated multi-streams or multi-layers of moving sheets of invisible air-jets for wiping and cleaning either/or both the front and/or the rear windshields without distracting the visual field of the driver and passengers. The mechanism and components of the oscillating embodiments, designs and assemblies of the present invention are hidden from the forward and rearward field of vision of the drivers and passengers, thus, eliminating the extended structural long-bladed assemblies of the conventional currently-used long-bladed system that annoys and distracts the forward and rearward visual fields of the drivers and passengers.

With the oscillating air-jet designs, as also shown in FIGS. 17, 19 and 21, near the ends of the air-jet pipes are air-jet nozzles. Fitted vibrator rings 122-*vr*-1, 122-*vr*-2 and 122-*vr*-3 are installed with the oscillating nozzles 82-*ojn*-1, 82-*ojn*-2 and 82-*ojn*-3 They are functionally capable of effectuating the vibrating of said oscillating nozzles during their oscillating motion of from left-to-right and vice versa, sustained or intermittently for releasing vibrating oscillating air-jets to accomplish wiping and cleaning action.

The oscillating nozzle system embodiment of the present invention may require some sturdy structural gliding rail support (although not shown in the simple illustration of FIG. 25A, but is anticipated by the present inventor within the scope of this oscillating embodiment of the present invention and can be further included during the engineering development phase of the present invention.

Figure 18:
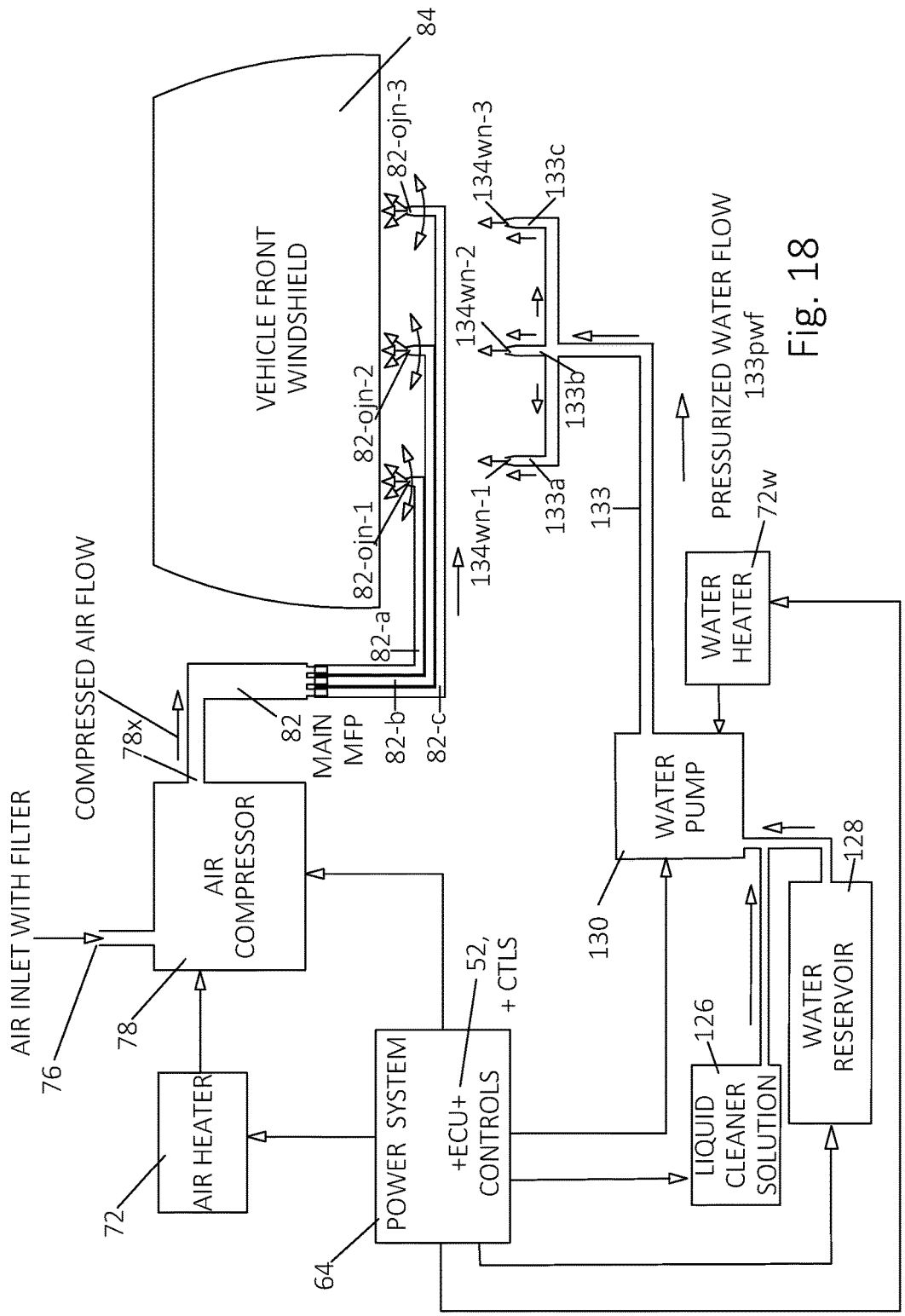

The triple oscillating multi-air-jet system in FIGS. 18 and 19 can also be used for wiping and cleaning the front windshield 84. The rear windshield 86 is being wiped and cleaned by the air-jets that are ejected from the triple oscillating type of bladeless windshield wiper shown in FIGS. 20 and 21.

Figure 23:
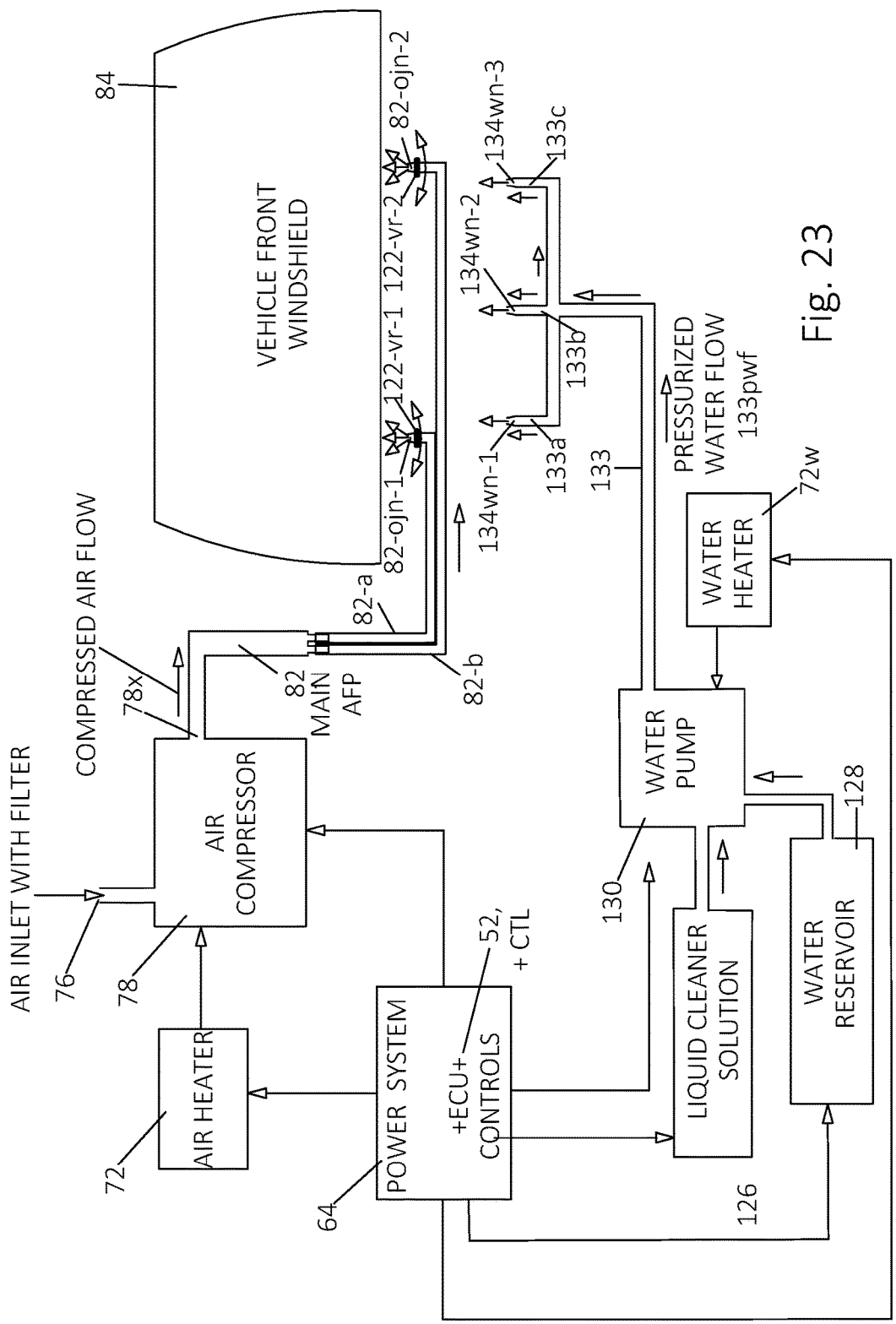

In FIG. 22 the bladeless dual oscillating system show nozzles 82-*ojn*-1 and 82-*ojn*-2 of the multi-air-jet windshield wipers and cleaners. They are shown installed at the front and rear windshields, respectively as shown in FIGS. 23 and 24. The dual oscillating multi-air-jet system shown in FIGS. 23, 26 and 27 is illustrated as wiping the front windshield 84. In FIG. 24 the dual oscillating multi-air-jet system is shown as wiping the rear windshield 86.

In FIGS. 26 and 27 the optional oscillating dual system can be used in combination with the longitudinal linear-slit nozzle system.

In FIGS. 18, 19, 20 and 21 of the triple oscillating type embodiment (shown in FIGS. 16 and 17), the air compressor 78 generates the high-velocity pressurized air-jets delivering to the front windshield 84 (in FIGS. 18 and 19), and the rear windshield 86 (in FIGS. 20 and 21), through the high pressure delivery air-pipes 82-*a*, 82-*b* and 82-*c*. The high pressure air-jets emerging from the 3 respective oscillating air-jet nozzles can wipe, clean and clear the rain, snow, ice and mist from the external surfaces of the respective windshields. The air compressor 78 is connected to air inlet with filter 76 that sucks in air from the ambient immediate environment. Since the ambient air is not clean all the time, there is required a filter to clean the impurities entering the air inlet. The air compressor 78 is connected to the air heater 72, which when activated, heated pressurized air is led through air outlet 78*x* which is connected to the main high pressure air delivery pipe 82-MFP and subdivides into high pressure air delivery pipes 82*a*, 83*b* and 82*c*.

NOTE: It is very important to clarify and emphasize that although the oscillating designs and configurations and mechanisms are presented as another alternative embodiment of the present invention, it can be entirely eliminated for achieving simplicity in applicable adequate streamlining of the device and system installations with less moving structural parts and lower maintenance cost. However, the oscillating type can be used as an optional added back-up with the longitudinal pipe linear-slit nozzles applicable for either/or both front and rear windshields, but installed below the frontal view of the front windshield, and placed above the rear field of view of the rear windshield, and depending upon the design and configuration of the modern automobile, and the desired additional needs of the driver/owner and the specific manufacturer.

In the simplified alternate optional oscillating nozzle embodiments of the present invention, generally, shown in FIGS. 16, 17 and 22, the oscillating windshield wiper driving mechanism consists basically of an electric motor 150 and a worm gear 152 which is connected to the shaft of the electric motor 150 which spins the worm gear 152 which in turn rotates the worm wheel 154 for the gear reduction that provides power to the respective oscillating jet nozzles. A worm gear reduction is used since it both reduces the speed of the motor and increases the power by a factor of about 50 times. So, when the wiper motor is spinning, the resulting speed after the worm gear is 50 times slower and the resulting torque is 50 times greater. This high torque is needed to move the other components of the respective oscillating air-jet nozzles quickly and powerfully. Linkages 156, 158, 160, with arms 162*a* and 162*b* shown in the FIGS. 16, 17 and 22 are connected together with respective pivot joints to convert the rotational output of the electric motor 150 into the oscillating motion of the oscillating nozzle holders 168*a*, 68*b* and 168*c*, respectively. The linkage uses a cam (not shown in figure) attached to the worm gear reduction. As the motor and gearing spins, the cam operates a long arm 160 by moving it back and forth. This long arm is connected to the respective smaller arms 162*a*, 162*b* and 162*c*, respectively which attach to the respective nozzle holders, 172*a*, 172*b* and 172*c*, respectively. This combined linkage and arms push and pull with the converted forces to move the nozzle holders back and forth. The respective nozzle holders grip the respective oscillating nozzles 82-*ojn*-1, 82-*ojn*-2 and 82-*ojn*-3, respectively along with the respective air-jet pipes firmly, and direct the jets of air onto the selected windshields along with its oscillating operations to clean and clear the unwanted materials on the surfaces of the windshield. The degrees of oscillation of the nozzle holders depend on the dimensions of the cam attached to the gear reduction. The distance between the respective nozzle holders is adjusted as per the required adequate optimum wiping action of the oscillating air-jets onto the respective windshields. In case of a curved contour of the respective windshield(s), the long shaft 160 can be designed and engineered as optimally pliable curved (not shown) to follow in accordance to the curvature of the curved windshield. If the oscillating design is chosen with vibratory rings, it is better to engineer the relevant embodiments with sturdy self-adjusting railing tracks (not shown in the drawing). And, as illustrated in the sectional view in FIG. 46A, the release of oscillating powerful invisible air-jets are not annoying or distracting to the drivers and passengers during operations as shown in the direction of invisible streams of the angular air-jets streams indicated by the upward directional flow of air-jets in case of the bottom-installed location of the oscillating air-jets arms, from which the internal air-jet nozzles 82-*ojn*-1, 82-*ojn*-2 and 82-*ojn*-3 eject the oscillating non-vision-distracting air-jets onto the targeted bottom, middle and upper portions of the curved windshield as shown, respectively, in relation to the sectional view of a curved windshield C84, and all operating mechanical components are located below the driving field of sight of the driver and passengers. The oscillating air-jet arms can also be fitted with vibrator rings (in FIGS. 17 and 22) so that when activated to vibrate and oscillate, controlled vibrating multi-streams or layers or sheets of invisible air-jets can be ejected from the corresponding internal vibrating nozzles to aid in the greater wiping, cleaning and clearing of the selected windshields. In FIG. 25A, however, the angled upwards direction of ejected invisible air-jet layers represented by the broken lines, are not illustrated in the vibratory mode, since the sectional view of the oscillating nozzle is not shown as equipped with a vibrator ring.

In FIG. 25A the oscillating embodiment of the present invention is shown in sectional view. It illustrates that the ejected air-jet streams or sheets or layers are aimed also to angularly and closely follow the curvature of the windshield C84. This particular view shows the inner-angled oscillating internal nozzles that eject powerful air-jet streams or sheets or layers emerging from respective internal nozzles being operational as closely adjacent to the curvature of the curved windshield C84. The powerful high pressurized air-jet layers or streams ejected in either a sustained or intermittent fashion are ejected from the oscillating air-jet nozzles located at the bottom and aimed upwardly in the case of the front windshield.

In FIG. 25C, there are Illustrated the sectional view of the staggered arrangement of the linear-slits of the internal oscillating nozzles X-82-*ion*-1, X-82-*ion*-2 and X-82-*ion*-3 of the oscillating jet arm as seen from view P of FIG. 25B. The sectional view of the stacked arrangement of linear-slits of the internal oscillating nozzles Y-82-*ion*-1, Y-82-*ion*-2 and Y-82-*ion*-3 of the oscillating jet arm is shown, as seen from point-of-view Q of FIG. 25B. Shown in FIGS. 12A, 13A, 14, 15, 18, 19, 20, 21, 23, 24, 26 and 27, the air compressor 78 gets power from the sufficient electrical supply from power supply 64 (also shown also in FIGS. 1-5) and managed by the ECU 52 and relevant controls.

In FIGS. 14, 15, 18-21, 23 and 24, the water-jet system has a water reservoir 128, water pump 130 and liquid cleaner solution 126. Water pump 130 gets the power from the battery 66 and/or battery 68 (in FIGS. 3-5) which are part of power system 64, and regulated by ECU 52 and controls CTL. The purpose of the water-jet system is to pump water-jets onto the selected windshields so as to clean the external surfaces of the respective selected windshields and side view mirrors for better visibility of the driver and passengers. The water reservoir 120 stores and supplies the water to water pump 130. Water pump 130 in the water-jet system pumps the pressurized water through the water-jet nozzles onto the selected windshields and side view mirrors (in FIGS. 14 and 15), and when needed mixed with liquid cleaner solution 126.

In FIGS. 6,18 and 19 water delivery pipe 133 branches into 133*a*, 133*b* and 133*c*. In FIGS. 20 and 21 water delivery pipe 133 branches into 133*y* and 133*x*.

There can be no limitation as to the number of needed air-jet delivery pipes as connected to the air outlet 78*x* from the air compressor 78, and depending also on the requirements of the surface areas to be wiped, cleaned and cleared. Either or both using singular air-jet pipe and/or aggregated multiple air-pipes, and the branches of the said air-pipes can be structured and fitted at the applicable relevant effective different positions and locations that will be most beneficial according to the designs of the automobile in which the invention is to be installed and applied.

As for the rear windshield in FIGS. 20, 21 and 24, it is preferred that the air-jets and water-jet delivery pipes be located at the top, and the air-jets and water-jets are directed downwardly as being ejected from the top portions, and as in the case also of the left side windshields and the right side windshields, in FIGS. 14 and 15, the air-jets are also directed from the top and jetting downwardly, and in the case of the left side-view mirrors and right-side-view mirror, also shown in FIGS. 14 and 15, those air-jets and water-jets from the top are aimed optimally angled to be effectively jetting downwards.

The longitudinal delivery pipe with longitudinal linear-slit air-jet nozzle 82-*s*-*ajp* in FIGS. 6, 10, 12A, 13A, 14 and 15, are designated for the effective wiping of the front, rear, right-side and left-side windshields and left and right side-view mirrors, respectively. The present inventive device mechanisms are placed at the bottom of the front windshield 84 (in FIG. 6) and below the field of vision of the driver and passenger(s). In FIG. 10, the longitudinal linear-slit air-jet pipe is placed across the top portion of the rear windshield 86, above the field of vision of the driver and passengers. It is also preferred that the longitudinal linear-slit pipes with linear-slit air-jet and water-jet nozzles be placed at the top portions of the right-side windshields and left-side windshields and left and right side-view mirrors, respectively (shown 13A and 14 and 15).

Although not shown in these drawings, the resultant aerodynamics of ambient air flow being met by the forward moving automobile will support a pressing smoother gliding action upon the upwardly and inwardly flowing air-jet streams or sheets or layers that invisibly flow onto the contoured external surfaces of the front windshield 84.

Other delivery pipes illustrated in FIGS. 28A-31C, show sectional views of a bottom-mounted multiple aggregated three and four delivery air-pipes, respectively, and each pipe having external and internal angled linear-slit air-jet nozzle, respectively are aimed for the effective wiping and clearing of the external surface of the curved front windshield C84. Each of the aggregated separate multiple air-jet delivery pipe are adjacent to each other, in close proximity to the curved front windshield C84. From the respective linear-slit external and internal nozzles, there can be relayed different variable pressurization forces of compressed air which can be optimally ejected from the respective linear-slit air-jet nozzles that are aimed to maximally wipe, clean and clear the front curved front windshield C84; the ejecting forceful air-jet streams or layers or sheets are capable also of being regulated and automatically calibrated with pre-adjusted compressed air pressures to be released as per the needed assigned air compression forces and air-jet velocities and strengths to help effectively carry on with the desired air-jet pressures coming from the respective linear-slit external and internal nozzles, as regulated by the ECU 52 and the specific controls made by the driver.

Also, as illustrated in the sectional views of FIGS. 29A and 30A, in the bottom-mounted longitudinal multiple aggregated air-pipes having 4-linear-slit external nozzles located adjacent and running along the curved front windshield C84, depending upon the speed of the automotive vehicle, the momentum of the onrushing ambient air will also play an important factor in pressing the four powerful air-jet streams or layers or sheets of invisible air-jets in an inward direction toward the curvature of the front windshield C84, and, thus helping in the further effectiveness in clearing raindrops, snow and dust or mud and preventing them to adhere on the external surfaces of the curved front windshield C84.

In FIGS. 28A-31A, since the air delivery pipes are separate from each other, the delivered compressed air running through each air delivery pipes 180-*p*-1, 180-*p*-2, 180-*p*-3 and including 180-*p*-4 (in FIGS. 29A-31A) can be adequately regulated, in such a way that the second 180-*p*-2 delivery pipe can deliver a more powerful pressurized air-jet than the first air delivery pipe 180-*p*1, and the third air delivery pipe 180-*p*-3 and the fourth air-delivery pipe 180-4 can convey a more powerful pressurized air-jet force than the first, second and third air delivery pipes. The resultant combination of the gradually incremental pressurized forcefully powered multi-air-jet streams 1, 2, 3 and 4 or multi-layers or moving sheets of invisible air-jets, will result into the greater coverage of cleaning and wiping of the front curved windshield C-84.

However, the timing, frequency and degrees in the variation of pressurization applied into the separate air-jet delivery pipes can be electronically controlled as to effect the best maximum wiping and cleaning and clearing capabilities on the various windshields and side-view mirrors.

In FIG. 28A, it also shows a sectional view of a bottom-mounted three independent air-jet delivery pipes also labeled in FIG. 28B as 180-*p*-1, 180-*p*-2 and 180-*p*-3. From each of the independent multiple aligned air-jet delivery pipes are the correspondingly built-in linear-slit external air-jet nozzles, respectively labeled in FIGS. 28A and 28B as 182-*en*-1, 182-*en*-2 and 182-*en*-3.

In FIG. 29A illustrates also the sectional view of the bottom-mounted aggregated multiple composite basically non-vibrating 4-linear-slit non-oscillating type of nozzles system. The four separate air-jet delivery pipes 180-*p*-1, 180-*p*-2, 180-*p*-3 and 180-*p*-4 show that the first three non-vibrating air-jets streams are being inwardly aimed onto the curved windshield C83, and wherein the first, second and third inner non-vibrating sustained or intermittent air-jets streams are respectively projected toward the lower, middle and upper regions of the front curved windshield C84, and that the fourth sustained or intermittent air-jet streams act as a forceful shield or barrier to bounce off or deflect the first contact of raindrops, snow and dust particles that rush against the said sectional view of the front curved windshield C84 of a forwardly moving automobile using the bladeless windshield wiper/cleaner/clearer of the present invention.

In FIGS. 29A and 29B, the aggregated multiple four air-pipes, show that each separate delivery pipe 180-*p*-1, 180-*p*-2, 180-*p*-3 and 180-*p*-4 having inwardly angled linear-slit external air-jet nozzles labeled in FIG. 29B as 182-*en*-1, 182-*en*-2, 182-*en*-3 and 182-*en*-4, being aimed to effectively wipe, clean and clear the external surface of the curved front windshield C84. Each of the aggregated separate air-jet delivery pipes 180-*p*-1, 180-*p*-2, 180-*p*-3 and 180-*p*-4 are adjacent to each other, in close proximity to the curved front windshield C84. From the respective 4-linear-slit air-jet external nozzles 182-*en*-1, 182-*en*-3, 182-*en*-3 and 182-*en*-4 (in FIG. 29B), there can be relayed different variable forces of compressed air which can be optimally ejected from the four respective linear-slit air-jet nozzles that are aimed to maximally wipe, clean and clear the front curved front windshield C84, as regulated by the ECU and the specific controls made by the driver.

In case of the longitudinal air-jet delivery pipes with built-in linear-slit nozzles, they follow the shape or contour of the windshields and are positioned and optimally angled to release powerful layers or streams or sheets of air-jets to cover the maximum external shapes or contours of the respective windshields for effective wiping, cleaning and clearing purposes to establish the best visibility for the driver and passengers of the automotive vehicle. The nozzles connected to the delivery air-pipes are hidden at the bottom or at the top of the specific windshield, and not within the forward, rearward and right-side and left-side visibility of the driver and passengers of the automotive vehicle.

In FIGS. 41A, 43A, 44A, 44B, 45 and 54, there are shown that by adding a vibrator 122 incorporated with the air-jet and water-jet delivery pipes system, will even maximize the wiping and cleaning and clearing capabilities onto the various windshields because the releasing ejected air-jets and water-jets coming from the respective vibrating air-jet and water-jet nozzles will be intensified in vibrating while in the process of wiping, cleaning and clearing operations. Incorporating the vibrator 122 with the water-jet delivery pipe system along with the air-jet delivery pipe system are shown in the compound aggregated multi-pipe but separate air-pipe and water-pipe delivery system as illustrated also in FIGS. 41A, 43A, 44A, 44, 45 and 54.

The vibrator 122 is not limited to causing ordinary vibration waves, but could also employ a combination of ultrasonic vibration waves and/or acoustic waves (which may include sonic silencers if needed, though said sonic silencer is not shown in the drawings); acoustic silencer, when needed will help minimize acoustic disturbance to the drivers and passengers of the modern state-of-the-art automobiles. There can be more than three angulated linear-slit external and/or internal linear-slit nozzles that may be required to eject the forceful numbers of vibrating or non-vibrating moving streams or layers of moving air-jets and/or water-jets that can be ejected from singular or aggregated multiple air-pipes, depending upon the shapes and contours of the curved and/or flat windshields.

In the bottom-mounted non-oscillating vibrating system and assembly of FIGS. 30A, 31A, 41A and 43A, and 45 shows a vibrator 122 placed at the bottom of the nozzles to create a vibratory motion to the nozzles, so that the powerful streams or sheets or layers of air-jets are made to vibrate in their upward paths, further helping in achieving greater effective wiping and cleaning of curved windshields to remove and prevent adherence of any particulate matters such as rain, snow and ice, etc.

In the top-mounted non-oscillating vibrating system and assembly of FIGS. 44A, 44B and 54, the addition of vibrator 122 placed at the top of the nozzles creates a vibratory motion to the nozzles, so that the powerful streams or sheets or layers of air-jets and water-jets are made to vibrate in their downward paths, for further helping in achieving greater effective wiping and cleaning of curved rear windshields and right-side and left-side windshields to better remove and prevent adherence of any particulate matters such as rain, snow and ice, etc.

In FIG. 30B which is a magnified sectional view of part of the sectional view of FIG. 30A there is shown the sectional view of the angled 4 separate longitudinal linear-slit external nozzles 182*en*-1, 182*en*-2, 182*en*-3 and 182*en*-4. Each of the external nozzle originating separately from the corresponding sectional views of the adjacent composite aggregated yet-separate multi-air-pipes 180-*p*-1, 180-*p*-2, 180-*p*-3 and 180-*p*4; additionally in this FIG. 30B also shows the sectional view of the roundish rod vibrator 122 embedded within the bottom of the aggregated or compositely adjacent separate aligned air-pipes or air-tubes that are held firmly together by external pipe holder 184-*eph*.

In FIG. 30C there is shown the flattened vibrator 122 placed at the bottom of the aggregated or compositely adjacent separate aligned air-pipes or air-tubes that are held firmly together by external pipe holder 184-*eph*.

The bottom-mounted non-oscillating vibrating multiple aggregated longitudinal air-pipes with angled vibrating 4-linear-slit external nozzles 182-*en*-1, 182-*en*-2 and 182-*en*-3 and 182-*en*-4 shown in the sectional views of FIG. 30A, and the bottom-mounted 4-linear-slit vibrating internal nozzles 182-*in*-1, 182-*in*-2, 182-*in*-3 an 182-*in*-4 shown in the sectional views of FIG. 31A actually help accentuate and maximize the wiping, cleaning and clearing of the curved windshield C84, and wherein in FIG. 30A, illustrates the vibrating upward directions of moving air-jet streams or layers or moving air-jet sheets being represented by the angled corrugated upward vibrating directions of the moving air-jets stream or layers or sheets for greater wiping and cleaning and clearing effectiveness as applied to the curved windshield C84. In FIGS. 30A and 31A illustrate a sectional view of a curved windshield C84, which is being wiped and cleaned by the inward-angled corrugated upward direction of vibrating moving layers or streams of air-jets 1, 2, 3 and 4 flowing with interspaced gaps and represented by the corrugated arc V-2; said vibrating air-jet streams are being ejected from the sectional views of the 4 longitudinal linear-slit external and internal nozzles, respectively. The sectional views of the aggregated or compositely adjacent multiple 4 separate air-pipes or air-tubes are shown in FIGS. 30A and 31A. The sectional view of the roundish vibrator 122 is shown as embedded at the bottom of the aggregated adjacently aligned 4 separate air-pipes or air-tubes 180-1, 180-2, 180-3 and 180-4 labeled in FIGS. 30B and 31B.

As shown, FIG. 31B illustrates a magnified sectional view of the four longitudinal linear-slit-internal nozzles 182-*in*-1, 182-*in*-2, 182-*in*-3 and 182-*in*-4 and showing the sectional view of the aggregated adjacent separate multi-air-jet pipes 180-*p*-1, 180-*p*-2, 180-*p*-3 and 180-*p*-4; also showing the sectional view of the roundish rod vibrator means 122 embedded within the bottom of the aggregated adjacent separate multiple delivery air-pipes held firmly together by external pipe holder 184-*eph*.

In FIG. 31C illustrating a magnified sectional view of the respective 4 internal nozzles 182-*in*-1, 182-*in*-2, 182-*in*-3 and 182-*in*-4 are shown and labeled. The flattened vibrator 122 is shown under the aggregated adjacent 4 delivery air-pipes or air-tubes which are firmly held together by the external pipe holder 184-*eph* labeled also in FIG. 31B.

In FIG. 32A which is a generally top view of the longitudinal curved design of a curved singular air-jet pipe C82-*s*-*ajp*, there is illustrated a curved linear-slit mono-jet nozzle C82*en* which is clearly illustrated in FIG. 32D as an external nozzle corresponding with FIG. 32A, as taken from broken line D-D of FIG. 32A.

In FIG. 32B which is also a generally top view of a longitudinal curved design of a singular air-jet pipe C82-*s*-*ajp*, illustrates three curved linear-slit external nozzles namely, C82-*en*-1, C82-*en*-2 and C82-*en*-3 which run equidistantly along the uniform curvature of the said singular air-jet pipe C82-*s*-*ajp*; and in FIG. 32E, the interior of C82-*s*-*ajp* is shown as taken from broken line E-E of FIG. 32B and exposing the 3 corresponding built-in external air-jet nozzles, labeled as C82-*en*-1, C82-*en*-2 and C82-*en*-3 in FIG. 35E. The curved orientation of the longitudinal curved air-jet pipe C82-*s*-*ajp* that can be placed along the curved length of the windshield, wherein the equidistant longitudinally-running 3 linear-slit nozzles C82*en*-1, C82*en*-2 and C82*en*-3, being situated along the said curved air-jet pipe.

In FIG. 32C which is a top view of the longitudinal curved singular air-jet pipe or tube which can be placed along the curved windshield, illustrates that the equidistant and longitudinally-running curved 4 linear-slit external nozzles, C82*en*-1, C82*en*-2, C82*en*-3 and C82*en*-4 are situated along the singular air-jet pipe C82-*s*-*ajp*.

In FIG. 32D are shown the sectional view taken from line D-D of FIG. 32A of the curved singular air-jet pipe C82-*s*-*ajp* and the built-in mono air-jet linear-slit external nozzle C82*en* internally communicating with said singular air-jet pipe C82-*s*-*ajp*.

In FIG. 32E which is a sectional view taken from line E-E of FIG. 32B, illustrates the 3 linear-slit external nozzles C82*en*-1, C82*en*-2 and C82*en*-3, extending from and internally communicating with said singular air-jet pipe C82-*s*-*ajp*.

In FIG. 32F which is a sectional view taken from line F-F of FIG. 32C, illustrates the 4 curved linear-slit external nozzles, C82*en*-1, C82*en*-2, C82*en*-3 and C82*en*-4 that extend from and internally communicating with said singular air-jet pipe C82-*s*-*ajp*.

In FIG. 33A which is a top view of a longitudinal straight air-jet pipe S82-*s*-*ajp* with built-in longitudinally running equidistant 3 straight linear-slit external nozzles, S82-*en*-1, S82-*en*-2 and S82-*en*-3, situated uniformly along the straight singular air-jet pipe, and lucidly illustrating various parts.

In FIG. 33B which is a top view of a longitudinal straight air-jet pipe S82-*s*-*ajp* illustrates the 4 straight linear-slit external nozzles S82-*en*-1, S82-*en*-2, S82-*en*-3 and S82-*en*-4 that are uniformly and longitudinally placed along the straight singular air-jet pipe S82-*s*-*ajp*.

In FIG. 33C which is a sectional view taken from line G-G of FIG. 33A, illustrates a singular air-jet delivery pipe S82-*s*-*ajp* with three linear-slit external nozzles, S82-*en*-1, S82-*en*-2 and S82-*en*-3, extending from and internally communicating with the singular air-jet pipe.

In FIG. 33D which is a sectional view taken from line H-H of FIG. 33B, illustrates the 4 linear-slit-external nozzles S82en-1, S82en-2, S82en-3 and S82en-4 extending from and communicating with the straight singular air-jet pipe S82-s-ajp In FIG. 34A which illustrates a generally top view of the curved singular longitudinal air-pipe C82-s-ajp that can be positioned either on top or at the bottom and along the curved windshield, and, also illustrating the curved longitudinally running 2 linear-slit internal nozzles C82-in-1 and C82-in-1 situated centrally along the curved longitudinal singular air-pipe C82-s-ajp; also showing that the built-in linear-slit internal nozzles are of widening dimension or flared from the left side toward the right side.

In FIG. 34B there is shown a generally top view of the curved singular longitudinal air-pipe C82-s-ajp that can be placed either on top or at the bottom and along the curved windshield, and, also illustrating the equidistantly and longitudinally running 3 linear-slit internal nozzles C82-in-1, C82-in-2 and C82-in-3 situated centrally along the singular air-pipe or air-tube; each of said 3 linear-slit internal nozzles are of widening dimension and flared from the left side to the right side of air-pipe C82-s-ajp.

In FIG. 34C there is shown a generally top view of the curved singular air-pipe C82-s-ajp that can be placed along either on top or at the bottom of a curved windshield, and, also illustrating the equidistantly and longitudinally running 4 linear-slit internal nozzles C82-in-1, C82-in-2 and C82-in-3 and C82-in-4 situated centrally along the curved singular longitudinal air-pipe C82-s-ajp; also showing those said internal nozzles which are of the same dimension and not flared from the left side.

In FIG. 34D there is shown the sectional view taken from broken line I-I of FIG. 34A showing the sectional view of the curved 2 linear-slit internal nozzles C82-in-1 and C82-in-2 that are situated as built-in with a portion of the sectional view of the curved singular longitudinal air-pipe C82-s-ajp.

In FIG. 34E there is shown the sectional view taken from broken line J-J of FIG. 34B, and showing the sectional views of 3 linear-slit internal nozzles C82-in-1, C82-in-2 and C82-in-3 that are situated as built-in with part of the sectional view of the curved singular longitudinal air-pipe C82-s-ajp.

In FIG. 34F there is shown the sectional view of FIG. 34C taken from broken line K-K of FIG. 34C, and showing the sectional view of the 4 linear-slit internal nozzles C82-in-1, C82-in-2 and C82-in-3 and C82-in-4 that are formed as built-in with part of the sectional view of the curved singular longitudinal air-pipe C82-s-ajp.

In FIG. 35A illustrates a generally top view of a singular longitudinal straight air-jet pipe S82-s-ajp with longitudinally running equidistant straight 3 air-jet linear-slit internal nozzles S82in-1, S82in-2 and S82in-3 situated along the top view of the straight singular longitudinal air-pipe S82-s-ajp.

In FIG. 35B which illustrates a generally top view of a straight singular longitudinal air-pipe or air-tube S-82-s-ajp with 4 linear-slit internal nozzles S82in-1, S82in-2, S82in-3 and S82in-4 that are longitudinally and equidistantly running along the top view of the straight singular longitudinal air-pipe S82-s-ajp.

In FIG. 35C there is shown the sectional view taken from broken line L-L of FIG. 35A, showing the sectional view of the straight singular air-jet pipe or air-tube with 3 linear-slit internal nozzles C82-in-1, C82-in-2 and C82-in-3 that are situated as built-in with part of the sectional view of the straight singular longitudinal air-pipe S82-s-ajp.

In FIG. 35D there is shown the sectional view taken from broken line M-M of FIG. 35B, showing the 4 linear-slit internal nozzles S82in-1, S82in-2, S82in-3 and S82in-4 that are situated as built-in with part of the sectional view of the straight singular longitudinal air-pipe S82-s-ajp.

In FIG. 36 which a generally top view with partial side-sectional view showing the vibrator 122 imbedded with a composite aggregated curved 9-linear-slit jet pipe system having 3 sets of aggregated curved multi-jet pipes comprising: the inner curved jet pipe with 3 inner equidistantly running curved linear-slit nozzles, the middle curved jet pipe with 3 equidistantly running curved linear-slit nozzles, and the outer curved jet pipe with 3 equidistantly running curved linear-slit nozzles. The linear-slit nozzles are of equal width dimension and can either be built-in as external nozzles or internal nozzles or a combination of both, depending upon the desired designs of the manufacturers that will better suit the design of the specific automobiles.

FIG. 37 illustrates a generally top-view and partial side-view of an embodiment of Type A of a composite aggregated straight jet pipe system (with vibrator) showing 7 straight linear-slit nozzles system, and, illustrating the 3 equidistant straight linear-slit internal nozzles being located in the inner segment, the 2 equidistant straight linear-slit internal nozzles being set farther apart and located in the middle segment, and the 2 equidistant straight linear-slit internal nozzles being set near each other at the outer periphery and located in the outer segment, and also partially showing the aggregated composite but separate corresponding multiple longitudinal jet pipes embedded with the sectional view of the curved vibrator, which are together held firmly by a sturdy external pipe holder.

In FIG. 38 there is shown a top-view and partial side-view of another embodiment which is of the Type B composite aggregated 3 independent curved delivery jet pipe system (with vibrator 122). It illustrates the 7-composite curved built-in linear-slit nozzles system, wherein 3-equidistant curved linear-slit nozzles being located in the inner pipe segment, 2-equidistant curved linear-slit nozzles being set farther apart and located as built-in from the middle delivery pipe segment, and 2-equidistantly located curved linear nozzles being set near each other at the outer periphery and located in the outer delivery pipe segment. The aggregated but separate corresponding water-pipe and air-pipes are embedded firmly with the sectional view of the curved vibrator 122 and held sturdily by external pipe holder 184-eph.

In FIG. 39 there is illustrated a top-view and partial side-view of an embodiment of the Type C composite aggregated system of straight independent but clustered pipes (with vibrator 122) having 7-wavy-slit nozzles, wherein 3-wavy-slit nozzles being oppositely positioned against each other and located along the inner pipe segment, and 2-wavy-slit nozzles set oppositely positioned against each other and located along the middle pipe segment, and 2-wavy-slit nozzles being set evenly and uniformly positioned along with each other and located at the outer pipe segment, and also partially showing the aggregated composite but separate corresponding delivery pipes embedded firmly with the sectional view of the curved vibrator 122.

In FIG. 40 there is illustrated a top view and partial side-view of an embodiment of the Type D composite aggregated curved pipes system (with vibrator 122) having 7-wavy-slit internal nozzles, wherein the curved 2-wavy-slit internal nozzles follow equidistant paths along each other and being located along the inner segment, and a set of curved central 2-wavy-slit internal nozzles that follow equidistant paths running along each other and located along the middle segment, and a set of curved 3-linear-slit curved non-wavy-slit internal nozzles following equidistant paths and located along the outer segment, and also partially showing the aggregated composite but separate corresponding water-pipe and air-pipes embedded with the sectional view of the curved vibrator 122 held firmly together within the sturdy pipe holder.

FIG. 41A illustrates a sectional view of a bottom-mounted composite aggregated 10-vibrating linear-slit air-jets and water-jets internal nozzles system. It shows the sectional view of the inner vibrating air-jet 3-linear-slit internal nozzles and inner air delivery pipe, the central vibrating water-jet 3-linear-slit internal nozzles and central water-pipe, and the outer vibrating 4-linear-slit internal air-jet nozzles built-in from the outer air-pipe. This FIG. 41A illustrates the upward flow directions of the corresponding vibrating inner air-jets and vibrating central water-jets streams and outer vibrating outer air-jets streams, which are respectively represented by corrugated arc V-2 showing the upward flowing vibrating streams of water-jets and vibrating streams of air-jets. The adjacent sectional view of a curved windshield C84 and the aggregated composite but separate corresponding water-pipe and air-pipes include an embedded sectional view of the curved vibrator 122, altogether held firmly by the sectional view of a sturdy external pipe holder 184-*eph*. V-1 represents the corrugated back and forth and front and back vibrations of the water pipe and air pipes and the pipe holder as influenced by the imbedded vibrator 122.

In FIG. 41B is a magnified sectional view of the composite aggregated but separate inner and outer air-pipes and central water-pipe shown in FIG. 41A. It shows also the sectional view of the curved vibrator 122 embedded below the said inner and outer air-pipes and central water-pipe which are held firmly in place by the enclosing external pipe holder 184-*eph*.

In FIG. 41C, the enlarged sectional view of the same composite aggregated vibrating 10 linear-slit air-jet and water-jet delivery pipes of FIG. 41B with the imbedded vibrator 122, clearly show the inner air pipe with the built-in 3 internal nozzles labeled as Group A of 3-vibrating C82-*x* internal nozzles, the central water pipe with built-in Group B of 3-vibrating C82-*y* internal nozzles, and Group C of 4-vibrating C82-*z* internal nozzles, and, wherein said air-jet and water-jet delivery pipes are held firmly in place by the external pipe holder 184-*eph*.

In FIG. 42A there are shown the bottom-mounted sectional view of the non-vibrating inner and outer air-jets with central non-vibrating water-jets system, and showing the smooth upward directions of the corresponding non-vibrating moving layers or streams of air-jets and water-jets as being ejected smoothly from a sectional view of a composite curved 10-non-vibrating system of air-jets and water-jets internal nozzles, and, also showing the adjacently placed sectional view of a curved windshield C84. The 3 sets of separate but aggregated inner and outer air-jet delivery pipes and the central water-jet delivery pipe are held in firm position by the sturdy external pipe holder 184-*eph*.

In FIG. 42B, there is shown a magnified sectional view of a portion of the drawing of FIG. 42A, and illustrating also the composite curved arrangement of the 10-non-vibrating system of air-jets and water-jet linear-slit internal nozzles formed from the aggregated curved arrangement of the adjacent delivery pipes such as the inner air-jet delivery pipe, the central water-jet delivery pipe and the outer air-jet delivery pipe, all being held firmly as embedded optimally within the external composite curved pipe holder 184-*eph*.

In FIG. 42C there is illustrated a similar drawing as shown in FIG. 42B with labels such as Group A of non-vibrating 3-internal nozzles 182-*x*, Group B of non-vibrating 3-internal nozzles 182-*y*, and Group C of non-vibrating 4-internal nozzles 182-*z*, which are built-in from the corresponding aggregated groups of firmly held curved arrangement of delivery air-pipes and water-pipe. The 3 sets of air-jet and water-jet delivery pipes are held in firm position by the sturdy curved external pipe holder 184-*eph*.

FIG. 43A shows a bottom-mounted sectional view of the vibrating inner and outer air-jets with central water-jets system, and, also showing the adjacent sectional view of a curved windshield C84, and, illustrating the upward corrugated directions of the vibrating inner and outer moving layers or streams of air-jets and vibrating central water jets being forcefully ejected from the various composite groups of vibrating 10-internal air-jet nozzles and water-jet nozzles; a sectional view of a longitudinal fluid suctioning pipe FSP is shown placed at the top portion.

In FIG. 44A there are shown a sectional view of a top-mounted composite curved 10-vibrating linear-slit internal air-jets and water jets nozzles system, and showing the sectional view of the inner vibrating water-jet linear-slit internal nozzles and inner water-pipe, the central vibrating air-jet linear-slit internal nozzles and central air-pipe, and the outer 4-vibrating linear-slit internal air-jet nozzles and the outer air-pipe; also showing the downward flowing directions of the corresponding vibrating water-jets and vibrating air-jets streams or layers, represented by the corrugated arc V2 with up and down set of double arrows, and also showing the adjacent sectional view of a curved windshield C84, and also showing the vibrating aggregated but separate corresponding water-pipe and air-pipes represented by V-1; said aggregated separate delivery water pipe and air-pipes shown embedded firmly together with the sectional view of the curved vibrator 122 firmly held firmly within curved external pipe holder.

In FIG. 44B there is shown the top-mounted vibrating inner and outer air-jets and the vibrating central water-jet system in proximal angular fashion in relation to the sectional view of a flat windshield glass F84 in positional relationship with the sectional view of the 3-curved composite inner and outer air-jet delivery pipes and a central water-jet delivery pipe, together with an imbedded curved vibrator 122 which cause the vibration V-1 of said internal nozzles and pipe system. V-2 shows the vibrating air-jets and water-jets that provide comprehensive wiping and cleaning of the external surface of the flat windshield F84.

FIG. 45 is a sectional view of a bottom-mounted composite 10-vibrating linear-slit air-jets and water-jets internal nozzles system, and showing the sectional view of the inner vibrating water-jet linear-slit internal nozzles and inner water pipe, the central vibrating air-jet 3-linear-slit internal nozzles and central air-pipe, and the outer vibrating 4-linear-slit internal air-jet nozzles built-in from the outer air-pipe; also showing the upward flow directions of the corresponding vibrating inner water-jets and vibrating central air-jets streams and vibrating outer air-jets streams, respectively represented by the upward flowing vibrating streams of water-jets and vibrating streams of air-jets represented by corrugated arc V-2, and also showing the adjacent sectional view of a curved windshield C84, and showing the aggregated composite but separate corresponding water-pipe and air-pipes embedded firmly with the sectional view of the curved vibrator, held firmly by the sectional view of a sturdy external pipe holder.

In FIG. 46A there is illustrated a sectional view of a curved windshield C84 with the sectional view of the optional oscillating type system showing the 5 linear-slit internal air-jet nozzles for attaining angled optimal flows of the inner 3 air-jet streams or moving air-jet layers or sheets reinforcing each other to optimally and effectively clean or wipe the various areas of the curved windshield C84. The 2 outer fourth and fifth parallel-flowing air-jets ejecting from below act as effective shield of sustained or intermittent flowing air-jet streams or sheets or layers for the purpose of bouncing off the onrushing rain or snow or dust particles to minimize further penetration of rain, snow, ice and other particulate matters to hit the windshield of a forwardly moving automotive vehicle.

In FIG. 46B there is shown a magnified portion in detailed View-M of FIG. 46A, and illustrating the various corresponding directions of the 5 streams of non-vibrating air-jets flowing in upwards ejection, and emanating from the 5 hidden linear-slit internal nozzles of multi-air-jet system with five separate internal air-jet nozzles coming from a regulated pressurized sectional view of the oscillating type system, situated at the bottom and positioned close to the curved front windshield C84 of a modern automobile.

In FIG. 47 there is shown a simple illustration representing the spraying of water-jets emanating from below the front windshield 84 of a car; said water-jets being sprayed on the external surface of said front windshield 84.

In FIG. 48 there is an illustration of an example of the upward directional multi-angular air-jets streams flowing and impinging on the external front windshield 84, and also showing the various downward directional multi-angular air-jets streams flowing and impinging on regions of the left-side windshields 88 of a modern automotive vehicle.
Note: Some functions described here as hardware operations will actually be implemented in software but the description of the function will not change.

FIG. 49 illustrates an electronic diagram including the signal generating circuit 200, which controls how the system will respond to the rain falling on the windshield and side-view mirrors based on the sensitivity control circuit 202. Circuit 202 calculates certain parameters and passes them to the micro-controller 208. Micro-controller 208 controls the respective valve size to open for the air and water pump valve circuits 216. This determines the quantity of the water directed from the water pump circuit 214 and/or determines how much pressure and temperature of the compressed air is proper as directed by the air pump circuit 212 and respectively as required to be spilled or to be ejected through junction 218 and from 220 onto the selected windshields and side-view mirrors. Time Delay circuit 204, controls the timing of pumping for water-jets and air jets to be ejected to the selected windshields and/or side-view mirrors. The power rectifier circuit 206 allows power rectification of electricity that is collected from the power management system, and the converted required electrical rectification provides the correct needed electrical activations for the air pump circuit 212 and the water pump circuit 214, after the command from the air/water pump valve circuit 216 is received. This conversion is needed for the electricity to be converted from alternating current to direct current for the generating circuit. The High Voltage Generating Circuit 210 generates any required high voltages, providing the correct electrical power to control the air and water pressure and temperature. The various voltages are converted from AC to DC by the Power Rectifier 206. Commands are received from the Application Processor via the Application Interface. The engine 62 provides primary power from the alternator and primary battery A 66 and secondary battery B 68, if needed.

In FIG. 50 shows relevant components for the communications system. GPS components, vibrator, oscillating and other options are not shown. Camera 306 is also included. The touch/voice remote controller 108 can remotely activate (from an active range of distance) the internal air-conditioning/heater system 312 (in FIGS. 40-52 and 56-57) to provide optimal circulating cooling and heating environment inside the modern automobile.

The Remote Wireless signals are received and sent through the RF Transceiver 112. The Baseband Processor 256 and its CPU 254 communicate to the Application Processor 258 to control overall operations.

Information from the Temperature Sensor 70 and Freeing Sensor 54 are used to activate the Air Heater 72 and Water Heater 72w for the relevant operational needs of the various selected windshields and/or side-view mirrors.

The Air/Water nozzles have a high, medium and low pressure settings. The liquid cleaner solutions are the same as would be typically used for the location and weather.

The Vibrator (122 in FIGS. 51, 52, 54, 55, 56 and 57) can be implemented in order to maximize vibration-activated wiping, cleaning and clearing for surface area coverage.

In FIGS. 49, 50, 51, 52, 56 and 57, the output, 220, is selectable from the remote control, the Touch/Voice controller 108, or the Touch/Keypad (250) or through the Microphone 240 to selectively output through output 220 either or both air-jets and/or water-jets. These commands are conveyed to the Application Processor 258 and linked to the Application Interface 286, transmitting data and information to the air/water pump valve circuit 216 in order to open the selected valve size at junction 218 for the correct size and degrees of air-valve to open and/or water-valve to open. The right amount of water-jets can be ejected through output 220 from junction 218, by opening the right water valve size through the air/water pump valve circuit 216, and pumped with the correct pressure by the water pump circuit 214. If heated water is needed, the water heater 72w is activated. The right amount of air can be ejected through output 220 from junction 218 by opening the right air-jet valve size through air/water pump valve circuit 216, and pumped with the correct air-jet pressure by the air pump circuit 212. If heated air-jets are needed, then the air-heater 72 is activated powered by the high voltage generating circuit 210 in order to eject heated air-jets. However, if both water-jets and air-jets are commanded to be ejected through output 220 through junction 218, then both the respective needed water valve size and air valve size are activated in the air/water pump valve circuit 216, and pumped with the correct water-jet pressure and air-jet pressure by the respective water pump circuit 214 and air pump circuit 212. Both are powered by the high voltage generating circuit 210; and if both heated water-jets and heated air-jets are needed, then both water heater 72w and air heater 72 are activated as powered also by the high voltage generating circuit 210. Through the application interface 286, the selected respective commands activate the air/water pump valve circuit 216. The water reservoir will supply the needed water to sustain the ejection of the required water-jets to be released through output 220, and/or the pressurized air-jets will be ejected through output 220 through junction 218.

The Freezing Sensor 54 is set to determine a threshold limit and communicates to the Application processor 258.

The Application processor determines if certain conditions are met and activates the Greet Tone/Alert indicator 294 and displays the temperature on the 2D/3D LCD Display 224 and through the Speaker (246). These events are stored in the Solid State Drive 304, an EEPROM, along with time, date and system status.

If the temperature is below the set limit, the application processor 258, being linked with application interface 286, will alert the user using the greet tone/alert means 294, and through the application processor 258. It will display the temperature on the 2D/3D LCD display 224 and heard through the speaker 246, indicating that the temperature is considered "Freezing". Then the application processor 258 will command the air-heater 72 to be activated. The response will be to allow the heated pressurized air-jets to be ejected through the respective air-jet nozzles through output 220, in order to defrost the current freezing windshield based on the alert from the greet tone/alert means 294 as confirmed, once the application processor 258 sets the limit for the freezing sensor 54 as sent to the application interface 286. The solid state drive SSD 304 will record the information for each of the variables in the process such as: recorded temperature, time, date, and system status.

The Rain Sensor 56 is directly connected to the application processor 258. Once the rain sensor detects any significant precipitation the Application Processor 258 will process the information and make appropriate entries in the Memory control Unit 272 which allows saving the information such as: precipitation amount, time, date, and system status, which can be useful for needed updates and other information. The rain sensor 56 as activated by the amount of rainfall communicates with the application processor 258 through the application interfaces 286 warns or alerts the user with the function of the greet tone/alert means 294, providing also a safeguard for the vehicle to activate its rain defense system. The rain defense system will turn on the respective air-jet nozzles to eject the needed air-jets through output 220, as soon as the rain sensor 56 sends the right signals to the application processor 258 to prompt command through the application interface 286 to deflect the rain and to adjust while the car is in motion or not in motion in order to provide the correct amount and air-jet pressures, selectively released either in sustained or intermittent fashion as regards to the current or progressive motion status of the vehicle's aerodynamic environmental conditions.

The temperature sensor 70 provides a temperature converter to the voltage circuit, and the converter will provide an output signal in volts after the temperature sensor 70 is activated according to specific temperature range for the air heater 72 and/or water heater 72w to be activated and release heated air-jets and/or water-jets according to the commands made by the user, or as pre-set by the specific manufacturer of the system.

The Air Speed Sensor 55 senses air speed, not necessarily car speed, so the system can make allowances for air flow over the windshield from the environment. This also allows for consideration of wind chill factor in calculations. The Air Speed Sensor is basically a rotating vane. This is the reverse of a fan. The faster the wind blows the faster the blades turn and the higher the output voltage. Much the same as is used in weather forecasts. The Air Speed Sensor 55 is physically located in an air scoop up towards the front grill of the vehicle. Other sensors may be housed in the same assembly.

The air heater 72 heats the air as powered by the high voltage generating circuit 210. The air heater 72 will be prompted through the application interface 286, enabling the driver or user a selection for the desired command on the interactive 2D/3D LCD Display 224. The air heater 72 is activated when the freezing sensor 54 in case of cold weather conditions sends the freezing data/information to the application processor 258 which sends an activation command directly through the application interface to the air heater 72 as powered by the high voltage generating circuit 210.

A water heater 72w is utilized to provide heated water to be released through output 220. The amount of required pressurized heated water is controlled by the water pump circuit 214, as prompted through the application interface 286 from the commands from the application processor 258 as initiated by the user using the interactive 2D/3D LCD Command and Display 224. The water heater 72w will also be accessed by the freezing sensor 54, in case when required, depending upon the cold weather conditions as sensed by the freezing sensor which will send data to the application processor 258 that will then also send a command to activate the required functioning of the air heater 72 providing heat for the pressurized air-jets to be ejected together with the ejection of heated water-jets, when required.

From the interactive touch/voice remote controller 108, the remote commands are processed through application processor 258. The remote wireless signals are received at and sent from the RF-Transceiver 112 and regulated by the baseband processor 256 of CPU 254. The application processor 258 sends the specific commands through the application interface 286 to adjust the volume, speed and frequency of release of air-jets and/or water-jets from the longitudinal linear-slit air-jets and water-jets nozzles, and (if optionally installed) will also turn on an electric motor for activating operations of the oscillating system 120 (added in FIG. 52).

Touch/Voice remote controller 108 (also shown in FIGS. 1-5 and FIGS. 50-52 and 55-57) can also wirelessly control the nozzle jets along the specific vehicle's windshields which will then eject from output 220 either or both the selected air-jets and/or water-jets through junction 218 of the specific vehicle system. As mentioned, there will be an option for either water-jets and/or air-jets to be outputted through output 220, depending on the command through the application processor 258 and application interface.

A vibration feature 122 (in FIGS. 51, 52, 54, 55, 56 and 57) is fitted into the Air/Water nozzles to enhance the cleaning actions by modulating the jet spray's intensity for maximum cleaning and clearing effects on each of the selected windshields, because this vibrator feature can provide the jet nozzles at output 220 to reach multiple vibrating angles that are beneficial to achieve ejecting vibrating air-jets and/or water-jets as commanded by the user through the application processor 258. The ejecting vibrating air-jets and/or water-jets coming from output 220 will maximize the wiping and cleaning of any obstructing particulate matters that may be distracting to the vehicle's drivers/users, and, allied with cleaning solution, (if needed), the heated air-jets and water-jets with the adjustable needed air and water pressures and the optional oscillating nozzles (if installed as back-up), may be selected for the required excellent wiping and cleaning and clearing operating performance. The vibrator 122 (added in FIGS. 51, 52, 54, 55, 56 and 57) can be used with an option on a car to be controlled in both stand-alone mode and/or in a user-controlled mode.

The strength and velocity of outputted air-jets and/or water-jets ejected through output 220 will depend upon the option selected pressure settings such as: high, or medium, or low mode settings; the selected required powerful air-jets and/or water-jets are forcefully aimed against the resistance of any material obstructions that may be distracting to the particular vehicle's driver and passengers. If, needed, liquid cleaner solutions 126 (in FIGS. 3, 4, 6, 10, 14,15, 18, 19, 20 and 21) can also be commanded to mix with the water-jets for achieving better cleaning of the selected windshields, and if required, linked with the selected side view mirrors.

The heated air-jets and/or water-jets, and adjustable air/water pressures and vibratory forces provided by the vibrator means 122 (added in FIGS. 51, 52, 55, 56 and 57), and (if installed) the optional oscillating system 120 (added in FIG. 52) which also activates the oscillating vibrating nozzles, will definitely assist in accentuating in the maximal selected windshield cleaning, wiping and clearing effects.

The optional oscillating system 120 (in FIG. 52), involves the oscillating nozzles with activating components and linkages for the vehicle's oscillating wiper system. When activated, while receiving command signals regulating the timing and speeds of the intermittent and/or sustained functioning of the optional selected oscillating bladeless wiper system, determine the frequency occurrence activity of the oscillating system 120 as commands are sent from the touch/voice remote controller 108 or from the voice commands dictated through the microphone 240, or from the touch/keypad 250 along with interactive 2D/3D LCD display 224 located inside the vehicle's control panel.

Preferably, there can be multiple linear-slit nozzles or wavy-slit nozzles for the various styles of vehicles in order to attain maximum wiping and cleaning to cover most of the external surface areas of the vehicle's various windshields. Also, there should be linear-slit nozzles or wavy-slit nozzles for the right-side and left-side windshields as well as for both the right and left side-view mirrors which, preferably should be installed at the top locations of the vehicle's external sections. The selected powerful graded ejections of pressurized water-jets and air-jets must be configured to work in the most favorable direction in coordination with the air-jets ejecting onto the respective various windshields and side-view mirrors. There can be multiple linear-slit nozzles or wavy-slit nozzles or other shapes of applicable different sizes which will output the adaptable required air-jets and/or water-jets according to the different contours and shapes of various windshields and side-view mirrors of the various vehicle designs. There will be an option for either water-jets to be outputted and/or air-jet to be outputted depending on the commands through the application processor 258. This option can also be combined with the oscillating setting of the optional oscillating embodiment of the present invention which can act as a back-up feature, (if installed), in order to provide maximum wiping, cleaning and clearing coverage during harsh weather conditions.

The Signal Generating circuit 200 provides timing for analog and digital circuits via the Application Interface 286. This signal generating circuit 200 is important for using the correct operation to find out what circuit will be tested for use in the system. The signals will also be in a troubleshooting unit for any internal repairs and adjustments that may be needed for any correct signals. There will be many different types of signal generator techniques that can be applied to ensure that all applications are able to process signal commands via the application interface 286 which will receive the signals that come in from the vehicle's RF-Transceiver 112 that are processed in the CPU 254.

A heating function feature using air heater 72 and water heater 72w will also be powered by the high voltage generating circuit 210. The power rectifier circuit 206 is controlled through the application interface 286 that receives the command from the software installed in the application processor 258.

Options are provided to control the adjustments for high, medium and low pressures for both the air and water pumps. The power systems will allocate the necessary power for the vibrator feature 122 as well as for the optional oscillating system 120 (in FIG. 52).

The Sensitivity Control Circuit 202 will be controlled by the Applications Processor 258 which will give the most efficient level of gain for the range selected through the Application Interface 286. The Sensitivity Control Circuit 202 will monitor the signals that are collected from the RF Receiver 112 and sent to the Baseband Processor 256.

When the air pump circuit 212 is activated, the suctioned ambient air is compressed and sent through the respective delivery air-pipes to the proper locations accordingly. The air pump 212 which will preferably be located at the bottom of the front windshield of the vehicle, and, at the rear windshield of the vehicle, the air pump may be situated at the top portion of the vehicle. Structural designs and placements of the air-jet and water-jet nozzles must be made so that the ambient air-flow of the forward moving automobile will coordinate to work favorable to the directional flow of the ejected air-jets.

The application processor 258 sends the commands for the amounts and degrees of the required pressurized air from the compressor. Through the respective delivery air-pipes, the pressurized air is led to junction 218, and through output 220 will release powerful multi-layers or forceful streams of air-jets from the respective air-jet nozzles for wiping and cleaning the selected windshields and side-view mirrors.

The water pump circuit 214 controls the required water pressure levels, coming from the water reservoir, in accordance with the degree of pressurization commanded by the user. Then, the volume of pressurized water is conveyed through the respective delivery water pipe as pumped from the selected water pump, (placed below the front windshield of the vehicle, and, in case of the rear windshield of the vehicle, the water pump may be located at the most favorable convenient place, depending upon the design of the vehicle). The high-voltage generating circuit 210 allocates the required amount of voltages needed.

The spraying of pressurized water should conform with the ambient air-flow encountered by the forwardly moving vehicle. The water pump circuit 214 has an option for mixing liquid cleaner solution, which, together, can be dispersed onto the external surfaces of the vehicle's selected windshields and side-view mirrors to provide better cleaning of undesired particulate matters encountered while the vehicle is in operation.

The air/water pump valve circuit 216 receives commands through the application interface 286 that will determine the amount of air and/or water volume adequately needed to be outputted. The power rectifier circuit 206 determines and sends the necessary voltage that the high voltage generating circuit 210 will allow for both the air pump circuit 212 and the water pump circuit 214.

The touch key pad 250 is a user interface system that will have a visual display inside the automobile systems that can directly communicate with the keyboard touch screen controller 226. The touch/keypad will be responsible for all user interfacing applications with the application interface processor 286, and that the various application operations are displayed on the 2D/3D LCD display 224, the signal command being processed by the application processor 258.

At the controller valve junction 218 a switch is allocated so that with the activation of the air pump circuit 212 and/or water pump circuit 214, the required air-jets and/or water-jets can be outputted through the output system 220. A logic gate is activated according to the command from the application processor 258 which switches from a water pump to an air pump or vice versa, or, if needed, to activate both air pump and water pumps. Junction 218 is in communication with the water pump circuit 214, and the air pump circuit 212, respectively controlling the required levels of the pressurization of water and air. The Controller valve at junction 218 is also directly connected to the air/water pump valve circuit 216 which is linked through the application interface 286 as prompted by the user once the command signal is sent from the application processor 258 of CPU 254.

The 2D/3D LCD Display 224 is a switchable LCD interactive display that has the option to display either a 2-dimensional display or a 3-dimensional display. The 2D/3D display 224 option will be controlled by a 2D-3D controller 222 that can provide an automated process for the user on the display side certain controls that will receive data commands through the application processor 258. This will also provide the user/driver to track the automobile's position using the GPS system 308 in better displaying the needed images on a 3-D view with more accurate displayed landmarks.

The 2D/3D Controller 222 is where the application processor 258 allows the visual display to switch from 2D to 3D, which will have a toggle option provided by a user command through the application interface 286 and the application processor 258 and will be shown on the 2D/3D LCD display system. This will provide the user/driver to track the position using GPS system in better displaying the images on a 3-D view with more accurate displayed landmarks.

The keyboard/touch screen controller 226 converts the commands inputted by the registered user into programmable language which will be converted here in logic for communications with the application processor 258. The user will have the option to command the needed operational activities and adjustments of the vehicle's respective air-jets and/or water-jets to be ejected. Also, the user will be able to activate and control the optional selected nozzle oscillating system 120 (in FIG. 52), as well as the vibrator 122 (in FIGS. 51, 52, 55, 56 and 57) to provide the necessary needs and proper requirements for the specific vehicle to achieve maximum vibration-dependent cleaning, wiping and clearing operations onto the various selected windshields and/or side-view mirrors.

The activated relevant electronic circuitry can adjust and control the proper timing, volume output, graded pressures, angular orientation, vibrations, sustained or intermittent jet release, and frequency operations of the nozzle systems (the ones with longitudinal linear-slit nozzles or wavy-slit nozzles, and, (if installed as an auxiliary, will also activate the optional oscillating system) in order to adjust for the required adaptable maximum frequency and accurate ejection volume and intensities of the air-jets and/or water jets coming from the respective nozzles to be released onto the external surface areas of the various respective windshields and/or side-view mirrors.

The LED signal light display 230 will be used to indicate the voltage level status of the current system as the LED will receive the commands from the CPU 254 in order to emit light for the car's alert means 294.

The main function of microphone 240 is to capture analog data/information that will be produced by a driver/user/owner which will be sent to the audio/video CODEC 228 for the proper signal files to be converted and, then handled by the application processor 258. Another function of microphone 240 device is to provide means for all communications from the user to the various proper applications and telecommunications. The microphone 240 is linked into the automobile's speaker system 246 and for voice amplifications as well. The user will have the option to say or dictate voice commands, and with processing by the application processor 258 and through the application interface 286, the user can control different optimal variations of the desired operational features.

The speaker 246 is an output device used to send an analog signal to the user in a computer-generated voice provided by a program controlled by the application processor 258 and application interface 286. The application processor 258 dictates for the proper digital signal conversion to analog as sent to and from the application processor 258 and through the application interface 286 and then heard through the speaker system 246. The head set jack 248 provides an input port that will be used for an external source for the earphone system that can be connected. This feature will function with Audio/Video CODEC 228 which controls the signals coming in through the head set jack sent from CPU 254.

Feature access control 252 is where the uploaded programs are routed, and saved in the Ram-1/Ram-2 268 that are designed for the automobile's internal 2D/3D LCD display system 224, and available here to interact with the current user through the application interface 286 with the control of the application processor 258. This will provide both audio and visual data from the keyboard/touch screen controller 226 in coordination with an application program that is formatted for use inside the respective automobile.

The Remote Wireless signals are received and sent through the RF Transceiver 112. The Baseband Processor 256 and its CPU 254 communicate to the Application Processor 258. to control overall operations.

The radio-frequency transceiver 112 contains both a receiver and a transmitter within the same circuit housing for the use of high speed data transmissions using a digital signal processor which is programmable from the CPU. The R-F transceiver 112 uses conversions for both digital signals as well as analog signals taken in from antenna 116. The transceiver connects with the baseband processor 256. The Antenna 264 will serve as a physical station for incoming signals that, after amplification by the power amplifier 114, is sent to the baseband processor 256 via the R-F transceiver 112. Antenna is used also for transmitting signal.

The power amplifier 114 is a unit which provides a function to the antenna 112 in boosting the input and output signals for the vehicle's system which is controlled by the baseband processor 256 that manages all the radio frequencies received by the vehicle. The power amplifier 114 can be controlled by the CPU also without any commands from the user in order to protect the car while the user is not inside of the vehicle. The radio frequencies that are received by the RF-transceiver 112 will all be scanned and managed by the baseband processor 256.

The vehicle's antenna 116 collects radio waves which are converted to electrical signals, and amplified by power amplifier 114 and sent directly to the RF-transceiver 112 for the signal processing inside of the baseband processor 256. The main function of the antenna 116 will be for the internal components such as: radio, two-way communication, radar components, microphones, satellite, garage door activation system, Bluetooth, internet connection, RFID keys, all of the cellular communication, and any broadcasting that may be prompted to be displayed on the 2D/3D LCD display 224 controlled by the CPU 254 with the application interface 286 and application processor 258.

The RF sensor 118 collects radio frequency waves to transfer data to the linked R-F transceiver 112, which will then be processed by the baseband processor 256. The antenna 116 transfers the radio frequencies collected for power amplification by the power amplifier 114 for processing by the baseband processor 256. The function of the RF sensor is to label the collected signals and provide those signals to the R-F transceiver 112 and to be processed by the baseband processor 256. RAM-1/RAM-2 268 are used for the vehicle's system for randomly accessing the systems applications and software programs, while allowing the user to read and write the data accessed. RAM requiring power stores data, so the vehicle uses a hard disk via the memory controller 272 for data that needs to be stored. The application interface 286 with the application processor 258 will also communicate with the RAM 268 storage center for applications needing to be accessed autonomously for features in and outside of the car.

ROM 270 is utilized by the relevant linked electrical devices as storage and retrieval for the needed installed data software for the various hardware components connected. The ROM cannot be easily edited or reprogrammed and serves as a permanent storage for the vehicle's program boot system which will only allow reading data. The vehicle's manuals will all be digitally stored here that are not needed for re-booting the system itself. Memory Controller 272 is used for controlling the proper commands for the systems' usages for the relevant data that need to be stored as well as be the conduit for any updates that are sent and received from the application processor 258. The CPU 254 communicates with the memory controller 272 each time that a process requires a storage check to verify the correct data that can be updated using the flash drive 302. The batteries A 66 and B 68 are charged as the AC voltage is converted into DC. The voltage conversion circuit 280 equipped with diodes will be in control of the conversion of alternating current to the direct current for electrically charging and recharging the batteries which supply electrical power as continuously supported by the operating engine 62. The batteries are charged, providing the vehicle with the needed power to the relevant linked systems, while the vehicle engine is shut off. The batteries will also be the electrical source of the vehicle's selected components while the car is in the idle state, thereby, acting as a support to the engine alternator. The power management integrated circuit 278 controls the diodes that direct the voltage to flow to the batteries. Battery Charger/Adapter 274 is the internal source for the user's portable devices within the vehicle, and can also be used as the car's electrical energy source. Engine 62 with alternator converts mechanical operations into electricity, and provides the automobile with motion, and, also responsible for most of the vehicle's consumption and regeneration of electricity. The AC current is converted to DC current which is used by the engine and powers all the main components of the vehicle, inclusive of the regeneration of the battery A 66 and battery B 68 and other linked batteries. The alternator takes the mechanical energy, generates electricity, and sends it to the motor that is recharging the battery. The current in-turn powers the electrical components of the automobile like the exterior lights, interior lights, and instrument panel. The power management integrated circuit 278 is the main control center that allocates the correct voltage for each component inside the vehicle's system which the application processor 258 processes to provide the needed limits as programmed by the manufacturer. The power management IC 278 is responsible for the various allocated effective voltages for each of the individual electrically dependent components. The power supply switching circuit 284 is the regulator that electronically controls and converts the various required electrical power to the various relevant connected components efficiently. This switching circuit transfers the required electrical power to the power management IC 278.

In FIGS. 51 and 52, the PIN/Password 288 give alternate access aside from the biometric scanner 290 in order to gain access to the vehicle's internal systems components; wherein a PIN (Pin number) or special password can be part of the registered owners/users assigned protection for the right users or owners to operate the vehicle's systems. The PIN/Password can be stored in the system's ROM 270 to avoid system deletion prior to the vehicle losing power, and when in the active mode as verified and authenticated, allows access to the vehicle at all times.

In FIGS. 51 and 52, the Biometric Scanner 290 allows the user to gain access to secure devices either or both located inside the automotive vehicle or within the range of touch/voice remote control 108 outside the vehicle, as well as in the vehicle's main application interface assistant system. The biometric scanner 290 will be prompted by the users who are programmed as authentic registered owners/users of the specific vehicle connected to the relevant database, thereby, only allowing access to those programmed accepted owners/users for accessing the specific vehicle's functions and features. The Biometrics information will be stored in the systems' SS Drive 304 to avoid system deletion prior to the vehicle losing power and which allows relevant access to the specific automotive vehicle at all times. The scanner will be installed for dual mode security which will be both on the external vehicle's door as well as at the vehicle's dash board or steering wheel, depending upon the design and construction of the specific vehicle. The frequency tuning circuit 298 allows the user to access different radio frequencies for different AM/FM radio signals. The desired timing and frequency of nozzle oscillations of the optional oscillating type system 120 (in FIG. 52) for the ejections of air-jets and water-jets will also be controlled by the driver or user from the control panel inside the car or remotely from certain acceptable range through the use of a linked touch/voice remote controller 108, while receiving command signals to regulate the volume, graded pressures, speed and intensities of the intermittent and/or sustained ejection functioning operations that will be best suited for cleaning and clearing the selected windshields according to the weather conditions and as needed and commanded by the registered user (if the said oscillating system is optionally adapted as a back-up system). The optional oscillating system 120 (in FIG. 52) controls the vibrations of oscillating nozzles which may be embedded strategically with vibrating rings around each oscillating nozzle. An electric motor and linkages will be connected to the oscillating nozzles.

Voice commands can be made using the microphone 240, or manually done using the touch/keypad 250 along with interactive 2D/3D LCD display 224 located inside the vehicle's control panel.

The power unit 300 supplies electrical power to the power rectifier circuit 206 which supplies the high voltage generating circuit 210 for supplying enough power to the air pump circuit 212 and the water pump circuit 214 and the water heater 72*w* and air heater 72. The voltage generated from the engine with alternator is converted from alternating current to direct current, and allowing the correct amount of voltage to be distributed in the car. The power rectifier circuit 206 is also linked to the application interface 286 and linked to also supply power to the CPU 254, including application processor 258 and baseband processor 256.

Flash drive 302 will allow the user to use removable storage data slot inside of the car for car updates and system upgrades that can communicate with the application processor 258, and allowing the Ram-1/Ram-2 268 to add more applications or update them. This can also be used by different authorized users in the car to add features to the car's applications as well as store information which can be linked to the Biometric Scanner 290.

SS Drive 304 is for personal data storage that the user may need to access over time, which includes personal data for the user to access through the application interface 286 and application processor 258 to be displayed on the 2D/3D display 224 through the 2-D/3-D controller 222. Selected program applications files will also be stored here in the Solid State drive for use through the application processor 258 which will command for the updates inside through the Memory controller 272.

Camera system 306 is set up inside of car that is controlled by the CPU 254. Biometric scanner 290 stores biometric data and from the data stored in the SS drive 304 to determine if the user is the real registered owner/driver/user of the specific automotive vehicle. If not, the CPU 254 will then send out a signal to the alert means 294 to warn the real owner/driver/user for protection, in order to prevent the operations of the specific automotive vehicle from use by any fraudulent intruder. The camera system can also be coordinated for use in taking and recording visual happenings and surroundings within and outside the vehicle which can also be recorded in the memory storage of the vehicle system, if desired.

The application of the GPS System 308 is mainly stored in the ROM 270 in order to be accessed through the application processor 258, thereby allowing the user to access a Global Positioning System for accurate area location as well as to provide access as to the needed destination while the CPU 254 sends commands to the GPS system, and outputs the needed data to the speaker 246 and for the user to interact with the interactive 2D/3D display 224 that communicates with the application processor 258.

The voice recorder 236 is linked with the language translator processor 232, once the user sends an input command to the application processor 258 with either from the touch/keypad 250 through keyboard/touch screen controller 226, or from a command using microphone 240 for access by the registered user.

In the event of an emergency, the voice recorder 236 will be able to record voice data and store that information within the SS drive 304 which can be accessed by a command through the memory controller 272.

Each voice is unique so the voice recorder processor 234 will allow the voice recorder 236 to access the correct voice which will be matched with the application processor 258 for commands given by a user or an administrator user. The speech controller 244 will allow the user to send commands to the application processor 258 by voice which is processed by the application processor 258 that uses the language translation processor 232 in conjunction with the translation file database 238 to verify the language of the user which is sent in from the microphone 240 which is an input device with a main function to capture analog data that will be produced by a user.

The Feature extraction unit 242 extracts the features which characterize the input utterances of the user in order to facilitate speech recognition. The Speech controller 244 recognizes the spoken utterances based on the data extracted by the Feature extraction unit 242. This pattern recognition system is trained and tested for each authorized registered user's utterances so as to allow only the registered driver/owner/user to operate the vehicle's systems and operational components. The utterances may come in response to prompts conveyed to the authorized user through Audio/Video CODEC means 228 through Speaker 246 or head set jack 248, coming from Application Processor 258 of CPU 254, and through prompts conveyed to the respective authorized user through interactive 2-D/3-D LCD display 224, also, directed from Application Processor 258 of CPU 254, which already has a two-way link with the Audio/Video CODEC means 228.

Translation file database 238 via language translation processor 232 for conversion of different languages or dialects (when available) are provided for supporting language translation or dialect translation if available (and/or possibly as advances in technological communications occur, can also extend to further accurate extra-terrestrial communications) and/or in the future can be allied to become very responsive to the receptions and transmissions of other subtle energetic vibration frequencies of biological-borne thought waves and biological-borne vivid imagination patterning and vivid imagination-image reconstruction, detection, transmission, reception, storage and retrieval of data and information capture, inter-change and translation data in the future) for greater and broader useful anti-fraud and detection of the state-of mind of the driver and passengers to prevent accidents.

Optionally, as the language translation application is activated, the vehicle's system prompts the user to select the language to be translated into the language to be outputted for translation of contents, and requests the user to enter the input utterances of his speech through Microphone 240, then via the Audio/Video CODEC 228, and the Application Processor 258, gets processed through Voice record processor 234, and will be recorded in the Voice recorder 236. The recorded voice is inputted to the Language translation processor 232 to convert the speech into the desired selected output language. The Language translation processor 232 is connected to the Language translation file database 238, which provides the necessary information for the required language translation. The Language Translation processor 232 gets the data from the Translation file database 238 and translates the input speech into the desired language output speech. The translated language is outputted through either the Speaker 246 and/or through the Head set jack 248, via the Application Processor 258 and Audio/Video CODEC 228.

Voice recording application performs to record the voice of the users and the interactive vocal translations from one selected language to the chosen language (or from one selected dialect to another chosen dialect, when available) according to the respective dates, times and GPS locations (according to the relevant programming or modes of desired relevant operations and availability) and saves them in the RAM 268 or other flash drive devices.

Memory module for storing the program information and transaction information consists of Read Only Memory (ROM) 270 and Random Access Memory 222 (RAM) 1, 2, 3. The ROM 270 stores all the programs required to operate the relevant components through CPU 254, whereas the Random Access Memory 268 stores the time data, GPS data, voice and translation recorded data, textual/talking/singing greetings data, camera data, biometric data, voice-activated PIN/password data, language or dialect data, temperature data, transactions and communications data, audio-visual data and other corresponding activities and other relevant data, according to the desired applications used that may be additionally incorporated with the present inventive device and system.

The present inventive device can also have provisions for the temporary memory like Micro-SD for storing extra data. The Memory Controller 272 controls the memory requirements for the different types of memories for the vehicle's system, and should have sufficient power available as needed.

It must be understood that although the drawings and specifications and explanations are centered mostly on the inventive applications for effectively wiping and cleaning the various viewing transparent windshields and side-view mirrors of modern state-of-the-art automobiles, some of the features and embodiments of the present invention can be modified for applicability to extend in providing year-round cost-saving and time-saving effective wiping and cleaning the transparent viewing shielding surfaces of modern high-rise, medium-rise and low-rise buildings with or without fluid suctioning mechanisms for absorbing ejected water-jets and air-jets so as not to spill them to outside pedestrians walking or standing by around the being cleaned buildings.

To activate and maintain adequate cleaning power to the fluid compressors, certain linear or spiral multiple-bladed small compressors with noise reduction features, including associated suctioning mechanisms can be developed (which is are within the scope of ramifications of the present invention.

The persons having ordinary skill in the art will understand that terms such as "above," "below," "upward," "downward," "top," "bottom," front windshield, rear windshield, left-side and right-side windshields, side-view mirrors, linear-slit or wavy-slit nozzle system or any other suitable shapes and forms of nozzle systems, multi-air-jet streams and multi-water-jet streams, bladeless surface cleaning device, etc. are used descriptively for the figures and explanations, and do not represent limitations on the scope of the present invention, as defined by the appended claims.

I claim:

1. A bladeless non-visual distracting multi-jet surface wiping, cleaning and clearing apparatus and system, comprising:
    a. at least one fluid source communicating with a plurality of openings configured to connect to at least one longitudinal singular or an aggregated plurality of longitudinal fluid delivery pipes, each pipe having apertures extending therethrough configured to direct the flow of fluid;
    b. at least one fluid suctioning component for obtaining and delivering suctioned fluid from the surrounding ambient air environment;
    c. at least one compressor component, wherein the at least one compressor component is configured to force and compress fluid material from the at least one fluid source through the apparatus and system, wherein the at least one compressor component is in electrical communication with the at least one fluid source, a power source component for pressurizing the fluid and for conveying pressurized fluid though the at least one singular longitudinal pipe or through the aggregated plurality of longitudinal pipes leading to the one or more built-in linear-slit or wavy-slit jet nozzles configured to cause pressurized fluid ejection of multi-streams of air-jets or water-jets or the combination of both air-jets and water-jets targeting most multi-regions of the surface to be wiped, cleaned and cleared;
    d. at least one commanding component for initiating wiping, cleaning and clearing cycle operations of the surface to be wiped, cleaned and cleared;
    e. at least one regulator component for regulating the degree of applied pressurization of the fluid by the at least one compressor component;
    f. at least one control component for controlling the volume and delivery of the pressurized fluid through the at least one longitudinal singular or the plurality of aggregated longitudinal delivery pipes leading to the built-in one or more linear-slit or wavy-slit jet nozzles and for initiating and controlling the power, velocity, timing and frequency of the cyclic release and angular orientation and rapid intermittent or sustained momentum of the ejecting pressurized fluid jets targeting multi-regions of the surface to be cleaned and cleared;
    g. at least one built-in fluid reservoir component having one or more openings configured to connect to the longitudinal singular or the aggregated plurality of longitudinal delivery pipes;
    h. at least one attachment component having a first portion linked and attached to the surface wiping, cleaning and clearing apparatus and system and a second portion positioned in close proximity with the surface to be wiped, cleaned and cleared and for allowing regulated angular ejections of multi-layers of air-jets or water-jets or the combination of both air-jets and water-jets for wiping, cleaning and clearing the multi-regions of the surface to be wiped, cleaned and cleared; and
    i. at least one motor component for generating regulated activation of the intermittent and sustained wiping, cleaning and clearing cycle and for effectively targeting the multi-regions of the surface to be wiped, cleaned and cleared.

2. The bladeless non-visual distracting multi-jet surface wiping, cleaning and clearing apparatus and system of claim 1, wherein at least one configured attachment component is attached to conform with the contour of at least one perimeter of the surface to be wiped, cleaned and cleared.

3. The bladeless non-visual distracting multi-jet surface wiping, cleaning and clearing apparatus and system of claim 1, wherein the at least one linear-slit or wavy-slit nozzle or a combination of both the at least one linear-slit and wavy-slit nozzles are built-in from the at least one singular longitudinal fluid delivery pipe or the aggregated plurality of longitudinal fluid delivery pipes that follow at least one perimeter of the surface to be wiped, cleaned and cleared, and wherein the at least one linear-slit or the combination of linear-slit and wavy-slit jet nozzles are angled for ejecting pressurized fluid of one jet stream or multiple streams of air-jets or water-jets or the combination of both air-jets and water-jets for wiping, cleaning and clearing the targeted multiple regions of the surface to be wiped, cleaned and cleared.

4. The bladeless non-visual distracting multi-jet surface wiping, cleaning and clearing apparatus and system of claim 1, wherein at least one fluid heater component is incorporated with the apparatus and system for heating the fluid which is air or water or a combination of air and water for ejecting heated air-jets or water-jets through the respective linear-slit or wavy-slit air-jet or water-jet nozzle or nozzles angled onto the targeted multi-regions of the surface to be wiped, cleaned and cleared.

5. The bladeless non-visual distracting multi-jet surface wiping, cleaning and clearing apparatus and system of claim 1, wherein at least one vibrator component is incorporated with the apparatus and system for emitting various energetic frequencies and for initiating and accentuating the controlled vibrations of the linear-slit or wavy-slit jet nozzles and the ejecting air-jets or water-jets or the combination of both air-jets and water-jets for broadening the wiping, cleaning and clearing coverage of the ejecting and vibrating air-jets or water-jets for greater and broader wiping, cleaning and clearing of the targeted multi-regions of the surface to be wiped, cleaned and cleared.

6. The bladeless non-visual distracting multi-jet surface wiping, cleaning and clearing apparatus and system of claim 1, wherein at least one vacuuming component is incorporated with the apparatus and system configured for aiding the air-jets or water-jets in minimizing leakage of various undesired debris into the surrounding environment during the process of wiping, cleaning and clearing the multi-regions of the surface to be wiped, cleaned and cleared.

7. The bladeless non-visual distracting multi-jet surface wiping, cleaning and clearing apparatus and system of claim 1 wherein the surface to be wiped, cleaned and cleared is at least one windshield of an automobile or an aquatic or an amphibian or a flying vehicle.

8. The bladeless non-visual distracting multi-jet surface wiping, cleaning and clearing apparatus and system of claim 1, wherein the longitudinal singular pipe or the aggregated plurality of longitudinal fluid deliver pipes are configured to follow along the at least one perimeter of the surface to be wiped, cleaned and cleared and positioned as visually non-protruding and non-visual-distracting from the windshield visual fields of the driver and passenger or passengers of an automobile or an aquatic or an amphibian or a flying vehicle during driving operations or during stopping or parking conditions.

9. The bladeless non-visual distracting multi-jet surface wiping, cleaning and clearing apparatus and system of claim 7, wherein the surface to be wiped, cleaned and cleared is at least the front and the rear windshields of an automobile.

10. The bladeless non-visual distracting multi-jet surface wiping, cleaning and clearing apparatus and system of claim 7, for wiping, cleaning and clearing the surface of a right and a left side-view mirrors of an automobile or an aquatic or an amphibian or a flying vehicle.

11. The bladeless non-visual distracting multi-jet surface wiping, cleaning and clearing apparatus and system of claim 1, wherein the linear- slit or wavy-slit air-jet nozzles are built-in at a tip of at least one oscillating arm of a motorized back-and-forth swinging structural system hidden or away from the windshield viewing fields of the driver and passengers for wiping, cleaning and clearing the surface to be cleaned and cleared of at least one windshield of an automobile or an aquatic or an amphibian or a flying vehicle.

12. The bladeless non-visual distracting multi jet surface cleaning and clearing apparatus and system of claim 1 wherein the surface to be wiped, cleaned and cleared is the transparent viewing shielding panel of a building.

13. An Apparatus and system for providing effective bladeless transparent wiping and clearing of windshields and side-view mirrors of automobiles and other mobile vehicles, including transparent viewing shielding panels of buildings, operating by removing vision-obstructing particles of rain, ice, snow, dust, dirt and debris, using regulated sustained or intermittent release of forceful multi- streams of angular-oriented fluid jets ejected from angled linear-slit or wavy-slit jet nozzles built-in from a singular or a plurality of aggregated straight or contoured pressurized longitudinal fluid delivery pipes, structurally placed at hidden sections away from visual fields of drivers and passengers of automobiles and flying vehicles and marine vehicles including transparent shielding panels of buildings; wherein an amount and volume of pressurized suctioned jet fluid, intensity, velocity, and timing of cyclic pressurized jet fluid ejections are regulated by components and systems for selective manual or automated commands, regulations, temperature sensing and fluid suctioning mechanisms powered by electrical power supply, comprising of :

a. at least one fluid source communicating with a plurality of openings configured to connect to at least one longitudinal singular or an aggregated plurality of longitudinal fluid delivery pipes, each pipe having apertures extending there-through configured to direct the flow of fluid;
   b. at least one fluid suctioning component for obtaining and delivering suctioned fluid from the surrounding ambient air environment;
   c. at least one compressor component, wherein the at least one compressor component is configured to force and compress fluid material from the at least one fluid source through the apparatus and system, wherein the at least one compressor component is in electrical communication with the at least one fluid source, a power source component for pressurizing the fluid and for conveying pressurized fluid though the at least one singular longitudinal pipe or through the aggregated plurality of longitudinal pipes leading to the one or more built-in linear-slit or wavy-slit jet nozzles configured as angularly positioned to cause pressurized fluid ejection of multi-streams of air-jets or water-jets or the combination of both air-jets and water-jets targeting most multi-regions of the surface to be wiped, cleaned and cleared;
   d. at least one commanding component for initiating wiping, cleaning and clearing cycle operations of the surface to be wiped, cleaned and cleared;
   e. at least one regulator component for regulating the degree of applied pressurization of the fluid by the at least one compressor component;
   f. at least one control component for controlling the volume and delivery of the pressurized fluid through the at least one longitudinal singular or the plurality of aggregated longitudinal delivery pipes leading to the built-in one or more linear-slit or wavy-slit jet nozzles and for initiating and controlling the power, velocity, timing and frequency of the cyclic release and angular orientation and rapid intermittent or sustained momentum of the ejecting pressurized fluid jets targeting multi-regions of the surface to be cleaned and cleared;
   g. at least one built-in fluid reservoir component having one or more openings configured to connect to the longitudinal singular or the aggregated plurality of longitudinal delivery pipes;
   h. at least one attachment component having a first portion linked and attached to the surface wiping, cleaning and clearing apparatus and system and a second portion positioned in close proximity with the surface to be wiped, cleaned and cleared and for allowing regulated angular ejections of multi-layers of air-jets or water-jets or the combination of both air-jets and water-jets for wiping, cleaning and clearing the multi-regions of the surface to be wiped, cleaned and cleared; and i. at least one motor component for generating regulated activation of the intermittent and sustained wiping, cleaning and clearing cycle and for effectively targeting the multi-regions of the surface to be wiped, cleaned and cleared.

\* \* \* \* \*